US008180999B1

(12) United States Patent
Oakenfull

(10) Patent No.: US 8,180,999 B1
(45) Date of Patent: May 15, 2012

(54) VERTICALLY TIERED HORIZONTALLY EXPANDABLE MICRO GRID SYSTEM WITH BRIDGE DOCKING BAY CONTOURED BY RADIAL ARMS EXTENDING FROM CENTRAL HUB FOR COUPLING PROCESSOR OR POWER HUBS

(75) Inventor: Ian Edward Oakenfull, Queensland (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/048,158

(22) Filed: Mar. 15, 2011

Related U.S. Application Data

(63) Continuation of application No. 12/699,177, filed on Feb. 3, 2010, now abandoned.

(51) Int. Cl.
*G06F 15/16* (2006.01)
*H05K 7/00* (2006.01)

(52) U.S. Cl. .......... 712/28; 361/725; 361/728; 361/729; 710/303

(58) Field of Classification Search .................. None
See application file for complete search history.

(56) References Cited

U.S. PATENT DOCUMENTS

| 5,243,704 | A | * | 9/1993 | Baty et al. .................. 710/100 |
| 5,253,141 | A | * | 10/1993 | Hellwig et al. ............ 361/679.6 |
| 5,537,111 | A | | 7/1996 | Martin et al. |
| 6,598,124 | B1 | | 7/2003 | Damron et al. |
| 7,343,222 | B2 | | 3/2008 | Solomon |
| 7,461,130 | B1 | | 12/2008 | AbdelAziz et al. |
| 7,521,138 | B2 | | 4/2009 | Pearson |
| 7,594,015 | B2 | | 9/2009 | Bozak et al. |
| 2005/0160424 | A1 | | 7/2005 | Broussard et al. |
| 2007/0073861 | A1 | | 3/2007 | Amanuddin et al. |
| 2008/0027591 | A1 | | 1/2008 | Lenser et al. |
| 2008/0133052 | A1 | | 6/2008 | Jones et al. |
| 2010/0145536 | A1 | | 6/2010 | Masters et al. |

OTHER PUBLICATIONS

Notice of Allowance (Mail Date May 17, 2011) for U.S. Appl. No. 13/045,654, filed Mar. 11, 2011; Confirmation No. 3341.
U.S. Appl. No. 12/494,497, filed Jun. 30, 2009; First Named Inventor Ian Edward Oakenfull; Confirmation No. 1236; Expressly Abandoned Nov. 19, 2010. Notice of Abandonment Nov. 23, 2010.
U.S. Appl. No. 12/497,818, filed Jul. 6, 2009; First Named Inventor Ian Edward Oakenfull; Confirmation No. 7280; Expressly Abandoned Nov. 24, 2010. Notice of Abandonment Nov. 29, 2010.

(Continued)

*Primary Examiner* — Kenneth Kim
(74) *Attorney, Agent, or Firm* — Schmeiser, Olsen & Watts; John Pivnichny

(57) ABSTRACT

A micro grid apparatus and associated method of formation. At least one tier in a printed circuit board is formed. Each tier includes complex shapes interconnected by bridge modules. Each complex shape includes a central area and at least three radial arms external to and integral with the central area. Each radial arm extends radially outward from the central area. Each pair of adjacent radial arms defines a docking bay. Each complex shape is either a power hub whose central area includes rechargeable batteries or a processor hub whose central area includes processors. A bridge unit of a bridge module is latched in at least one docking bay of each complex shape. Each docking bay not latching a bridge unit of any bridge module latches an irregular shaped module. An irregular shaped module is latched in at least one docking bay in at least two complex shapes.

20 Claims, 106 Drawing Sheets

OTHER PUBLICATIONS

U.S. Appl. No. 12/541,205, filed Aug. 14, 2009; First Named Inventor Ian Edward Oakenfull; Confirmation No. 2876; Expressly Abandoned Dec. 13, 2010. Notice of Abandonment Dec. 16, 2010.

U.S. Appl. No. 12/609,057, filed Oct. 30, 2009; First Named Inventor Ian Edward Oakenfull; Confirmation No. 7660; Expressly Abandoned Jan. 21, 2011. Notice of Abandonment Jan. 24, 2011.

U.S. Appl. No. 12/699,128, filed Feb. 3, 2010; First Named Inventor Ian Edward Oakenfull; Confirmation No. 5321; Expressly Abandoned Mar. 14, 2011.

U.S. Appl. No. 12/699,177, filed Nov. 3, 2010; First Named Inventor Ian Edward Oakenfull; Confirmation No. 5429; Expressly Abandoned Mar. 16, 2011.

U.S. Appl. No. 12/952,716, filed Nov. 23, 2010; First Named Inventor Ian Edward Oakenfull; Confirmation No. 2214.

U.S. Appl. No. 12/949,059, filed Nov. 18, 2010; First Named Inventor Ian Edward Oakenfull; Confirmation No. 5101.

U.S. Appl. No. 12/963,777, filed Dec. 9, 2010; First Named Inventor Ian Edward Oakenfull; Confirmation No. 3557.

U.S. Appl. No. 13/010,123, filed Jan. 20, 2011; First Named Inventor Ian Edward Oakenfull; Confirmation No. 2099.

Notice of Allowance (Mail Date Feb. 9, 2011) for U.S. Appl. No. 12/952,716, filed Nov. 23, 2010; Confirmation No. 2214.

U.S. Appl. No. 13/045,654, filed Mar. 11, 2011; First Named Inventor Ian Edward Oakenfull; Confirmation No. 8166.

Ortiz et al.; Autonomous Collaborative Agents in Wireless Environments; SRI Presentations and Demos; SRI International; Department of the Navy Science & Technology; 23 pages.

Pravin Varaiya; Intelligent Autonomous Agents: Convergence of Communications, Networking, Adaptive Control, and Real-time Distributed Computing; University of California, Berkeley; pp. 0-22.

Anonymous: "Blade server"; Wikipedia; Jul. 3, 2009; pp. 1-6; XP002601339. [online]. Retrieved from the Internet: < URL: http://en.wikipedia.org/w/index.php?title=Blade_server&oldid=300051901 . [retrieved on Sep. 20, 2010].

Smith et al.; "Towards a Service-Oriented Ad Hoc Grid"; Parallel and Distributed Computing, 2004. Third International Symposium on/Algorithms, Models and Tools for Parallel Computing on Heterogeneous Networks, 2004. Third International Workshop on Cork, Ireland Jul. 5-7, 2004, Piscataway, NJ, USA, IEEE, Jul. 5, 2004. pp. 201-208.

Grnarov, Aksenti et al., "Grid Computing Implementation in Ad Hoc Networks"; 2008; Springer Science; Advances in Computer and Information Sciences and Engineering; pp. 196-201.

Wang et al.; "Wireless Grid Computing over Mobile Ad-Hoc Networks with Mobil Agent"; 2005; Proceedings of the First International Conference on Semantics, Knowledge and Grid (SKG 2005); 3 pages.

* cited by examiner

VERTICALLY TIERED HORIZONTALLY EXPANDABLE MICRO GRID SYSTEM WITH BRIDGE DOCKING BAY CONTOURED BY RADIAL ARMS EXTENDING FROM CENTRAL HUB FOR COUPLING PROCESSOR OR POWER HUBS

This application is a continuation application claiming priority to Ser. No. 12/699,177 filed Feb. 3, 2010, now abandoned.

FIELD OF THE INVENTION

The present invention relates to a micro grid apparatus for use in a mainframe or server system.

BACKGROUND OF THE INVENTION

The world is melting into a global internet village in which countries and states are literally becoming super-suburbs. Computer communication advancements are primarily fuelling exploding events in this global internet village.

Unfortunately, current technology does not combine and utilize resources in a manner that enables adequate and efficient responses to problems and challenges in this global internet village.

Thus, there is a need for an apparatus and method that combines resources for enabling adequate and efficient responses to problems and challenges relating to use of the Internet.

SUMMARY OF THE INVENTION

The present invention provides a micro grid apparatus for use in a mainframe system or server system, comprising:

at least one tier, each tier comprised by an associated printed circuit board, wherein if said at least one tier consists of a plurality of tiers then the tiers are distributed and sequenced in a vertical direction such that each tier is at a different vertical level in the vertical direction, wherein each tier comprises a multiplicity of complex shapes interconnected by a plurality of bridge modules, wherein each complex shape of the multiplicity of complex shapes comprises a central area and at least three radial arms connected to the central area, wherein the radial arms are external to and integral with the central area, wherein each radial arm extends radially outward from the central area, wherein each pair of adjacent radial arms defines a docking bay, wherein each complex shape of the multiplicity of complex shapes is either a power hub whose central area comprises a plurality of rechargeable batteries or a processor hub whose central area comprises plurality of processors, wherein at least one docking bay of each complex shape of the multiplicity of complex shapes has a bridge unit of a bridge module of the plurality of bridge modules latched therein such that another remaining bridge unit of said bridge module is latched into a docking bay of another complex shape of the multiplicity of complex shapes, wherein each docking bay of each complex shape of the multiplicity of complex shapes that does not have a bridge unit of any bridge module of the plurality of bridge modules latched therein has an irregular shaped module of a plurality of irregular shaped modules latched therein, each irregular shaped module providing a functionality for responding to an alert pertaining to an event, and wherein the multiplicity of complex shapes comprises a plurality of complex shapes such that at least one docking bay of each complex shape of the plurality of complex shapes has one irregular shaped module of the plurality of irregular shaped modules latched therein.

The present invention provides a method of forming a micro grid apparatus for use in a mainframe system or server system, said method comprising:

forming at least one tier, each tier comprised by an associated printed circuit board, wherein if said at least one tier consists of a plurality of tiers then the tiers are distributed and sequenced in a vertical direction such that each tier is at a different vertical level in the vertical direction, wherein each tier comprises a multiplicity of complex shapes interconnected by a plurality of bridge modules, wherein each complex shape of the multiplicity of complex shapes comprises a central area and at least three radial arms connected to the central area, wherein the radial arms are external to and integral with the central area, wherein each radial arm extends radially outward from the central area, wherein each pair of adjacent radial arms defines a docking bay, wherein each complex shape of the multiplicity of complex shapes is either a power hub whose central area comprises a plurality of rechargeable batteries or a processor hub whose central area comprises plurality of processors, wherein at least one docking bay of each complex shape of the multiplicity of complex shapes has a bridge unit of a bridge module of the plurality of bridge modules latched therein such that another remaining bridge unit of said bridge module is latched into a docking bay of another complex shape of the multiplicity of complex shapes, wherein each docking bay of each complex shape of the multiplicity of complex shapes that does not have a bridge unit of any bridge module of the plurality of bridge modules latched therein has an irregular shaped module of a plurality of irregular shaped modules latched therein, each irregular shaped module providing a functionality for responding to an alert pertaining to an event, and wherein the multiplicity of complex shapes comprises a plurality of complex shapes such that at least one docking bay of each complex shape of the plurality of complex shapes has one irregular shaped module of the plurality of irregular shaped modules latched therein.

The present invention advantageously provides an apparatus and method that combines resources for enabling adequate and efficient responses to problems and challenges relating to use of the Internet.

DETAILED DESCRIPTION OF THE INVENTION

The present invention relates generally to grid computing, and more particularly to micro grid and macro grid processing, the functional system purpose, the system structure, and method of system use of the same, that provides for the functionality of a micro grid, additional data buses necessary to interface to a micro grid and macro grid, and each of the system elements' functional relationship with, wireless macro grid alerts under artificial intelligence control. Existing application software, operational system software, communications software, and other software including drivers, interpreters and compilers for micro processor systems can function within embodiments of the present invention.

The detailed description of the invention is presented in the following sections:
 A. Micro Grids and Macro Grids;
 B. Governance;
 C. Macro Grid Communications;
 D. Sensor and Actuator Apparatus
 E. Bridge Structures
 F. Power
 G. Mainframe/Server Apparatus
 H. Cloud Computing
 I. Data Processing Apparatus.

A. Micro Grids and Macro Grids

Figure 1:
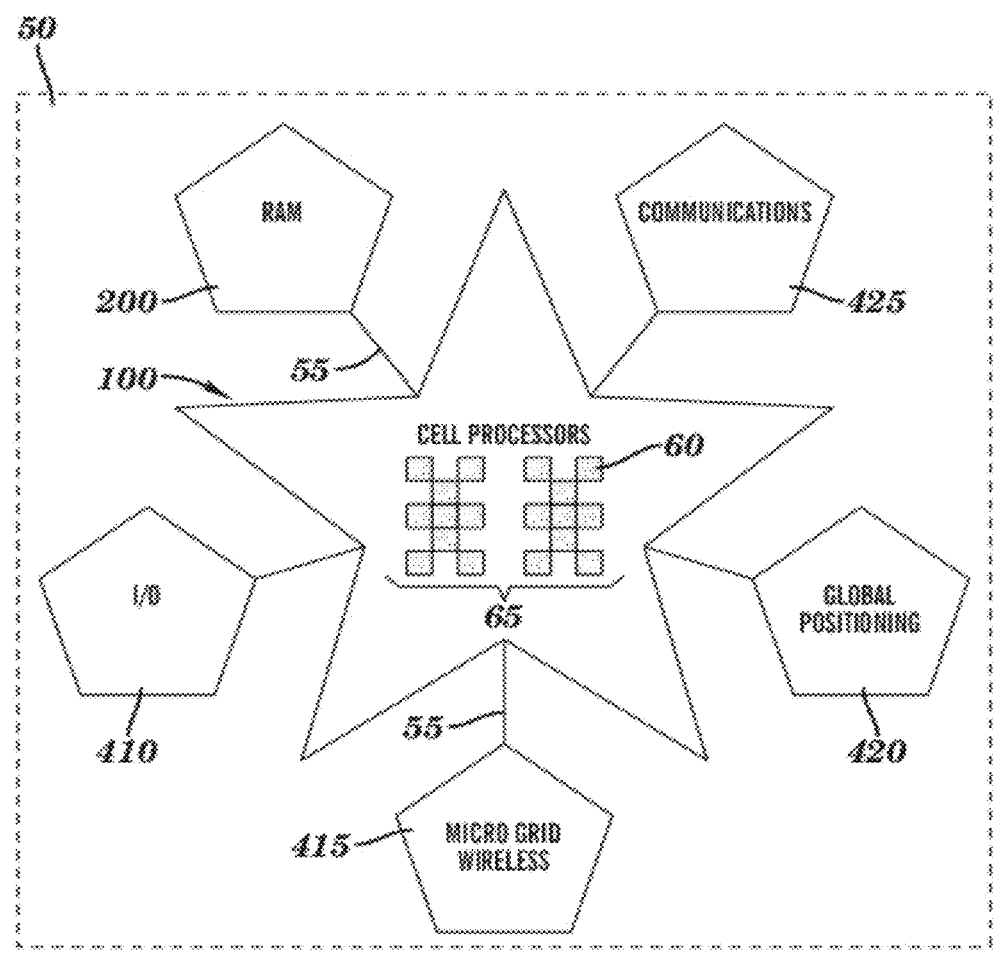
FIG. 1 is a block diagram of a computer system comprising a micro grid apparatus and irregular shaped modules connected to the micro grid apparatus via respective connection interfaces, in accordance with embodiments of the present invention.

FIG. 1 is a block diagram of a computer system 50 comprising a micro grid apparatus 100 and irregular shaped modules 200, 410, 415, 420, and 425 connected to the micro grid apparatus 100 via respective connection interfaces 55, in accordance with embodiments of the present invention. The micro grid apparatus 100 is also called a "complex shape".

The micro grid apparatus 100 is configured to enable the irregular shaped modules 200, 410, 415, 420, and 425 to be geometrically connected thereto via the respective connection interfaces 55. The connection interfaces 55 accommodate a V-shaped geometric connection between the irregular shaped modules 200, 410, 415, 420, and 425 and the complex shape of the micro grid apparatus 100.

Figure 2A:
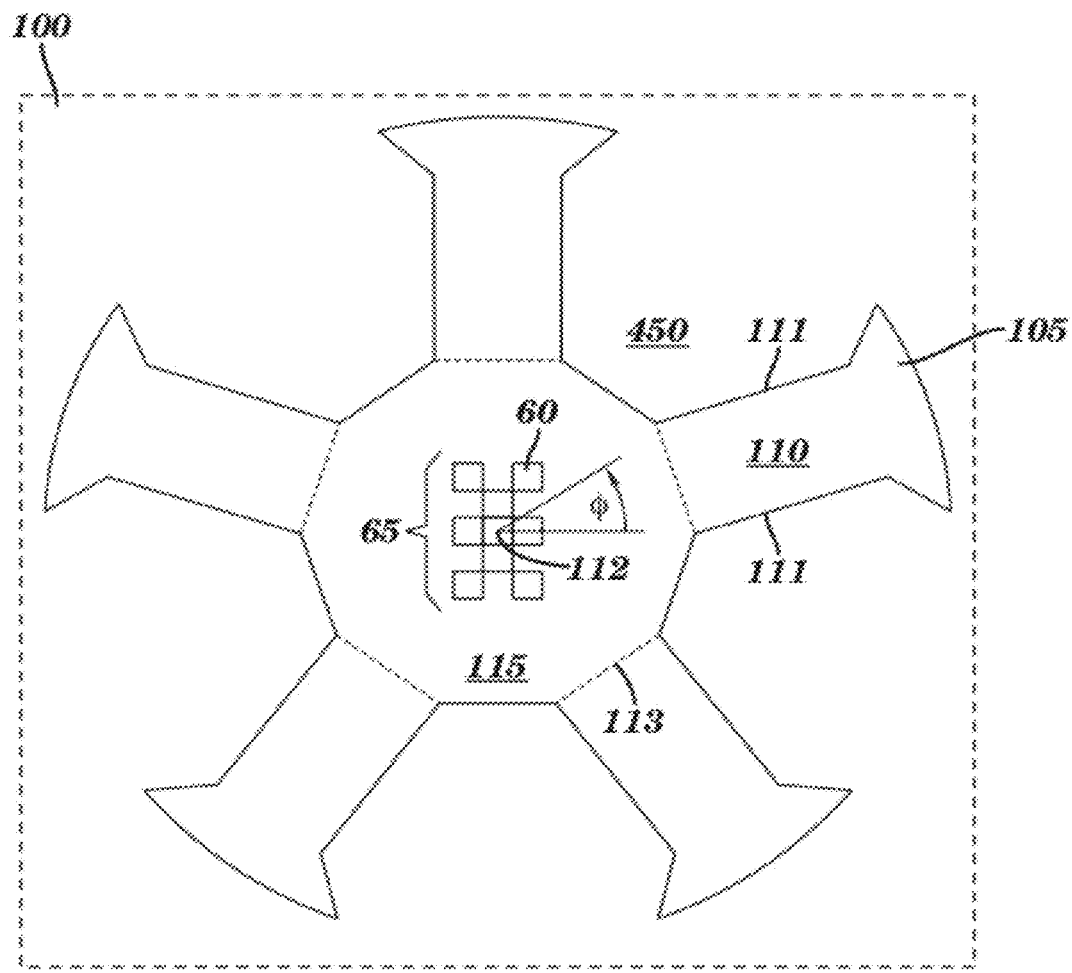
FIG. 2A is a diagram depicting the micro grid apparatus of FIG. 1, in accordance with embodiments of the present invention.

The micro grid apparatus 100 comprises a central area 115 (see FIG. 2A) that includes a micro grid, wherein the micro grid comprises a plurality of processors 65. In one embodiment, each processor of the plurality of processors 65 has a unique Internet Protocol (IP) address. The reference numeral "65" refers to the collection of processors that the plurality of processors consists of. In embodiments of the present invention, the plurality of processors 65 consists of nine or eighteen individual processors. In practice, the number of processors may be determined by design criteria, manufacturing considerations, etc. In FIG. 2A, a central area 115 of the micro grid apparatus 100 having a complex shape comprises a plurality of processors 65 consisting of nine processors with connection to a micro grid wireless module of irregular shape 415 and four other types of add-on hardware interface modules of the irregular shaped modules 200, 410, 420, and 425 (see FIG. 1) accommodated in the five docking bays 460. The central area 115 comprises a plurality of processors 65 that are linked together wirelessly or by direct electrical connection, and the plurality of processors 65 are linked wirelessly or by direct electrical connection to each irregular shaped module.

Each processor of the plurality of processors 65 has its own individual operating system and assigned resources (e.g., cache memory—not shown). The operating system within each processor of the micro grid apparatus 100 controls the programmatic housekeeping and individual processor availability and assignment of the micro grid, including allocation of random access memory of irregular shape 200 to the processors with common types of operating systems within the micro grid apparatus 100, and other communication interfaces of irregular shape 425. The processors within the apparatus 100 are linked by multiple data buses (not shown) for data transfer and electrical connection to each other where they collectively reside with their individual cache memory and cache controllers in the same physical apparatus. Contemporaneously, there are multiple operating systems actively functioning in the different processors of the same physical micro grid apparatus 100.

An assembled micro grid apparatus structure of the present invention is constructed from two physically different components: (1) the complex shape of the micro grid apparatus 100, which may embody the central processing unit's cell wafer including the associated cache memory, the cache controllers, and the associated electronic circuits of the micro grid apparatus 100; and (2) the closely packed modular irregular shaped modules (e.g., 200, 410, 415, 420, 425 for which there are five docking bays provided) and/or bridge modules as discussed infra in conjunction with FIG. 8.

In FIG. 1, the five different irregular shaped modules, which may be selected and assembled for functional use by the micro grid apparatus 100, include: (1) the irregular shape 200 which embodies random access memory (RAM); (2) the irregular shape 425 which embodies communications comprising Transmission Control Protocol/Internet Protocol (TCP/IP) Ethernet, cable, and/or fiber optic communications; (3) the irregular shape 420 which embodies a Global Positioning System (GPS); (4) the irregular shape 415 which embodies micro grid wireless connection points (e.g., 18×802.11s micro grid wireless connection points); and (5) the irregular shape 410 which embodies input and output (I/O) support including data buffers for serial and parallel linked peripheral components and devices.

The irregular shaped modules 200, 410, 415, 420, and 425 are interchangeable and fit any docking bay in the micro grid apparatus 100 as determined by system architectural design. Different combinations, including multiples of one type of irregular shape, are permitted in an assembled apparatus. For example, three RAM modules 200, a micro grid wireless module 415, and a global positioning module 420 would facilitate a mobile micro grid apparatus 100 with a particularly large amount of memory; however it would not have I/O, or physical connectable communication functionality. Each irregular module is coupled by high speed bi-directional data buses available at the connection interface (e.g., 'V' shaped connection interface) 55. The total number of such data buses is equal to the total number of processors of the plurality of processors. For example, if the total number of such processors is 18, then the total number of such data buses is 18. The processors of the plurality of processors 65 contained in the complex shape of the micro grid apparatus 100 communicate individually via each of the available individual data buses (e.g., of 18 data buses) to the irregular shaped module 415, connected by the 'V' shaped connection interface 55.

The plurality of processors 65 includes a unique processor 60 having its unique operating system and is included among the associated micro grid of processors 65, and may include associated internal cache memory and cache memory control, main random access memory 200 for storing data and instructions while running application programs, a mass-data-storage device, such as a disk drive for more permanent storage of data and instructions, peripheral components such as monitors, keyboard, pointing devices, sensors and actuators which connect to the I/O module 410, data and control buses for coupling the unique processor 60 and its operating system to the micro grid processors and components of the computer system, and a connection bus 55 for coupling the micro grid processors and components of the computer system. FIG. 8, described infra, depicts an exemplary data processing apparatus in which any processor of the present invention may function.

The present invention utilizes one or more operating systems residing in single processors, and multiple operating systems residing in multiple processors, such as may be embodied on the same wafer, can be constructed with known software design tools and manufacturing methods.

The computer system 50 provides the following functionalities:

1. Containment of the micro grid apparatus 100 and its I/O capability for detecting local alerts and peripheral device interfacing with I/O module 410, its communications capability for receiving alerts via communications module 425, its global positioning system module 420 for detecting location and change of location when mobile, its multiple wireless communications ability for data interchange via the micro grid wireless module 415, and its system memory storage via RAM module 200, embodied in a single apparatus incorporating a single complex shape, and coupled to selectable and interchangeable modules of irregular shape (e.g., module 415) is provided for.
2. Enablement to heat dissipation of the complex shape of the micro grid apparatus 100 is provided for by two surfaces being available without obstruction by connection pins. Thus in one embodiment, no connection pins are connected to either or both of a top surface and a bottom surfaces of the central area 115. This physical method of forming the apparatus doubles the available surface area for heat dissipation capability and enhances known heat dissipation techniques for micro processors.

The underside connection pins of the complex shape may be provided only on the radial arms to functionally facilitate dual heat dissipation contact devices on the top and underside of the complex shape. Thus in one embodiment, connection pins are connected to a bottom surface of at least one radial arm of the radial arms 110 and not to a top surface any radial arm 110. A suitable hole in the mountable multi-layered printed circuit board under the complex shape will accommodate the underside heat dissipation device.

3. Enablement of modularity in micro computer structural design of the computer system 50 is provided by selecting all or any multiple combinations of available irregular shaped modules (e.g., 200, 410, 415, 420, and/or 425) and other 'interconnecting modules'. The method of the present invention forms a modular design with flexibility that provides for generalized micro grid functionality, as well as specialized micro grid functionality, and provides customized design functionality for larger and more complex grid computing systems constructed from a plurality of interconnected micro grids.

4. Enablement of scaleable designs of the micro grid apparatus (by use and interconnection of multiple complex shapes) is provided for grid computing.

5. Enablement of micro grid hardware design change and working system reconfiguration of a micro grid's functionality is provided. Irregular shaped modules (e.g., 200, 410, 415, 420, and/or 425) can be mechanically extracted from the complex shape and other irregular shaped modules selected and mechanically inserted in the resultant vacant docking bay as a design change preference to alter the micro grid functional design. A change of the irregular shaped modules 200, 410, 415, 420, and/or 425 provides for system software diversity by reconfiguration for a micro grid's functionality.

6. Enablement of robotic micro grid maintenance and remote design change is provided. The irregular shaped modules are designed for ease of extraction and replacement. This feature enhances techniques for microprocessor maintenance by system engineers and facilitates robotic intervention for hardware fault elimination of irregular shaped modules in remote or dangerous locations (e.g., spacecraft probes in hostile atmospheres).

7. Enablement of dynamic change of the operating system software functioning in each micro grid processor, by instruction from the unique processor 60, to function within the embodiment of a single apparatus as a macro grid processor with it's assigned micro grid processors, independently generated and wirelessly connected. The macro grid processor connects wirelessly the wireless module 415 to other adjacent macro grid processors forming a macro grid across which a transient and mobile artificial intelligence resides.

FIG. 2A is a diagram depicting the micro grid apparatus 100 of FIG. 1, in accordance with embodiments of the present invention. The micro grid apparatus 100 is a physical structure having an exterior boundary as shown. The micro grid apparatus 100 comprises a central area 115 and five radial arms 110, wherein the radial arms 110 are external to and integral with the central area 115. A micro grid apparatus generally comprises a plurality of radial arms. For example, the number of radial arms may consist of 2, 3, 4, 5, 6, 7, 8, 9, 10, 11, 12, etc. or at least 2, 3, 4, 5, 6, 7, 8, 9, 10, 11, 12, etc. The central area 115 of the micro grid apparatus 100 provides hardware containment of a basic micro grid of 9 processors 65 each with its own operating system. The unique processor 60 has a unique operating system that differs from the operating system of each of the other processors. The unique processor 60 governs all other processors of the plurality of processors 65. The docking bays 450 are defined by adjacent radial arms 110 together with a portion of an exterior boundary of the central area 115 and accommodate irregular shaped modules such as irregular shaped modules 200, 410, 415, 420, and/or 425 discussed supra in conjunction with FIG. 1. As shown, each docking bay 450 is a region whose geometric shape enables a module to be latched therein such as any of the modules (200, 425, 420, 415, 410) in FIG. 4B or any of the modules (200, 425, 2010, 415, 410) in FIG. 20A.

The processors are linked to each other via a system bus (not shown), a micro grid bus (not shown) and a macro grid bus (not shown). Known existing (and future designed) application software, operational system software, communications software, and other software including drivers, interpreters and compilers for micro processor systems may function within the embodiments of the present invention. Any irregular shaped module is able to connect to any of the five docking bays available in the complex ceramic chip structure in any combination, including the arrangement of five bridge modules attached to one complex ceramic chip structure. In one embodiment, Terrestrial and 802.11g Wireless Communication protocols and standards may be employed for use in the present invention. In one embodiment, the Mesh Wireless Communication 802.11s standard may be employed for use in the present invention. Circumstances (e.g., manufacturing, research, etc.) determine standards (e.g., 802.11g, 802.11s, and other existing wireless standards and future standards) that may be used in different embodiments or in different combinations in the same embodiment (e.g., inclusion of communication techniques such as 'Bluetooth').

In one embodiment, the outer curved edge 105 of the radial arm 110 is physically manufactured to the shape of a circle, resulting in the outer curved edge 105 of the radial arms 110 being at a radial distance (e.g., of 5 cm in this example) from a radial center 112 of the circle (i.e., the circle has a diameter of 10 cm in this example) within the central area 115 of the micro grid apparatus 100. Each radial arm 110 extends radially outward from the central area 115 and has an outer curved edge 105 disposed at a constant radial distance from the radial center 112. Thus, the outer curved edges 105 of the radial arms 110 collectively define a shape of a circle centered at the constant radial distance from the radial center 112. The circle has a diameter exceeding a maximum linear dimension of the central area 115. Each pair of adjacent radial arms 110 defines at least one docking bay 450 into which an irregular shaped module can be inserted. The total number of docking bays 450 is equal to the total number of radial arms 110. In one embodiment, one or more irregular shaped modules are inserted into respective docking bays 450 defined by adjacent radial arms 110. In one embodiment, the radial arms 110 are uniformly distributed in azimuthal angle ϕ about the radial center 112. In one embodiment, the radial arms 110 are non-uniformly distributed in azimuthal angle ϕ about the radial center 112, which may be employed to accommodate different sized irregular shaped modules with corresponding radial arms 110 that present different sizes and shapes of their 'V' interface.

The central area 115 of the micro grid apparatus 100 comprises a plurality of processors 65 that are electrically linked together and are electrically linked to each irregular shaped module that is inserted into a respective docking bay 450 defined by adjacent radial arms 110. The central area 115 has a polygonal shape (i.e., a shape of a polygon 113) whose number of sides is twice the number of radial arms 110. The dashed lines of the polygon 113 do not represent physical structure but are shown to clarify the polygonal shape of the polygon 113. In FIG. 2A, the polygon 113 has 10 sides which corresponds to the 5 radial arms 110. The polygon of the polygonal shape of the micro grid apparatus 100 may be a regular polygon (i.e., the sides of the polygon have the same length and the internal angles of the polygon are equal to each other) or an irregular polygon (i.e., not a regular polygon). The radial arms 110 may be uniformly distributed in azimuthal angle $\phi$ about the radial center 112. The radial arms 110 being uniformly distributed in azimuthal angle $\phi$ about the radial center 112 is a necessary but not sufficient condition for the polygon of the polygonal shape of the micro grid apparatus 100 to be a regular polygon. Accordingly, the radial arms 110 may be uniformly distributed in azimuthal angle $\phi$ about the radial center 112 such that the polygon is not a regular polygon. In one embodiment, the radial arms 110 are non-uniformly distributed in azimuthal angle $\phi$ about the radial center 112.

The central area 115 is structurally devoid of connection pins on the top and underside surfaces, enabling direct contact with heat dissipation devices on both surfaces. The radial arms 110 have connection pins on the underside (i.e., bottom) surface.

Five docking bays 450 for the irregular shaped modules (200, 410, 415, 420, 425) are provided between the radial arms 110. Each radial arm 110 has parallel sides 111 oriented in a radial direction and are 1.4 cm wide in this example. The arc at the outer curved edge 105 of the radial arm 110 has a chord of 2.7 cm in this example.

The connection interface 55 provides an electrical connection 'V' point for a system bus between the complex structure and the irregular shaped modules and is available along the edge of the docking bay 450 of the pentagonal shape of the central area 115 of the complex shape. The bus comprises individual bi-directional data buses (e.g., 18 data buses) capable of connecting the micro grid processors (e.g., 18 processors) with their own operating systems to their own individual wireless devices contained in the irregular shaped module 415 for micro grid wireless connection points. The mechanical connection is achieved by the irregular shaped module 415 press fitting its wedged connection point edge into a 'V' edged protrusion along the length of the complex shape; i.e., the docking bay's pentagonal edge.

Figure 2B:
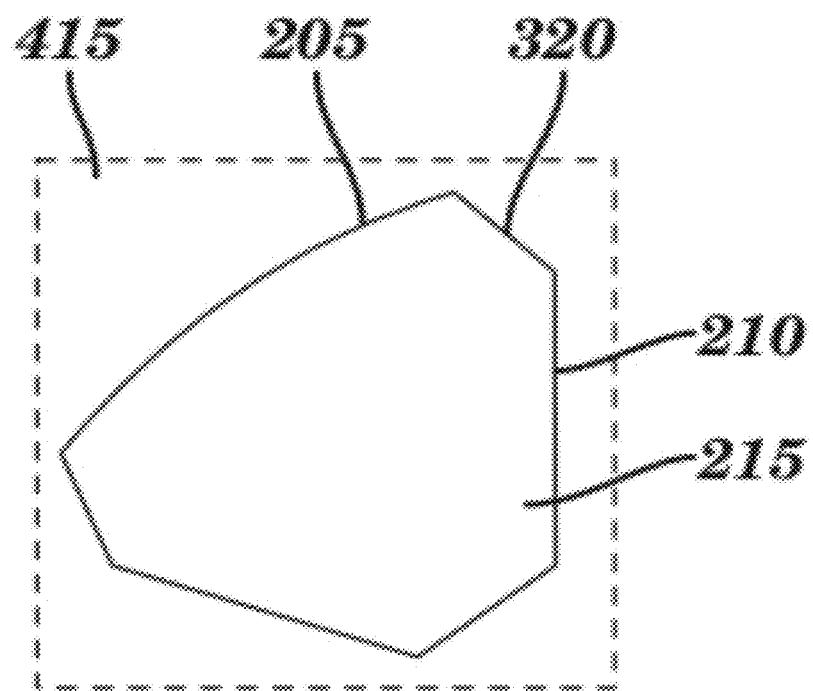
FIG. 2B is a diagram showing an irregular shaped module, in accordance with embodiments of the present invention.

FIG. 2B is a diagram showing an irregular shaped module 415, in accordance with embodiments of the present invention. The irregular shaped module 415 in FIG. 2B may alternatively be any other irregular shaped module such as the irregular shaped module 200, 410, 420, or 425. The irregular shaped module in FIG. 2B contains chip structure to provide hardware containment of the micro grid wireless interfaces and is ensconced in place with downward pressure on the curved edge 205 within the embrace of the docking bay after their electrical connection 'V' shaped receptacle edge has been positioned correctly and is in contact with the electrical connections of the complex shape's 'V' protrusion edge. The curved edge 205 in FIG. 2B is analogous to the curved edge 105 in FIG. 2A.

The latching mechanism on the radial arms 110 of the complex shape in FIG. 2A is provided as a raised and rounded protrusion of about 1.5 mm height×about 3.5 mm length along the edge 320 of both sides of the irregular module shape 415 in this example. This protrusion fits a receptacle with the same characteristics to receive the complex shape, on all the radial arm edges of the complex shape. In one embodiment, the irregular shaped modules are manufactured from a slightly softer molded material to provide the mechanical contraction against the harder ceramic form of the complex shaped module, thus enabling the latching mechanism to work. In one embodiment, the manufacturing is configured to create a relatively softer complex shaped module to accept relatively harder irregular shaped modules.

The irregular shapes are manufactured to fit perfectly within the docking bay 450 (see FIG. 2A), with less than 0.1 mm of gap tolerance around the non contact edges in this example. The gap tolerance (0.1 mm or otherwise) is determined by the mechanics of the protrusion and receptacle mechanical latching mechanism described supra. The chord of the curved edge 205 is 3.5 cm and the non-contact side 210 of the irregular shaped module is 2.2 cm in length in this example. Connection pins are not present on the irregular shaped module, and similar to the complex shape, both top surfaces 215 and underside surfaces are available for contact with heat dissipation devices. External system devices such as a disk drive (not shown) for more permanent storage of data and instructions, and peripheral components such as monitors, keyboard, pointing devices, sensors and actuators, connect via the underside pins on the radial arms of the complex shape to the I/O irregular shaped module 410.

Similarly, the global positioning irregular shaped module 420 and the communications irregular shaped module 425 connect to their external associated hardware (i.e., physical antenna, cable and fiber connections) via the underside pins on the radial arms of the complex shape. The RAM irregular shaped module 200) and micro grid wireless module 415 do not necessarily require the use of connection pins under the complex shape as they are self contained and do not have any associated external hardware.

In accordance with the present invention, each individual processor can participate as a member of the micro grid apparatus 100 and may be conscripted for functional use from within the micro grid apparatus 100 by one uniquely assigned processor (e.g., by processor 60) with its individual operating system. Each processor of the plurality of processors 65 has its own individual operating system and assigned resources (e.g., cache memory—not shown) and is available to participate either by direct connection and/or wirelessly (802.11g), either individually and/or collectively, on demand, from within the embodiment of the micro grid apparatus 100 to an external dynamically expanding and contracting wireless macro grid, comprised of conscripted and participating processors, from a plurality of participating micro grids according to embodiments of the present invention. Each processor of common processors within the micro grid apparatus 100 with the same type of individual operating system and assigned resources is available for functional use as a wirelessly connected participant of one or more macro grids.

A macro grid comprises a set of processors conscripted from one or more micro grid apparatuses to become macro grid processors within the macro grid. A macro grid may also include other computational resources which do not function as a macro grid processors, such as other micro grid processors of the one or more micro grid apparatuses.

A macro grid may dynamically change as a function of time. The macro grid has a geographical footprint, which is spatial contour defined by the macro grid processors in a macro grid. The spatial contour of the geographical footprint may be generated by fitting a curve to the geographical locations of the macro grid processors in a macro grid at a given instant of time. The geographical footprint (i.e., the spatial contour) of a macro grid expands or contracts dynamically as macro grid processors are added or removed, respectively, from the macro grid and also as the spatial location of one or more macro grid processors in the macro grid change as a function of time.

Conscripted micro grid processors that are participants in a macro grid could be physically contained within the confines of a moving vehicle, a flying airplane, a sailing ship, a walking person, etc. Thus, the mobility of macro grid processors contributes to dynamic changes in the macro grid.

An artificial intelligence of the present invention is intelligent software implemented by a macro grid (i.e., by the macro grid processors in a macro grid) to perform a task or a set of tasks in real time in response to detection of an alert pertaining to an event. The alert may be detected by a unique processor 60 residing in the plurality of processors in the complex shape of the micro grid apparatus 100. In one embodiment, the artificial intelligence (i.e., the intelligent software) of a macro grid is located in a single macro grid processor of the macro grid. In one embodiment, the artificial intelligence is distributed among a plurality of macro grid processors of the macro grid (i.e., different portions of the software comprised by the artificial intelligence are stored in different macro grid processors of the macro grid). In one embodiment, the artificial intelligence is distributed and stored among all of the macro grid processors of the macro grid. The location of the artificial intelligence in the macro grid may be static (i.e., unchanging) or may dynamically change in accordance with a transient evolution of the macro grid as the response to the alert develops over time and eventually reduces and terminates as the specific event associated with the alert diminishes and is quenched. In addition, the mobility macro grid processors of a macro grid may be accompanied by locational changes in the artificial intelligence associated with the macro grid.

The scope of logic, decision making, and any other intelligent functionality in an artificial intelligence of the present invention includes the current state of knowledge, and enablement of that knowledge for practical utilization, known to a person of ordinary skill in the field of artificial intelligence at any time that the present invention is practiced. Thus, it is contemplated that an artificial intelligence of the present invention will be utilized with increasing capabilities and levels of sophistication as corresponding capabilities and levels of sophistication are developed in the field of artificial intelligence.

An artificial intelligence is generated (i.e., created), by hardware and/or software in any manner known to a person of ordinary skill in the field of artificial intelligence. For example, a set of artificial intelligences may pre-exist in a storage medium and a particular stored artificial intelligence that is capable of responding to the event associated with the alert may be activated for use by the macro grid. As another example, an artificial intelligence may generated by software in a manner that tailors the artificial intelligence to the specific event associated with the alert.

The unique processor 60 is used to create and dynamically change macro grids and to generate artificial intelligences to govern (i.e., control and manage) operation of the macro grids in response to a real time alert. A software conscription request may be received (or generated) by the unique assigned processor 60 in the micro grid apparatus 100 from (or to) uniquely assigned processors of other micro grids, that are wirelessly adjacent and available, to the alert sensing (or alert transmitting) micro grid apparatus 100. In one embodiment, once an alert is acknowledged by the unique processors in two or more micro grids, a macro grid is formed and expands by further conscription demand of other adjacent wirelessly available micro grids to become a large macro grid, comprised of a plurality of selected numbers of individual processors within a plurality of wirelessly connected micro grids. The macro grid processor connects wirelessly the wireless module 415 to other adjacent macro grid processors forming a macro grid across which a transient and mobile artificial intelligence resides. The dynamically constructed macro grid continues to function wirelessly utilizing changing populations of connected individual processors embodied within micro grids. The macro grid is governed by an artificial intelligence.

The macro grids expand and contract their geographic footprint as: (1) participating micro grid processor numbers increase and decrease; (2) the operating system of the micro grid unique processors re-prioritizes individual processor availability; (3) the physical location of the participating processors change as detected via the global positioning interface module 420; (3) the unique application program alert demand, from within the macro grid, adjusts requirements for micro grid processor participation; and/or (4) new alerts are raised for functional use of micro grid processors that are already engaged in functional use by other macro grids. It is noted that different macro grids can use different processors embodied within the same micro grid apparatus.

An artificial intelligence is generated by the unique processor 60, within the wireless configuration of a macro grid, as a result of a program alert to the operating system of the unique processor 60 within the micro grid apparatus 100, from sensor signals and software activity on the I/O interface of irregular shaped module 410. In response to the alert, the artificial intelligence conscripts available physically connected processors from within the described micro grid apparatus, and wirelessly conscripts available processors from different micro grid apparatus's within a prescribed or otherwise detectable range. The artificial intelligence becomes transient and not specifically reliant on the initiating host unique processor's operating system.

The artificial intelligence governs its macro grid via the operating systems of the unique processors of the participating, wirelessly connected micro grid apparatuses, and authoritatively controls the functionality and sustained vitality of its mobile macro grid that has been initiated for it to reside upon, until expiry or offload. In one embodiment, one macro grid supports one artificial intelligence, and one micro grid may have mutually exclusive individual processors under the control of multiple artificial intelligences.

A plurality of transient artificial intelligences can co-exist (each contained within their individual expanding and contracting macro-grids) contemporaneously. The different artificial intelligences utilize different individual wirelessly connected micro grid processors, their common type operating systems, and their assigned resources, available within any single micro grid apparatus.

Figure 2C:
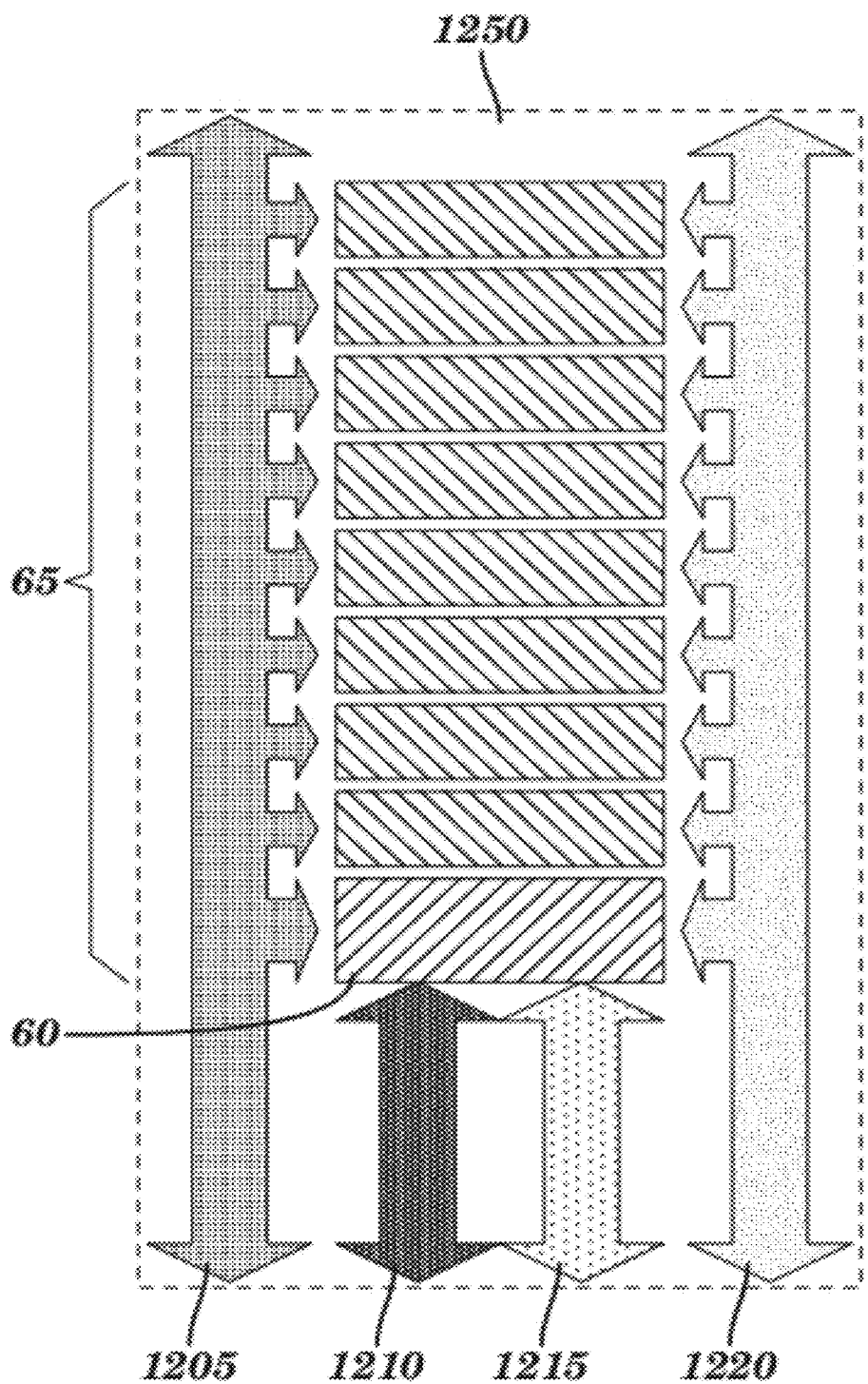
FIG. 2C depicts a micro grid system stack, in accordance with embodiments of the present invention.

FIG. 2C depicts a micro grid system stack 1250, in accordance with embodiments of the present invention. The micro grid system stack 1250 is formed of 9 processors, two standard system data buses (1210, 1215), a micro grid system bus 1205, and a macro grid system bus 1220, to provide data transfer pathways of the micro grid system stack to wireless interfaces, I/O and other software connections of the assembled apparatus. The micro grid system stack 1250 is an example of a micro grid system stack generally. A micro grid system stack is comprised by a micro grid apparatus such as the micro grid apparatus 100 of FIG. 1 or FIG. 2A.

Various activities (e.g., research, manufacturing, etc.) may determine the specific structure of these two standard system data buses (1210, 1215). These standard system data buses (1210, 1215) could be used individually (e.g., one standard system data bus for inbound data, one standard system data bus for outbound data), as a bidirectional address bus, as a bidirectional data bus, or as a high speed 'on wafer' extendable address/data ring similar to token ring and other microprocessor connection technologies. Thus, the present invention includes multiple design options in bus structure and interconnections and also includes both parallel and serial methods of data transfer.

The standard system bus (1210, 1215) provides for address and data interchange between the unique system processor 60 and all of the micro grid processors individually. Conscription of a micro grid processor to participate as a macro grid processor, including instruction to a micro grid processor to change its operating system, occurs over this standard system bus (1210, 1215). Micro grid processor status and availability, monitoring of micro grid processor utilization, and micro grid processor prioritization also occurs over this standard system bus (1210, 1215) by the unique processor 60. This standard system bus (1210, 1215) maintains the vitality of the micro grid and its resources.

The standard system bus (1210, 1215) also interconnects all of micro grid processors 65 to the RAM module 200, via memory control and cache memory control.

The standard system bus (1210, 1215) also interconnects the unique processor 60 to the I/O module 410 for detecting local attached alerts and interfacing with standard external peripheral system devices such as a disk drive for more permanent storage of data and instructions, and peripheral components such as monitors, keyboard, pointing devices, attached alert sensors and actuators.

The standard system bus (1210, 1215), also interconnects the unique processor 60 to the GPS module 420 for provision of location information and movement.

The standard system bus (1210, 1215) also interconnects the unique processor 60 to the communications module 425 for receiving wireless alerts from adjacent processors (but yet to be connected as macro grid processors) and cable communicated alerts from fiber optic and Ethernet connected sensors. The communications module 425 is also utilized by the macro grid processors for responding to alerts by instructing actuators to counter the alert event. The micro grid system bus 1205 provides for data interchange among any two (or groups) of the micro grid processors when assigned by the unique processor 60, to provide additional processing capacity to a macro grid processor. Once the micro grid participating processors are identified and assigned, and are acting as an active collaborating micro grid, the micro grid participating processors reduce their individual use of the standard system bus (1210, 1215) and utilize the micro grid system bus (1205). The present invention reduces data traffic volumes on the standard system bus (1210, 1215) and provides alternate micro grid address and data capacity via the micro grid system bus (1205) and further provides macro grid address and data capacity via the macro grid system bus (1220).

The macro grid system bus 1220 provides for data interchange from each processor of the macro grid processors individually via the wireless module 415 to other adjacent macro grid processors embodied within a macro grid. The artificial intelligence associated with the macro grid processor within the macro grid communicates to all the other macro grid processors within the macro grid.

The two standard system data bus (1210, 1215), the micro grid system bus 1205 and the macro grid system bus 1220, are all available as a system bus 55 at the five connection points of the complex shape with the individual irregular shaped modules. The system bus 55 serves as an embodiment of connection interface 55 (see FIG. 1).

The system bus 55 can be extended beyond the embodiment of one apparatus via a bridge module (i.e., a bi-polygonal irregular shaped module).

Figure 3A:
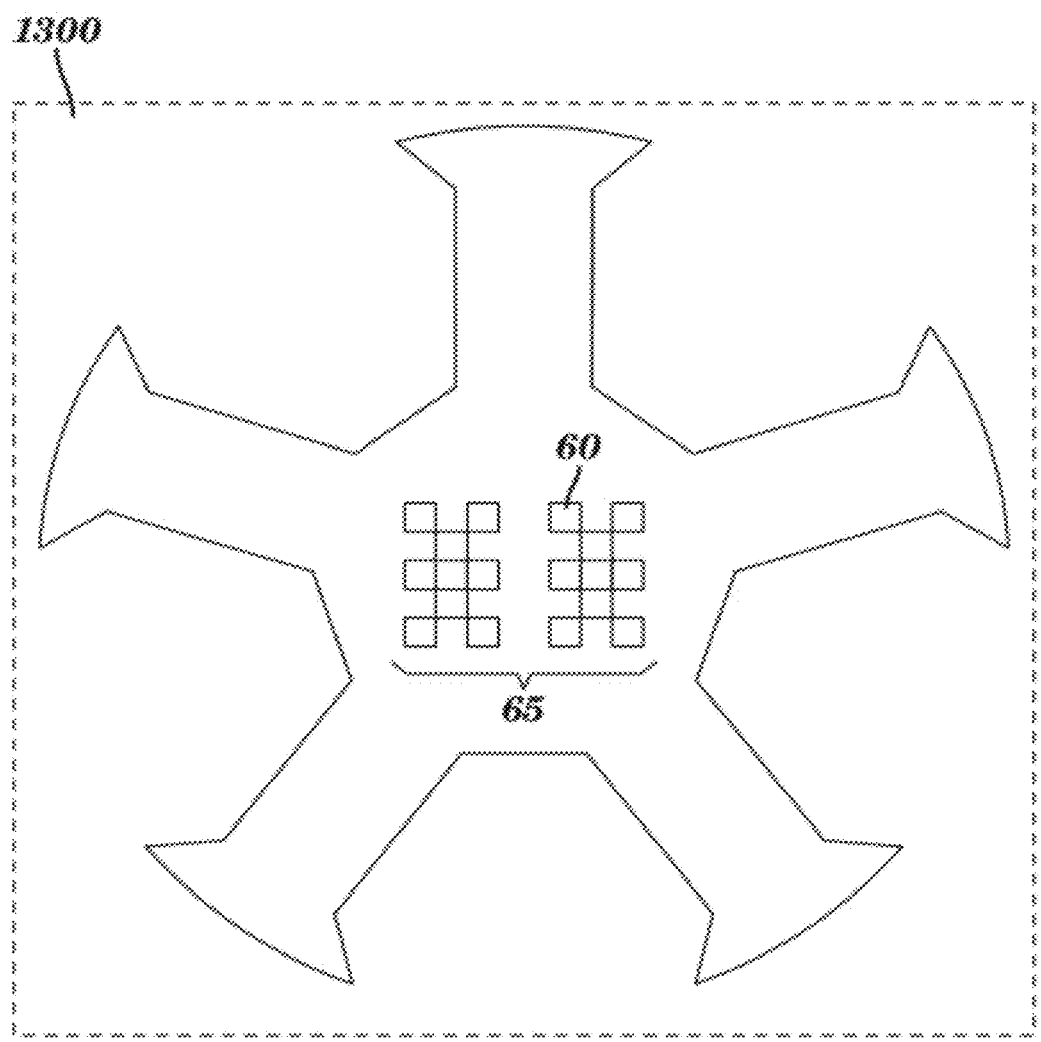
FIG. 3A depicts a micro grid apparatus, in accordance with embodiments of the present invention.

FIG. 3A depicts a micro grid apparatus 1300, in accordance with embodiments of the present invention. The micro grid apparatus 1300, which may in one embodiment comprise a complex ceramic chip apparatus, is for containment of a micro grid of 18 processors 65. The processors 65 each have its own operating system and operate under control of a unique processor 60 and its operating system, and are linked to each other via the system bus (1210, 1215), the micro grid bus 1205, and the macro grid bus 1220 (see FIG. 2B). The micro grid apparatus 1300 is analogous to the micro grid apparatus 100 of FIG. 2A.

Figure 3B:
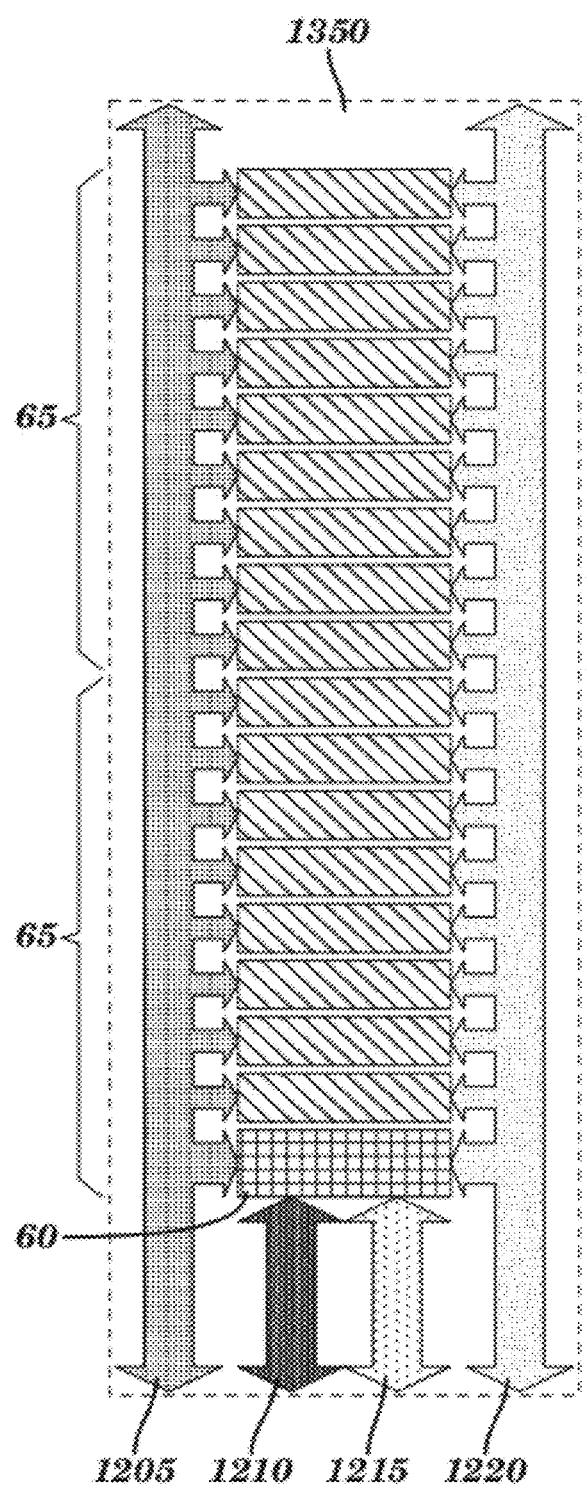
FIG. 3B depicts a micro grid system stack, in accordance with embodiments of the present invention.

FIG. 3B depicts a micro grid system stack 1350 of 18 processors 65, in accordance with embodiments of the present invention. The micro grid system stack 1350 comprises two standard system data buses (1210, 1215), a micro grid system bus 1205, and a macro grid system bus 1220 to provide data transfer pathways of the micro grid system stack to wireless interfaces, I/O and other necessary software connections of the assembled apparatus. The unique processor 60 with its own unique operating system resides at the first position in the micro grid stack of processors 65. The two groups of cell processors 65 are collectively embodied in the stack as a continuous row of available micro grid processors for determination of use, by the unique processor 60.

Figure 4A:
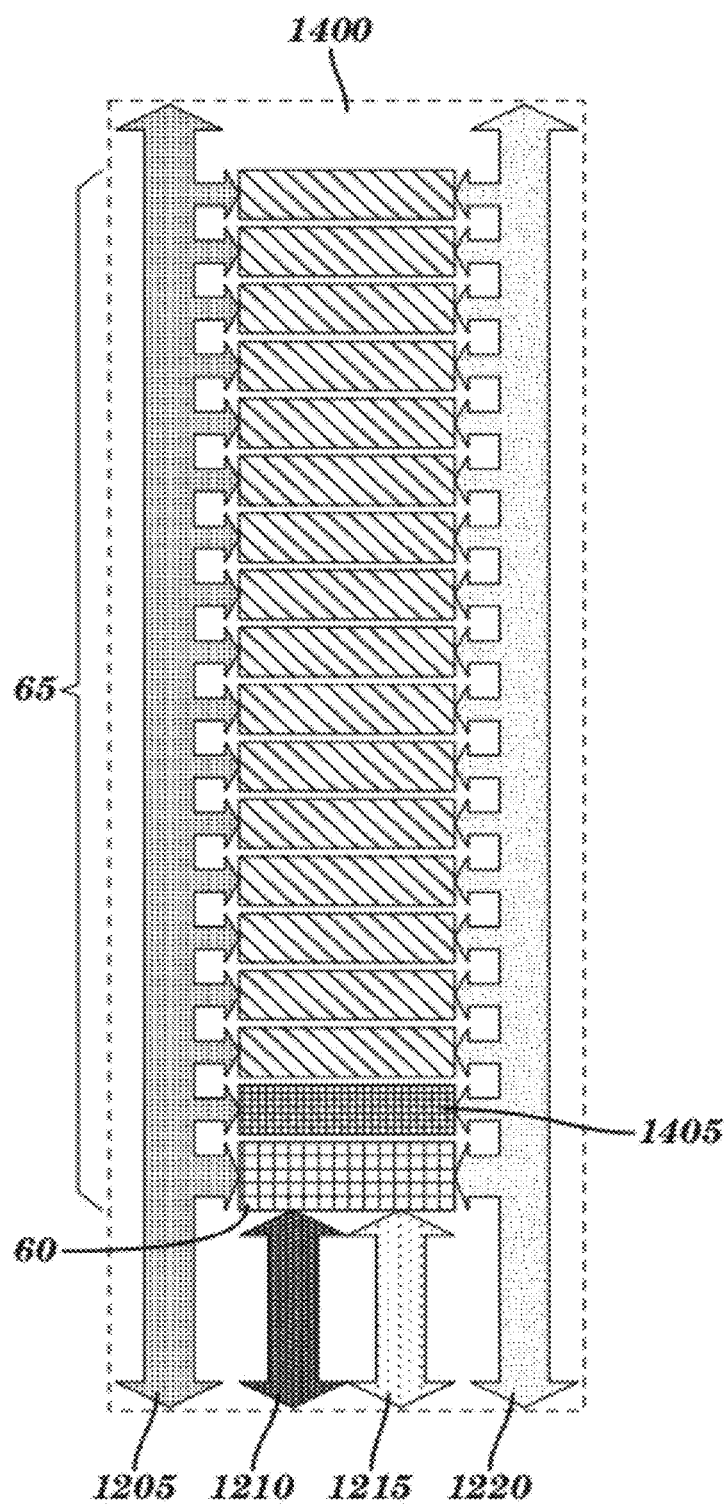
FIG. 4A depicts a micro grid system stack, in accordance with embodiments of the present invention.

FIG. 4A depicts a micro grid system stack 1400 of 18 processors 65, in accordance with embodiments of the present invention. The 18 processors 65 comprise a unique micro grid processor 60, a macro grid processor 1405 for a single artificial intelligence to interface, 16 micro grid processors 65, and micro grid system buses for data transfer and software connections, which include two standard system data buses (1210, 1215), a micro grid system bus 1205, and a macro grid system bus 1220.

An alert to the unique processor 60 may be detected via the I/O module 410 for the local and physically connected sensors to the apparatus; or via the communications module 425 receiving the alert wirelessly for remote sensors linked to the apparatus.

An external macro grid alert to the unique processor 60 (e.g., as received from the communication module 425's wireless connection to an adjacent macro grid processor) may contain an externally computed value of scale (S), wherein S is a function of a magnitude of the event (E), an urgency level for responding to the event (U), and a quash time for extinguishing the event (Q). The magnitude of the event (E) that triggered the alert is a numerical value within a predefined range of numerical values (e.g., a continuous range of values such as 1 to 10, a discrete set of values such as the integers 1, 2, 3, . . . , 10, etc.). The urgency level (U) for responding to the event is a numerical value within a predefined range of numerical values (e.g., a continuous range of values such as 1 to 10, a discrete set of values such as the integers 1, 2, 3, . . . 10, etc.). The quash time (Q) for extinguishing the event is in units of seconds, minutes, hours, days, etc. In one embodiment, the magnitude of an event (E) is derived from GPS data received by the artificial intelligence from GPS modules (420) attached to participating micro grid apparatuses across the extremity of the geographical footprint of the macro grid. In one embodiment, the urgency level (U) is derived from the TCP/IP sensors alert signal frequency (e.g., one alert signal per second, one alert signal per millisecond, etc.). In one embodiment, $S=(E \times U)/Q$. In one embodiment, E and U are independent of each other. In one embodiment, U is a function of E. For example, if U is a linear function of E, then S is proportional to $E^2/Q$.

The unique processor 60 assigns an internal micro grid processor to modify its operating system and becomes a macro grid processor of a macro grid, after which an artificial intelligence is generated for the macro grid. The macro grid processor created by the unique processor 60 interrogates the alert and determines the number of available micro grid processors 65 (e.g., from information provided by the unique processor in the micro grid stack) to be assigned for countering the event by either: (1) determining the scale of the event to be the scale (S) contained in the alert; or (2) determining the scale of the event by computing a value for the scale (S') of the response necessary to counter the event raised by an alert. The scale (S') is computed by an artificial intelligence of the macro grid; e.g., by using the same formula (e.g., S'=(E×U)/Q in one embodiment) as used for previously computing the scale S received by the unique processor 60 in the alert, but may differ in value from S due to U and/or Q being different for computing S' than for computing S (e.g., due to a change in U and/or Q having occurred from when S was computed to when S' is computed). In one embodiment, the number of available micro grid processors 65 to be assigned for countering the event is a non-decreasing function of the scale (S or S') of the event.

The artificial intelligence in the macro grid processor then requests other adjacent and wirelessly connectable unique processors to assign a micro grid processor to become a macro grid processor in a similar way. Accordingly, the macro grid begins to grow in footprint size and shape.

The scale (S) of the alert received by the unique processor 60 from an adjacent processor via the communication module's wireless may be predetermined by an artificial intelligence in the adjacent processor requesting assignment of a macro grid processor (including micro grid processing resources) from the unique processor 60.

Figure 4B:
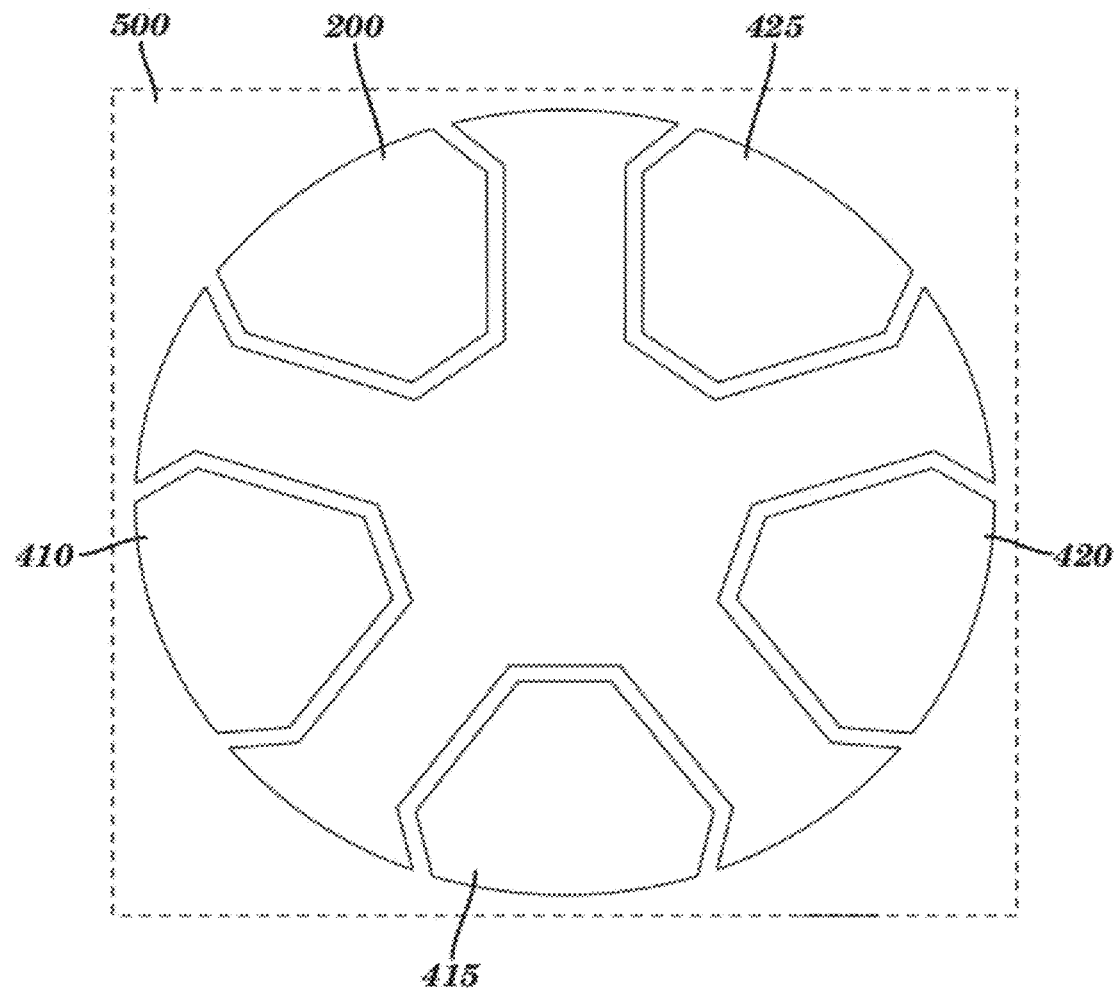
FIG. 4B depicts a micro grid apparatus, in accordance with embodiments of the present invention.

FIG. 4B depicts a micro grid apparatus 500, in accordance with embodiments of the present invention. The micro apparatus 500 contains of the hardware and software of a micro grid system stack in the complex shape of the micro grid apparatus 500. The micro grid apparatus 500 comprises the micro grid's system RAM 200, the micro grid's system communication 425, the micro grid's system GPS 420, the micro grid's system artificial intelligence wireless 415, and the micro grid's system I/O 410.

Figure 4C:
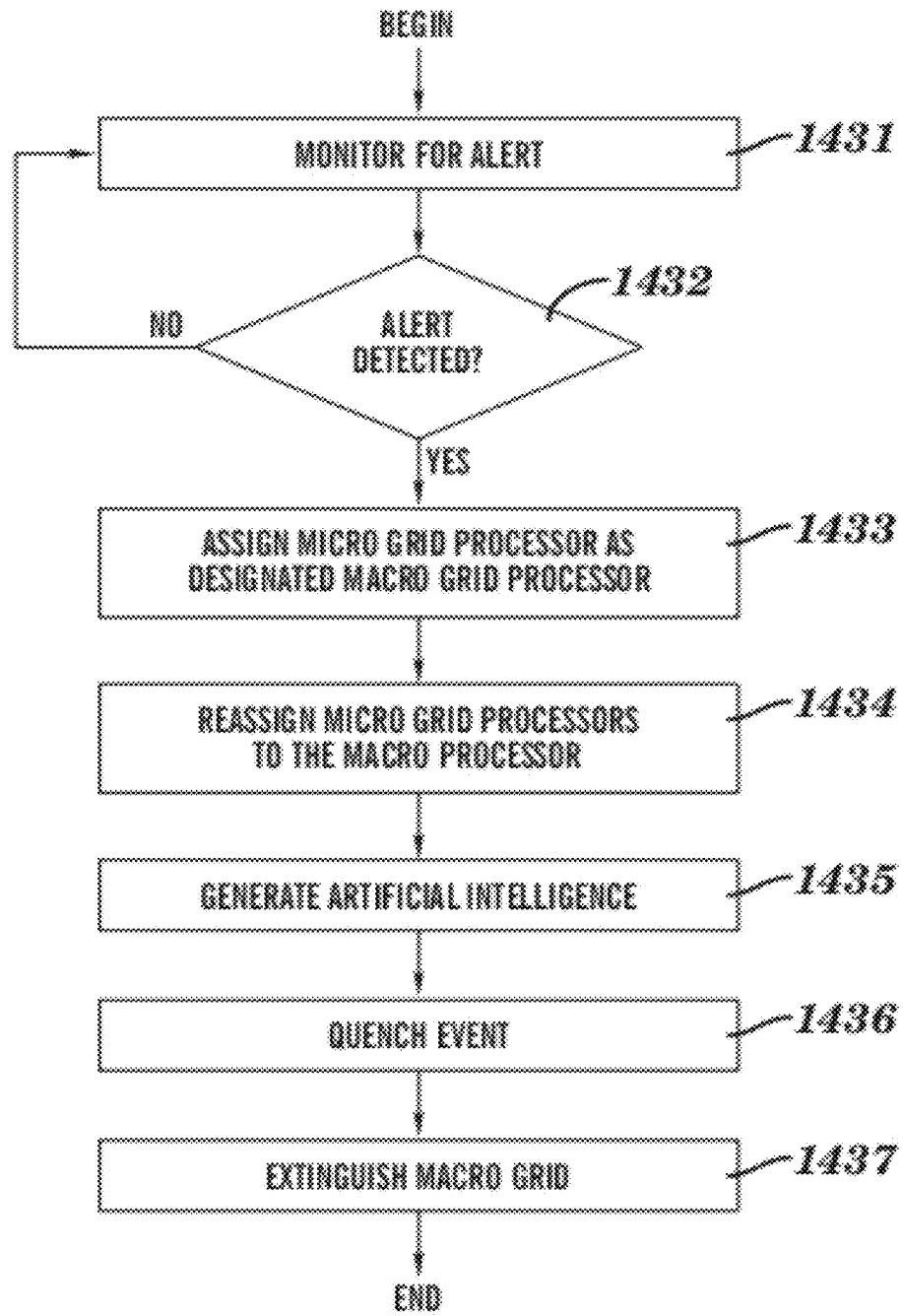
FIG. 4C is a flow chart describing a process for detecting an alert and for responding to the detected alert, in accordance with embodiments of the present invention.

FIG. 4C is a flow chart describing a process for detecting an alert and for responding to the detected alert, in accordance with embodiments of the present invention. The flowchart of FIG. 4C comprises steps 1431-1437.

In step 1431, the unique processor 60 constantly monitors the system bus (1210, 1215) for an 'alert data packet': (1) from any sensor directly connected to the I/O irregular shaped module 410 or to the communications module 425; or (2) from any external micro grid apparatus or any macro grid that is connected wirelessly or by direct electrical connection to the micro grid apparatus 100. An alert data packet comprises an alert pertaining to an event.

The 'alert data packet' may contain a computed value of scale (as defined supra) to assist in determining the number of micro grid resources required to assist with countering the event from the location of the external micro grid apparatus. GPS information from the GPS module 420 may be constantly interrogated to determine a 'location value' for advising the artificial intelligence (generated in step 1435) as to where the event is, and as a consequence, influencing the macro grid operating system to increase or decrease the number of micro grid processing resources participating from within the single apparatus.

Step 1432 determines whether the unique processor 60 has detected a data packet comprising the alert in step 1431. If step 1433 determines that the unique processor 60 has detected a data packet comprising the alert, then step 1433 is next performed; otherwise the process loops back to step 1431 to monitor for an alert.

In step 1433, via the micro grid bus 1205, the unique processor 60 initiates a response to the alert by identifying an available micro grid processor within the micro grid apparatus comprising the unique processor 60, designates the available micro grid processor to be a designated macro grid processor by altering the operating system of the available micro grid processor to a macro grid operating system, and assigns to the designated macro grid processor an alert ownership of a macro grid with an associated responsibility for the operation of the macro grid.

The designated macro grid processor assigns one or more additional processors from the micro grid apparatus comprising the unique processor 60 as micro grid computational resources are required by the macro grid. The total number of the one or more additional processors assigned as computational resources for the micro grid is a function of the scale of the alert. The macro grid operating system comprises software configured, upon being implemented (i.e., performed), to respond to the event associated with the detected alert.

In one embodiment, step 1434 is performed if warranted by the nature of the event and/or scale of the alert. In step 1434, the designated macro grid processor communicates the 'alert data packet' to the unique micro grid processor(s) in one or more different micro grid apparatuses, via the wireless irregular shaped module 415 for connection. The unique micro grid processor in each micro grid apparatus of the one or more different micro grid apparatuses assigns a micro grid processor in its micro grid apparatus to become an additional macro grid processor of the macro grid. The assembled macro grid communicates via the wirelessly connected macro grid system bus 1220. Each macro grid processor of the designated macro grid processors may assign one or more additional processors from its micro grid apparatus as computational resources for the macro grid. In one embodiment, the initially designated macro grid processor directs and oversees the operation of all of the other macro grid processors of the macro grid.

In one embodiment, step 1434 is not performed and the macro grid consequently has exactly one macro grid processor, namely the designated macro grid processor.

In step 1435, an artificial intelligence is generated for the macro grid by the designated macro grid processor. In one embodiment, the artificial intelligence is stored only in one macro grid processor (e.g., the designated macro grid processor) of the macro grid. In one embodiment, a different portion of the artificial intelligence is stored in some but not all macro grid processors of the macro grid. In one embodiment, a different portion of the artificial intelligence is stored in each macro grid processor of the macro grid.

The macro grid may dynamically expand or contract as the event increases or decreases, respectively. If the alert is of a predefined scale (as defined supra) requiring additional computational resources, or if a matched alert is detected in other micro grid apparatus(es) than the micro grid apparatus that detected the alert in step 1432, then micro grid processors within the other apparatus(es) are assigned to the artificial intelligence as computational resources. A "matched alert" is defined as an alert that communicates an enhancement of the event associated with the original alert detected in step 1432. As the event diminishes, macro grid processors and/or micro grid processors assigned as computational resources are removed from the macro grid.

In step 1436, the event associated with the alert is responded to and quenched by the artificial intelligence. The manner in which the macro grid responds to and quenches the event is specific to the event, as illustrated in three hypothetical examples which are described infra.

As the scale of the alert (as defined supra) is reduced such that fewer computational resources are needed to combat the event associated with the alert. Accordingly, the artificial intelligence returns no longer needed macro grid processors back to associated micro grid processors under the control of the unique processor of the micro grid apparatus that comprises each associated micro grid processor.

If a previously occurring matched alert disappears, then the artificial intelligence will commence returning the conscripted additional macro grid processors back to the control of the corresponding unique processor in the micro grid apparatus that is wirelessly connected the micro grid apparatus 100. Eventually the designated macro grid processor itself is returned as a micro grid processor to the micro grid apparatus 100, resulting in the artificial intelligence vacating the macro grid and the macro grid disappearing, thus extinguishing the macro grid and all of its included macro processors, along with the artificial intelligence, in step 1437.

Figure 4D:
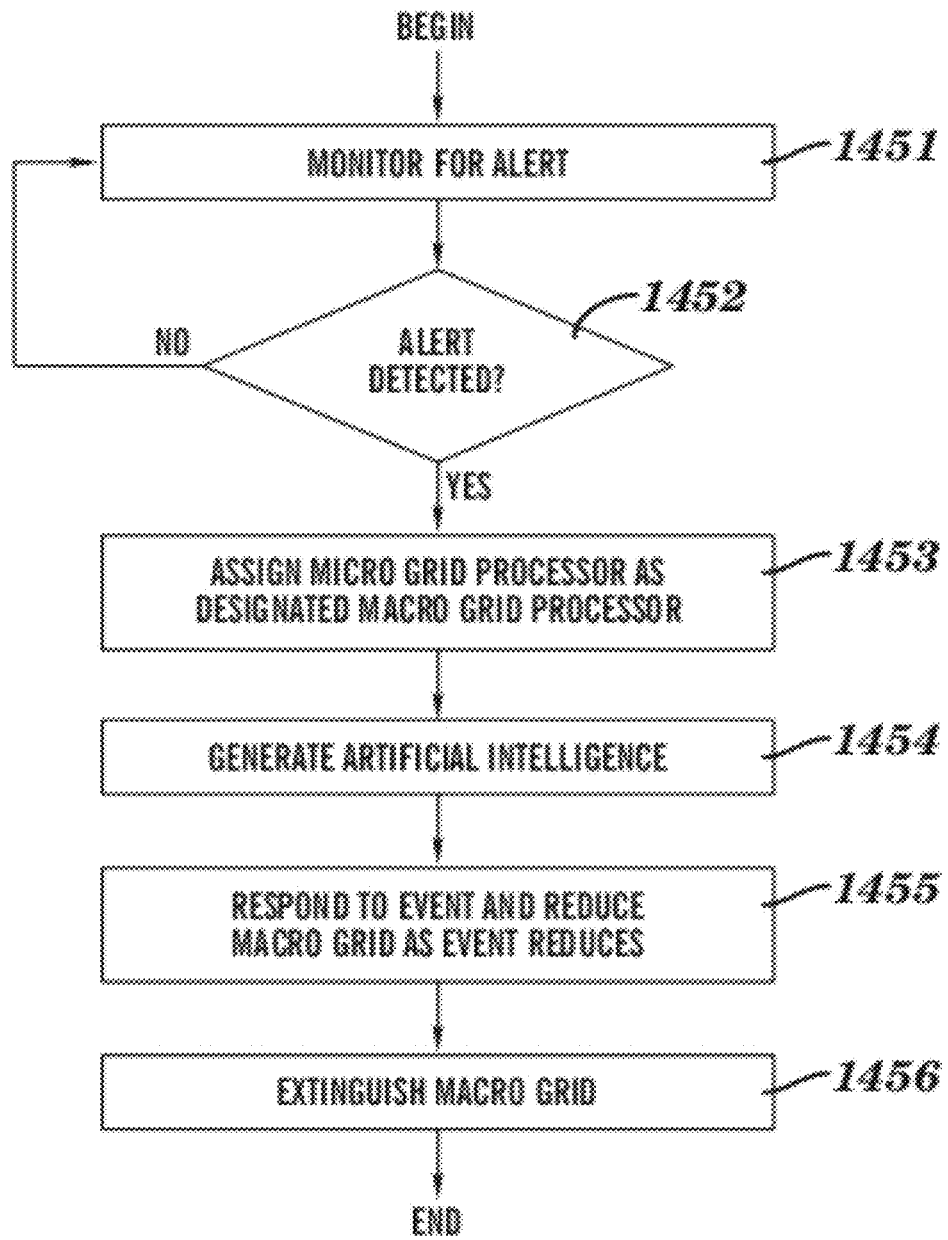
FIG. 4D is a flow chart describing a process for detecting an alert and for responding to the detected alert, in accordance with embodiments of the present invention.

FIG. 4D is a flow chart describing a process for detecting and for responding to the detected alert, in accordance with embodiments of the present invention. The flow chart of FIG. 4D comprises steps 1451-1456.

In step 1451, the unique processor 60 constantly monitors the system bus (1210, 1215), via the communications module 425 of the micro grid apparatus 100, for an 'alert data packet': (1) from any sensor directly connected to the I/O irregular shaped module 410 or to the communications module 425; or (2) from any external micro grid apparatus or any macro grid that is connected wirelessly or by direct electrical connection to the micro grid apparatus 100. An alert data packet comprises an alert pertaining to an event.

The 'alert data packet' may contain a computed value of scale (as defined supra) to assist in determining the number of micro grid resources required to assist with countering the event from the location of the external micro grid apparatus. GPS information from the GPS module 420 may be constantly interrogated to determine a 'location value' for advising the artificial intelligence (generated in step 1454) as to where the event is, and as a consequence, influencing the macro grid operating system to increase or decrease the number of micro grid processing resources participating from within the single apparatus.

Step 1452 determines whether the unique processor 60 has detected a data packet comprising the alert in step 1451. If step 1452 determines that the unique processor 60 has detected a data packet comprising the alert then step 1453 is next performed; otherwise the process loops back to step 1451.

In step 1453, via the micro grid bus 1205, the unique processor 60 initiates a response to the alert by identifying an available micro grid processor within the micro grid apparatus comprising the unique processor 60, designates the available micro grid processor as a macro grid processor by altering the operating system of the available micro grid processor to a macro grid operating system, and assigns to the designated macro grid processor an alert ownership of a macro grid with an associated responsibility for the operation of the macro grid.

In step 1454, an artificial intelligence is generated for the macro grid, under control of the unique processor 60, and is stored in the designated macro grid processor. The artificial intelligence stored in the designated macro grid processor, upon being implemented, may assign one or more additional processors from its micro grid apparatus as computational resources are for the macro grid.

In one embodiment, the artificial intelligence stored in the designated macro grid processor may trigger generation of other macro grid processors if warranted by the nature of the event and/or scale of the alert. Specifically, the artificial intelligence stored in the designated macro grid communicates with the unique micro grid processor in one or more different micro grid apparatuses to direct the unique micro grid processor in each micro grid apparatus of the one or more different micro grid apparatuses to assign a micro grid processor in its micro grid apparatus to become an additional macro grid processor of the macro grid. In one embodiment, the artificial intelligence stored in the designated macro grid processor may affirm or negate the choice of the additional macro grid processor by the unique micro grid processor in each micro grid apparatus.

In one embodiment, the artificial intelligence does not trigger generation of other macro grid processors and the macro grid consequently has exactly one macro grid processor, namely the designated macro grid processor.

If generation of other macro grid processors is triggered, the artificial intelligence stored in the designated macro grid processor may generate, or trigger the generating of, other artificial intelligences to generate or develop a resultant artificial intelligence. In one embodiment, the artificial intelligence is stored only in one macro grid processor (e.g., the designated macro grid processor) of the macro grid. In one embodiment, a different portion of the artificial intelligence is stored in some but not all macro grid processors of the macro grid. In one embodiment, a different portion of the artificial intelligence is stored in each macro grid processor of the macro grid.

If the alert is of a predefined scale (as defined supra) requiring additional computational resources, or if a matched alert (as defined supra) is detected in other micro grid apparatus(s) than the micro grid apparatus that detected the alert in step 1452, then micro grid processors within the other apparatus (s) are assigned to the artificial intelligence as computational resources.

In step 1455, the event is responded to by the artificial intelligence. The manner in which the macro grid and artificial intelligence responds to and quenches the event is specific to the event, as illustrated in three hypothetical examples which are described infra.

As the scale of the alert (as defined supra) is reduced such that fewer computational resources are needed to combat the event associated with the alert. Accordingly, the artificial intelligence returns no longer needed macro grid processors back to associated micro grid processors under the control of the unique processor of the micro grid apparatus that comprises each associated micro grid processor.

If a previously occurring matched alert disappears, then the artificial intelligence will commence returning the conscripted additional macro grid processors back to the control of the corresponding unique processor in the micro grid apparatus that is wirelessly connected the micro grid apparatus 100. Eventually the designated macro grid processor itself is returned as a micro grid processor to the micro grid apparatus 100, resulting in the artificial intelligence vacating the macro grid and the macro grid disappearing, thus extinguishing the macro grid and all of its included macro processors, along with the artificial intelligence, in step 1456.

Figure 4E:
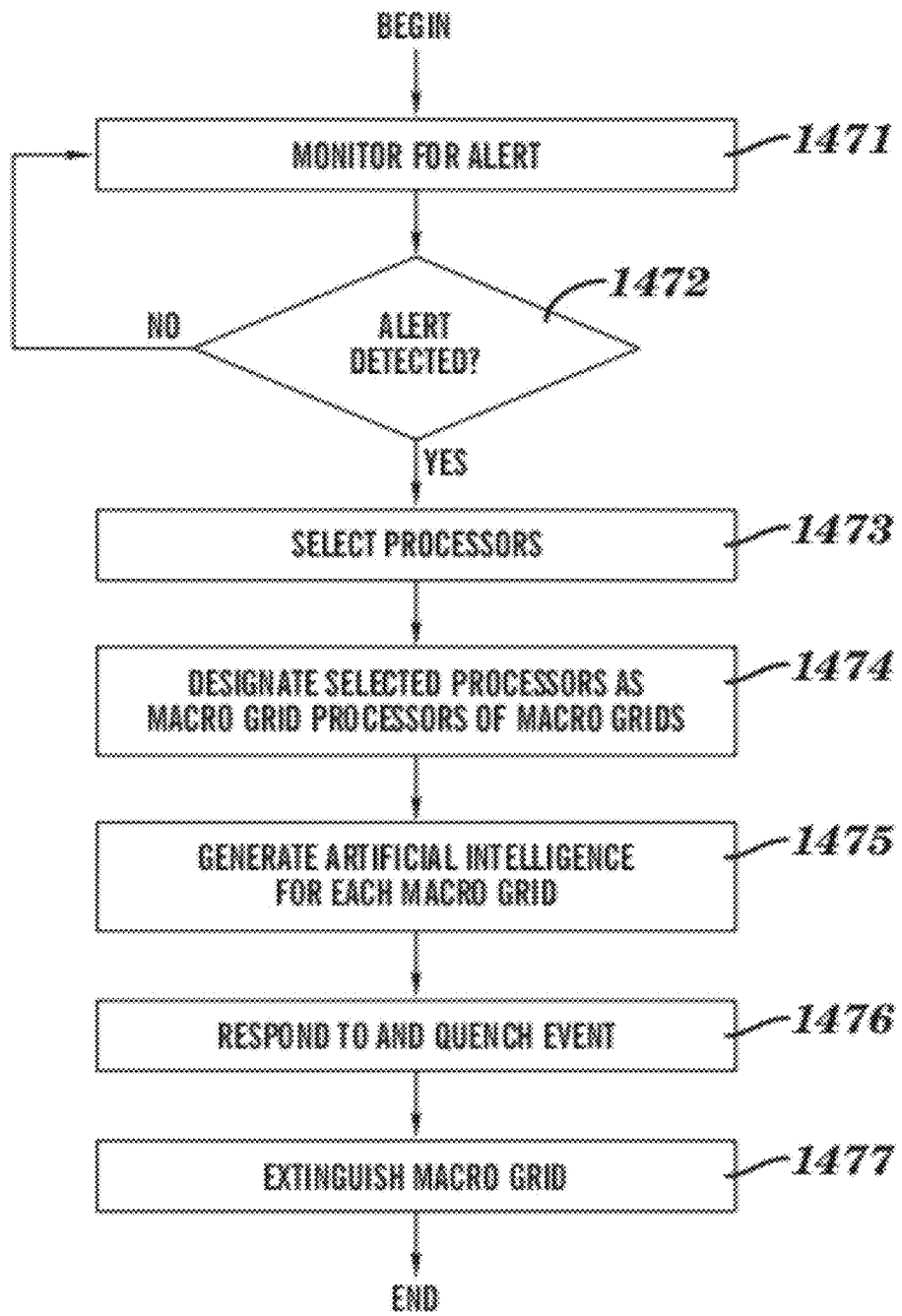
FIG. 4E is a flow chart describing a process for detecting an alert and for responding to the detected alert, in accordance with embodiments of the present invention.

FIG. 4E is a flow chart describing a process for detecting an alert and for responding to the detected alert, in accordance with embodiments of the present invention. The flow chart of FIG. 4E comprises steps 1471-1477.

In step 1471, the unique processor 60 constantly monitors the system bus (1210, 1215), via the communications module 425 of the micro grid apparatus 100, for an 'alert data packet': (1) from any sensor directly connected to the I/O irregular shaped module 410 or to the communications module 425; or (2) from any external micro grid apparatus or any macro grid that is connected wirelessly or by direct electrical connection to the micro grid apparatus 100. An alert data packet comprises an alert pertaining to an event.

The 'alert data packet' may contain a computed value of scale (as defined supra) to assist in determining the number of micro grid resources required to assist with countering the event from the location of the external micro grid apparatus. GPS information from the GPS module 420 may be constantly interrogated to determine a 'location value' for advising the artificial intelligence (generated in step 1475) as to where the event is, and as a consequence, influencing the macro grid operating system to increase or decrease the number of micro grid processing resources participating from within the single apparatus.

Step 1472 determines whether the unique processor 60 has detected a data packet comprising the alert in step 1471. If step 1472 determines that the unique processor 60 has detected a data packet comprising the alert then step 1473 is next performed; otherwise the process loops back to step 1471.

In step 1473, after detecting the alert data packet in step 1472, each unique processor selects at least one processor from each micro grid apparatus.

In step 1474, each selected processor is designated as a macro grid processor of a respective macro grid by altering an operating system of each selected processor to a macro grid operating system and by assigning to each selected processor a responsibility for operation of its respective macro grid.

In step 1475, an artificial intelligence is generated for each macro grid.

In step 1476, the event is responded to and quenched by executing the artificial intelligence of each macro grid.

In step 1477 after the event has been quenched, the macro grids are extinguished.

In one embodiment, at least one micro grid apparatus comprises a plurality of micro grid apparatuses, wherein step 1474 results in the respective macro grids comprising a plurality of macro grids, and wherein executing the artificial intelligence of each macro grid in step 1476 comprises contemporaneously executing the artificial intelligence of each macro grid to perform said responding to and quenching the event.

In one embodiment for each macro grid, one or more processors in each micro grid apparatus, other than the selected processors in each micro grid apparatus, are assigned as computational resources for each macro grid.

In one embodiment, at least two macro grids include a different macro grid processor selected from a same micro grid apparatus.

In one embodiment, the process geographically relocates at least one macro grid processor of a first macro grid, which results in the first macro grid having its geographical footprint increased or decreased.

In one embodiment, the alert data packet includes an identification of a scale (S), wherein S is a function of a magnitude of the event (E), an urgency level for responding to the event (U), and a quash time for extinguishing the event (Q). The scale (S) identified in the alert data packet may be used to determine a total number of processors of the at least one processor to be selected from each micro grid apparatus during said selecting the at least one processor from each micro grid apparatus in step 1473. In one embodiment, $S=(E \times U)/Q$.

In one embodiment, the artificial intelligence for a first macro grid of the plurality of macro grids ascertains that the scale is increased relative to the scale identified in the alert data packet which triggers adding at least one macro grid processor to the first macro grid, resulting in the first macro grid having its geographical footprint increased In one embodiment, the artificial intelligence for a first macro grid of the plurality of macro grids ascertains that the scale is decreased relative to the scale identified in the alert data packet which triggers removing at least one macro grid processor from the first macro grid, resulting in the first macro grid having its geographical footprint decreased.

Other embodiments, as described supra in conjunction with the process of FIG. 4C and/or FIG. 4D, are likewise applicable to the process of FIG. 4E.

Figure 5A:
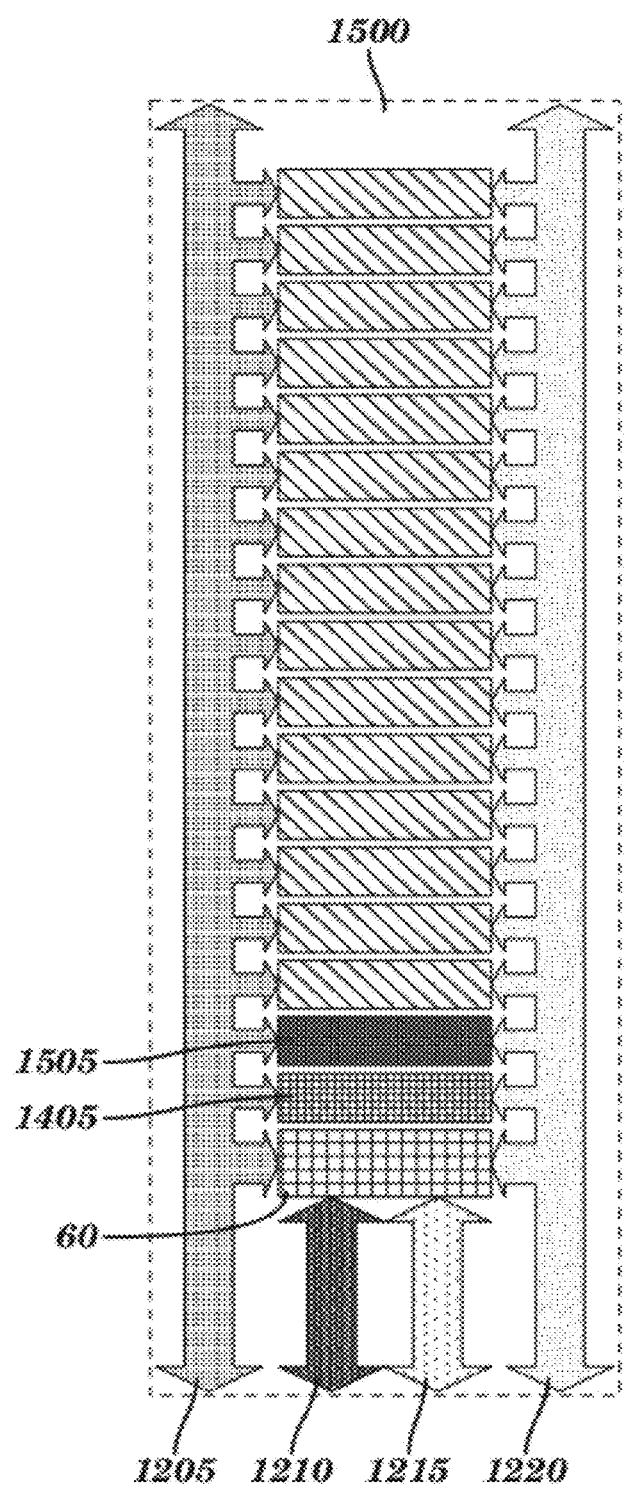
FIG. 5A depicts a micro grid system stack of 18 processors, in accordance with embodiments of the present invention.

FIG. 5A depicts a micro grid system stack 1500 of 18 processors, in accordance with embodiments of the present invention. The micro grid system stack 1500 comprises a unique micro grid processor 60, two designated macro grid processors (1405, 1505) of two corresponding macro grids, and 15 micro grid processors (as additional processing resources, some or all of which being allocated to the two designated macro grid processors (1405, 1505)). The two corresponding macro grids exist contemporaneously and have two corresponding artificial intelligences co-existing in the same micro grid apparatus (i.e., in the same micro grid system stack 1500).

Figure 5B:
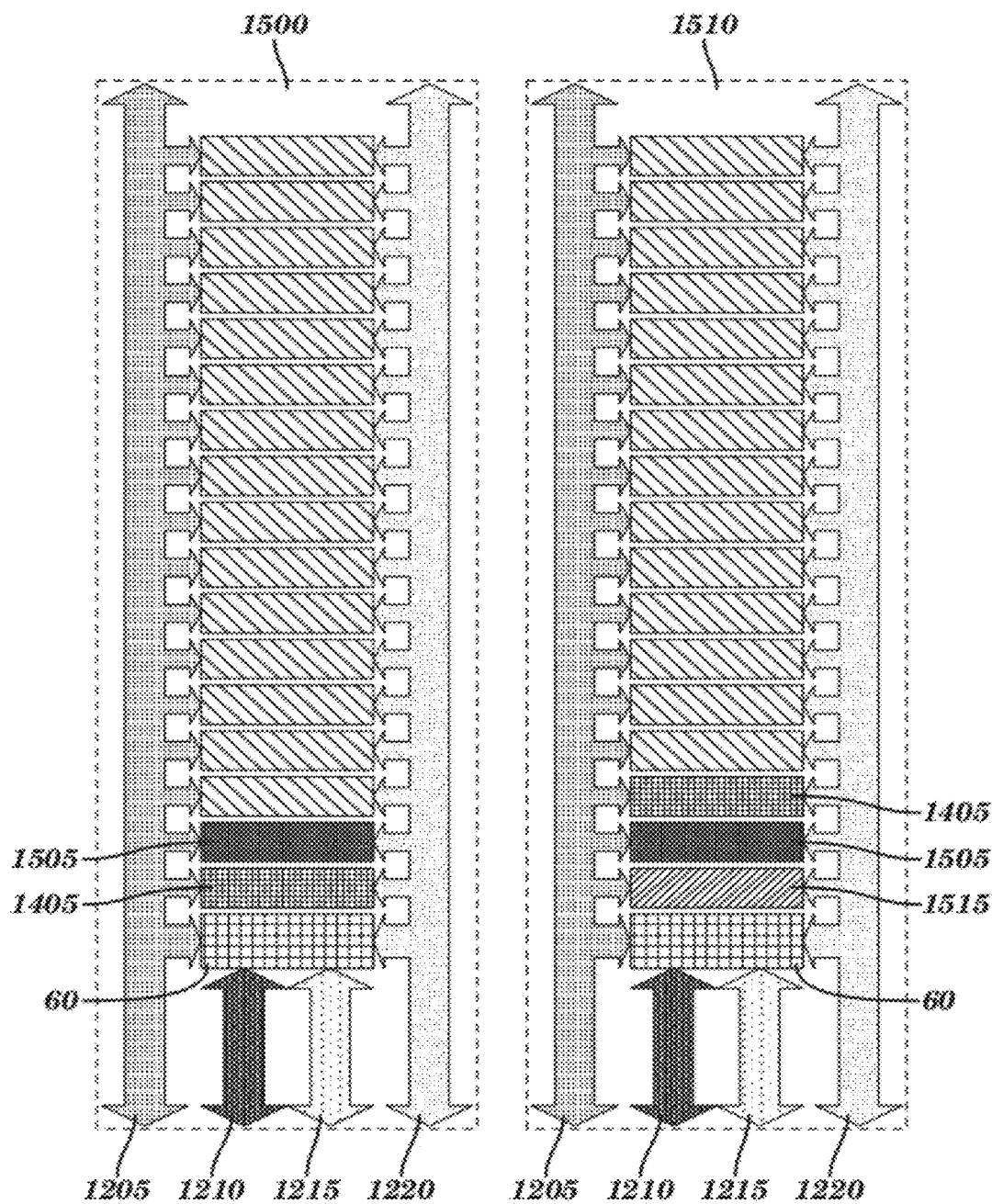
FIG. 5B depicts two micro grid system stacks, each stack comprising 18 processors, in accordance with embodiments of the present invention.

FIG. 5B depicts two micro grid system stacks (1500, 1510), each stack comprising 18 processors, in accordance with embodiments of the present invention. Each stack is in a different micro grid apparatus. The 18 processors in each stack are adjacent to one another and are directly connected electrically or wirelessly connected to each other within a micro grid apparatus. The stack 1500 comprises a unique micro grid processor 60, two designated macro grid processors (1405, 1505) of two corresponding macro grids, and 15 micro grid processors (as additional processing resources, some or all of which being allocated to the two designated macro grid processors (1405, 1505)). The stack 1510 comprises a unique micro grid processor 60, three designated macro grid processors (1515, 1505, 1405) of three corresponding macro grids, and 14 micro grid processors (as additional processing resources, some or all of which being allocated to the three designated macro grid processors (1515, 1505, 1405)).

In FIG. 5B, a first macro grid comprises macro grid processor 1405 of stack 1500 and macro grid processor 1405 of stack 1510, said first macro grid having a first artificial intelligence. A second macro grid comprises macro grid processor 1505 of stack 1500 and macro grid processor 1505 of stack 1510, said second macro grid having a second artificial intelligence. A third macro grid comprises macro grid processor 1515 of stack 1510, said third macro grid having a third artificial intelligence. Each macro grid in FIG. 5B is formed by the process depicted in FIG. 4C or FIG. 4D.

Figure 5C:
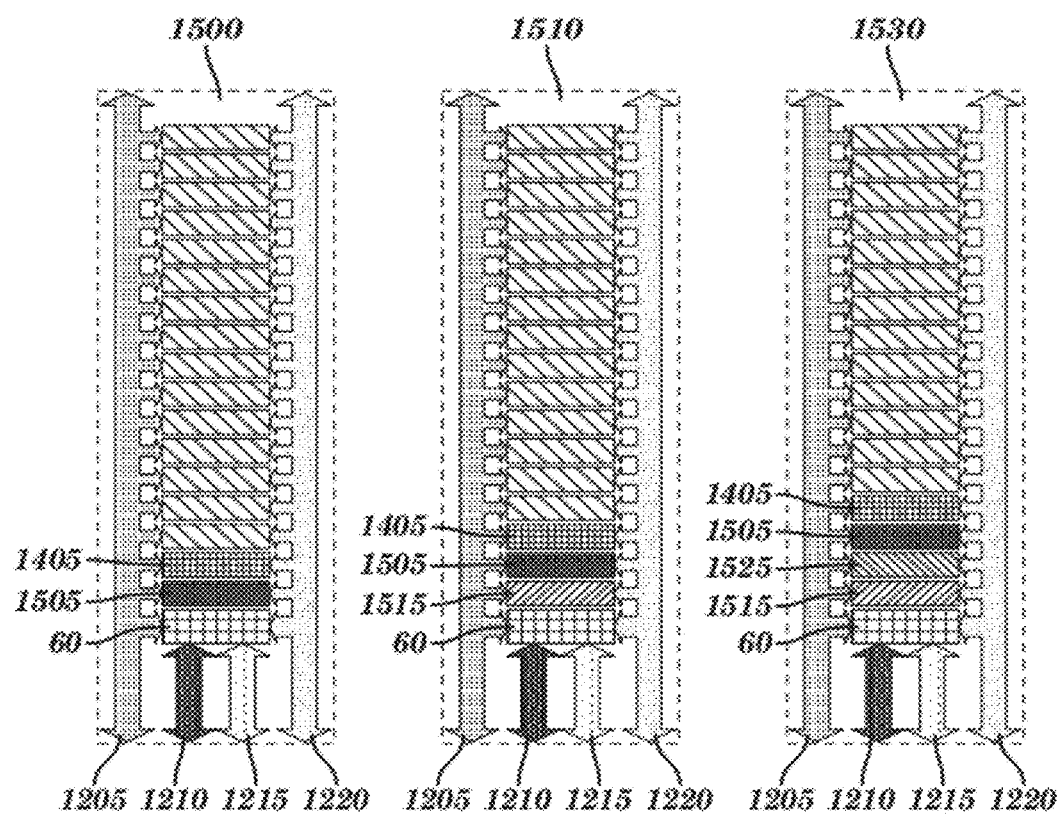
FIG. 5C depicts three micro grid system stacks, each stack comprising 18 processors, in accordance with embodiments of the present invention.

FIG. 5C depicts three micro grid system stacks (1500, 1510, 1530), each stack comprising 18 processors, in accordance with embodiments of the present invention. Each stack is in a different micro grid apparatus. The 18 processors in each stack are adjacent to one another and are directly connected electrically or wirelessly connected to each other within a micro grid apparatus. The stack 1510 is disposed between stacks 1500 and 1530. The stack 1500 comprises a unique micro grid processor 60, two designated macro grid processors (1505, 1405) of two corresponding macro grids, and 15 micro grid processors (as additional processing resources, some or all of which being allocated to the two designated macro grid processors (1505, 1405)). The stack 1510 comprises a unique micro grid processor 60, three designated macro grid processors (1515, 1505, 1405) of three corresponding macro grids, and 14 micro grid processors (as additional processing resources, some or all of which being allocated to the three designated macro grid processors (1515, 1505, 1405)). The stack 1530 comprises a unique micro grid processor 60, four designated macro grid processors (1515, 1525, 1505, 1405) of four corresponding macro grids, and 13 micro grid processors (as additional processing resources, some or all of which being allocated to the four designated macro grid processors (1515, 1525, 1505, 1405)).

In FIG. 5C, a first macro grid comprises macro grid processor 1405 of stack 1500, macro grid processor 1405 of stack 1510, and macro grid processor 1405 of stack 1530, said first macro grid having a first artificial intelligence. A second macro grid comprises macro grid processor 1505 of stack 1500, macro grid processor 1505 of stack 1510, and macro grid processor 1505 of stack 1530, said second macro grid having a second artificial intelligence. A third macro grid comprises macro grid processor 1515 of stack 1510 and macro grid processor 1515 of stack 1530, said third macro grid having a third artificial intelligence. A fourth macro grid comprises macro grid processor 1525 of stack 1530, said fourth macro grid having a fourth artificial intelligence.

In FIG. 5C: (1) each of the three micro grid system stacks (1500, 1510, 1530) has a unique processor 60; (2) one of the micro grid system stacks (1530) has a macro grid processor (1525) not found in the other two adjacent physical apparatus's (1500, 1510); (3) two of the micro grid system stacks (1510, 1530) have a macro grid processor (1515) participating in the same third macro grid; (4) all three of the micro grid system stacks (1500, 1510, 1530) have two macro grid processors (1405, 1505) participating in the first and second macro grid, respectively; and (5) a total of four macro grids are present in the three micro grid system stacks (1500, 1510, 1530), and are functioning contemporaneously, each controlled by their own individual artificial intelligence.

Figure 5D:
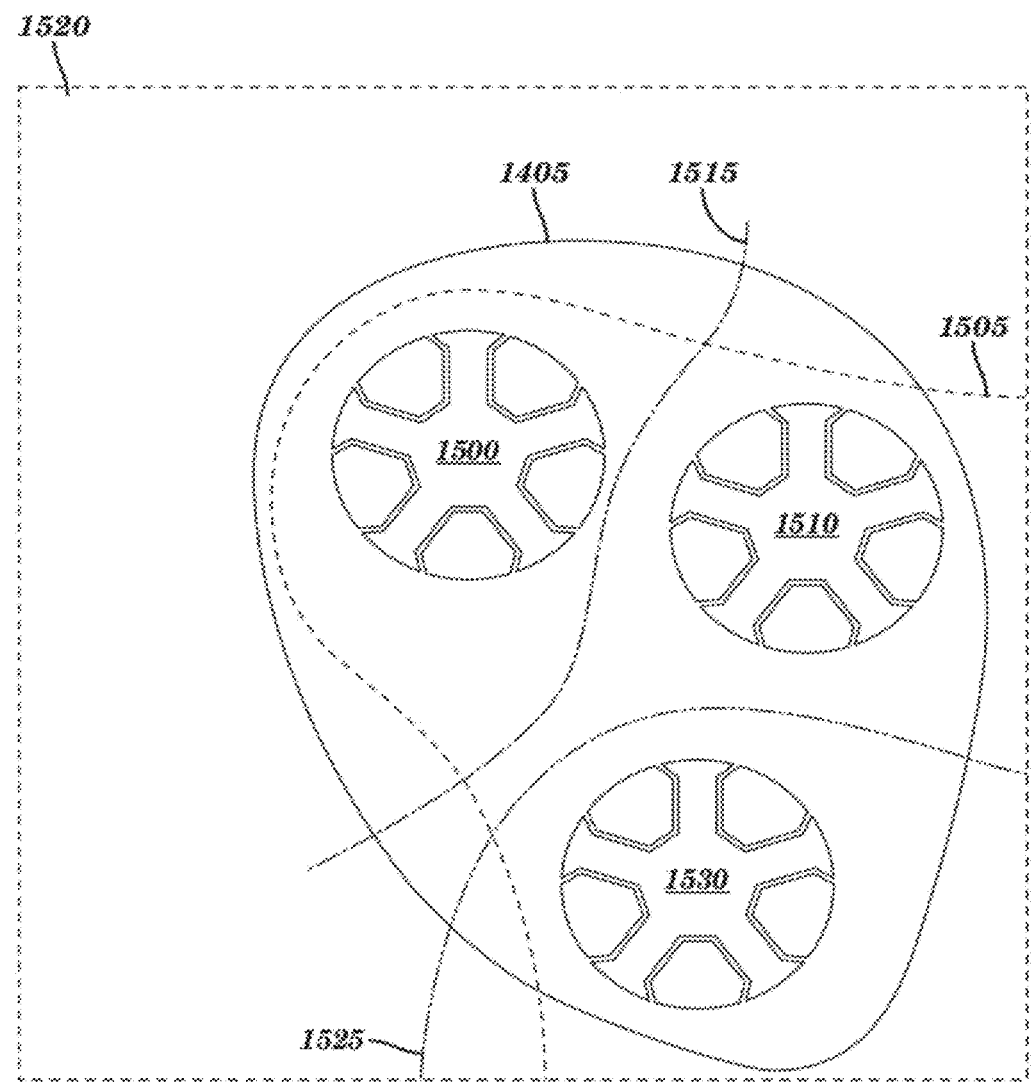
FIG. 5D is a diagram of a geographic area comprising the four macro grids associated with the three micro grid system stacks of FIG. 5C, in accordance with embodiments of the present invention.

FIG. 5D is a diagram of a geographic area 1520 comprising the four macro grids associated with the three micro grid system stacks (1500, 1510, 1530) of FIG. 5C, in accordance with embodiments of the present invention. FIG. 5D depicts the micro grid apparatuses that comprise the three micro grid system stacks (1500, 1510, 1530). The three mobile micro grid system stacks (1500, 1510, 1530) are adjacent to each other and wirelessly connected to each other in the manner described supra in conjunction with FIG. 5C. Each micro grid system stack contains different combinations of macro grid processors, which are illustrated by the shape and boundaries of the respective geographical footprint of the macro grids. Each geographical footprint in FIG. 5D is identified by the macro grid processor (1405, 1505, 1515, 1525) included in its respective macro grid. Each macro grid is governed by its own artificial intelligence. In one embodiment, the geographic area 1520 is several hundred meters across.

Figure 6A:
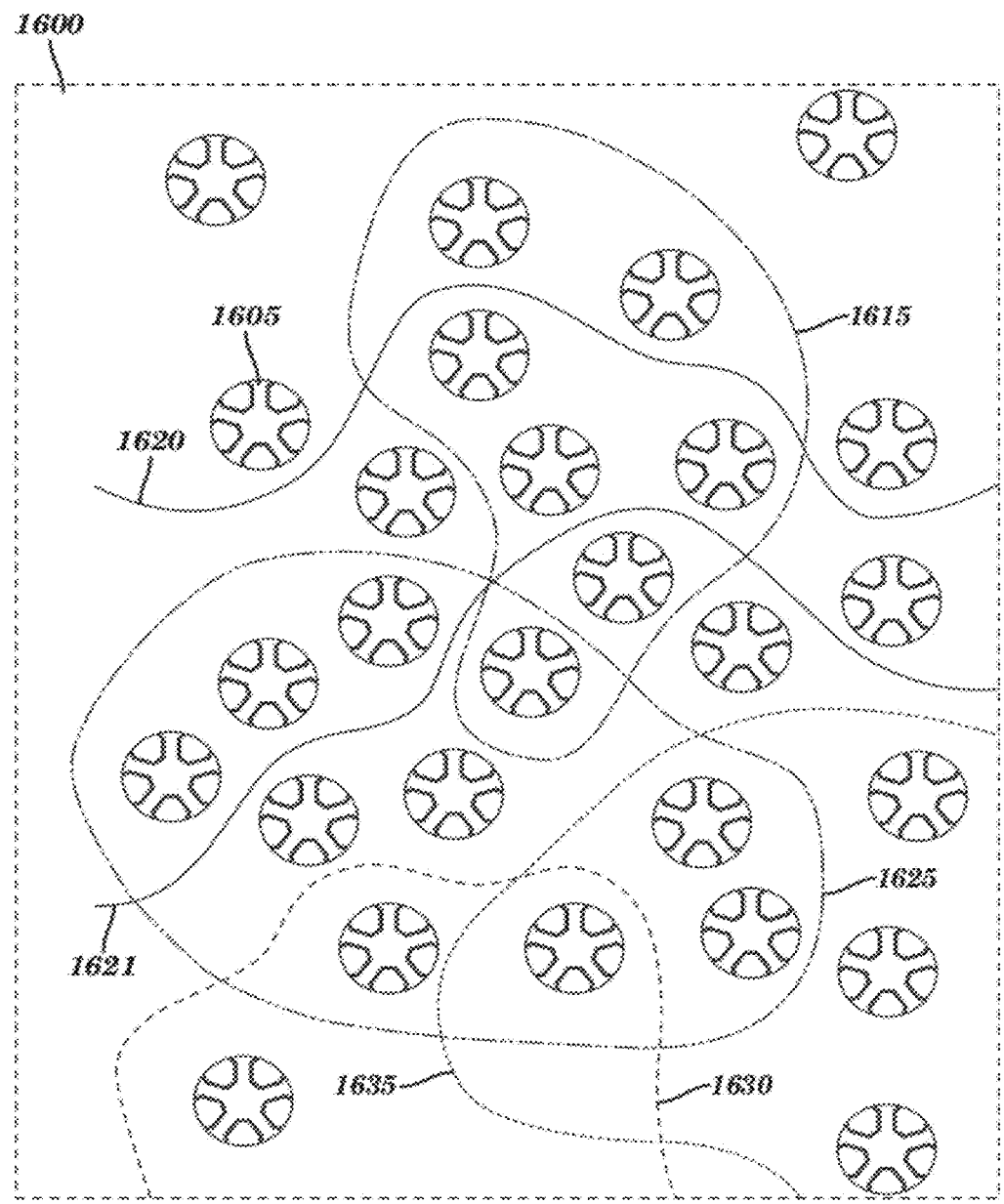
FIG. 6A is a diagram of a geographic area comprising 5 macro grids and 27 micro grid apparatuses, in accordance with embodiments of the present invention.

FIG. 6A is a diagram of a geographic area 1600 comprising 5 macro grids and 27 micro grid apparatuses, in accordance with embodiments of the present invention. FIG. 6A depicts a distribution of micro grid apparatuses within the 5 macro grids. Each micro grid apparatus in FIG. 6A comprises its micro grid system stack, as explained supra. Some or all of the 27 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6A is identified by the macro grid processor (1615, 1620, 1625, 1630, 1635) included in its respective macro grid. The two portions of the footprint of the macro grid 1620 depicted in FIG. 6A are connected to each other outside of the geographic area 1600 and thus collectively form a single continuous footprint. Each macro grid is governed by its own artificial intelligence. In one embodiment, the geographic area 1600 is one kilometer across. At least one micro grid apparatus (denoted by its micro grid system stack 1605) is not connected or participant to any of the macro grids.

Figure 6B:
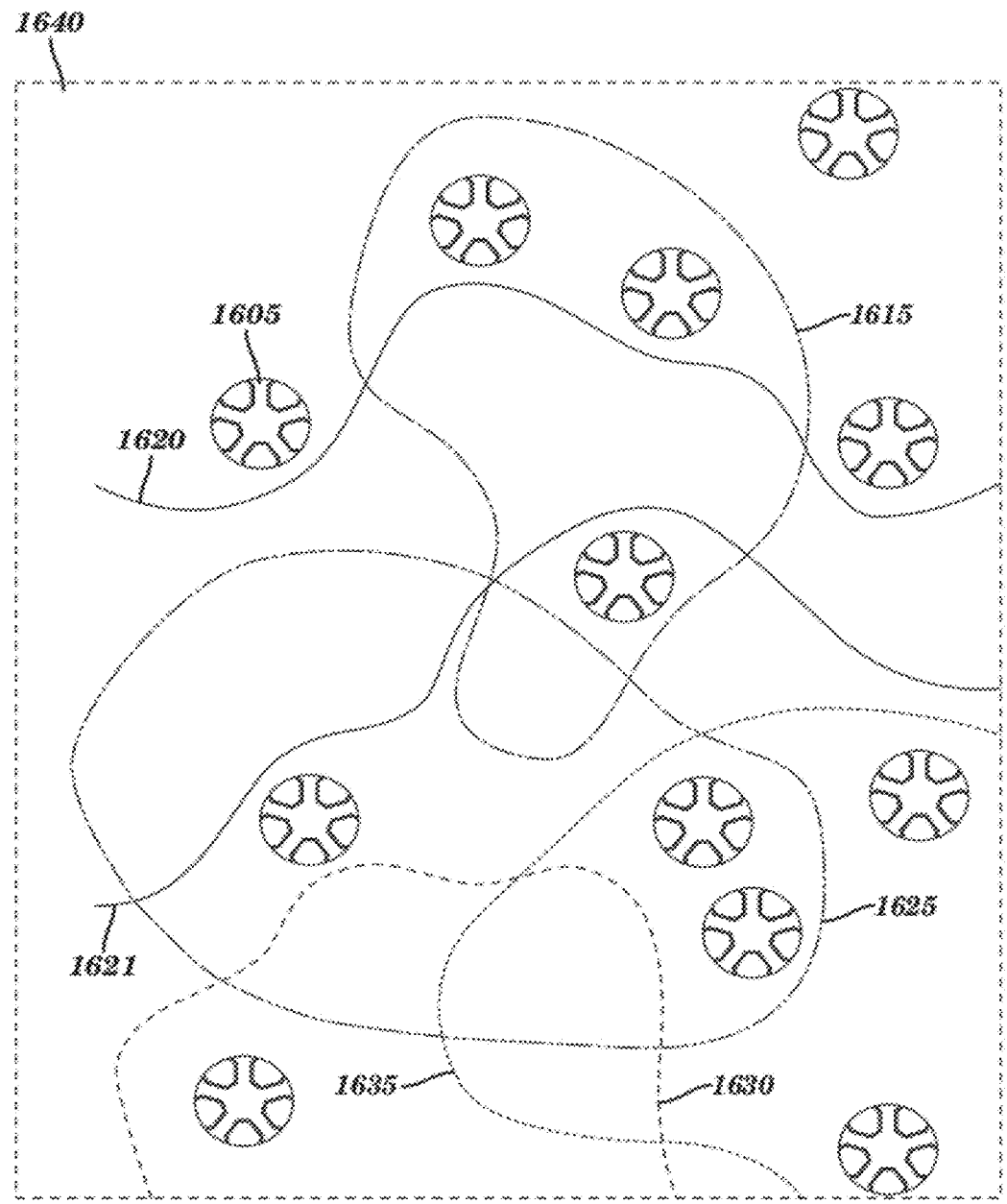
FIG. 6B is a diagram of a geographic area comprising 5 macro grids and 12 micro grid apparatuses and being later in time than the geographic area in FIG. 6A, in accordance with embodiments of the present invention.

FIG. 6B is a diagram of a geographic area 1640 comprising the 5 macro grids of FIG. 6A and 12 micro grid apparatuses, in accordance with embodiments of the present invention. FIG. 6B depicts a distribution of micro grid apparatuses within the 5 macro grids. The 12 micro grid apparatuses in FIG. 6B is a subset of the 27 micro grid apparatuses in FIG. 6A. The geographical area 1640 of FIG. 6B is later in time than is the geographical area 1600 of FIG. 6A and either encompasses or is a subset of the geographical area 1600. Each micro grid apparatus in FIG. 6B comprises its micro grid system stack, as explained supra. Some or all of the 12 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6B is identified by the macro grid processor (1615, 1620, 1625, 1630, 1635) included in its respective macro grid. Each macro grid is governed by its own artificial intelligence. In one embodiment, the geographic area 1640 is one kilometer across. At least one micro grid apparatus (denoted by its micro grid system stack 1605) is not connected or participant to any of the macro grids. One of the macro grid macro grids (1620) has experienced a decaying artificial intelligence and is disappearing due to removal of all of its participating macro grid processors. The geographical footprints of the other macro grids are reducing in size as their alert scale value reduces. The distribution of micro grid apparatuses within the 5 macro grids of FIG. 6B differ from the distribution of micro grid apparatuses within the same 5 macro grids of FIG. 6A due to the dynamic evolution the 5 macro grids from the time associated with FIG. 6A to the time associated with FIG. 6B.

Figure 6C:
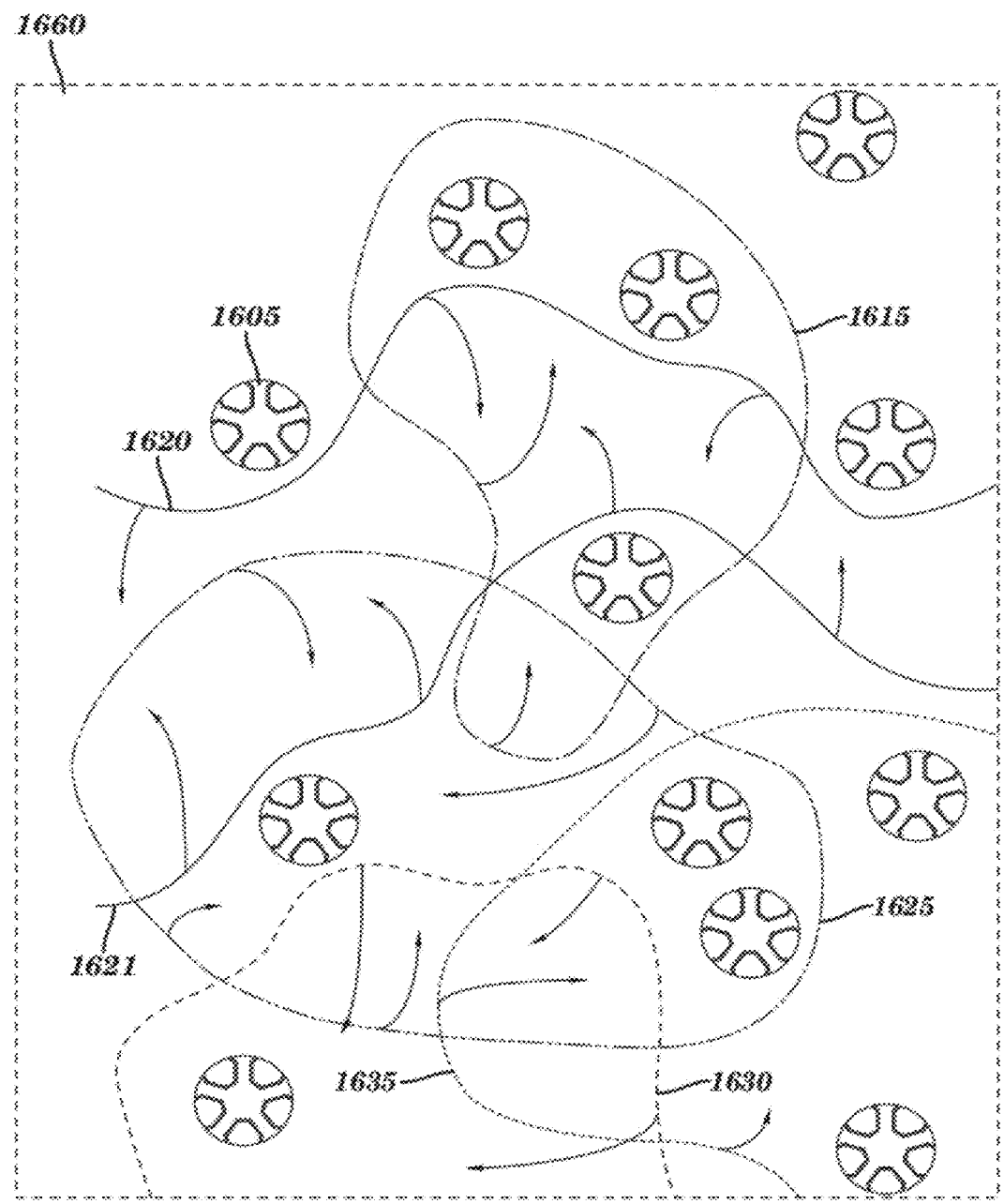
FIG. 6C is a diagram of a geographic area comprising 5 macro grids and 12 micro grid apparatuses and being later in time than the geographic area in FIG. 6B, in accordance with embodiments of the present invention.

FIG. 6C is a diagram of a geographic area 1660 comprising 5 macro grids and 12 micro grid apparatuses, in accordance with embodiments of the present invention. FIG. 6C depicts a distribution of micro grid apparatuses within the 5 macro grids. The 12 micro grid apparatuses in FIG. 6C are the same micro grid apparatuses as the 12 micro grid apparatuses in FIG. 6B. The geographical area 1660 of FIG. 6C is later in time than is the geographical area 1640 of FIG. 6B and either encompasses or is a subset of the geographical area 1640. Each micro grid apparatus in FIG. 6C comprises its micro grid system stack, as explained supra. Some or all of the 12 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6C is identified by the macro grid processor (1615, 1620, 1625, 1630, 1635) included in its respective macro grid. Each macro grid is governed by its own artificial intelligence. In one embodiment, the geographic area 1660 is one kilometer across. At least one micro grid apparatus (denoted by its micro grid system stack 1605) is not connected or participant to any of the macro grids. One of the macro grids (1620) has experienced a decaying artificial intelligence and is disappearing due to removal of all of its participating macro grid processors. The geographical footprints of the other macro grids are reducing in size as their alert scale value reduces. Directional arrows illustrate an instantaneous direction in which portions of each of geographical footprints is dynamically moving, which may represent an expansion or contraction of each macro grid. The distribution of micro grid apparatuses within the 5 macro grids of FIG. 6C have not changed from the distribution of micro grid apparatuses within the same 5 macro grids of FIG. 6C during the period of time from the time associated with FIG. 6B to the time associated with FIG. 6C.

Figure 6D:
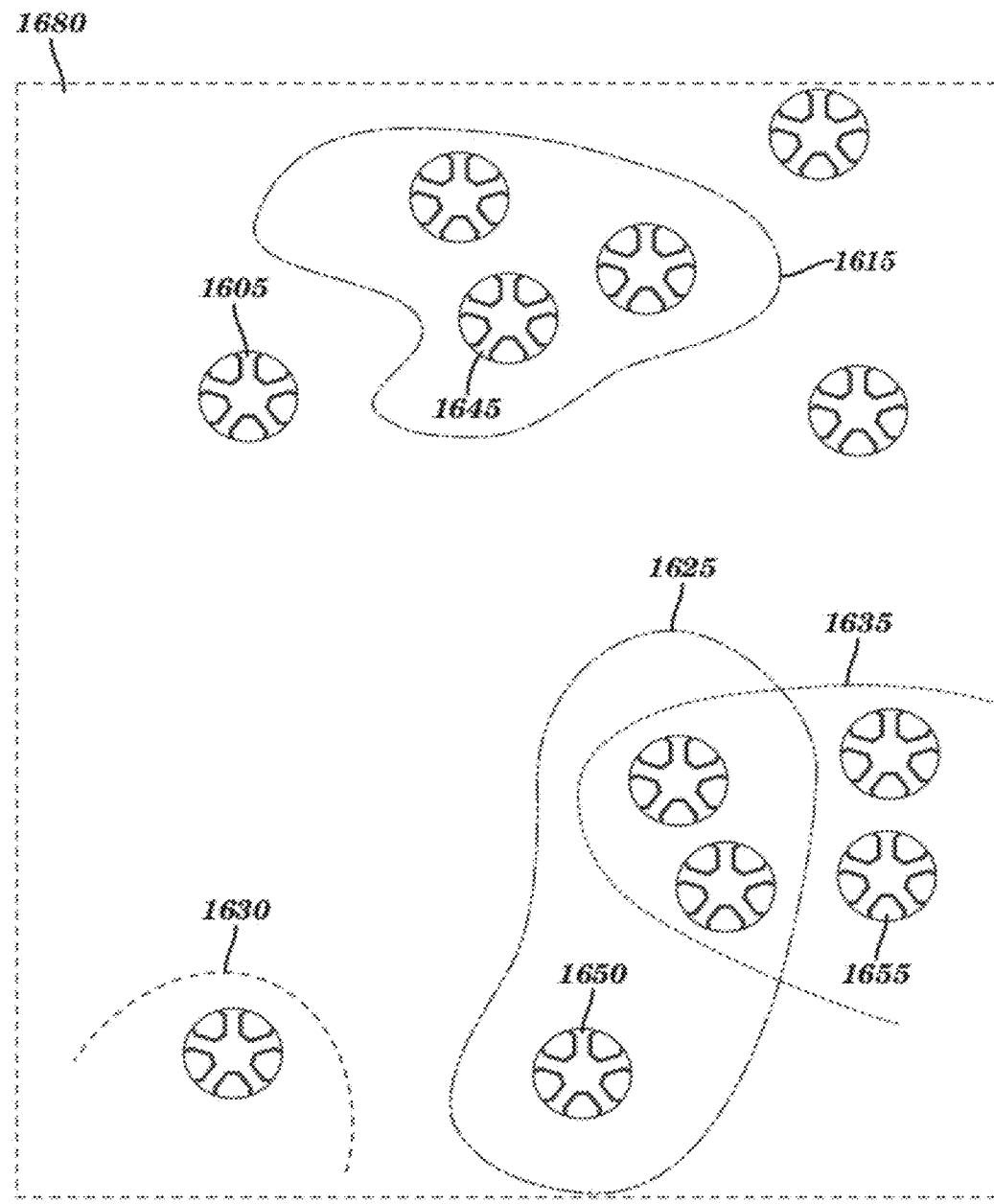
FIG. 6D is a diagram of a geographic area comprising 5 macro grids and 12 micro grid apparatuses and being later in time than the geographic area in FIG. 6C, in accordance with embodiments of the present invention.

FIG. 6D is a diagram of a geographic area 1680 comprising 5 macro grids and 12 micro grid apparatuses, in accordance with embodiments of the present invention. FIG. 6D depicts a distribution of micro grid apparatuses within the 5 macro grids. The geographical area 1680 of FIG. 6D is later in time than is the geographical area 1660 of FIG. 6C and either encompasses or is a subset of the geographical area 1660. The 5 macro grids in the geographic area 1680 in FIG. 6D are associated with a subset of the 12 micro grid apparatuses and consist of the 5 macro grids of FIG. 6C. Each micro grid apparatus in FIG. 6D comprises its micro grid system stack, as explained supra. Some or all of the 12 micro grid system stacks are wirelessly connected to each other. Each micro grid system stack contains combinations of macro grid processors, which are illustrated by the shape and boundaries of the geographical footprint of the macro grids respectively. Some such combinations of macro grid processors may differ from each other. Each geographical footprint in FIG. 6D is identified by the macro grid processor (1615, 1625, 1630, 1635) included in its respective macro grid. Each macro grid is governed by its own artificial intelligence. In one embodiment, the geographic area 1680 is one kilometer across. At least one micro grid apparatus (denoted by its micro grid system stack 1605) is not connected or participant to any of the macro grids. One of the macro grids (1620) has experienced a decaying artificial intelligence and is disappearing due to removal of all of its participating macro grid processors. At the time associated with FIG. 6D, the macro grid 1620 includes micro grid apparatuses only outside of geographical area 1680 and is therefore not explicitly identified in FIG. 6D. The geographical footprints of the other macro grids are reducing in size as their alert scale value reduces. Only 4 macro grids of the 5 macro grids in FIG. 6C remain in FIG. 6D and have been reduced in size and continue to be reduced in size as their alert scale values are being reduced, namely the 4 macro grids identified by the respective macro grid processors 1615, 1625, 1630, 1635. Three micro grid apparatuses (1645, 1650, 1655) are mobile (e.g., in vehicles) that do not appear in FIG. 3C, and their GPS systems indicate a change in 'location value' that is recognized by their governing artificial intelligences to maintain their wireless connections and macro grid participation. Similar to FIG. 6B, the distribution of micro grid apparatuses within the 5 macro grids of FIG. 6D differ from the distribution of micro grid apparatuses within the same 5 macro grids of FIG. 6A and include new micro grid apparatuses (e.g., 1645, 1650, 1655) due to the dynamic evolution and spatial migration of the 5 macro grids from the time associated with FIG. 6C to the time associated with FIG. 6D.

The expansion and contraction of artificial intelligence footprints is generally dynamic and changing.

Each macro grid in FIG. 5D, FIG. 6A, FIG. 6B, FIG. 6C, FIG. 6D, and/or any other macro grid described herein, is formed by the process depicted in FIG. 4C, FIG. 4D, FIG. E, or combinations thereof.

Figure 7A:
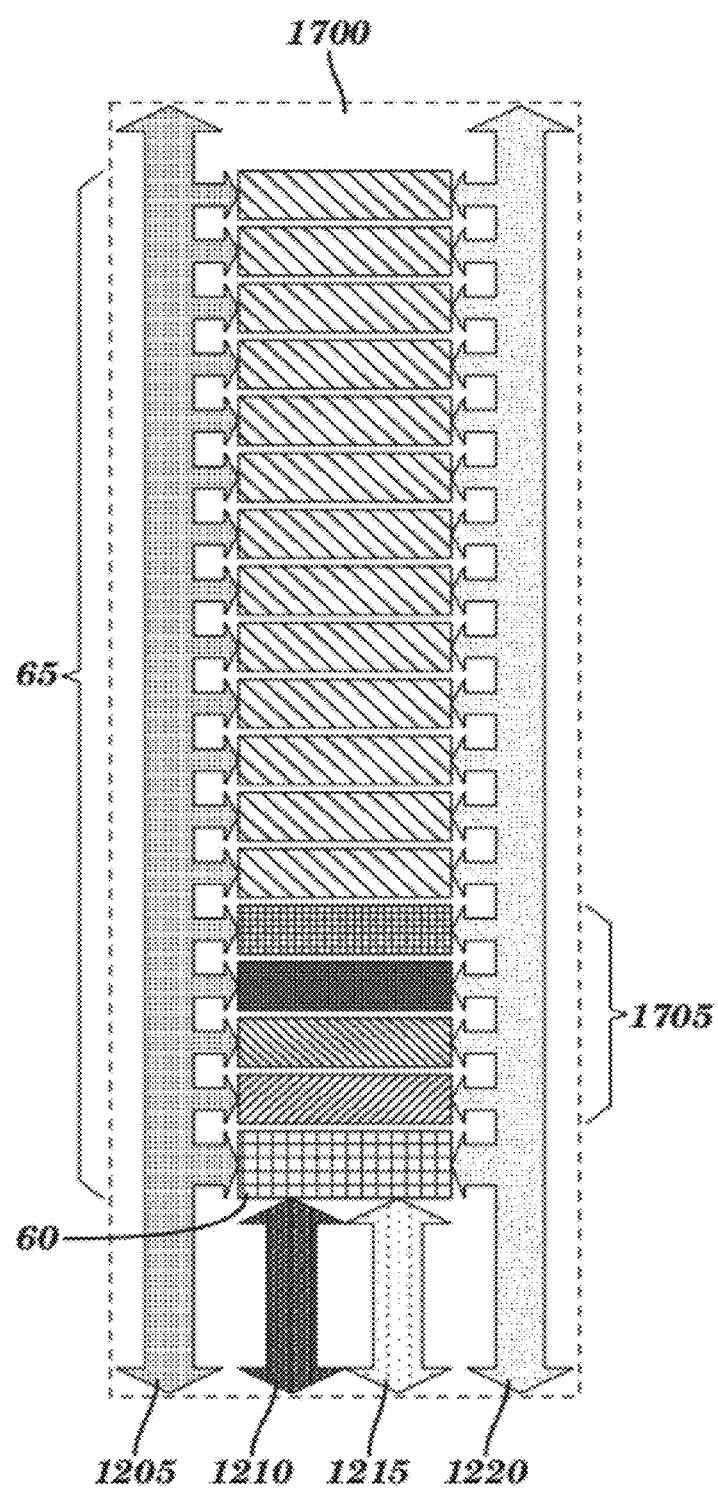
FIG. 7A depicts a micro grid system stack of 18 processors, in accordance with embodiments of the present invention.

FIG. 7A depicts a micro grid system stack 1700 of 18 processors, in accordance with embodiments of the present invention. The micro grid system stack 1700 comprises a unique micro grid processor 60, four designated macro grid processors (1705) of four corresponding macro grids, and 13 micro grid processors 65 (as additional processing resources, some or all of which may be allocated to the four designated macro grid processors (1705)). The four corresponding macro grids exist contemporaneously and have four corresponding artificial intelligences co-existing in the same micro grid apparatus (i.e., the same micro grid system stack 1700). Also shown are the buses (micro grid system bus 1205, standard system buses 1210 and 1215, macro grid system bus 1220) for data transfer and software connections. The unique micro grid processor 60 maintains an orderly macro stack of macro grid processors by selecting the next available micro grid processor in the linear micro grid stack for operating system change to a macro grid processor. A process of 'stack house keeping' by the unique processor 60 ensures stack efficiency and micro grid processor availability for assignment of micro grid processing resources 65 to alert requests.

Figure 7B:
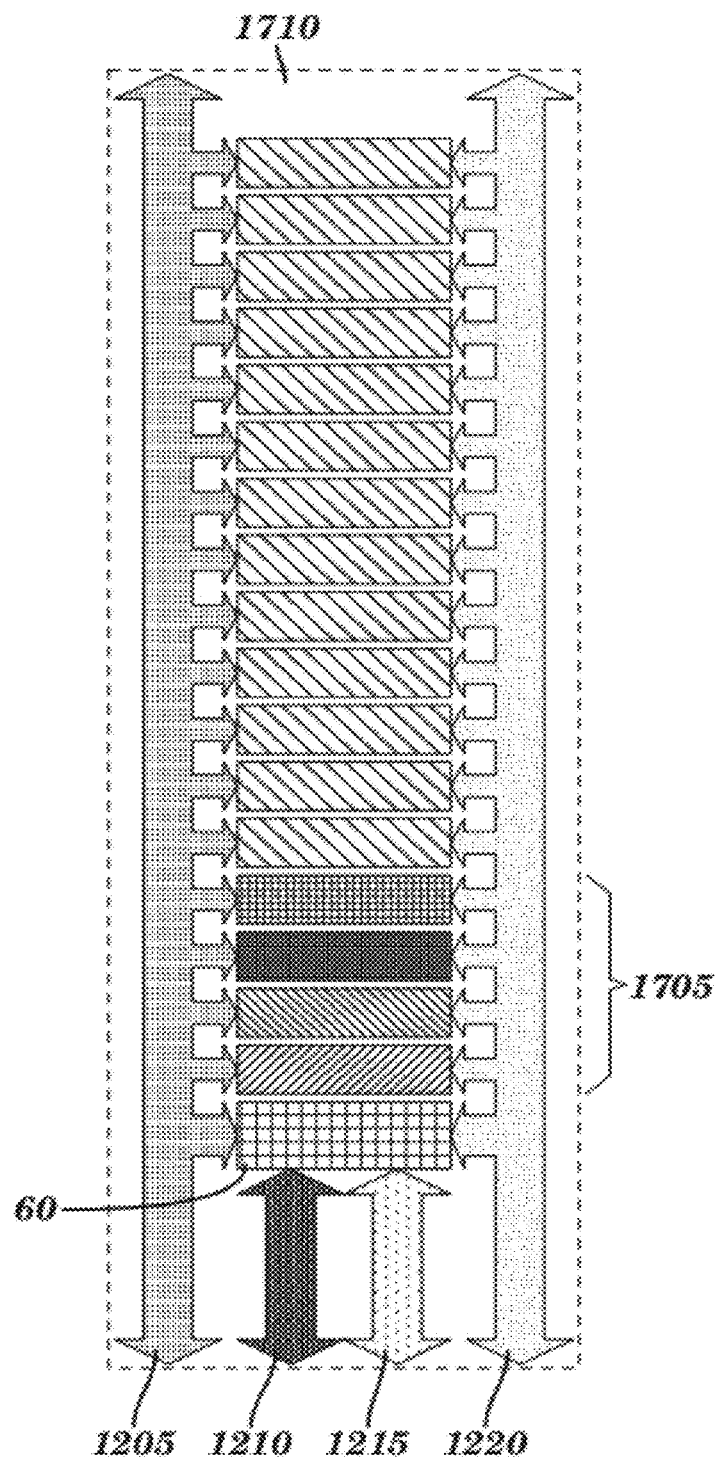
FIG. 7B is a diagram showing a micro grid system stack of 18 processors, displaying an extension capability of buses, in accordance with embodiments of the present invention.

FIG. 7B is a diagram showing a micro grid system stack 1710 of 18 processors, displaying the extension capability of the buses, in accordance with embodiments of the present invention. The micro grid system stack 1710 comprises a unique micro grid processor 60, four designated macro grid processors (1705) of four corresponding macro grids, and 13 micro grid processors 65 (as additional processing resources, some or all of which may be allocated to the four designated macro grid processors (1705)). The four corresponding macro grids exist contemporaneously and have four corresponding artificial intelligences co-existing in the same micro grid apparatus (i.e., the same micro grid system stack 1700). Also shown are the buses (micro grid system bus 1205, standard system buses 1210 and 1215, macro grid system bus 1220) for data transfer and software connections. The unique micro grid processor 60 is embodied at the base (in position zero) of the micro grid system stack 1710. The micro grid system bus 1205 and macro grid system bus 1220 can be extended to provide their bus functionality from 9 to 18 or more micro grid processors with their own individual operating systems. The combined standard system buses 1210 and 1215, micro grid system bus 1205 and macro grid system bus 1220 can be extended to a plurality of other micro grid processor stacks by an irregular shaped module or 'bridge', physically connecting other micro grid apparatuses together.

Figure 7C:
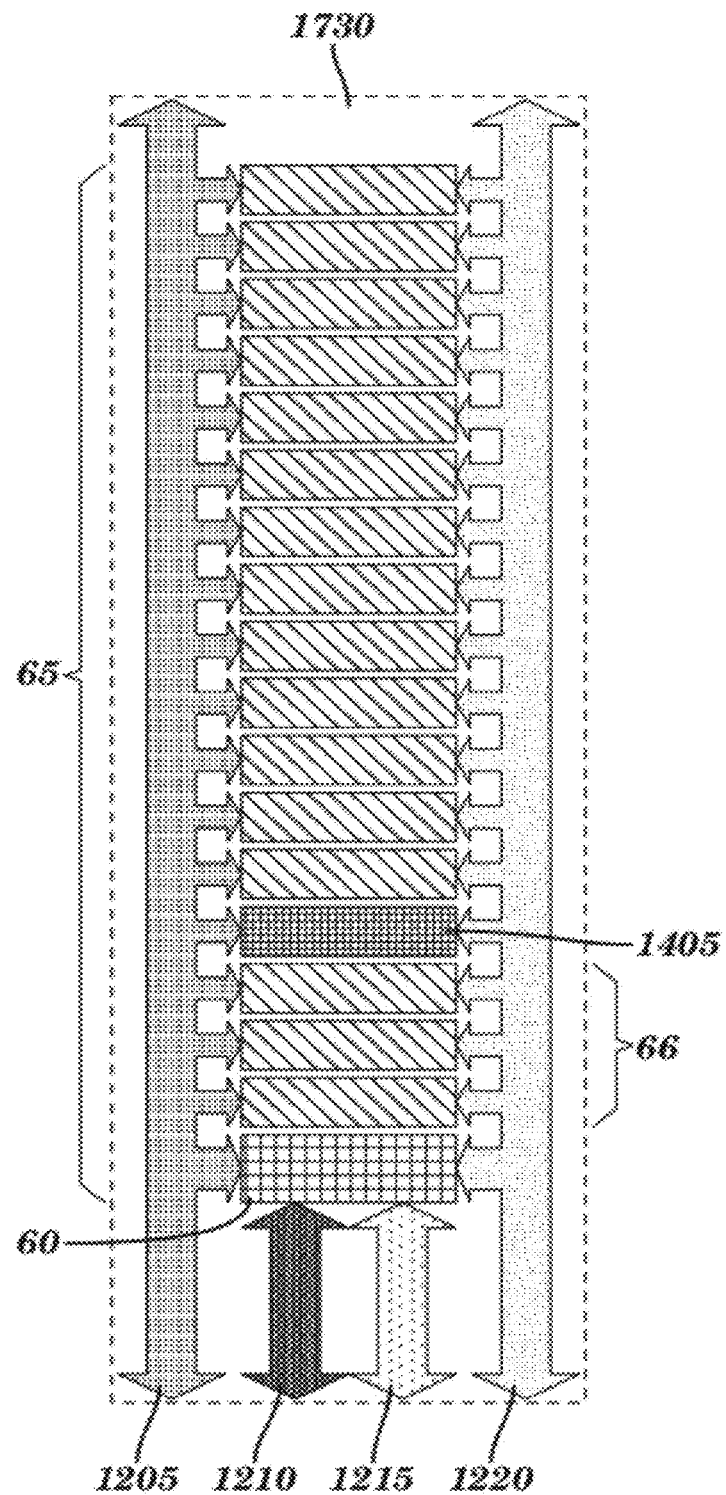
FIG. 7C is a diagram showing a micro grid system stack of 18 processors, displaying operating system change and re-assignment as artificial intelligence requirements of an apparatus are extinguished within a single apparatus, in accordance with embodiments of the present invention.

FIG. 7C is a diagram showing a micro grid system stack 1730 of 18 processors, displaying operating system change and re-assignment as artificial intelligence requirements of the apparatus are extinguished within a single apparatus, in accordance with embodiments of the present invention. The micro grid system stack 1730 comprises a unique micro grid processor 60, a designated macro grid processor 1405 of a corresponding macro grid, 3 micro grid processors 66, and 13 micro grid processors 65. Also shown are the buses (micro grid system bus 1205, standard system buses 1210 and 1215, macro grid system bus 1220) for data transfer and software connections. The unique processor 60 constantly monitors alert data interrogated from its attached local and remote sensors, as well as the alert data issued by the macro grid artificial intelligence it is participating in. The unique processor 60 constantly receives alert values of scale from a plurality of sources. The alert value of scale for the macro grid processor 1405 indicates it is still required to participate in providing processing resources for the artificial intelligence within that macro grid. However, the 3 macro grid processors 66 have been returned to micro grid operating systems as their artificial intelligences have been extinguished. The next step is for the unique processor 60 in the micro grid system stack to apply further 'housekeeping' and relocate the operating system of the macro grid processor 1405 at stack position four to stack position one. The three freshly re-assigned micro grid processors 66 are then coalesced with the other 13 micro grid processors 65 by the unique processor 60's instruction, resulting in a linear and uninterrupted stack of 16 micro grid processors (not shown), ready for the next alert.

The scale (S) of an alert is computed by the artificial intelligence from interrogation of alert data either detected directly via the unique processor 60 within the structure 500 (see FIG. 4B) from the connected local sensors and/or remote sensors via the micro grid's I/O module 410 and communications module 425 (see FIG. 4B), or received (see step 1455 of FIG. 4D) from an external micro grid apparatus or a macro grid that is wirelessly connected to the micro grid apparatus 100.

Adjacent wirelessly connectable physical apparatuses respond to the received (1450 to 1470) alert and join the macro grid along with processing resources as required by the artificial intelligence. The communicational data may be in the TCP/IP packet format.

The scale (S) of an alert is computed and used by the artificial intelligence to constantly indicate an alert value to all participating wirelessly connected micro grid unique processors (60) responsible for assigning macro grid processors and managing micro grid processors and resources. The scale (S) indicates, to the unique processor 60, a requirement to conscript more micro grid processors for the artificial intelligence, maintain the status quo, or reduce resource participation, which facilitates scalability of the dynamic functional use of the micro grid systems.

The artificial intelligence processes the data to counter the event with physical action and activity against the cause of the alert. This is undertaken by instruction to the available intelligent actuators (not shown) controlled by the unique operating system of the unique processor 60 in each micro grid apparatus. Alert interrogation provides the necessary feedback to the artificial intelligence to assess the effectiveness of the counter, which is then adjusted accordingly. This counter action and feedback mechanism may occur within a short period (e.g., milliseconds).

There are many examples for using the present invention, wherein micro grid and macro grid alert processing can be provided for artificial intelligence to take pro-active control of situations, initiated by the raising of alarms and alerts. Micro grid and macro grid technology could be deployed everywhere, resolving issues, counteracting events, and controlling remote circumstances that would otherwise require centralized decision making by people, who are not always available 24×7×365.

The following three hypothetical examples illustrate use of the present invention.

1. A huge forest fire erupts overnight in the hills behind Los Angeles (LA). The wind direction and fire intensity indicates an event to some outer LA suburbs within 48 hours. 427 fire trucks and 3 sky-crane helicopters have been dispatched by the greater LA Fire Authority into the area. Micro grids are embedded in all vehicles, and monitor heat, wind, smoke, and location information from their intelligent sensors. A smoke alert is raised by one of the micro grids. Quickly a macro grid is formed between all vehicles and the artificial intelligence takes control of the dangerous event. Each vehicle has interactive voice and video. The artificial intelligence interfaces with these communication devices and issues task assignments to the LA Fire Authority Units. The artificial intelligence provides a constant stream of updated information to central control, police, ambulance, and news media. The forest fire is surrounded by fire fighting efficiency and resource co-ordination. Within 36 hour, the potential disaster is arrested and suffocated. The wireless macro grid decays and separates back to individual micro grid processing. The mayor thanks the LA Fire Authority for another job well done.

2. It is year 2017 and the recently arrived NASA roving vehicles on Titan have been transmitting astounding images and data to Earth central control. A micro meteorite impacts 200 meters from one of the rovers, creating a sudden geological landscape change, unseen by earth controllers that may prove destructive for the $4 billion mission. Large freshly formed terrain fractures are detected by micro grid sensors on the rovers. A macro grid is quickly formed, and the generated artificial intelligence overrides current forward movement instructions and stops the affected rover immediately. This averts a potential rover loss, as communication with earth control is over 16 minutes (turnaround). The artificial intelligence re-evaluates the terrain and provides Earth controllers with Titan ground distance images and new atmospheric temperature, dust, gas and pressure data from the direction of the meteorite impact. The artificial intelligence decays and the individual micro grid unique processor in the command vehicle waits revised mission instructions.

3. It is 6.30 AM on a winter day in year 2012, and 400,000 vehicles are on the M1 motorway in England due to people traveling to work. Micro grid computing has been embedded in vehicles since year 2009 and approximately 15% of the vehicles have the technology. A thick fog rolls in over a 12 mile portion of the M1 motorway. Micro-grid sensors within the vehicles react to the arrival of the thick fog and indicate the density and GPS location to the other collaborating macro grid connected vehicles. Quickly, a fog pattern alert is generated by the artificial intelligence and conveyed to British motorway authorities including weather forecasters, television stations, and radio stations. The collaborating processors in the macro grid dispatch and share an unsolicited alert image on their dashboard LCD screens indicating topographic size and density of the fog. Safely, the vehicles slow down influencing other non-macro-grid vehicle drivers to do the same. Image processing, sensor sampling, and information up-dates are maintained by the artificial intelligence until all vehicles have passed through the fog, and the fog itself lifts for another fine day.

B. Governance

Governance relates to the structure and function of a macro grid configured to respond to an alert and may comprise, inter alia, processor stack control, operating system software, house keeping within stacks, control growth, decay, and operation of the unique processors of the macro grid, communication between or among the unique processors of the macro grid, etc.

The present invention utilizes the following governance structures that may exist in a macro grid: Council, Executive, Parliament, and Government, in conjunction with a simple micro grid apparatus and/or a complex micro grid apparatus (also called a "connectivity structure").

A simple micro grid apparatus is defined as a micro grid apparatus that comprises one and only one plurality of processors, said one and only one plurality of processors including one and only one unique processor having a unique operating system that differs from the operating system of each other processor in the plurality of processors of the simple micro grid apparatus.

A complex micro grid apparatus (or connectivity structure) is defined as a micro grid apparatus that comprises at least two pluralities of processors, wherein the at least two plurality of processors are physically connected within the complex micro grid apparatus such that each plurality of processors includes one and only one unique processor having a unique operating system that differs from the operating system of each other processor in each plurality of processors of the complex micro grid apparatus.

A Council is defined as a unique processor in a macro grid such that the unique processor is comprised by a plurality of processors and is wirelessly connected to at least one other unique processor in the macro grid, wherein each unique processor in the macro grid has a unique operating system that differs from the operating system of each other unique processor in the plurality of processors of a micro grid apparatus.

An Executive within a macro grid is defined as a Council in a simple micro grid apparatus (e.g., a mobile micro grid apparatus), wherein the Council is wirelessly connected to at least one other unique processor in the macro grid that is external to the simple micro grid apparatus and is not physically connected to any other unique processor of the macro grid. Each Executive in a macro grid is a Council consisting of a unique processor in a different plurality of processors of at least one plurality of processors. For example, the unique processor 60 within the simple micro grid apparatus 100 of FIG. 1, if comprised by a macro grid, is an Executive in the macro grid, if the unique processor 60 in FIG. 1 is wirelessly connected to at least one other unique processor in the macro grid. It is noted that the unique processor 60 in FIG. 1 is not physically connected to any other unique processor of the macro grid.

A Parliament within a macro grid is defined as a plurality of unique processors (Councils) within a connective structure in which the unique processors of the plurality of unique processors are physically connected within the connective structure, wherein the unique processors of the plurality of unique processors in the Parliament are each wirelessly connected to at least one other unique processor of the macro grid that is external to the connective structure. Each unique processor of the plurality of unique processors in the Parliament is comprised by a plurality of processors within the connective structure.

A Government within a macro grid is defined as a plurality of governmental components such that each governmental component is either an Executive or a Parliament. Each such governmental component within a Government can communicate with at least one other governmental component within the Government. Such communication is effectuated via any Council or a designated resource processor in each governmental component. The present invention provides a structure and mechanism for the unique processors of the governmental components within a Government to communicate effectively with each other.

Thus, a Government, a Parliament, an Executive, and a Council are each a governance structure. A Government comprises a plurality of Executives, a plurality of Parliaments, or at least one Executive and at least one Parliament. An Executive, which comprises a Council, is a governmental component of a Government. A Parliament, which comprises a plurality of Councils, is another governmental component of a Government. A Council is the smallest indivisible governance structure within a Government.

As discussed supra, a unique processor of a macro grid is comprised by a plurality of processors in a micro grid apparatus.

A plurality of Governments can contemporaneously exist at any time within a corresponding plurality of macro grids or within a single macro grid.

A Government may created initially for (and on demand by) an artificial intelligence for the macro grid. Alternatively, a Government or a governance substructure within a Government may create or activate an artificial intelligence for the macro grid.

Two Governments, one government having a relatively lower artificial intelligence and the other government having a relatively higher artificial intelligence, can merge such that the relatively lower artificial intelligence transfers the alert responsibility and ownership to the relatively higher artificial intelligence in accordance with specified rules. An example of such a rule for transferring the alert responsibility may be: upon recognition by two artificial intelligences that they have been generated for the same alert originally responded to by their respective unique processors in different geographical locations and within different micro grid structures or apparatuses, the Government of unique processors then enables access to the multiple alert sensors (and response actuators) of the relatively higher artificial intelligence. Relatively lower and higher artificial intelligence is determined or measured by specified intelligence level rules for artificial intelligences.

A Government can split into a plurality of smaller Governments in accordance with specified rules, (e.g., the footprint of a mobile relatively higher artificial intelligence owning multiple alerts becomes stretched to a 'snap' point and becomes wirelessly 'out of range' forming multiple new smaller footprints). Each resultant artificial intelligence may not necessarily have the same number of alerts to remedy and may re-merge into a single Government (with a single artificial intelligence) again if the wireless connection is re-established.

A Government exists and may expand/or decay for the life of a wirelessly transient artificial Intelligence of its associated macro grid. A Government can decay into Parliaments, and/or Councils as its associated macro grid decays with the connectivity structure remaining intact.

A Parliament can be transformed into Executives and smaller Parliaments by physical fragmentation of the connectivity structure in which the Parliament is contained.

A Parliament exists for the life of the assembled bridge structure within the macro grid until decayed from the macro grid.

The following working flow relates to the use of governance structures by the present invention.

An alert is sensed by a unique processor (60) in a micro grid stack. A macro grid is initiated and an associated artificial intelligence is generated as a reaction to the alert. In one embodiment, the unique processor (60) in the micro grid stack is an Executive. The unique processor (60) in the micro grid stack assigns the artificial intelligence ownership of the alert and converts a micro grid processor in its stack into a macro grid processor (by alteration and addition of operating system software) in which the artificial intelligence can initially reside. The artificial intelligence may, depending on the size of the alert, authoritatively negotiate with a unique processor of a simple or complex micro grid apparatus for more processor resources. If the micro grid apparatus is within a complex micro grid apparatus (i.e., a connectivity structure such as, inter alia, a bridge structure), unique processors within the complex micro grid apparatus amalgamate to form a Parliament of unique processors. In this instance, the artificial intelligence negotiates with the Parliament for additional macro grid processors within the complex micro grid structure. Otherwise, the micro grid apparatus is within a simple micro grid apparatus comprising an Executive and the artificial intelligence negotiates with just the Executive present within the simple micro grid apparatus. The artificial intelligence may not achieve all the processor resources it requires from the Executive or Parliament, and may instruct the Executive or Parliament to locate any adjacent wireless micro grids, and amalgamate them into a Government of wirelessly connected unique micro grid processors (which includes the Executive or Parliament that the artificial intelligence is already negotiating with). The unique processor (60) in the micro grid stack that initiated formation of the macro grid is a Council that either is an Executive in the Government or is within a Parliament in the Government. This process of accumulating wirelessly connected Executives and Parliaments continues, as the artificial intelligence seeks the necessary macro grid processors to undertake its remedy of the alert. The footprint of the Government that the artificial intelligence operates in may grow to an enormous scale in size, or remain localized. The footprint of the Government may expand and contract on demand of the artificial intelligence. As an artificial intelligence decays it relinquishes individual Executives and Parliaments that were wirelessly connected, which may also occur as attrition through mobility, until the artificial intelligence is extinguished and its last macro grid processor is returned by the Council back to the micro grid stack as a micro grid processor. If no other macro grid processors are assigned in the simple micro grid apparatus, the Council reverts to a simple unique processor (60), attentively monitoring its I/O, GPS and communication module sensors, and waiting for another alert to occur.

Figure 8A:
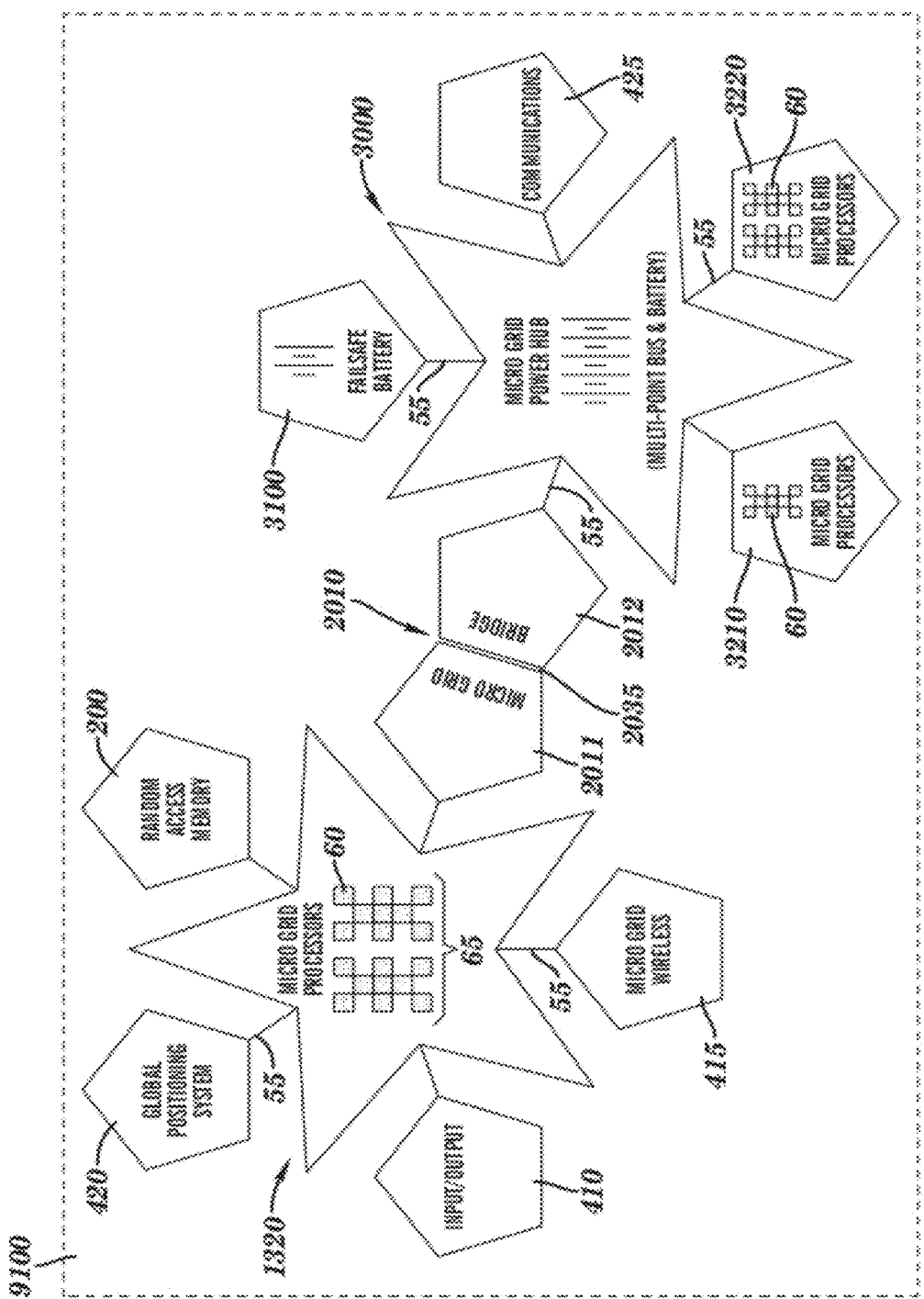
FIG. 8A is a block diagram depicting a connectivity structure with a bridge module physically connecting a micro grid apparatus to a power hub, in accordance with embodiments of the present invention.

FIG. 8A is a block diagram depicting a connectivity structure 9100 with a bridge module 2010 physically connecting a micro grid structure 1320 to a power hub 3000, in accordance with embodiments of the present invention. The bridge module 2010 comprises bridge units 2011 and 2012 connected together by a bridge hinge 2035. The bridge hinge 2035 provides the bridge module 2010 with sufficient physical flexibility to enable the bridge units 2011 and 2012 to dock and be ensconced into respective docking bays of the micro grid structure 1320 and the power hub 3000. Generally, the micro grid apparatus 1320 and the power hub 3000 are embodiments of a first micro grid system and a second micro grid system, respectively.

The micro grid structure 1320 comprises the group of micro grid processors 65 which include a unique processor (Council) 60. The micro grid structure 1320 accommodates, via connection interface 55, the irregular shaped modules 420 (GPS), 200 (RAM), 410 (I/O), 415 (wireless connection), and the bridge unit 2011 of the bridge module 2010.

The power hub 3000 comprises a plurality of rechargeable batteries and accommodates, via connection interface 55, the irregular shaped modules 3100 (failsafe battery), 425 (communications), 3210 (micro grid processors that include a unique processor (Council) 60), 3220 (micro grid processors that include a unique processor (Council) 60), and the bridge unit 2012 of the bridge module 2010. The plurality of rechargeable batteries in the power hub 3000 provides electrical power for the micro grid processors in the irregular shaped modules (e.g., modules 3210 and 3220). The failsafe battery in the module 3100 provides back up power for the rechargeable batteries in the power hub 3000 (if the rechargeable batteries should become discharged or otherwise fail) or additional power to supplement the power provided by the rechargeable batteries in the power hub 3000. Failsafe battery modules may be connected in any plurality via connection interfaces (55), across all complex micro grid structures and apparatuses, including micro grid power hubs and micro grid power towers, where a plurality of connection interfaces (55) are presented.

The Councils 60 in the connectivity structure 9100 collectively form a Parliament within a macro grid. The Parliament comprises the unique processor 60 in the micro grid structure 1320, the unique processor 60 of the micro grid processors 3210, and unique processor 60 of the micro grid processors 3220.

The connectivity structure 9100 is more specifically a bridge structure. A bridge structure comprises a plurality of micro grid systems linked together by one or more bridge modules. Each bridge module of a bridge structure physically links together two micro grid systems of the plurality of micro grid systems. Each of micro grid system of the plurality of systems comprises at least one micro grid apparatus having a plurality of processors 65 that includes a unique processor 60. Thus, a bridge structure comprises a plurality of unique processors 60 disposed within the plurality of micro grid systems which are coupled together by the bridge module(s) in the bridge structure.

A Parliament comprises physically connected Councils, each Council with jurisdiction over its own plurality of (wafer contained) processors. The Parliament comprises software (residing in one or more Councils of the Parliament) that queries the Councils for processor resource availability and assignment, and interfaces wirelessly to potential requests for participation in a Government. The Parliament facilitates its internal and external data communications with utilization of the enhanced TCP/IP model structure, and packet structure, and provides full peer-to-peer facilitation (including governance and artificial intelligence) within its interconnected structure.

Macro grid modularity allows for removal and addition of Councils, Executives, and Parliaments. Physical connection or removal of Councils from or to a Parliament is provided for by governance operating system software that detects the Council alterations and reconfigures the Parliament appropriately to reflect the change.

Known existing (and future designed) application software, operational system software, communications software, and other software including drivers, interpreters and compilers for micro processor systems may function within the embodiments of the present invention.

The Global Positioning System (GPS) module (420) provides the telemetry and handover data for inclusion in the enhanced TCP/IP data packets originating from any processor in the Parliament. GPS data may be static for non-mobile micro grid Councils or Parliaments, or dynamic for mobile micro grid Executives or Parliaments.

Figure 8B:
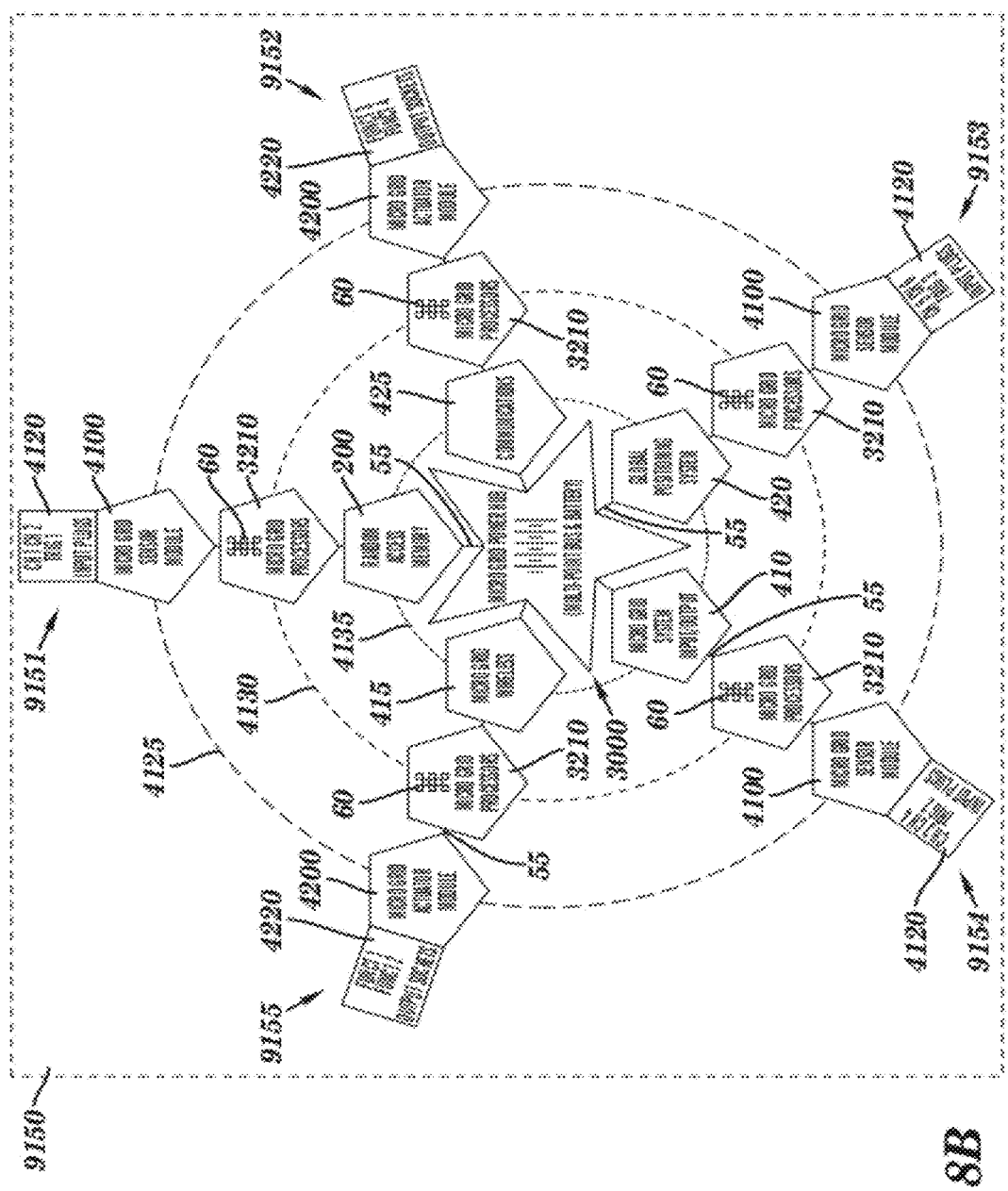
FIG. 8B is a block diagram depicting a connectivity structure in the form of a complex power hub apparatus comprising a central power hub and radial vertical tiers, in accordance with embodiments of the present invention.
Figure 8C:
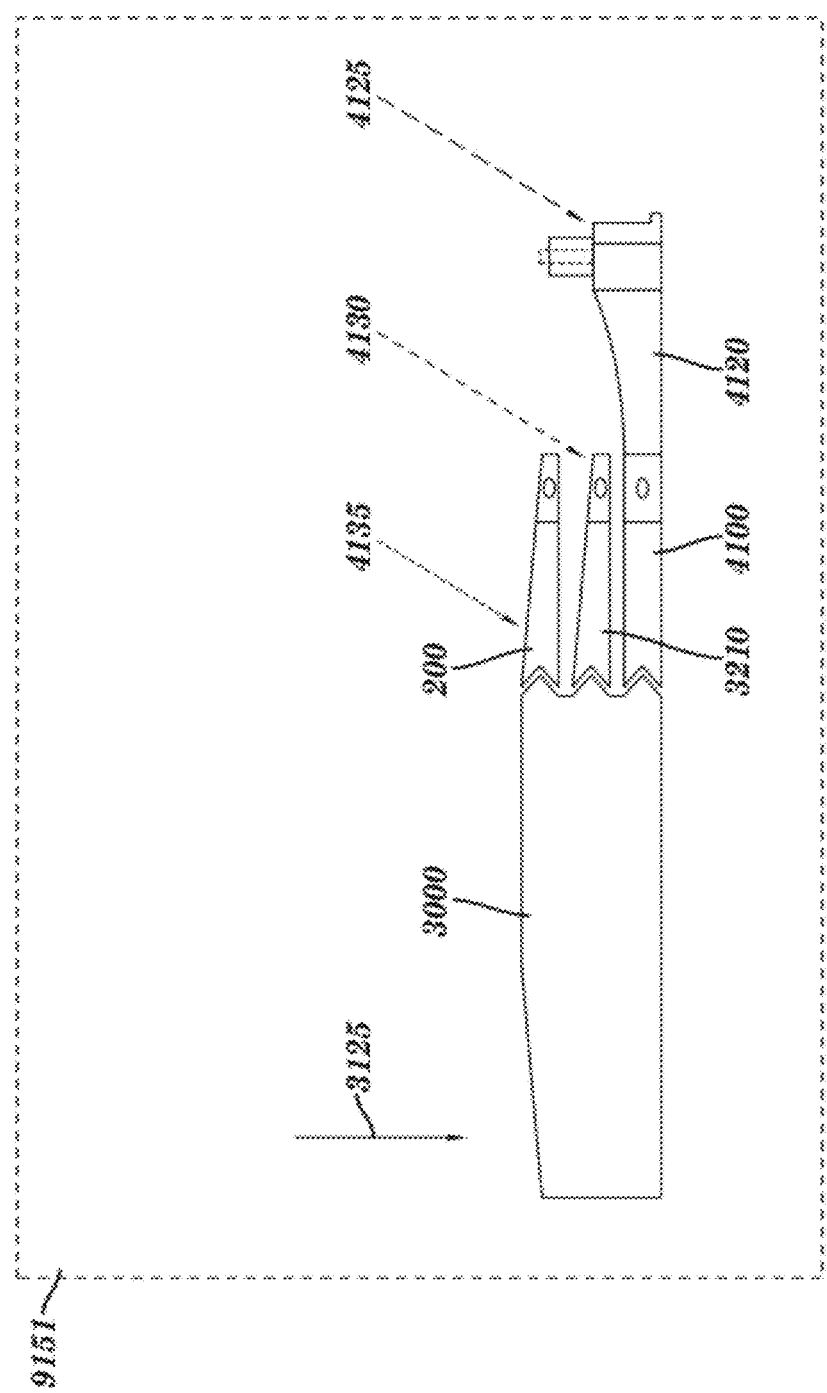
FIG. 8C depicts a radial vertical tier of FIG. 8B, in accordance with embodiments of the present invention

FIG. 8B is a block diagram depicting a connectivity structure in the form of a complex power hub apparatus 9150 comprising a central power hub 3000 and radial vertical tiers (9151-9155), in accordance with embodiments of the present invention. Each radial vertical tier comprises three physically irregular shaped modules, Each irregular shaped module is connected to the power hub 3000 as illustrated in FIG. 8C, described infra.

Generally, a complex power hub apparatus comprises a central power hub, a plurality of connection interfaces (55) and radial vertical tiers (9151, 9152, 9153, 9154, 9155). Each radial vertical tier provides a plurality of physical connections to the central power hub 3000 and comprises irregular shaped modules interconnected with each other via connection interfaces 55. The central power hub 3000 comprises a central area and radial arms external to and integral with the central area to define docking bays such that each radial vertical tier is physically connected to the central power hub 3000 at a respective docking bay at the central area. The central power hub 3000 is analogous to the micro grid apparatus 100 of FIG. 2A with respect to the central area 115, radial arms 110, and docking bay 450 in FIG. 2A. Each radial vertical tier (9151, 9152, 9153, 9154, 9155) in FIG. 8B comprises a plurality of modules consisting of a same number of modules in each radial vertical tier.

The complex power hub apparatus (9150) shown in FIG. 8B is a vertically tall structure comprising three connectivity horizontal layers, illustrated by circles (4125, 4130, 4135), wherein each circle embodies five irregular shaped modules distributed in the five respective radial vertical tiers (9151, 9152, 9153, 9154, 9155). A total of fifteen connection interfaces (55) are presented on this complex power hub structure, for embodying the fifteen irregular shaped modules illustrated.

A complex power hub apparatus is not limited to three horizontal layers and generally comprises a plurality of horizontal layers that could be illustrated as a plurality of circles. Thus, the modules in the radial vertical tiers are collectively distributed on the circles of the plurality of circles. The circles are concentric with a center point (e.g., geometric center, centroid, etc.) in the central power hub such that a total number of circles in the plurality of circles is equal to the same number of modules in each radial vertical tier. Corresponding modules in respective radial vertical tiers are located on a same circle of the plurality of circles.

A complex power hub apparatus may be manufactured in a plurality of configurations, including very tall 'power tower' structures for forming micro grid mainframe apparatuses, with a plurality of horizontal layers, and radial vertical tiers.

Circle 4125 comprises: three micro grid sensor modules 4100 with input plugs 4120 physically connected to the micro grid sensor module 4100, two micro grid actuator modules 4200 with output sockets 4220 physically connected to the micro grid actuator module 4200 to cause generation of output or activate responsive functionality in response to the event that the macro grid is responding to, and each physically connected to the power hub 3000 at the first horizontal layer (illustrated as circle 4125) of available docking bays. Thus, the three micro grid sensor modules 4100 and the two micro grid actuator modules 4200 are corresponding modules in respective radial vertical tiers 9151-9155 such that the corresponding modules are located on the same horizontal layer of a plurality of horizontal layers.

Circle 4130 comprises: five micro grid processor modules 3210 (each micro grid processor module having a unique processor (Council) 60), and each micro grid processor module physically connected to the power hub 3000 at the second horizontal layer (illustrated as circle 4130) of available docking bays. Thus, the five micro grid processor modules 3210 are corresponding modules in respective radial vertical tiers 9151-9155 such that the corresponding modules are located on the same horizontal layer of a plurality of horizontal layers.

Circle 4135 comprises: a RAM module 200, a communications module 425, a GPS module 420, an I/O module 410, and a wireless module 415, each physically connected to the power hub 3000 at the third horizontal layer (illustrated as circle 4135) of available docking bays. Thus, the RAM module 200, the communications module 425, the GPS module 420, the I/O module 410, and the wireless module 415 are corresponding modules in respective radial vertical tiers 9151-9155 such that the corresponding modules are located on the same horizontal layer of a plurality of horizontal layers.

The three connected micro grid sensor modules 4100 each utilize its input plugs 4120 to detect input such as an alert or a communication from another processor either external to (i.e., wirelessly connected to) or within the connectivity structure 9150. Such communication is described infra in terms of an enhanced TCP/IP model structure.

The three connected sensor micro grid sensor modules 4100 in the modular radial vertical tiers 9151, 9153, and 9154 each comprise its own single unique processor (Council) 60 (not shown). The two connected micro grid actuator modules 4200 each comprise its own single unique processor (Council) 60 (not shown). The connectivity structure 9150 comprises ten Councils 60 which collectively form a Parliament within a macro grid. The Parliament comprises ten Councils 60 embodied in the circles 4125, 4130, 4135.

The data from the Global Positioning System (GPS) module 420 in FIG. 8B could be either static or dynamic depending on the micro grid apparatus installation environment and material use.

Whether mobile or fixed, the Parliament facilitates its internal and external data communications with utilization of the enhanced TCP/IP model structure, and packet structure, and provides full peer-to-peer facilitation (including governance and artificial intelligence) within its interconnected structure.

FIG. 8C depicts a vertical section of the radial vertical tier 9151 of FIG. 8B, in accordance with embodiments of the present invention. FIG. 8C shows a distribution in the vertical direction 3125 of the RAM module 200, the micro grid processors 3210, and the micro grid sensor module 4100. The vertical direction 3125 is perpendicular to the plane of the two-dimensional representation of the complex power hub apparatus 9150 of FIG. 8B. The vertical direction 3125 is also perpendicular to the central area within the central power hub 3000. The modules 200, 3210, and 4100 are physically connected to the central power hub 3000 as shown. The output sockets 4120 are connected to the micro grid sensor module 4100 at a same vertical level. FIG. 8C depicts the circles 4135, 4130, and 4135 at different vertical levels along the direction 3125.

The other radial vertical tiers (9152, 9153, 9154, 9155) of FIG. 8B have vertical sections which are similar in mechanical structure to the vertical section of the radial vertical tier 9151 depicted in FIG. 8C.

Figure 8D:
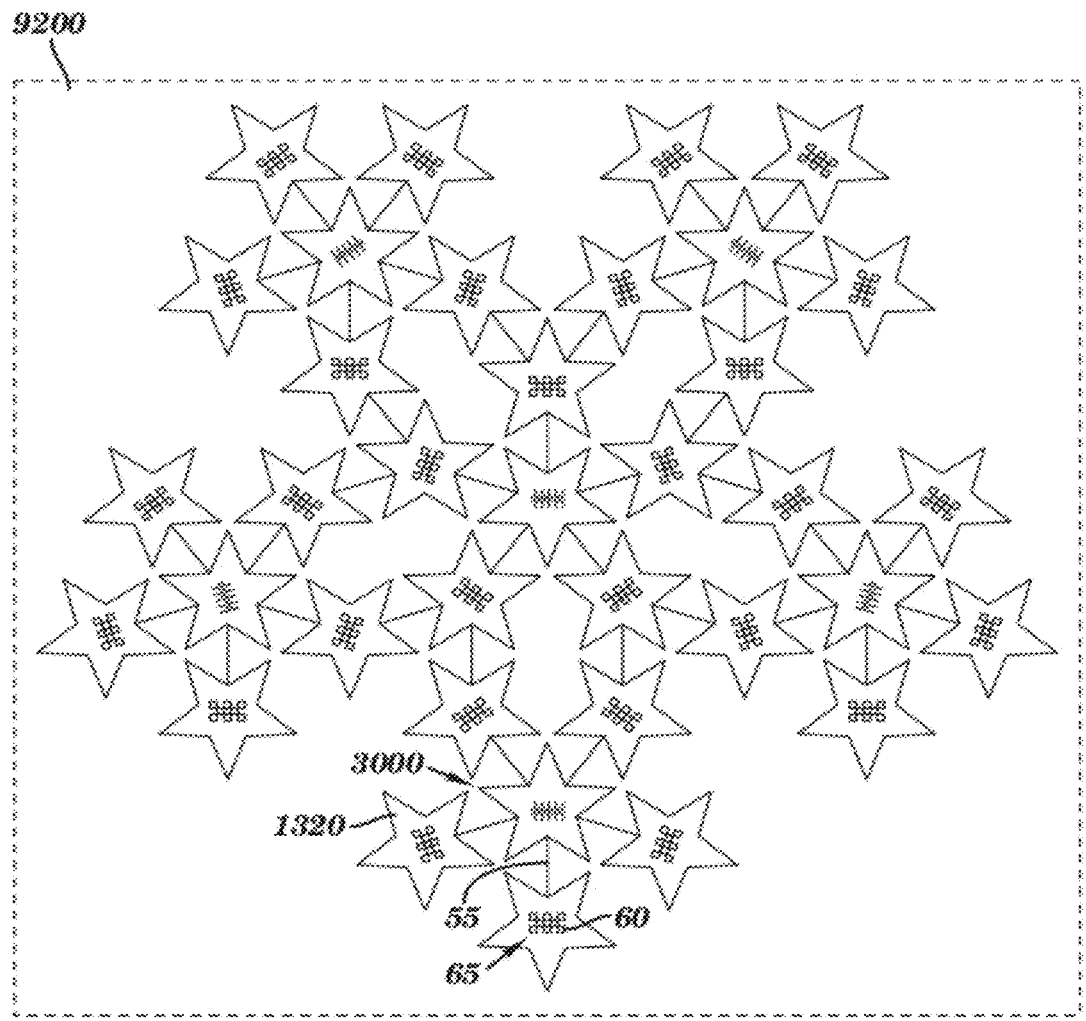
FIG. 8D is a block diagram depicting a connectivity structure in the form of complex mosaic micro grid apparatus including power hubs and micro grid structures, in accordance with embodiments of the present invention.

FIG. 8D is a block diagram depicting a connectivity structure 9200 in the form of complex mosaic micro grid apparatus including power hubs and micro grid structures, in accordance with embodiments of the present invention. The connectivity structure 9200 comprises multiple power hubs 3000 and multiple micro grid structures 1320 physically connected by connection interfaces 55. Each multiple micro grid structure 1320 comprises a plurality of processors 65 that includes a unique processor (Council) 60. The Councils 60 collectively form a Parliament in a macro grid. This Parliament could be located in a Data Centre server rack, or embodied in a Mainframe (as one of a stack of mosaic micro grid platters). The irregular shaped modules are not depicted in this diagram, but would be present to provide the Parliament with GPS, I/O, RAM, Communications and Wireless functionality.

Generally, a complex mosaic micro grid apparatus comprises a plurality of micro grid structures 1320 and a plurality of power hubs 3000 physically connected by irregular shaped micro grid bridge modules at connection interfaces 55. Each micro grid structure 1320 comprises a singular central area and radial arms external to and integral with the central area to define docking bays for accommodating modules to be inserted in the docking bays. The central area comprises a first plurality of processors that include a Council.

Figure 8E:
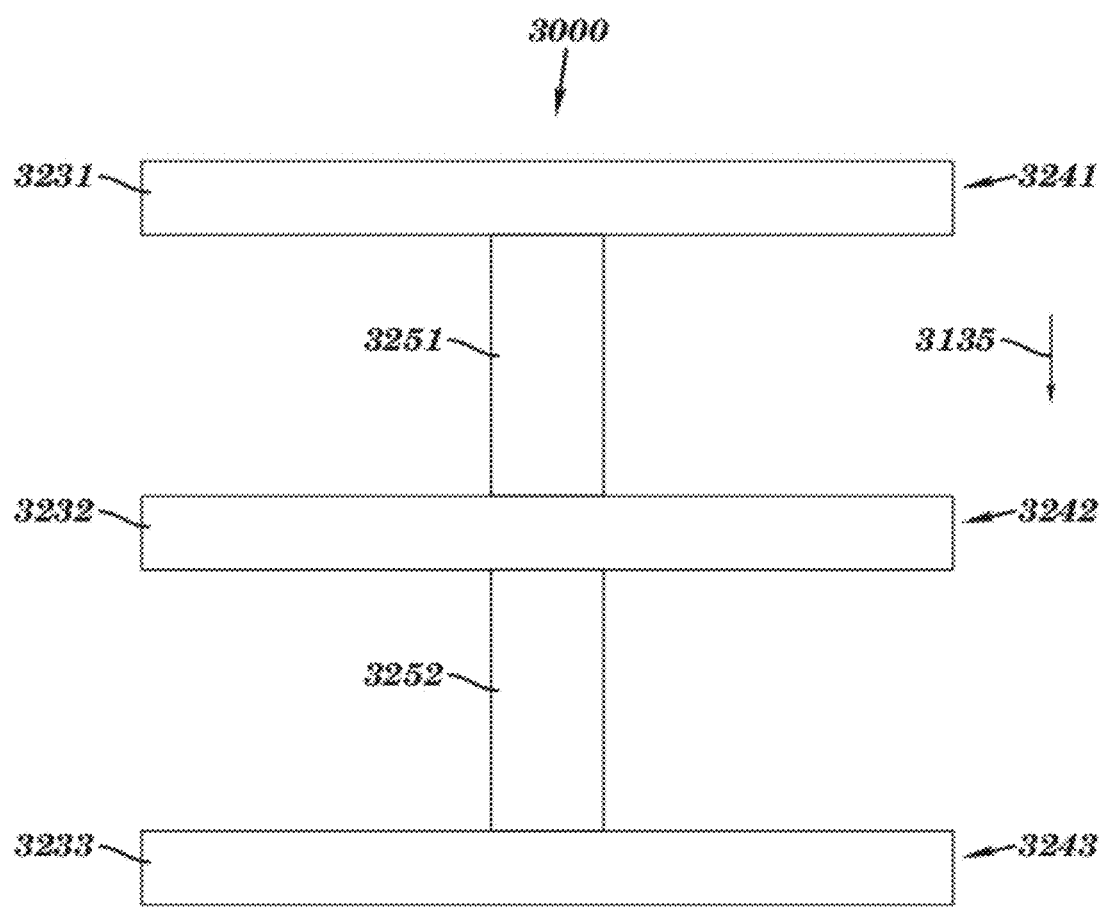
FIG. 8E is a vertical cross-sectional view of a power hub of FIG. 8D, in accordance with embodiments of the present invention.

FIG. 8E is a vertical cross-sectional view of a power hub 3000 of FIG. 3D, in accordance with embodiments of the present invention. The power hub 3000 comprises a plurality of central areas (3231, 3232, 3233) that coalesce to define internal structural space 3251 and 3252 configured to accommodate re-chargeable batteries and radial arms external to and integral with each central area to define horizontal layer docking bays for accommodating irregular shaped modules to be inserted in the horizontal layer docking bays pertaining to each central area. Each central area comprises rechargeable batteries. The central areas (3231, 3232, 3233) coalesce in the vertical direction 3135 which is perpendicular to the two-dimensional plane representing the complex mosaic micro grid apparatus 9200 of FIG. 8D.

Figure 9:
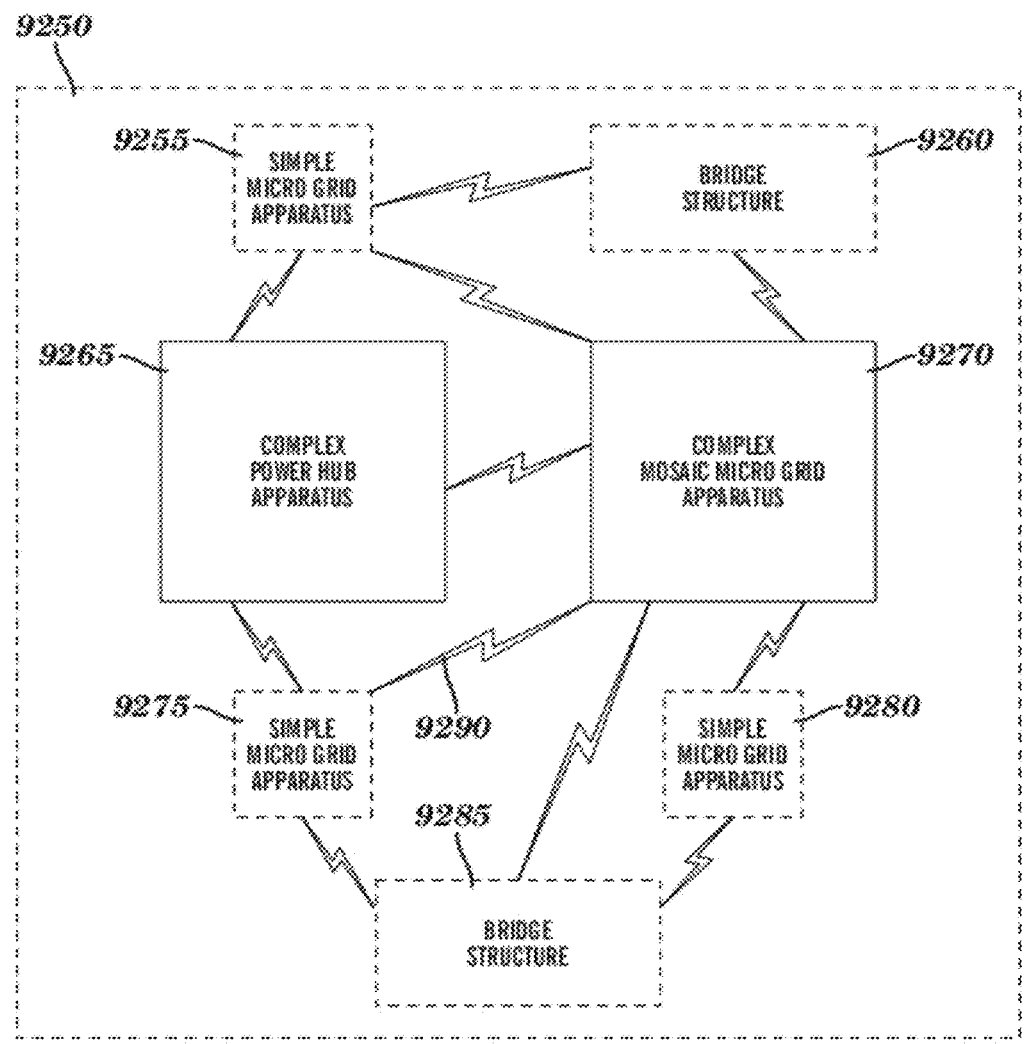
FIG. 9 is a block diagram of a configuration comprising wirelessly connected structures, in accordance with embodiments of the present invention.

Thus in the embodiment illustrated in FIG. 9, the plurality of central areas in each power hub 3000 consists of the three central areas 3231, 3232, and 3233. The central area 3231 defines first horizontal layer docking bays for accommodating irregular shaped modules to be inserted in the first horizontal layer docking bays. The central area 3232 defines second horizontal layer docking bays for accommodating irregular shaped modules to be inserted in the second horizontal layer docking bays. The central area 3233 defines third horizontal layer docking bays for accommodating irregular shaped modules to be inserted in the third horizontal layer docking bays.

The power hubs 3000 are tall rechargeable battery power towers distributed throughout the complex mosaic micro grid apparatus of FIG. 8D for providing horizontal power connection, provisioning direct-current (DC) power, voltage noise filtering, and close proximity current source distribution directly within the mainframe structure to the micro grids positioned in situ. Each power hub 3000 comprises a plurality of central areas coalesced for including rechargeable batteries that provide electrical power for the Council in each micro grid structure 1320.

Each Power hub 3000 comprises vertical tier and horizontal layer data buses internally, to provide interconnection of all connection interfaces (55) on a plurality of vertical tiers and horizontal layers externally.

The Parliament in the complex mosaic micro grid apparatus comprises the Councils in the totality of micro grid structures 1320.

Even as a server, or a component to a Mainframe, the Parliament in the complex mosaic micro grid apparatus 9200 facilitates its internal and external data communications with utilization of the enhanced TCP/IP model structure, and packet structure, and provides full peer-to-peer facilitation (including governance and artificial intelligence) within its interconnected structure.

Figure 8F:
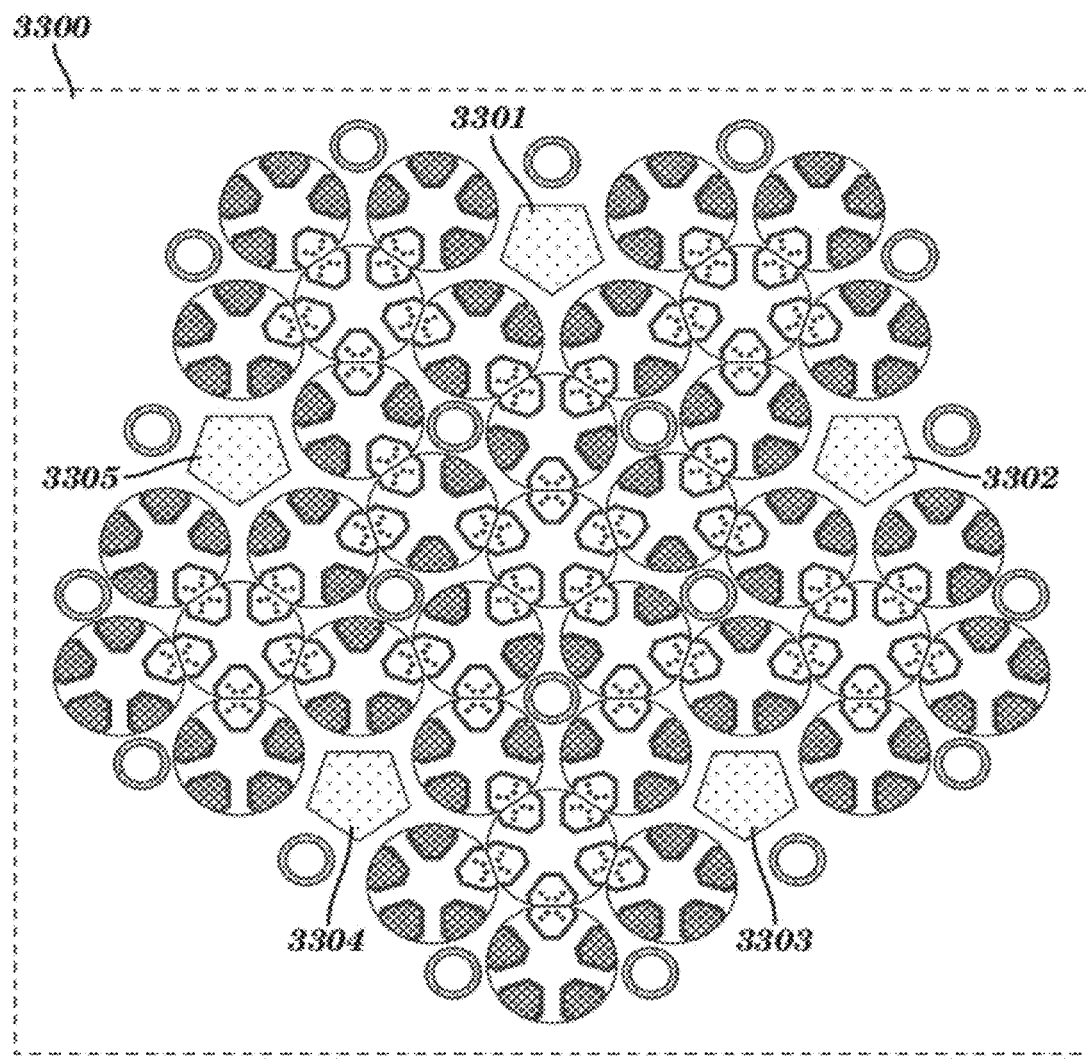
FIG. 8F depicts a complex mosaic micro grid circuit board with five multi-socket connection blocks, in accordance with embodiments of the present invention.

FIG. 8F depicts a complex mosaic micro grid circuit board 3300 with five multi-socket connection blocks (3301-3305), in accordance with embodiments of the present invention. The mulit-socket connection blocks (3301-3305) are disposed amongst a plurality of micro grid apparatus's and power hubs (intruding through large accommodating holes in the circuit board). Connection pins (not shown) beneath the multi-socket connection blocks present to a similar complex mosaic circuit board directly underneath to connect the data buses and to physically form a more complex structure by aggregation of the connector blocks to form segmented backplanes.

Figure 8G:
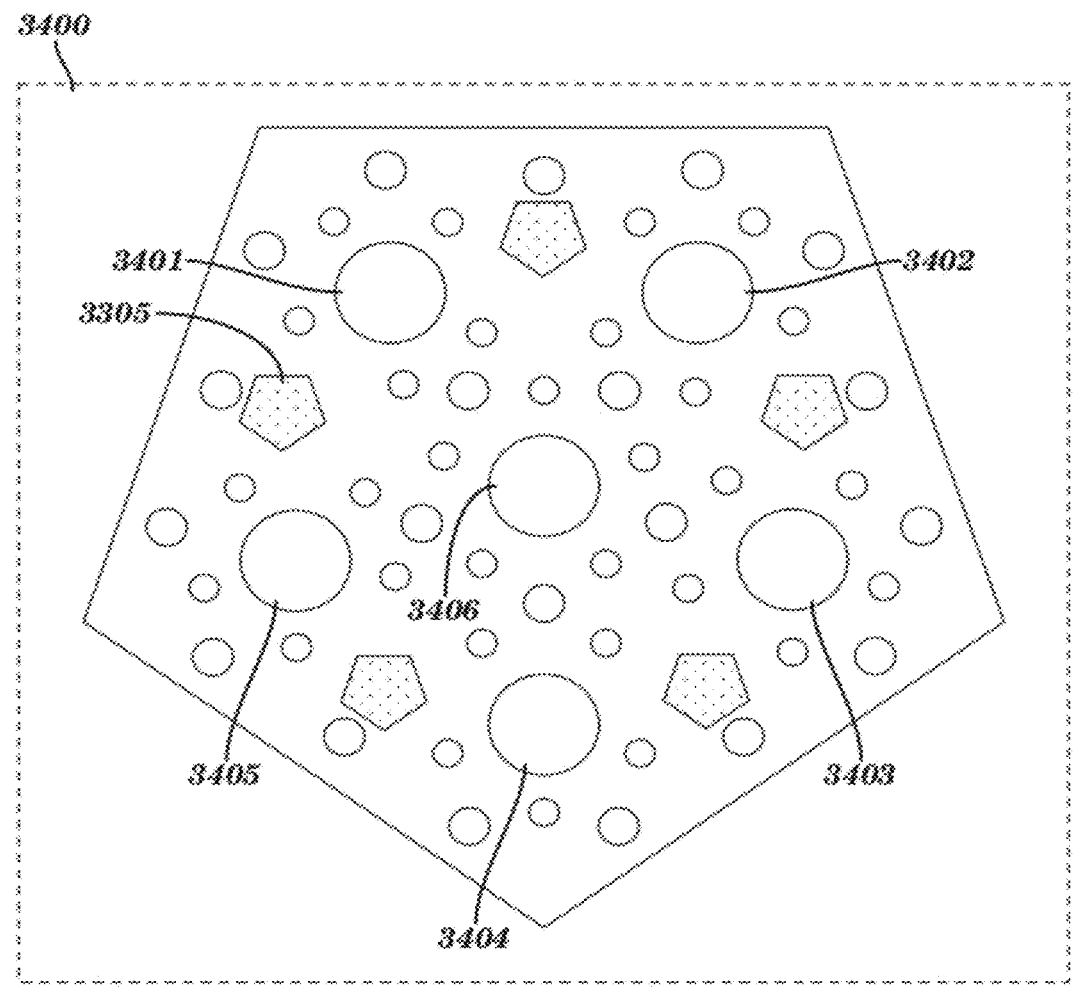
FIG. 8G depicts a complex mosaic micro grid circuit board with six large holes, in accordance with embodiments of the present invention.

FIG. 8G depicts a complex mosaic micro grid circuit board 3400 with six large holes (3401-3406), in accordance with embodiments of the present invention. The six large holes (3401-3406) are configured to accommodate the penetration of re-chargeable battery power towers intrusively through the assembled structure of a micro grid mainframe, provisioning direct-current (DC) power, voltage noise filtering, and close proximity current source distribution directly within the mainframe structure. A plurality of holes of a plurality of shapes and sizes may be manufactured for a plurality of power tower types and penetration formats for power disbursement. Positions of other structural holes and components (e.g., connector block 3305) are illustrated.

FIG. 9 is a block diagram of a configuration comprising wirelessly connected structures 9255, 9275, 9280, 9260, 9285, 9265, and 9270, in accordance with embodiments of the present invention.

The structures 9255, 9275, and 9280 are each essentially the micro grid apparatus 100 of FIG. 1 and each comprises an Executive as described supra.

The structures 9260 and 9285 are essentially the connectivity structure 9100 of FIG. 8A and each is a bridge structure that comprises a Parliament as described supra.

The structure 9265 is essentially the connectivity structure 9150 of FIG. 8B and is a complex power hub apparatus that comprises a Parliament as described supra.

The structure 9270 is essentially the connectivity structure 9150 of FIG. 8C and is a complex mosaic micro grid apparatus that comprises a Parliament as described supra.

A Government in a macro grid is formed by wirelessly congregating the three Executive in structures 9255, 9275, and 9280 and the four Parliaments in structures 9260, 9285, 9265, and 9270. The functionality of this Government is implemented though use of peer-to-peer governance software and peer-to-peer intelligence software, to embody a unique artificial intelligence.

Thus, the present invention provides a governance apparatus comprising a Government and a plurality of micro grid apparatuses.

The Government of the governance apparatus comprises a plurality of governmental components. The governmental components collectively comprising a plurality of Councils such that a macro grid comprising an artificial intelligence and the Government is configured to respond to an alert pertaining to an event through use of the artificial intelligence and the Government. Each governmental component is an either an Executive or a Parliament.

Each micro grid apparatus of the governance apparatus is either a simple micro grid apparatus or a complex micro grid apparatus. Each complex micro grid apparatus is a connectivity structure. Each micro grid apparatus is wirelessly connected to another micro grid apparatus of the plurality of micro grid apparatuses. Each micro grid apparatus comprises a unique governmental component of the plurality of governmental components. Each Executive consists of a unique processor of a plurality of processors disposed in a unique simple micro grid apparatus of the plurality of micro grid apparatuses. Each Parliament comprises a unique processor of each plurality of processors of at least two pluralities of processors disposed in a unique complex micro grid apparatus of the plurality of micro grid apparatuses. Each processor of each plurality of processors of each micro grid apparatus has its own operating system. Each unique processor in each Executive or Parliament in the Government is a Council of the plurality of Councils and has a unique operating system differing from the operating system of each other processor in the plurality of processors that comprises said each unique processor.

C. Macro Grid Communication

The artificial intelligence when generated by a Council in a micro grid (as a result of a detected alert or event) is provided with a fresh Class E Internet Protocol (IP) address. Consequentially each micro grid processor assigned as a resource to the artificial intelligence (or macro grid) has its own individual IP address linked as a sub-IP address to the primary Class E IP Address of the artificial intelligence. In this way, IP addressing links all Council assigned micro grid processor resources to a single macro grid Government (enhanced TCP/IP Governance layer) and the embodied Intelligence (enhanced TCP/IP Intelligence layer), for the life and requirement of the artificial intelligence, in one embodiment.

Transience for the artificial intelligence is provided by the governance layer software (i.e. governance software in the Governance Layer) to enable the relocation of the artificial intelligence that is at the Council allocated primary Class E IP address, from a macro grid processor, wherein the artificial intelligence faces isolation or extinguishment, in one embodiment.

Thus, if the artificial intelligence that is residing in a primary Council having the primary Class E IP address (and having an artificial intelligence responsibility for implementing the artificial intelligence) is under event of isolation or extinguishment, then governance software in the Governance Layer may relocate the artificial intelligence to another Council in the Government.

Influenced by the increasing structural size of a macro grid, governance software will seek a Parliament (or an Executive) to assign a micro grid processor (or processors) as a minor backup processor(s) (i.e., Council(s)) to the primary Council, in the event that the macro grid processor embodying the primary Class E IP address (i.e., the primary Council) is unexpectedly and catastrophically lost (i.e., cannot be located). In response to ascertaining that the primary Council cannot be located, the backup macro grid processor would become a replacement primary Council by immediately assuming artificial intelligence responsibility (and inheriting the primary Class E IP address) and seek its own mirror micro grid processor backup from its interface with the presiding Governance software in order to trigger assignment of a second minor backup Council to the replacement primary Council.

Mirror backup macro grid processors facilitate maintaining macro grid cohesion. The lost processor would automatically re-assume its own unique IP address, and in isolation gravitate back to a disconnected and unassigned micro grid resource, governed by a Council (the unique processor in its micro grid), in one embodiment.

As the size of the macro grid increases further, multiple macro grid processors may be used to embody the artificial intelligence. To achieve this, the Class E IP address is shared in a similar method to the sharing of an IP address on an Internet Local Area Network (LAN), and a process of IP address translation occurs within the embodiment of the enhanced TCP/IP stack, in one embodiment.

Artificial intelligence governance layer software (i.e. the governance software in the Governance Layer) provides a process for the enhanced TCP/IP packet header information to be filtered through data security and data integrity algorithms, both to and from the intelligence layer software, to protect the artificial intelligence from attack (e.g., vicious attack). Artificial intelligence firewalls may be constructed, in one embodiment.

Figure 10A:
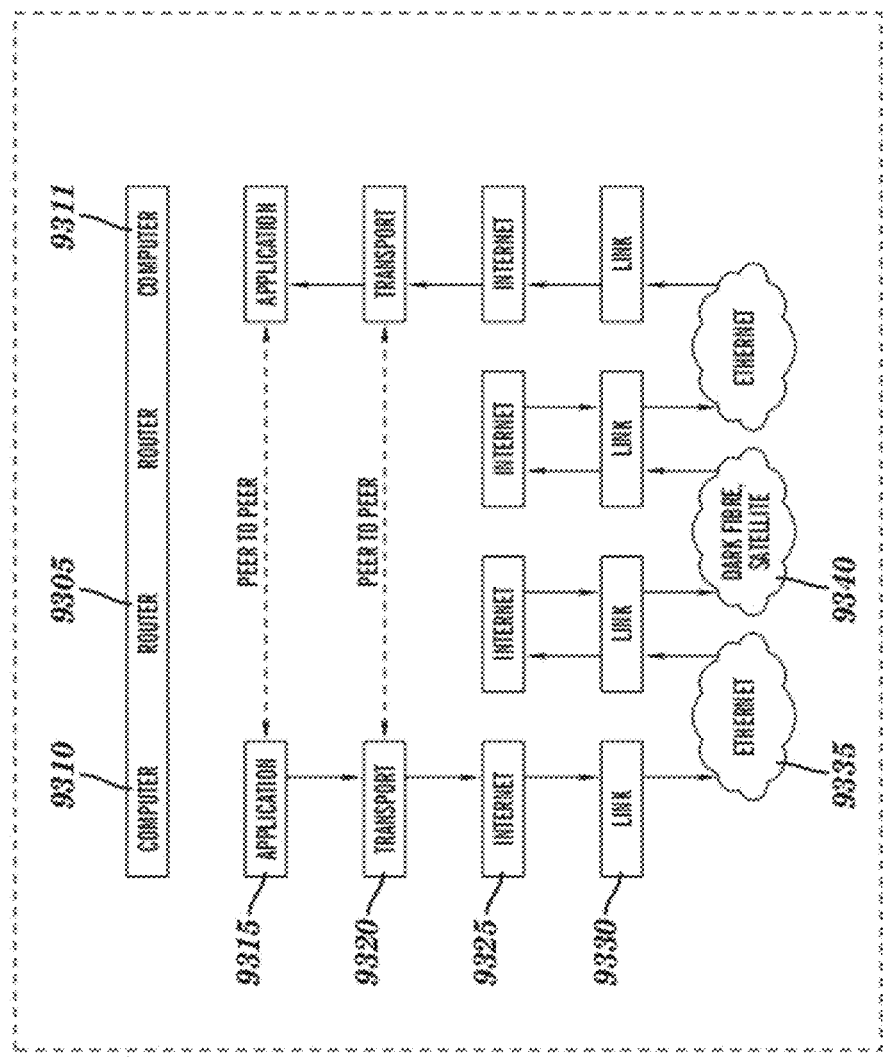
FIG. 10A is a data flow diagram depicting the current Internet communications structure between two computers, as a Transmission Control Protocol/Internet Protocol (TCP/IP) data communication model, in accordance with embodiments of the present invention.

FIG. 10A is a data flow diagram depicting the current Internet communications structure between two computers 9310 and 9311, as a Transmission Control Protocol/Internet Protocol (TCP/IP) data communication model, in accordance with embodiments of the present invention. The TCP/IP communication model comprises a five layered TCP/IP communications stack.

Layer 1 (9335) of the TCP/IP communications stack includes the physical use of Ethernet data cabling between the computer 9310 and its communication router 9305. Optical fiber and satellite 9340 are physical conduits utilized for the direct connection to another router and its Ethernet cable (cloud) connected computer 9311.

Layer 2 (9330) of the TCP/IP communications stack is the Link Layer, and carries the full TCP/IP data packet in data bits. The data packet is transmitted electronically from a computer 9310 via two routers to the computer 9311, encapsulated with a Frame header and a Frame footer for the Link Layer data packet structure.

Layer 3 (9325) of the TCP/IP communications stack is the Internet Layer, and carries the TCP/IP data packet without requirement for the Link Layer frame header and Frame footer. Layer 3 is the highest layer in the TCP/IP stack containing information required by the routers. Data for layers above the Internet Layer are delivered to those computational layers as peer-to-peer information, without interpretation of the packet data by the router.

Layer 4 (9320) of the TCP/IP communications stack is the Transport Layer, and carries the TCP packet without requirement for the IP header.

Layer 5 (9315) of the TCP/IP communications stack is the Application Layer, and delivers the TCP packet data to the application software requiring it.

Figure 10B:
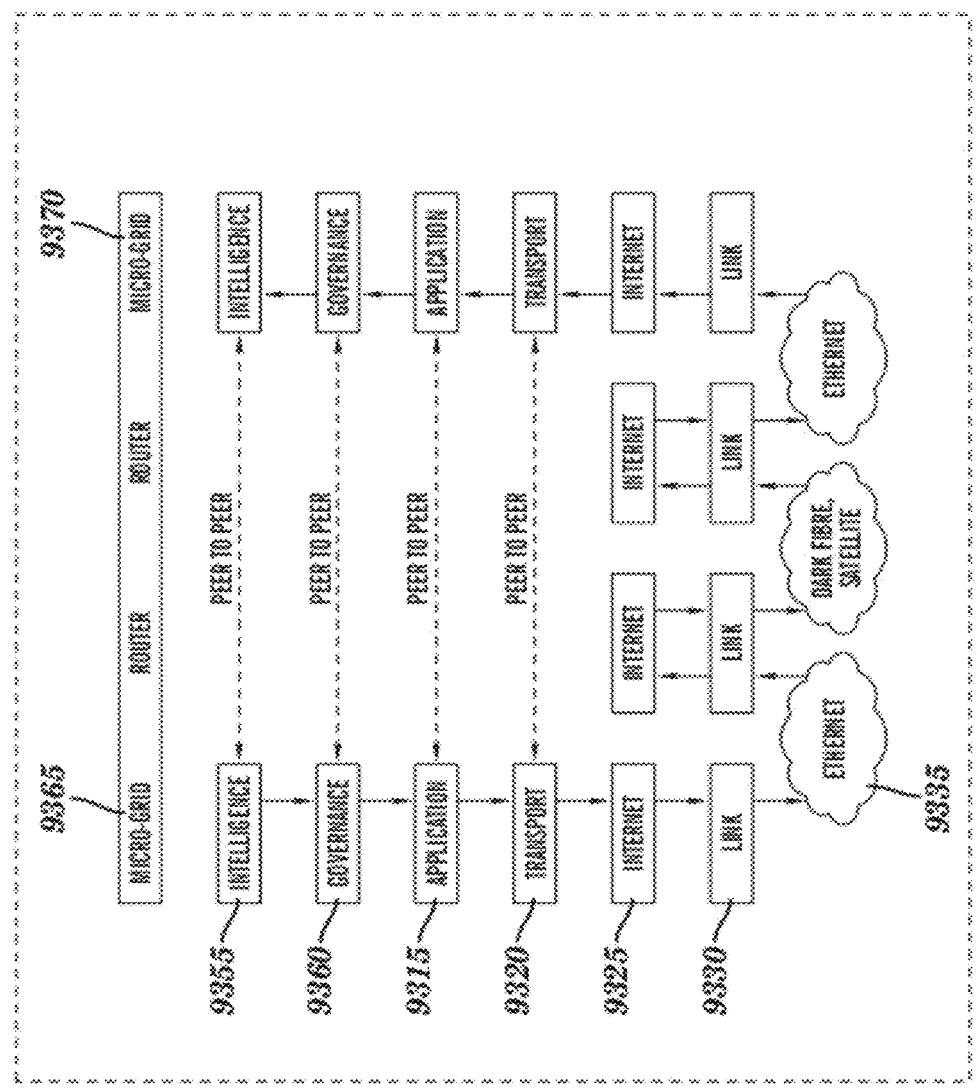
FIG. 10B is a data flow diagram depicting an enhanced Internet communications structure of a Government between two Councils, as a seven layered Transmission Control Protocol/Internet Protocol data communication model, by enhancement of the TCP/IP five layered model, to embody a Governance Layer and an Intelligence Layer, in accordance with embodiments of the present invention.

FIG. 10B is a data flow diagram depicting an enhanced Internet communications structure of a Government between two Councils, as a seven layered Transmission Control Protocol/Internet Protocol data communication model (in terms of an enhanced TCP/IP communication stack having seven layers), by enhancement of the TCP/IP five layered model, to embody a Governance Layer and an Intelligence Layer, in accordance with embodiments of the present invention.

The computers 9310 and 9311 in the TCP/IP five layered model of FIG. 10A are replaced in FIG. 10B with processors 9365 and 9370, respectively, which are Councils.

A sixth Governance Layer 9360 and a seventh Intelligence Layer 9355 have been included in the enhanced TCP/IP model, in accordance with embodiments of the present invention.

The Intelligence Layer 9355 comprises intelligence software configured to, inter alia, process data pertaining to the event, data pertaining to the alert, and data pertaining to the Government.

The Governance Layer comprises governance software which, inter alia, filters data in the TCP/IP packet header structure through data security and data integrity algorithms, both to and from the intelligence software in the Intelligence Layer, to protect the artificial intelligence from attack.

The micro grid unique processor 9370 acts as the recipient of the application software data, and peer-to-peer Governance and Intelligence control information is delivered by a known data packet delivery mechanism.

Figure 10C:
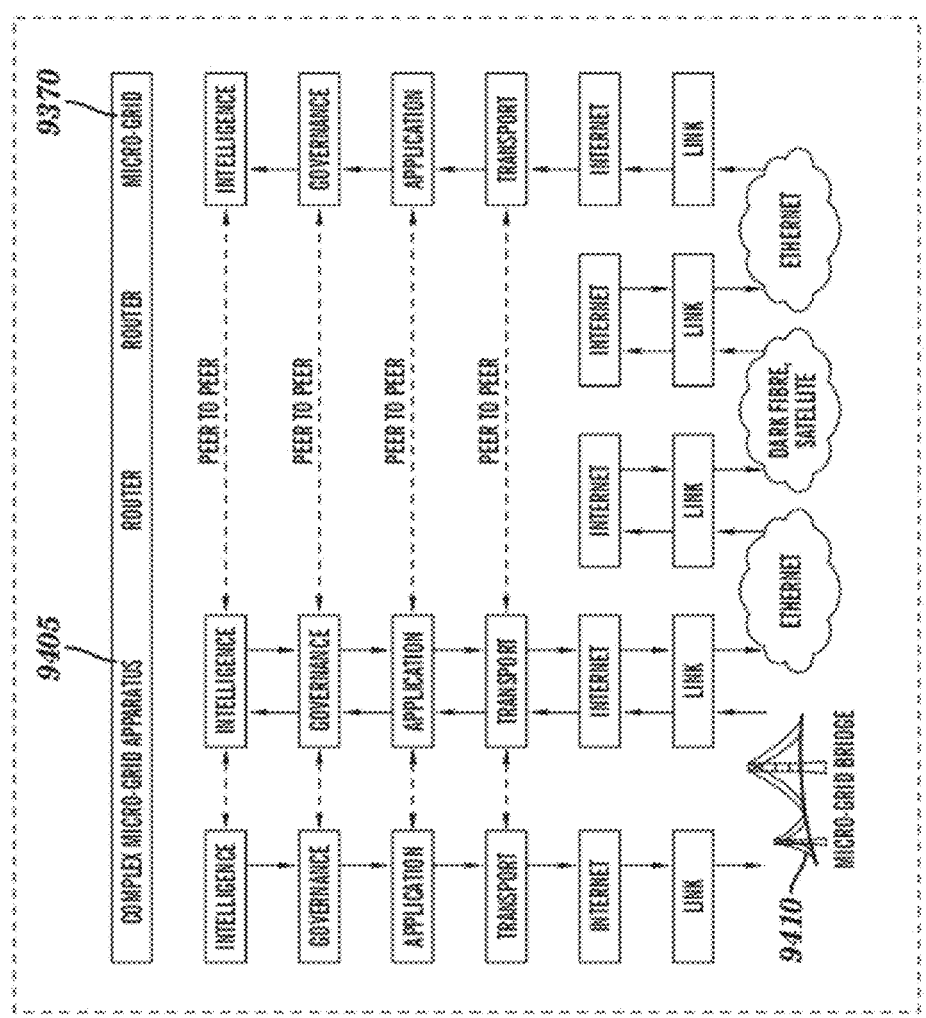
FIG. 10C is a data flow diagram depicting an enhanced Internet communications structure of a macro grid Government embodying a Parliament and a Council, as a seven layered Transmission Control Protocol/Internet Protocol (TCP/IP) data communication model, in accordance with embodiments of the present invention.

FIG. 10C is a data flow diagram depicting an enhanced Internet communications structure of a macro grid Government embodying a Parliament and a Council, as a seven layered Transmission Control Protocol/Internet Protocol (TCP/IP) data communication model, in accordance with embodiments of the present invention.

A connectivity structure in the form of complex micro grid apparatus 9405, with its Councils physically connected or bridged by a physical connectivity link (e.g., bridge) 9410 to create a Parliament, communicates with the recipient micro grid unique processor 9370 with information being provided peer-to-peer across the enhanced TCP/IP layers.

Peer-to-peer data interchange occurs within the complex micro grid apparatus, as well as across the Internet cloud.

Figure 10D:
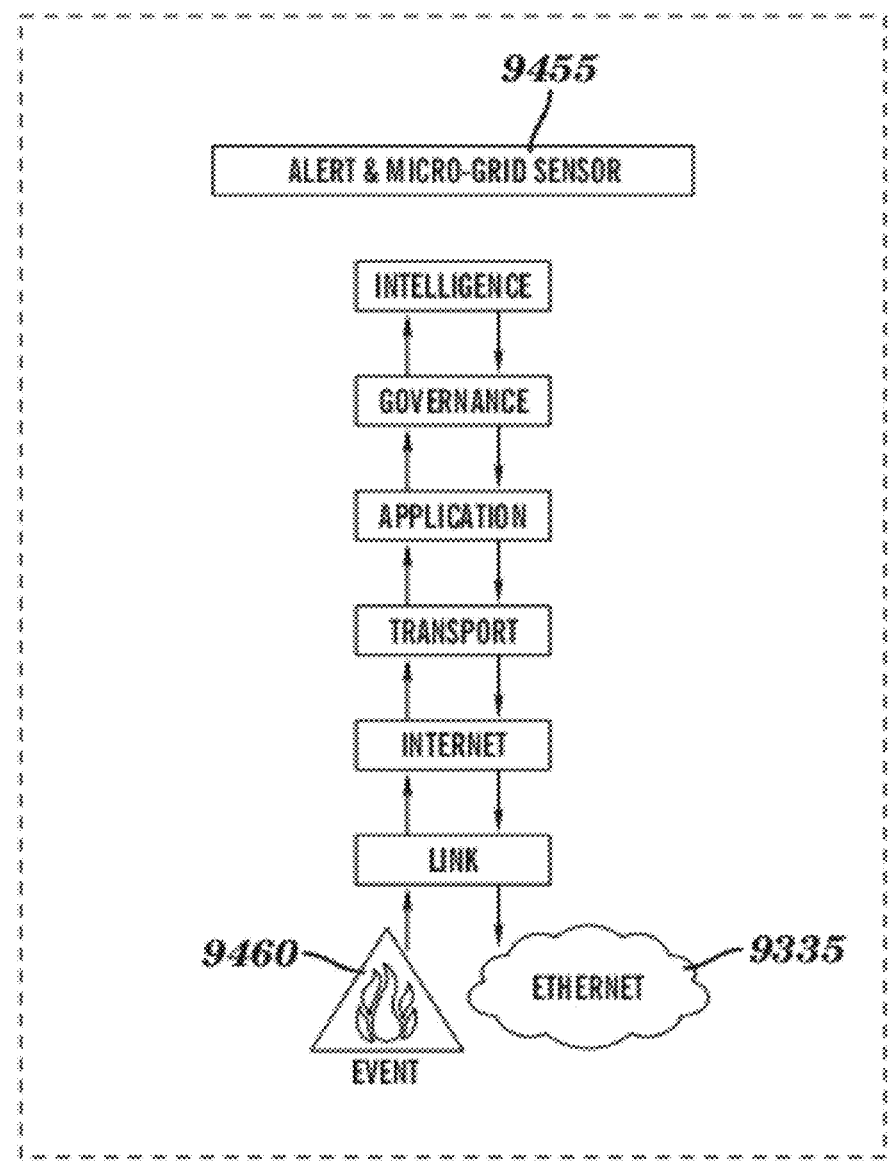
FIG. 10D is a data flow diagram depicting an enhanced Internet communications structure from a micro grid sensor to the Internet (Ethernet) cloud, as a seven layered Transmission Control Protocol/Internet Protocol (TCP/IP) data communication model, in accordance with embodiments of the present invention.

FIG. 10D is a data flow diagram depicting an enhanced Internet communications structure from a micro grid sensor 9455 to the Internet (Ethernet) cloud, as a seven layered Transmission Control Protocol/Internet Protocol (TCP/IP) data communication model, in accordance with embodiments of the present invention.

The diagram in FIG. 10D depicts the micro grid sensor apparatus (irregular shaped module) 9455 which includes a single unique micro processor also being its own Council, with operational software to enable alert sensing and conveyance of events and requests 9460, and embodiment of Governance and Intelligence communication over the seven layered TCP/IP model into the Ethernet network cloud 9335, in accordance with embodiments of the present invention.

Figure 10E:
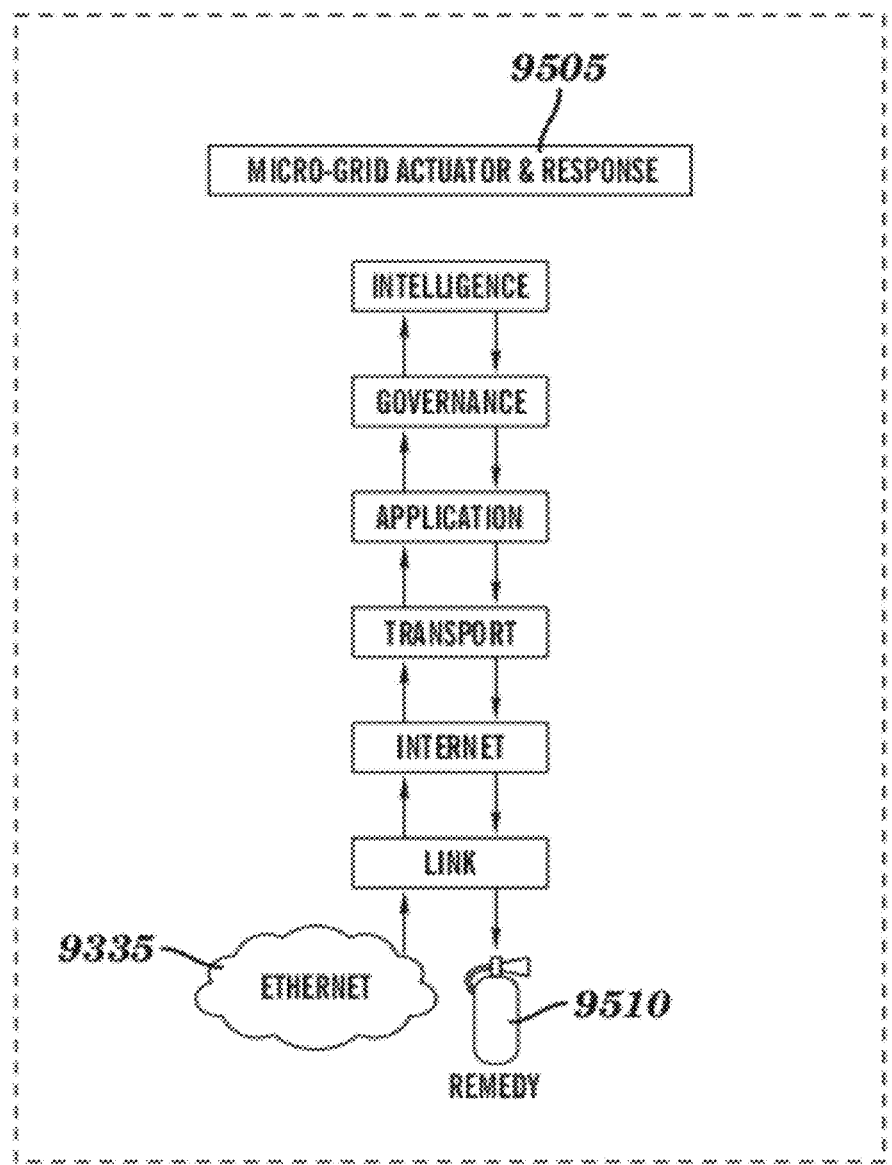
FIG. 10E is a data flow diagram depicting an enhanced Internet communications structure from the Internet (Ethernet) cloud to a micro grid actuator, as a seven layered Transmission Control Protocol/Internet Protocol (TCP/IP) data communication model, in accordance with embodiments of the present invention.

FIG. 10E is a data flow diagram depicting an enhanced Internet communications structure from the Internet (Ethernet) cloud 9335 to a micro grid actuator 9505, as a seven layered Transmission Control Protocol/Internet Protocol (TCP/IP) data communication model, in accordance with embodiments of the present invention.

The diagram in FIG. 10E depicts the micro grid actuator apparatus (irregular shaped module) 9505 which includes a single micro processor also being its own Council, with operational software to enable response and remedy 9510 and conveyance of actions, and embodiment of Governance and Intelligence communication over the seven layered TCP/IP model from the Internet (Ethernet) network cloud 9335, in accordance with embodiments of the present invention.

Figure 10F:
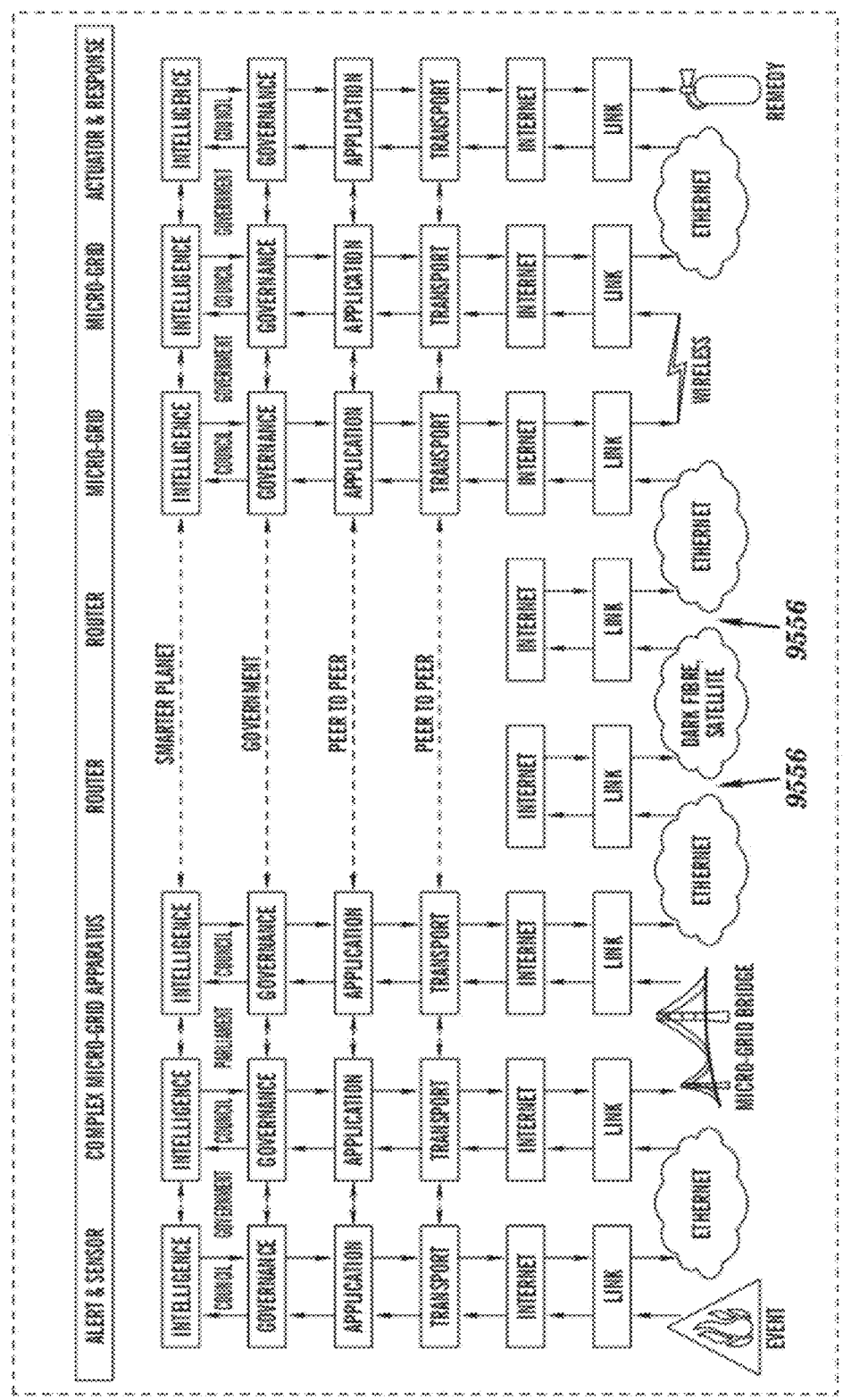
FIG. 10F is an end-to-end data concatenated data communication flow diagram of a macro grid activity from event to remedy depicting an enhanced Internet communications structure of a macro grid Government (presiding over its participating Parliaments and Councils) for the embodiment of a macro grid Intelligence, in a seven layered Transmission Control Protocol/Internet Protocol (TCP/IP) data communication model, in accordance with embodiments of the present invention.

FIG. 10F is an end-to-end data concatenated data communication flow diagram of a macro grid activity from event to remedy depicting an enhanced Internet communications structure of a macro grid Government (presiding over its participating Parliaments and Councils) for the embodiment of a macro grid Intelligence, in a seven layered Transmission Control Protocol/Internet Protocol (TCP/IP) data communication model, in accordance with embodiments of the present invention.

The diagram in FIG. 10F is a composite of FIGS. 10A-10E depicting consistent concatenation and communication continuity of a macro grid Government (presiding over four Councils and a Parliament with two Councils) responding to an alert (e.g., fire alarm), with an action of remedy (e.g., fire extinguisher), in accordance with embodiments of the present invention.

The current TCP/IP five layered model (see FIG. 10A) is identified in FIG. 10F by reference numeral 9556, and will continue to provide current Internet communication functionality to non-micro grid computers in concert with this invention, in accordance with embodiments of the present invention.

D. Sensor and Actuator Apparatus

FIG. 8B, which was discussed supra, is a block diagram depicting the connectivity structure in the form of a complex power hub apparatus 9150 comprising a central power hub 3000 and radial vertical tiers (9151-9155). Each "radial vertical tier" is alternatively referred to as a "vertical tier structure". Thus FIG. 8B depicts the vertical tier structures 9151, 9152, 9153, 9154, and 9155.

In FIG. 8B, circle 4125 comprises: three micro grid sensor modules 4100 with input plugs 4120 physically connected to the micro grid sensor module 4100, two micro grid actuator modules 4200 with output sockets 4220 physically connected to the micro grid actuator module 4200 to cause generation of output or activate responsive functionality in response to the event that the macro grid is responding to, and each physically connected to the power hub 3000 at the first horizontal layer (illustrated as circle 4125) of available docking bays, said first horizontal layer denoted as tier zero (0). Thus, the three micro grid sensor modules 4100 and the two micro grid actuator modules 4200 are corresponding modules in respective vertical tier structures 9151-9155 such that the corresponding modules are located on the same horizontal layer (i.e., tier) of a plurality of horizontal layers.

The three connected micro grid sensor modules 4100 each utilize its input plugs 4120 to detect an input signal such as an alert. The sensor module processors interpret the detected alert and create or adjust the alert scale. The updated alert value is communicated in a data packet to another processor either external to (i.e., wirelessly connected to) or within the connectivity structure 9150.

The three connected sensor micro grid sensor modules 4100 in the modular vertical tier structures 9151, 9153, and 9154 each comprise its own single unique processor 60. The two connected micro grid actuator modules 4200 each comprise its own single unique processor 60.

The micro grid sensor modules 4100 and their input plugs 4120, in a fixed, mobile or remote micro grid computing system provide the following features:

1. Direct physical connection, provided by the input plugs (4120), to electrical functioning sampling devices such as, inter alia, heat probes and bi-metallic strips; photo cells and photo diodes; mercury switches; tension bars; resistors; x-ray, cosmic radiation and other sub-atomic particle detection plates; a plurality of transistor types; chemical and aromatic probes; magnetic and mechanical pickups; astronomical, ground, oceanic and sub-marine antennae; gravitational and sub atomic particle detection plates; etc.

2. Conversion of digital and analogue signals (e.g., high and low frequency electrical signals, high and low amplitude electrical signals, high and low voltage electrical signals, high and low resistance electrical signals, etc.) from physically attached and electrical functioning sampling devices into micro grid data bus packets of information, for use by the attached and wirelessly connected micro grid and generated macro grid (artificial intelligence), is enabled by a processor within the micro grid sensor modules (4100). The conversion is effectuated by internal electronic circuitry (that is processor governed) and associated electronics similar to 'oscilloscope' instrument functionality (i.e., without the cathode ray tube and its associated circuitry).

3. Software driven rotational switching and sampling, by the processor within the micro grid sensor modules (4100), between the different sensing circuits for high and low frequency and amplitude electrical input signals, high and low voltage or resistance electrical input signals, high and low speed 'event' electrical input signal (i.e., a time trigger for the dual-input channels). The sensing circuits are attached to dual-input channels (4110, 4112) and their associated trigger channel (4115) of the input plugs 4120 (see FIG. 11A, discussed infra).

4. Constant surveillance of the electrical activity arriving from the physically attached electrical functioning sampling devices, and conversion into 'alert' packets of data for use by the micro grid and macro grid. Electrical signal feedback from the dual-input channels (4110, 4112) (see FIG. 11A) provides the micro grid and macro grid (artificial intelligence) with effective use of its actuator driver modules to counter an 'alert'. As a result the 'alert' may be adjusted in scale by the artificial intelligence.

5. Modular structure for designing micro grid sensing instrument apparatuses with a plurality of physical connection plugs to a plurality of electrically functioning sampling devices.

The micro grid actuator modules 4200 and their output sockets 4220 in a fixed, mobile or remote micro grid computing system provides the following features:

1. Direct physical connection by output sockets 4220 (e.g., the two output sockets 4205 and 4215 depicted in FIG. 11B, discussed infra), of the micro grid actuator module 4200 to electrically driven functional devices, such as, inter alia, armature motors; linear motors; relays; solenoids; vibration plates; servo's; transistors; digital and analogue electronic equipment; AM and FM coded data streams; sound output; etc.

2. Conversion, by the a processor in the micro grid actuator driver module 4200, of data packets of information from the micro grid and macro grid (artificial intelligence) into complex variable frequency and amplitude digital electrical output signals and/or variable frequency and amplitude analogue electrical output signals. These output signals are sent to physically attached and electrically driven functional devices, by internal electronic circuitry that is processor governed and its associated electronic circuitry similar to 'function-generator' instrument functionality.

3. The macro grid (artificial intelligence) reacting to a change in 'alert' value instructs the software operating within the micro grid actuator driver module 4200 to activate its associated 'function generating' circuitry to produce the appropriate complex variable frequency and amplitude digital electrical output signals and/or variable frequency and amplitude analogue electrical output signals to electrically drive the connected functional devices attached to the output sockets (e.g., the output sockets 4210 and 4215 in FIG. 11B).

4. Constant electrical activity to the physically attached electrically driven functional devices, which occurs as the artificial intelligence reacts to reduce the 'alert' value.

5. Modular structure for designing micro grid actuator apparatuses with a plurality of physical connection sockets to a plurality of electrically driven functional devices.

Figure 11A:
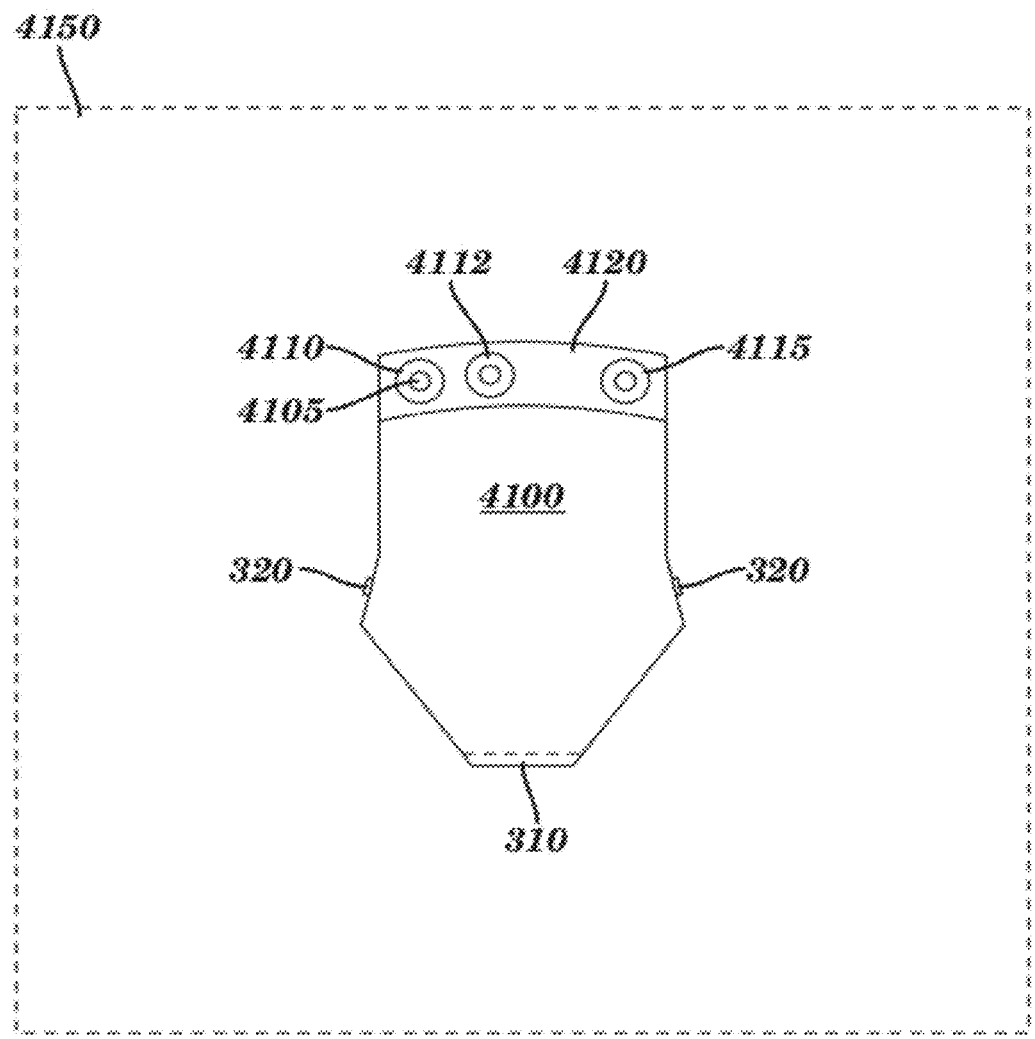
FIG. 11A depicts a micro grid sensor structure, in accordance with embodiments of the present invention.

FIG. 11A depicts a micro grid sensor structure 4150, in accordance with embodiments of the present invention. The micro grid sensor structure 4150 is configured to receive and process electrical sample signals of sampled data from at least one sampling device that has detected the electrical sample signals. The micro grid sensor structure 4150 comprises a micro grid sensor module 4100 and its input plugs 4120. The input plugs 4120 are physically and electrically connected to the micro grid sensor module 4100. The input plugs 4120 comprise three input pin connections (4110, 4112, 4115), wherein the input pin connections 4110 and 4112 are independent electrical signal receiver pin connections for receiving electrical signals, and wherein the input pin connection 4115 is an electrical trigger pin connection for triggering receiving electrical signals.

The micro grid sensor module 4100 has an irregular structural shape and contains a micro grid participating microprocessor.

The structural shape of the micro grid sensor module 4100 may be latched with its protrusion points (320) into any available tier zero (i.e., lowest tier a vertical distribution of tiers) docking bay of a micro grid complex shape and connects to the composite micro grid buses via its 'V' shaped connection point (310).

The sensor structure 4150 has a sufficient footprint for connector access and cables and may extend beyond (e.g., by 2.5 cm) the perimeter of a diameter (e.g., 10 cm) of the micro grid apparatus.

Figure 13A:
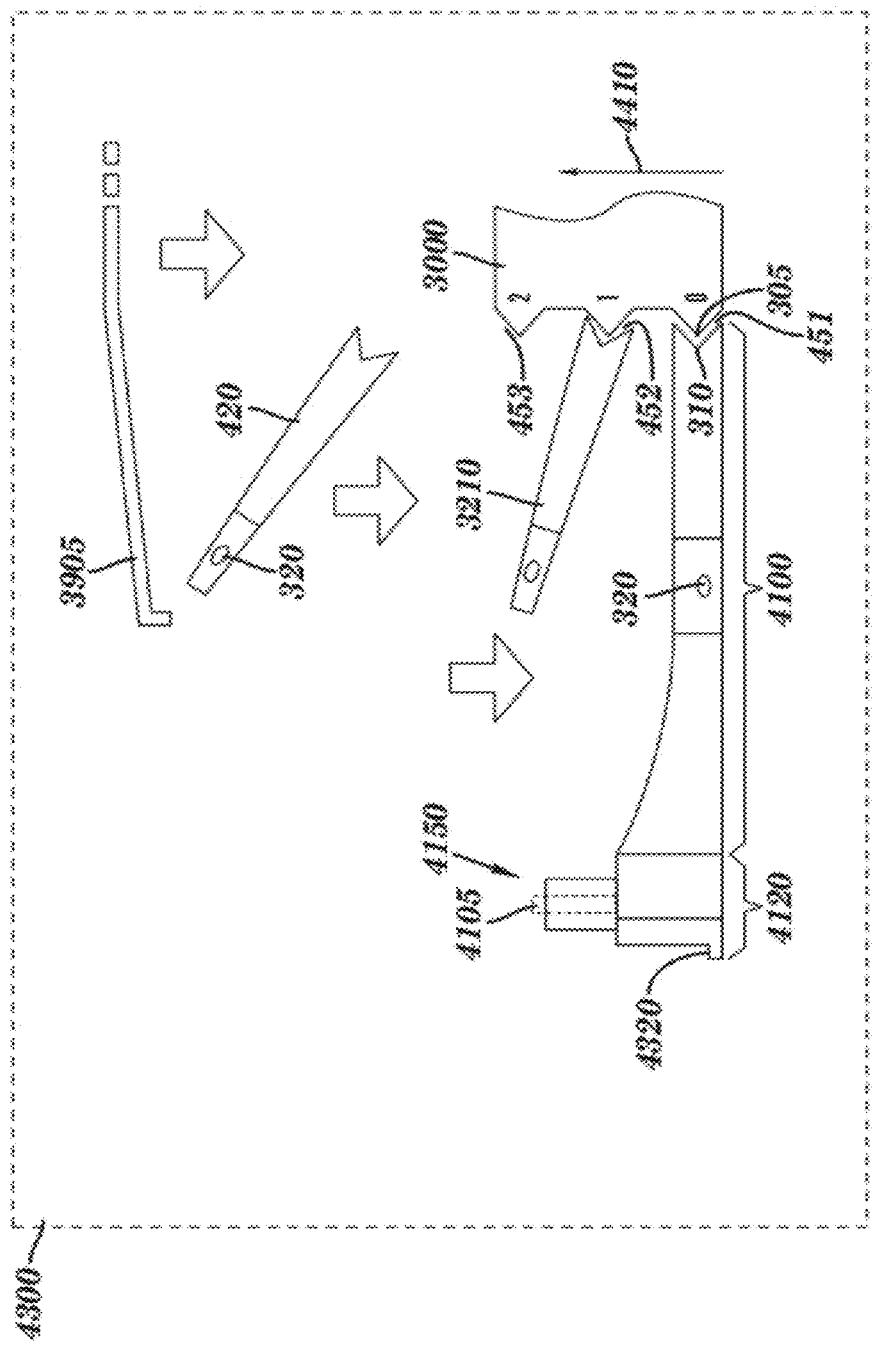
FIG. 13A is a vertical section diagram showing an assembly of a micro grid power hub said assembly including a micro grid sensor structure, in accordance with embodiments of the present invention.

A side-view diagram of the micro grid sensor module 4100 is provided infra in FIG. 13A which shows a structural lip (4320) for securing the sensor module 4100 to a structural bulkhead or base plate.

For electrical safety, the three input connections (4110, 4112, 4115) of the input plugs 4120 are provided with connection pins (4105).

Figure 11B:
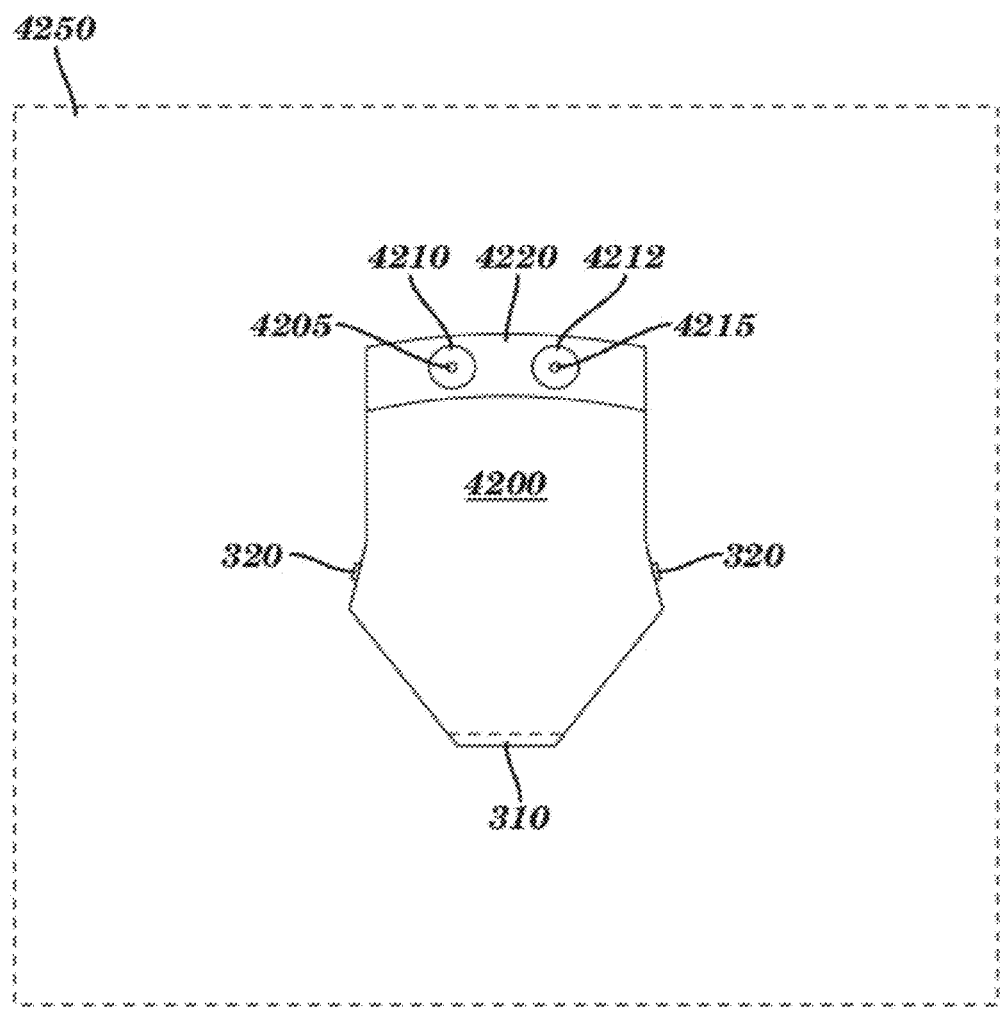
FIG. 11B depicts a micro grid actuator structure, in accordance with embodiments of the present invention.

FIG. 11B depicts a micro grid actuator structure 4250, in accordance with embodiments of the present invention. The micro grid actuator structure 4250 is configured to transmit electrical driver signals to at least one functional device to actuate functional operation of the at least one functional device. The micro grid actuator structure 4250 comprises a micro grid actuator module 4200 and its output sockets 4220. The output sockets 4220 are physically and electrically connected to the micro grid actuator module 4200. The output sockets 4220 include two output sockets connections (4210, 4212), wherein each output socket connection functions as an independent electrical function-generator output point to enable transmission of digital and analogue electrical signal output from the actuator module to at least one functional device.

The micro grid actuator module 4200 has an irregular structural shape and contains a micro grid participating microprocessor (not shown) and associated electronics.

The micro grid actuator module 4200 latches with its protrusion points (320) into any available tier zero docking bay of a micro grid complex shape and connects to the composite micro grid buses via its 'V' shaped connection point (310).

The actuator structure 4250 has a sufficient footprint for connector access and cables, and may extend beyond (e.g., by 2.5 cm) the perimeter of a diameter (e.g., 10 cm) of the micro grid apparatus.

Figure 13B:
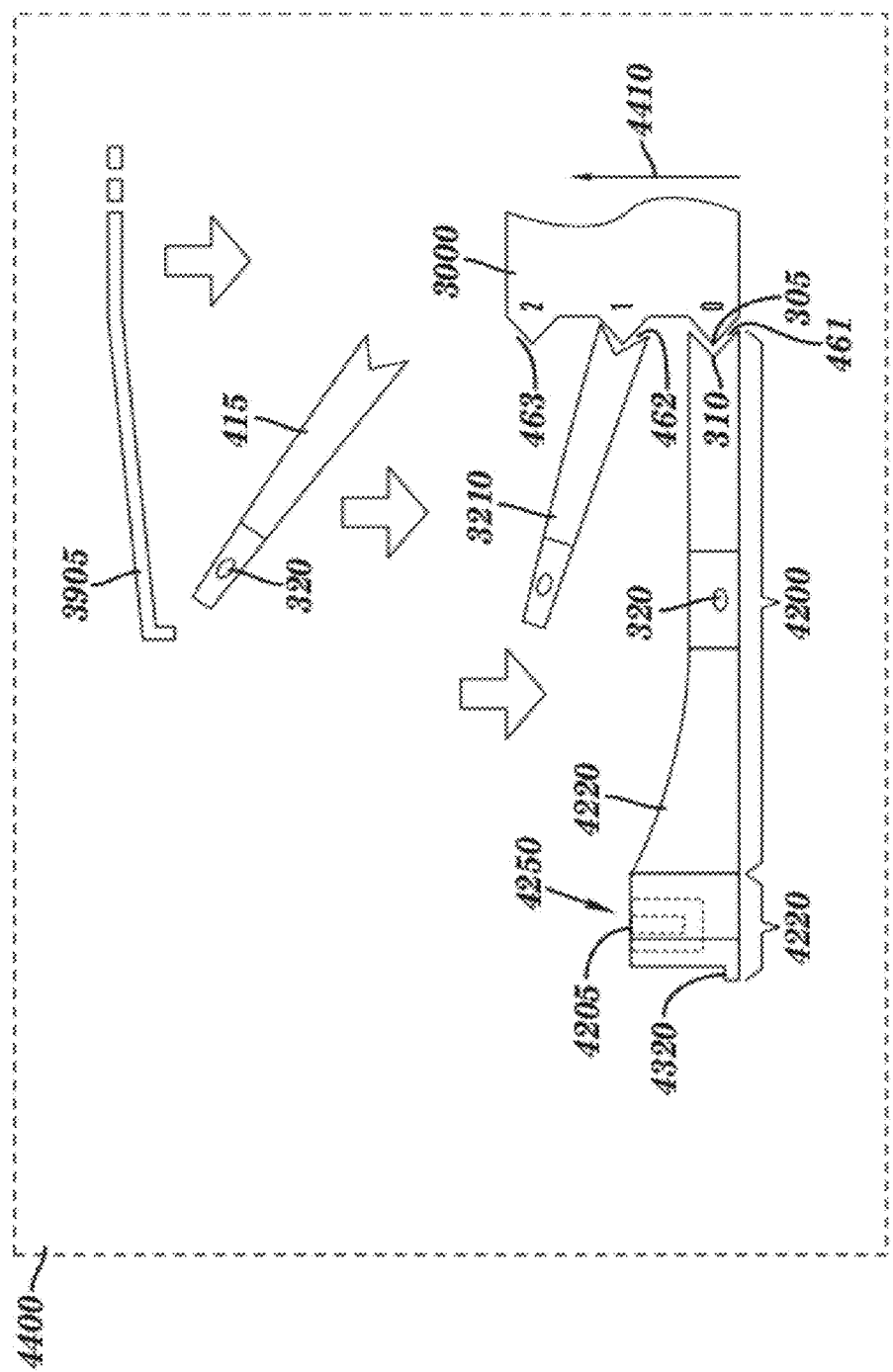
FIG. 13B is a vertical section diagram showing an assembly of a micro grid power hub said assembly including a micro grid actuator structure, in accordance with embodiments of the present invention.

A side-view diagram of the micro grid actuator module 4200 is provided infra in FIG. 13B which shows a structural lip (4320) for securing the actuator module 4200 to a structural bulkhead or base plate.

For electrical safety the two output connections (4205, 4215) of the output sockets 4220 are structured as receptor sockets.

Figure 12A:
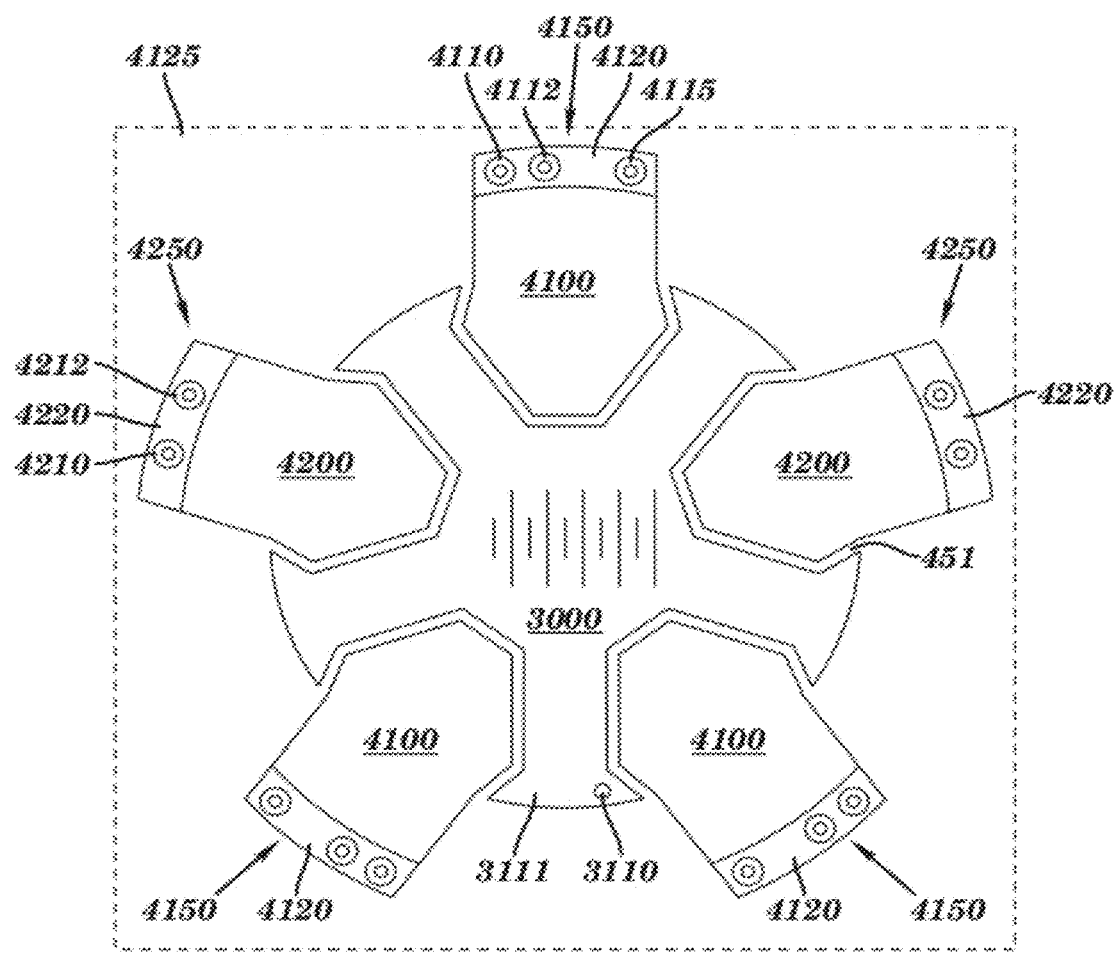
FIG. 12A is a diagram of a micro grid apparatus comprising a power hub with micro grid sensor structures and micro grid actuator structures, in accordance with embodiments of the present invention.

FIG. 12A is a diagram of a micro grid apparatus 4125, in accordance with embodiments of the present invention. The micro grid apparatus 4125 comprises a central power hub 3000 with three micro grid sensor structures 4150, two micro grid actuator structures 4250, and a tri-state light emitting diode 3110 on a topside surface of a radial arm 3111 of the power hub 3000.

The input plug 4120 of each micro grid sensor structures 4150 comprises three input pin connections (4110, 4112, 4115), wherein the input pin connections 4110 and 4112 are independent electrical signal receivers, and wherein the input pin connection 4115 is an electrical trigger receiving point.

The output socket 4220 of each micro grid actuator structure 4250 comprises two output socket connections (4210, 4212), wherein each output socket connection is an independent electrical function-generator output point to provide an output capability for digital and analogue electrical signal output.

In one embodiment, the micro grid apparatus 4125 is in tier zero of a vertical arrangement of tiers.

Although the micro grid apparatus 4125 of FIG. 12A depicts an embodiment having a particular structure arrangement of three micro grid sensor structures 4150 and two micro grid actuator structures 4250 in the docking bays 451 at tier zero of the power hub 3000, the scope of the present invention includes any combination of micro grid sensor structures 4150 and micro grid actuator structures 4250 in any permuted order with respect to the docking bays 451. For example denoting each micro grid sensor structure by the symbol "S" and each micro grid actuator structure by the symbol "A" for a power hub 3000 having five docking bays, exemplary permuted sequences of S and A include: SSSSS, AAAAA, SSSSA, AAAAS, SSSAA, AAASS, SASAS, ASASA, etc.

A plurality of extended complex structural power hub embodiments are possible. For example, when tier zero of a power hub 3000 embodies a plurality of micro grid bridge structures, the permutations of A and S are extended, thus forming complex power hub mosaic structures. Complex power hub mosaic structures may also embody complex micro grid processor structures (i.e. single tiered structures) such as the connectivity structure 9200 in FIG. 8D. These physically connected micro grid structures may embody additional A and S modules.

Figure 12B:
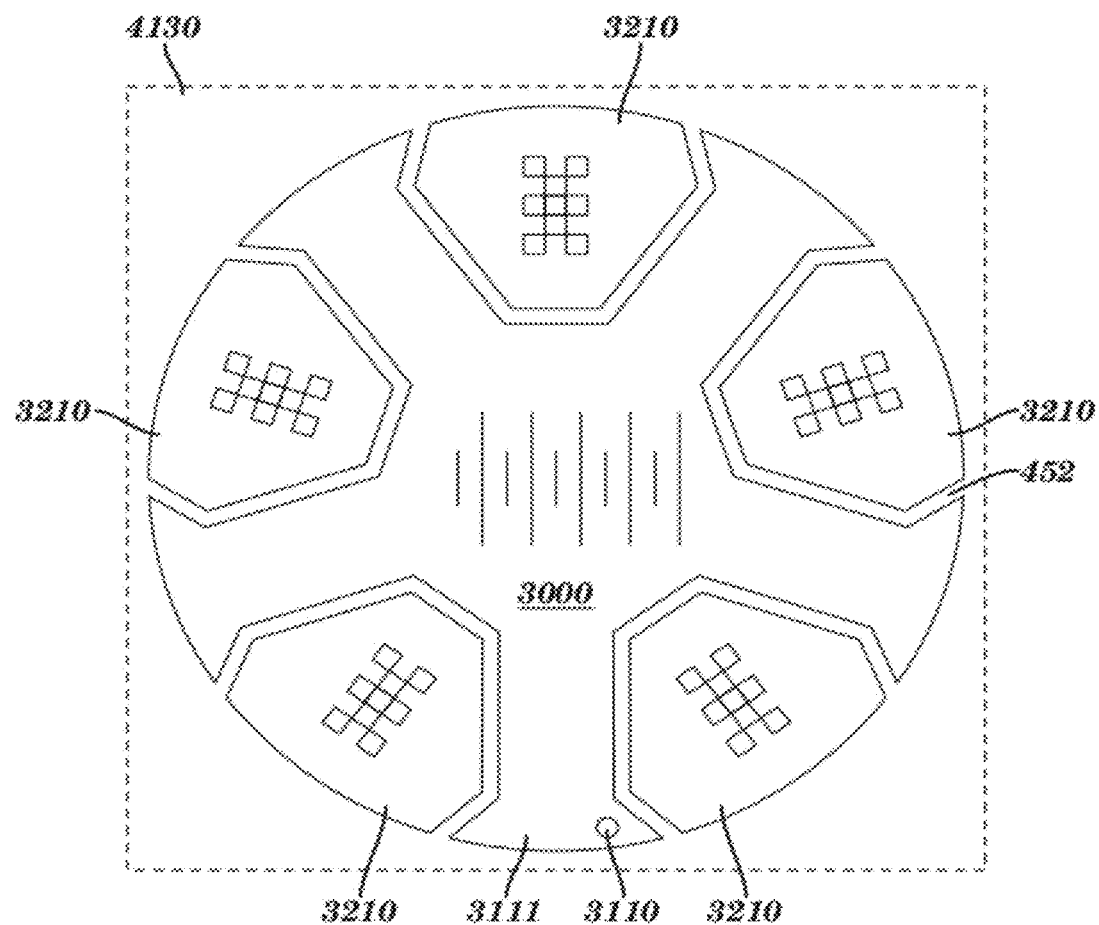
FIG. 12B is a diagram of a micro grid apparatus comprising a power hub with micro grid processor modules, in accordance with embodiments of the present invention.

FIG. 12B is a diagram of a micro grid apparatus 4130, in accordance with embodiments of the present invention. The micro grid apparatus 4130 of FIG. 12B comprises the power hub 3000 and five irregular shaped micro grid processor modules 3210 (see FIG. 8A) in the docking bays 452 at tier one of the power hub 3000. Each processor module 3210 comprises a micro grid of nine processors physically positioned in tier one. Tier one is a next tier that is vertically just above tier zero of a vertical arrangement of tiers. The nine processors of processor module 3210 include a unique processor 60 as discussed supra. Each micro grid processor module 3210 may be replaced by a processor having other than nine processors therein such as, inter alia, a micro grid processor module 3220 (see FIG. 8A) comprising eighteen processors that include a unique processor 60. Generally, each micro grid processor module 3210 comprises a plurality of processors that includes a unique processor having a unique operating system differing from an operating system in each other processor of the plurality of processors, wherein the plurality of processors may comprise any features or characteristics comprised by the plurality of processors 65 of FIG. 1 as described supra. As in FIG. 12A, the micro grid apparatus 4130 in FIG. 12B comprises a tri-state light emitting diode 3110 on a topside surface of a radial arm 3111 of the power hub 3000.

Figure 12C:
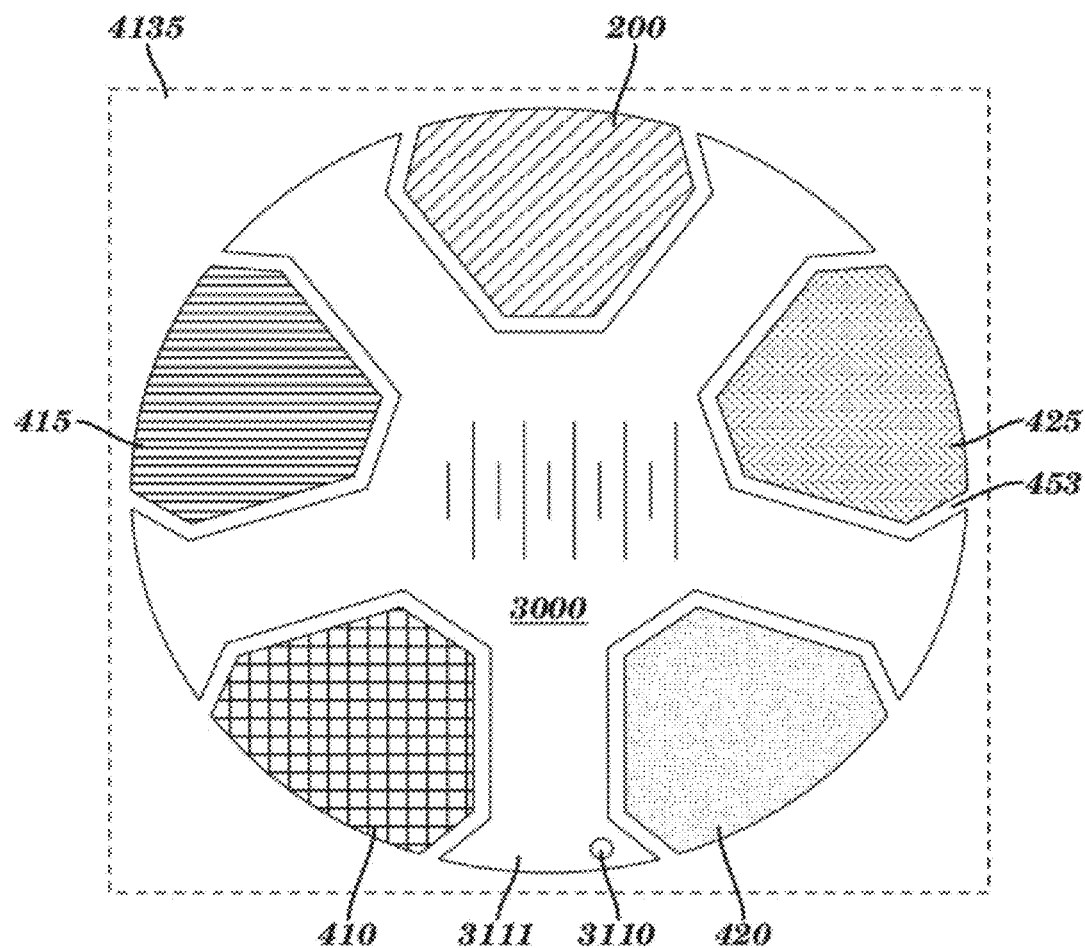
FIG. 12C is a diagram of a micro grid apparatus comprising a power hub with an assortment of irregular shaped modules, in accordance with embodiments of the present invention.

FIG. 12C is a diagram of a micro grid apparatus 4135, in accordance with embodiments of the present invention. The micro grid apparatus 4135 of FIG. 12C comprises the power hub 3000 and five irregular shaped modules (Random Access Memory (RAM) module 200, communications module 425, Global Positioning System (GPS) module 420, input and output (I/O) module 410, and a micro grid wireless module embodying micro grid wireless connection points 415) (see FIG. 8B) in the docking bays 453 at tier two of the power hub 3000. Tier two is a next tier that is vertically just above tier one of a vertical arrangement of tiers. In the embodiment of FIG. 12C, each module in tier 2 is a different type of module. In one embodiment, each irregular shaped module in tier two provides a functionality for responding to an alert pertaining to an event, wherein a macro grid and associated artificial intelligence may be employed in response to the event as described supra. As in FIGS. 12A and 12B, the micro grid apparatus 4135 in FIG. 12C comprises a tri-state light emitting diode 3110 on a topside surface of a radial arm 3111 of the power hub 3000.

FIG. 13A is a vertical section diagram showing a micro grid assembly 4300 comprising a micro grid power hub 3000, in accordance with embodiments of the present invention. The assembly 4300 is for a fixed, mobile or remote micro grid computing system. Three docking bays 451, 452, and 453 are shown in tier zero (0), tier one (1), and tier two (2), respectively. The docking bays 451, 452, and 453 are each defined by a pair of adjacent radial arms connected to a central area of the central power hub 3000 as described supra in conjunction with FIG. 8B. The tiers (tier 0, tier 1, tier 2) in the central power hub 3000 are distributed and sequenced in a vertical direction 4410 such that each tier is at a different vertical level in the vertical direction 4410. The vertical direction 4410 is perpendicular to the central area. Each radial arm of the central power hub 3000 extends radially outward from the central area in a radial direction that is perpendicular to the vertical direction 4410. Docking bay 453 in tier 2 is vertically aligned directly above docking bay 452 in tier 1, and docking bay 452 in tier 1 is vertically aligned directly above the docking bay 451 in tier 0, which defines a first vertical tier structure consisting of docking bays 451, 452, and 453 arranged in accordance with he aforementioned vertical alignments.

A micro grid sensor structure 4150 is positioned in the docking bay 451 at tier zero at a connection point 305 in the power hub 3000. An irregular shaped micro grid processor module 3210 (having nine processors) 420 is positioned in the docking bay 452 at tier one at another connection point 305 in the power hub 3000. The GPS irregular shaped module 420 is positioned in the docking bay 453 at tier two at another connection point 305 in the power hub 3000. The micro grid sensor structure 4150 comprises a micro grid sensor module 4100 and its input plugs 4120. The input plugs 4120 comprise a connection point 4105 for direct physical connection to a plurality of types of electrical functioning sampling devices and a structural lip 4320 for securing the sensor structure 4150 to a structural bulkhead or base plate.

The micro grid sensor module 4100 is latched into position by the protrusion 320 on both sides of the micro grid sensor module 4100, fitting into receptors of the same size located on the inside radial arms of the power hub 3000. Power and bus connection is made at the 'V' shaped edge between the connection point 310 of the sensor module 4100 and the connection point 305 of the power hub 3000.

The micro grid processor module 3210 is latched down in the tier one position of the docking bay 452 of the power hub 3000.

The GPS irregular shaped module 420 is latched down in the docking bay 453 at the tier two position of the power hub 3000, with protrusion 320 also fitting into the two receptors of the same size located on tier two of the inside radial arms of the power hub 3000.

A circular shaped solar power skin 3905 is positioned over tier two of the inside radial arms of the power hub 3000 for covering and latching down over the power hub 3000, and also for providing solar energy for battery charging and voltage integrity to the power hub 3000 in fixed, mobile, and/or remote locations as discussed infra in relation to FIGS. 14A, 14B, and 15, and 17B.

FIG. 13B is a vertical section diagram showing an assembly 4400 comprising a micro grid power hub 3000, in accordance with embodiments of the present invention. The assembly 4400 is for a fixed, mobile or remote micro grid computing system. Three docking bays 461, 462, and 463 are shown in tier zero (0), tier one (1), and tier two (2), respectively. The vertical direction 4410 is perpendicular to the central area and each radial arm of the central power hub 3000 extends radially outward from the central area in a radial direction that is perpendicular to the vertical direction 4410. Docking bay 463 in tier 2 is vertically aligned directly above docking bay 462 in tier 1, and docking bay 462 in tier 1 is vertically aligned directly above the docking bay 461 in tier 0, which defines a second vertical tier structure consisting of docking bays 461, 462, and 463 arranged in accordance with he aforementioned vertical alignments.

A micro grid actuator structure 4250 is positioned in the docking bay 461 at tier zero at a connection point 305 in the power hub 3000. An irregular shaped micro grid processor module 3210 (having nine processors) 420 is positioned in the docking bay 462 at tier one at another connection point 305 in the power hub 3000. The wireless irregular shaped module 415 (e.g., an 802.11s Mesh Wireless irregular shaped module) is positioned in the docking bay 463 at tier two at another connection point 305 in the power hub 3000. The micro grid actuator structure 4150 comprises a micro grid actuator module 4100 and its output sockets 4220. The output sockets 4220 comprise a connection point 4205 for direct physical connection to a plurality of types of electrical functioning driving (i.e., actuating) devices and a structural lip 4320 for securing the actuator structure 4250 to a structural bulkhead or base plate.

The micro grid actuator module 4200 is latched into position by the protrusion 320 on both sides of the micro grid actuator module 4200, fitting into receptors of the same size located on the inside radial arms at the docking bay 461 of the power hub 3000. Power and bus connection is made at the 'V' shaped edge between the connection point 310 of the actuator module 4200 and the connection point 305 of the power hub 3000.

The micro grid processor module 3210 is latched down in the tier one position at the docking bay 462 of the power hub 3000.

The micro grid wireless irregular shaped module 415 is latched down in the tier two position of the docking bay 463 of the power hub 3000, with protrusion 320 also fitting into the two receptors of the same size located on tier two of the inside radial arms of the power hub 3000.

Figure 14A:
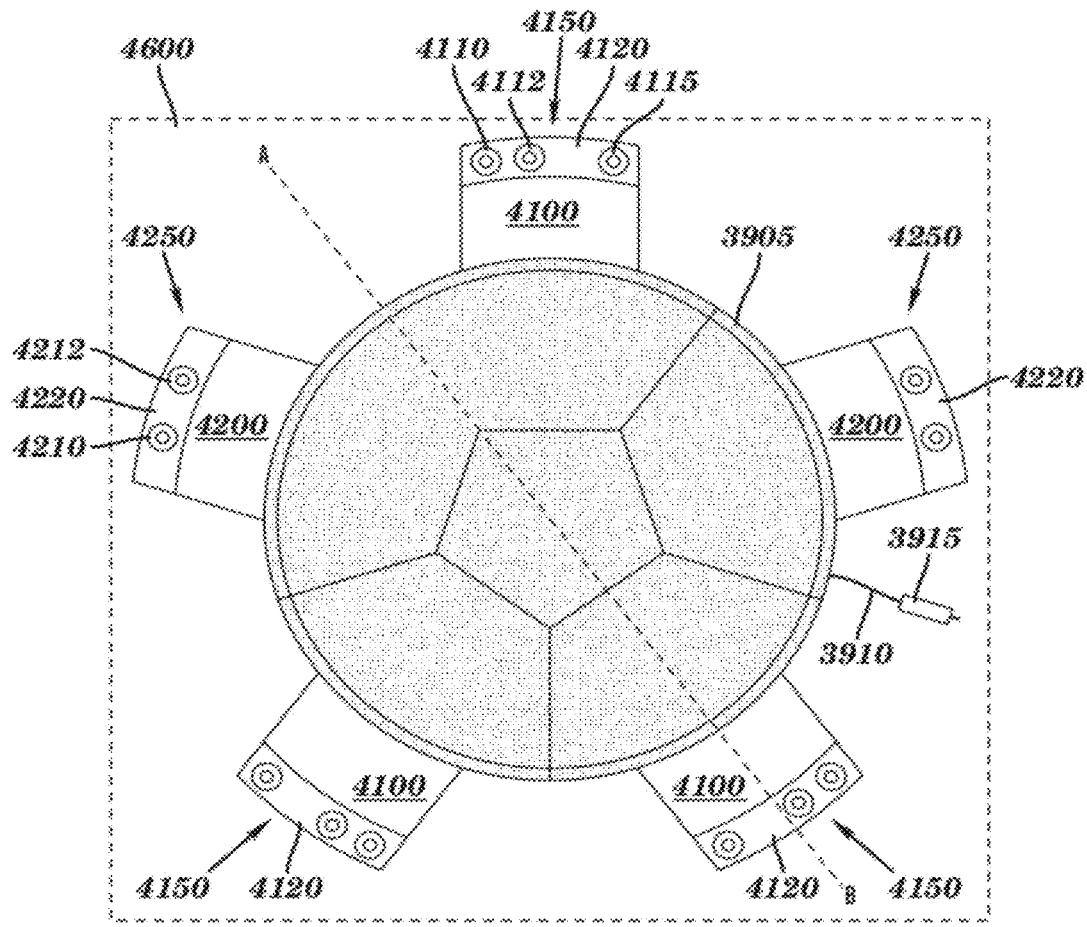
FIG. 14A is a top view of a micro grid apparatus, in accordance with embodiments of the present invention.
Figure 14B:
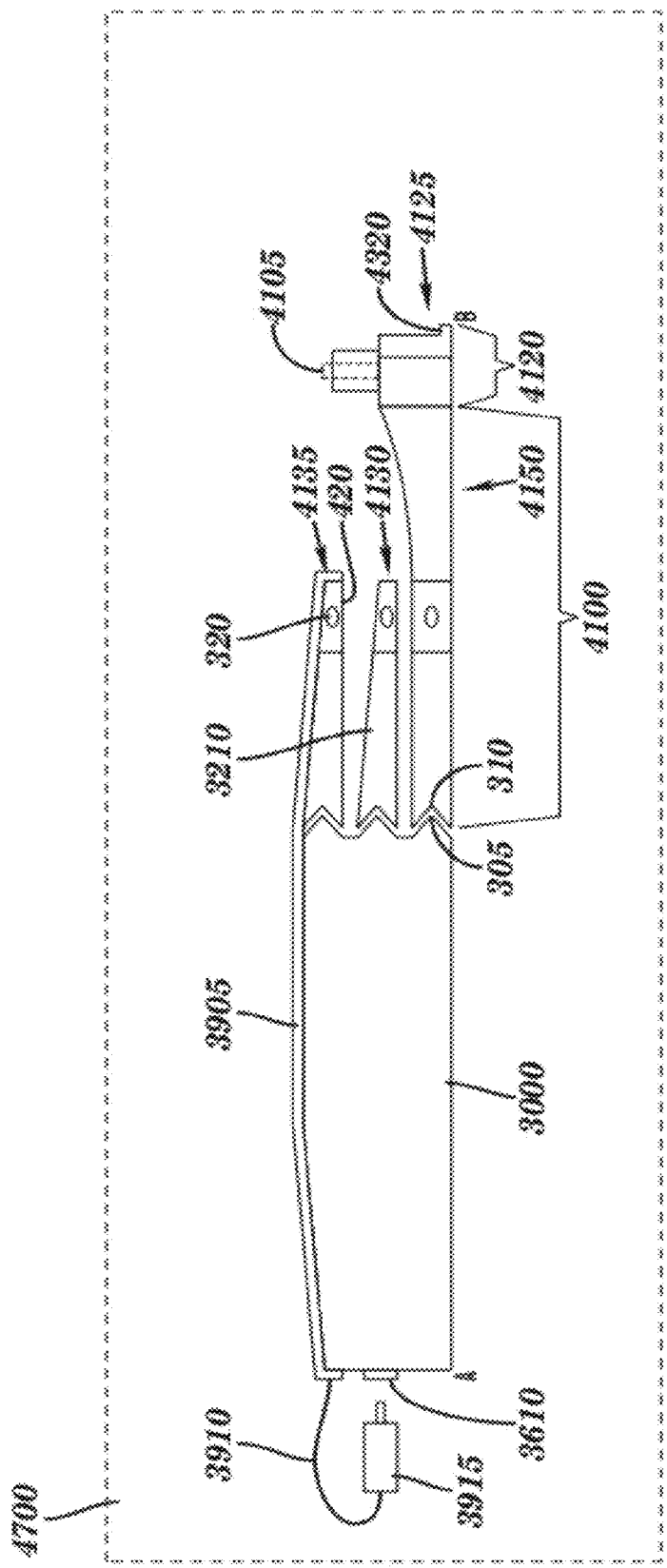
FIG. 14B is a vertical cross-sectional view along a line A-B depicted in FIG. 14A, showing a circular shaped micro grid solar power skin covering a power hub and irregular shaped modules for a vertical arrangement of tiers, in accordance with embodiments of the present invention.

A circular shaped solar power skin 3905 is positioned over tier two of the inside radial arms of the power hub 3000 for covering and latching down over the power hub 3000 and irregular shaped modules, and also for providing solar energy for battery charging and voltage integrity to the power hub 3000 in fixed, mobile, and/or remote locations an discussed infra in relation to FIGS. 14A and 14B.

FIG. 14A is a top view of a micro grid apparatus 4600, in accordance with embodiments of the present invention. The micro grid apparatus 4600 is a fixed, mobile, or remote micro grid computing instrument sensor and actuator driver system apparatus that includes three micro grid sensor structures 4150 (see FIGS. 11A and 12A), two micro grid actuator structures 4250 (see FIGS. 11B and 12A), and a circular shaped micro grid solar power skin 3905.

The micro grid apparatus 4600 covers tiers zero, one, and two of a vertical arrangement of tiers, which will be described infra in greater spatial detail in FIG. 14B.

As described supra in conjunction with FIG. 11A, each micro grid sensor structure 4150 comprises a micro grid sensor module 4100 and its input plugs 4120, wherein the input plugs 4120 comprise three input pin connections (4110, 4112, 4115), wherein the input pin connections 4110 and 4112 are independent electrical signal receivers, and wherein the input pin connection 4115 is an electrical trigger receiving point.

As described supra in conjunction with FIG. 11B, each micro grid actuator structure comprises a micro grid actuator module 4200 and its output sockets 4220, wherein the output sockets 4220 comprise two output socket connections (4210, 4212), and wherein each output socket connection is an independent electrical function-generator output point.

The solar power skin 3905 has an internal diameter (3926) to fit over the power hub 3000 and an external diameter (3925) to cover and latch down over the power hub 3000. In one embodiment, the internal diameter (3926) is 10 cm. and the external diameter (3925) is 10.5 cm.

In one embodiment, the micro grid solar power skin is arranged as a moulded composite of one central and five surrounding polygonal shapes, with a connection cable 3910 and power plug 3915 for attachment to a power socket 3610 (see FIG. 14B) on the radial arm of the power hub 3000 to transmit power from the micro grid solar power skin 3905 to the power hub 3000.

The micro grid solar power skin 3905 extracts available solar energy from the sun's electromagnetic radiation field, which may be used to recharge or power the batteries in the micro grid power hub 3000 for some fixed, some mobile, and some remote locations where normal mains power supplies are unavailable and cloud computing is required to operate.

Thus, the solar power skin covers the power hub 3000, wherein an internal portion of the solar power skin fits over the power hub 3000 and an outer portion of the solar power skin covers and latches down over the power hub 3000. The solar power skin extracts available solar energy from the sun's electromagnetic radiation field and is electrically connected to the power hub 3000 to recharge or power the rechargeable batteries in the power hub 3000.

The micro grid solar power skin (3905) may comprise any material known in the art as being capable of extracting available solar energy from the sun's electromagnetic radiation field for storage and subsequent usage. In one embodiment, the micro grid solar power skin (3905) may comprise a material comprising copper, indium, gallium, and selenite (CIGS).

FIG. 14B is a vertical cross-sectional view 4700 along a line A-B depicted in FIG. 14A, showing a circular shaped micro grid solar power skin 3905 covering the power hub 3000 and irregular shaped modules for a vertical arrangement of tiers, in accordance with embodiments of the present invention. The vertical arrangement of tiers comprises tier zero (0), tier one (1), and tier two (2).

Tier zero comprises the micro grid apparatus 4125 of FIG. 12A which includes any combination of micro grid sensor structures 4150 and micro grid actuator structures 4250 as discussed supra. A micro grid sensor structure 4150 is explicitly depicted in FIG. 14B for illustrative purposes.

Tier one comprises the micro grid apparatus 4130 of FIG. 12B which includes micro grid processor modules 3210, wherein each micro grid processor module 3210 includes nine processors in one embodiment. The input plugs 4120 comprise connection pins 4105 and a structural lip 4320 for securing the sensor module 4100 to a structural bulkhead or base plate.

Tier two comprises the micro grid apparatus 4135 of FIG. 12C which includes irregular shaped modules 200, 415, 410, 420, and 425 of which irregular shaped GPS module 420 is explicitly denoted in FIG. 14B.

In FIG. 14B, the solar power skin 3905 covers, is latched to, and is in direct mechanical contact with the power hub 3000 and the irregular shaped module 420 of the micro grid apparatus 4135 of FIG. 12C. The power plug 3915 attached to the solar power skin 3905 is inserted into the power socket or receptacle 3610 on the end of a radial arm of the micro grid power hub apparatus 3000 to sufficiently recharge and maintain battery power for, inter alia, fixed, mobile, and/or remote locations where cloud computing and other utilizations are implemented.

Figure 14C:
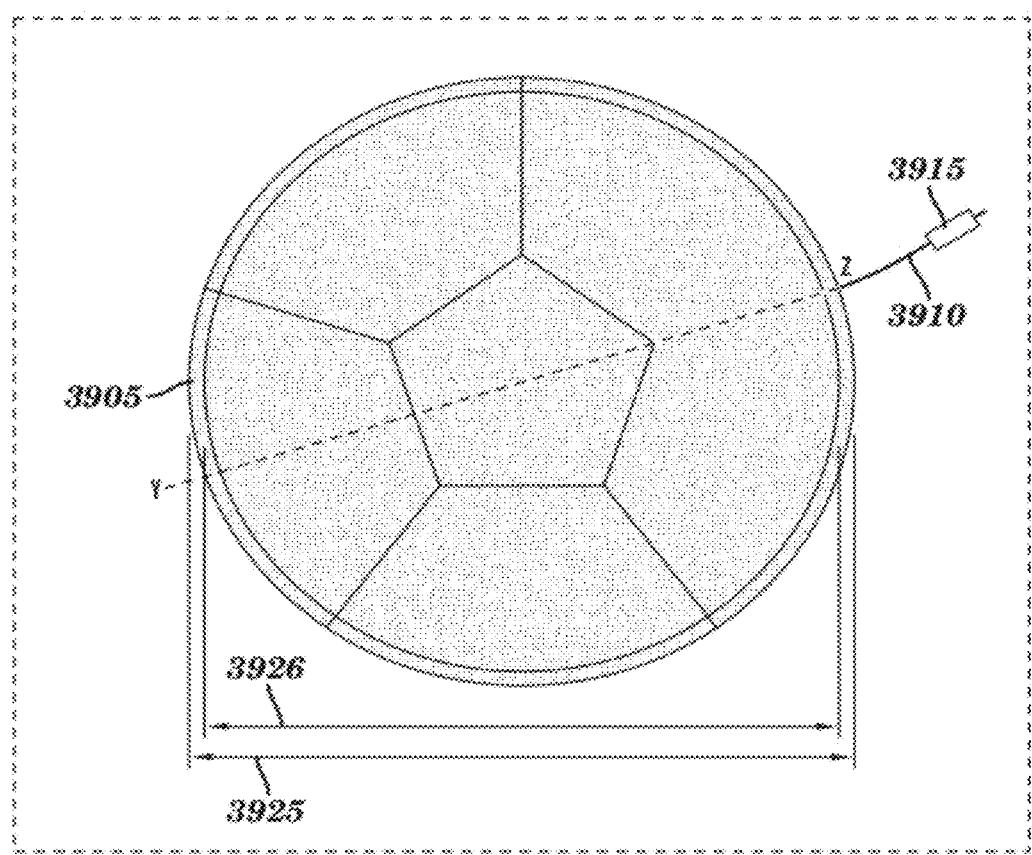
FIG. 14C is a top view of a micro grid apparatus covered with a solar power skin, in accordance with embodiments of the present invention.

FIG. 14C is a top view of a micro grid apparatus covered with a solar power skin, in accordance with embodiments of the present invention. The micro grid apparatus is a fixed, mobile, or remote micro grid computing system apparatus that in one embodiment includes a thermal dissipation fan 3921, a thermal fan body 9320, a thermal fan carriage assembly 3922 (see FIG. 14D), and a circular shaped micro grid solar power skin 3905.

The solar power skin 3905 has an internal diameter (3926) to fit over the thermal fan assembly and an external diameter (3925) to cover and latch down over the embodied micro grid apparatus 1310 (see FIG. 14D) and thermal fan carriage. In one embodiment, the internal diameter (3926) is 10 cm. and the external diameter (3925) is 10.5 cm.

In one embodiment, the micro grid solar power skin is arranged as a moulded composite of one central and five surrounding polygonal shapes, with a connection cable 3910 and power plug 3915 for attachment to a power socket on the multi-layered circuit board of the micro grid apparatus to transmit power from the micro grid solar power skin 3905 to the plurality of connected fail-safe battery modules, and plurality of connected power hubs 3000 and/or power towers.

The micro grid solar power skin 3905 extracts available solar energy from the sun's electromagnetic radiation field, which may be used to recharge or power the batteries in the micro grid apparatus for some fixed, some mobile, and some remote locations where normal mains power supplies are unavailable and cloud computing is required to operate.

Thus, the solar power skin 3905 covers the micro grid apparatus, wherein an internal portion of the solar power skin fits over the thermal fan's assembly and an outer portion of the solar power skin covers and latches down over the thermal fan carriage assembly 3922, a polygonal formed structure, creating a plurality of air plenums 3924, a plurality of air vents 3923 (see FIG. 14D) and a plurality of air intakes (not shown). The solar power skin extracts available solar energy from the sun's electromagnetic radiation field and is electrically connected to the micro grid multi-layered printed circuit board to recharge or power the rechargeable batteries in the micro grid apparatus.

Figure 14D:
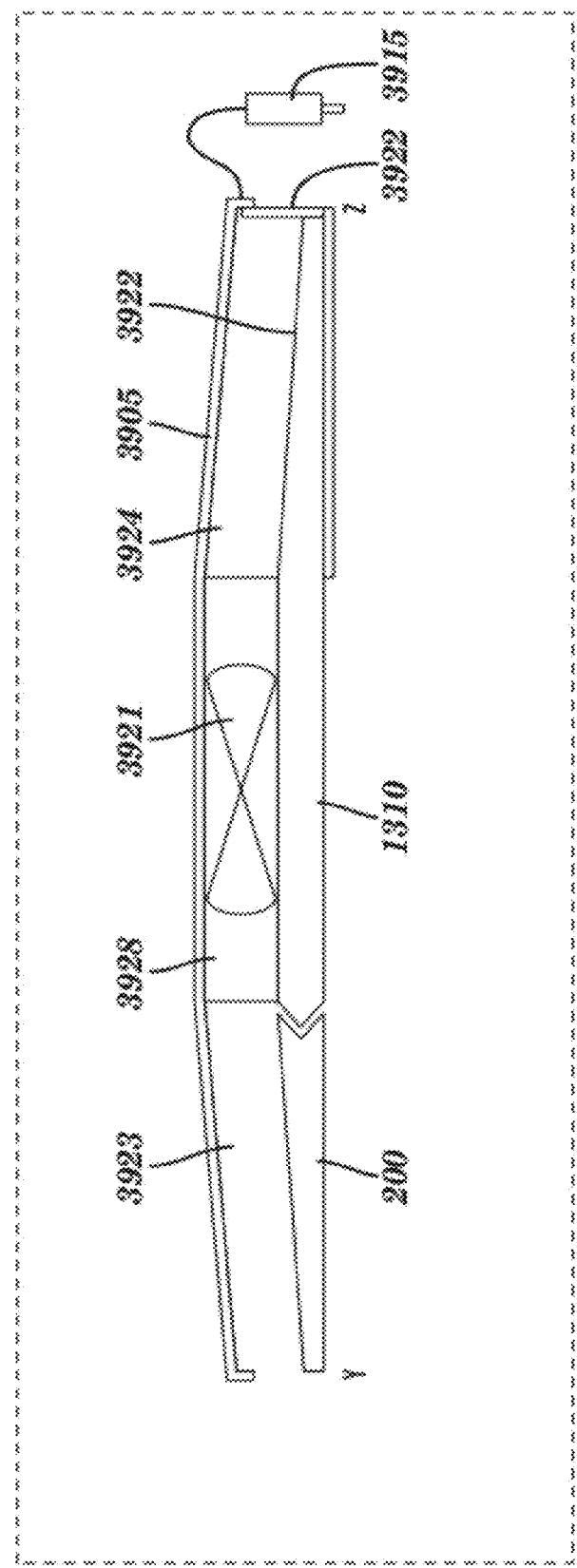
FIG. 14D is a vertical cross-sectional view along a line Y-Z depicted in FIG. 14C, showing a solar power skin and fan assembly on top of a micro grid apparatus and a connected irregular shaped module, in accordance with embodiments of the present invention.

FIG. 14D is a vertical cross-sectional view along a line Y-Z depicted in FIG. 14C, showing a solar power skin and thermal fan assembly on top of a micro grid apparatus 1310 and a connected irregular shaped module 200, in accordance with embodiments of the present invention. The micro grid apparatus 1310 represents any micro grid apparatus of the present invention such as the micro grid apparatus 100 of FIG. 1, the micro grid structure 1320 of FIG. 8A, etc.). The micro grid apparatus 1310 may be connected to a micro grid power hub 3000 as depicted in FIG. 8A. One or more docking bays of the micro grid apparatus 1310 may comprise an irregular shaped module that includes one or more rechargeable batteries (e.g., the irregular shaped module 3100 comprising a failsafe battery as depicted in FIG. 8A). The micro grid apparatus 1310 may be comprised by any system of the present invention (e.g., the micro grid apparatus 100 in the computer system 50 of FIG. 1 or the micro grid structure 1320 in the connectivity structure 9100 of FIG. 8A which may be regarded as a system).

In FIG. 14D, the solar power skin 3905 covers, is latched to, and is in direct mechanical contact with the thermal fan carriage assembly 3922 embodying the thermal fan 3921, the thermal fan body 9320 on top of the micro grid apparatus 1310. The power plug 3915 attached to the solar power skin 3905 is inserted into a socket (not shown) on the multi-layered printed circuit board on which the micro grid apparatus 1310 is permanently positioned by its connection pins, to sufficiently recharge and maintain battery power for, inter alia, fixed, mobile, and/or remote locations where cloud computing and other utilizations are implemented.

Figure 14E:
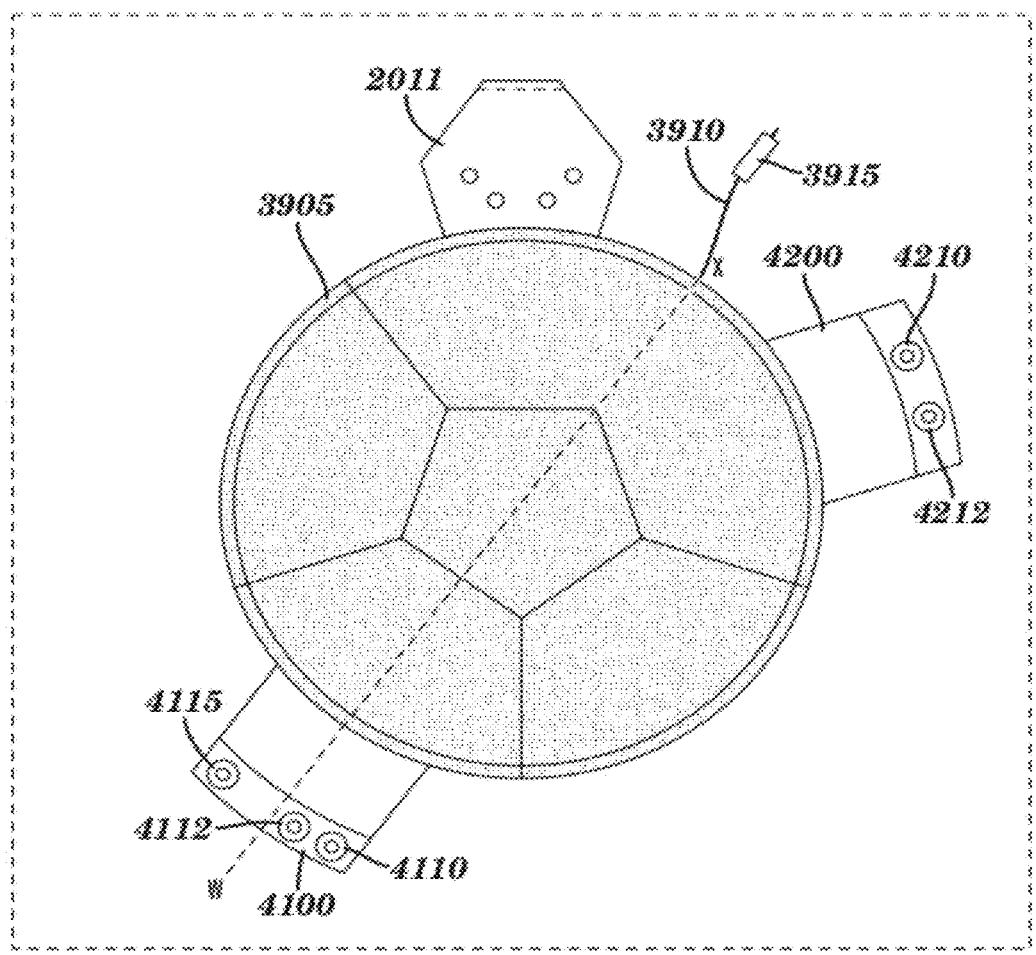
FIG. 14E is a top view of a micro grid apparatus, embodying one bridge module, a sensor module and an actuator module, in accordance with embodiments of the present invention.

FIG. 14E is a top view of a micro grid apparatus, embodying one bridge module, a sensor module and an actuator module, in accordance with embodiments of the present invention. The micro grid apparatus in FIG. 14E is a fixed, mobile, or remote bridged micro grid computing instrument sensor and actuator driver system apparatus that includes one micro grid sensor module 4100, one micro grid actuator module 4200, one micro grid bridge unit 2011 of a micro grid bridge module 2010 (see FIG. 8A), and a circular shaped micro grid solar power skin 3905.

As described supra in conjunction with FIG. 11A, each micro grid sensor structure 4150 comprises a micro grid sensor module 4100 and its input plugs 4120, wherein the input plugs 4120 comprise three input pin connections (4110, 4112, 4115), wherein the input pin connections 4110 and 4112 are independent electrical signal receivers, and wherein the input pin connection 4115 is an electrical trigger receiving point.

As described supra in conjunction with FIG. 11B, each micro grid actuator structure comprises a micro grid actuator module 4200 and its output sockets 4220, wherein the output sockets 4220 comprise two output socket connections (4210, 4212), and wherein each output socket connection is an independent electrical function-generator output point.

The solar power skin 3905 has an internal diameter (3926) to fit over the thermal fan assembly and an external diameter (3925) to cover and latch down over the embodied micro grid apparatus and thermal fan carriage. In one embodiment, the internal diameter (3926) is 10 cm. and the external diameter (3925) is 10.5 cm.

In one embodiment, the micro grid solar power skin 3905 is arranged as a moulded composite of one central and five surrounding polygonal shapes, with a connection cable 3910 and power plug 3915 for attachment to a power socket on the multi-layered circuit board of the micro grid apparatus to transmit power from the micro grid solar power skin 3905 to the plurality of connected fail-safe battery modules, and plurality of bridge connected power hubs 3000 and/or power towers.

The micro grid solar power skin 3905 extracts available solar energy from the sun's electromagnetic radiation field, which may be used to recharge or power the batteries in the micro grid apparatus for some fixed, some mobile, and some remote locations where normal mains power supplies are unavailable and cloud computing is required to operate.

Thus, the solar power skin 3905 covers the micro grid apparatus 1310, wherein an internal portion of the solar power skin fits over the thermal fan's assembly and an outer portion of the solar power skin covers and latches down over the thermal fan carriage assembly 3922, (a polygonal structure), creating a plurality of air plenums 3924, a plurality of air vents 3923 and a plurality of air intakes (not shown). The solar power skin extracts available solar energy from the sun's electromagnetic radiation field and is electrically connected to the micro grid multi-layered printed circuit board to recharge or power the rechargeable batteries in the micro grid apparatus 1310.

Figure 14F:
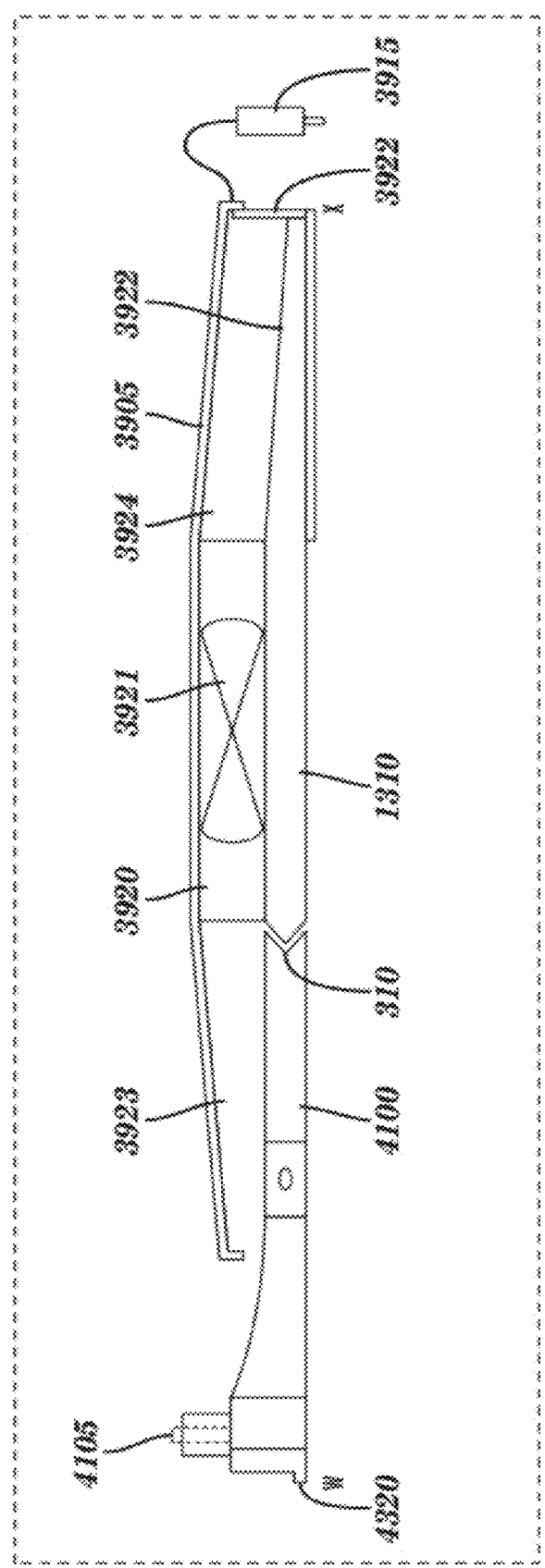
FIG. 14F is a vertical cross-sectional view along a line W-X depicted in FIG. 14E, showing a solar power skin and fan on top of a micro grid apparatus and a connected sensor module, in accordance with embodiments of the present invention.

FIG. 14F is a vertical cross-sectional view along a line W-X depicted in FIG. 14E, showing a solar power skin and fan on top of a micro grid apparatus 1310 and a connected sensor module, in accordance with embodiments of the present invention.

The micro grid apparatus in FIG. 14F includes any combination of micro grid sensor modules 4100 and micro grid actuator modules 4200 as discussed supra.

A micro grid sensor module 4100 is explicitly depicted in FIG. 14F for illustrative purposes. The input plugs comprise connection pins 4105 and a structural lip 4320 for securing the sensor module to a structural bulkhead or base plate.

The solar power skin 3905 has an internal diameter (3926) to fit over the thermal fan assembly and an external diameter (3925) to cover and latch down over the embodied micro grid apparatus and thermal fan carriage. In one embodiment, the internal diameter (3926) is 10 cm. and the external diameter (3925) is 10.5 cm.

In one embodiment, the micro grid solar power skin is arranged as a moulded composite of one central and five surrounding polygonal shapes, with a connection cable 3910 and power plug 3915 for attachment to a power socket on the multi-layered circuit board of the micro grid apparatus to transmit power from the micro grid solar power skin 3905 to the plurality of connected fail-safe battery modules, and plurality of connected power hubs 3000 and/or power towers.

The micro grid solar power skin 3905 extracts available solar energy from the sun's electromagnetic radiation field, which may be used to recharge or power the batteries in the micro grid apparatus for some fixed, some mobile, and some remote locations where normal mains power supplies are unavailable and cloud computing is required to operate.

Thus, the solar power skin 3905 covers the micro grid apparatus, wherein an internal portion of the solar power skin fits over the thermal fan's assembly and an outer portion of the solar power skin covers and latches down over the thermal fan carriage assembly 3922, a polygonal formed structure, creating a plurality of air plenums 3924, a plurality of air vents 3923 and a plurality of air intakes (not shown). The solar power skin extracts available solar energy from the sun's electromagnetic radiation field and is electrically connected to the micro grid multi-layered printed circuit board to recharge or power the rechargeable batteries in the micro grid apparatus.

In FIG. 14F, the solar power skin 3905 covers, is latched to, and is in direct mechanical contact with the thermal fan carriage assembly 3922 embodying the thermal fan 3921, the thermal fan body 9320 on top of the micro grid apparatus 1310. The power plug 3915 attached to the solar power skin 3905 is inserted into a socket (not shown) on the multi-layered printed circuit board on which the micro grid apparatus 1310 is permanently positioned by its connection pins, to sufficiently recharge and maintain battery power for, inter alia, fixed, mobile, and/or remote locations where cloud computing and other utilizations are implemented.

Thus, the embodiments of the present invention described in accordance with FIGS. 14C, 14D, 14E, and 14F may be implemented in a system that comprises a micro grid apparatus, N irregular shaped modules such that N is at least 3, rechargeable batteries for providing electrical power to the micro grid apparatus and the N irregular shaped modules, and a solar power skin. The micro grid apparatus comprises a central area to which N radial arms are connected, wherein the radial arms are external to and integral with the central area, wherein each radial arm extends radially outward from the central area, wherein the central area comprises a plurality of processors that are linked together wirelessly or by direct electrical connection, and wherein each pair of adjacent radial arms defines a docking bay which defines N docking bays. Each irregular shaped module of the N irregular shaped modules is latched in a respective docking bay of the N docking bays, wherein the plurality of processors are linked wirelessly or by direct electrical connection to each irregular shaped module. The solar power skin covers the central area, the N radial arms, and the N modules, wherein the solar power skin extracts available solar energy from the sun's electromagnetic radiation field and is electrically connected to the rechargeable batteries for recharging and/or powering the rechargeable batteries. In one embodiment, the solar power skin is arranged as a molded composite of one central region and N surrounding polygonal shapes, wherein each polygonal shape of the N surrounding polygonal shapes is in direct alignment over a corresponding docking bay of the N docking bays.

Figure 15:
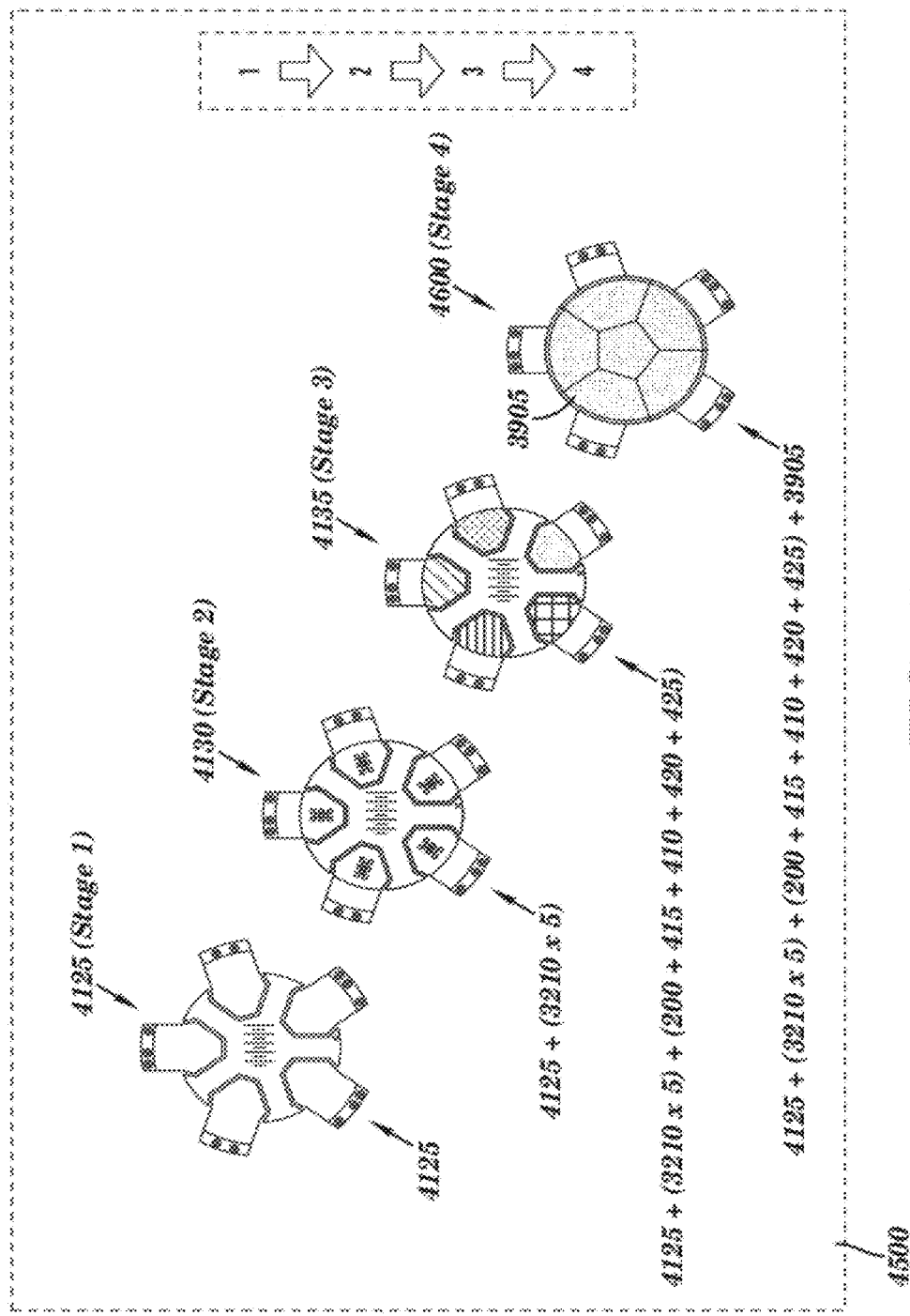
FIG. 15 is a sequence diagram showing four stages of assembly of a fixed, mobile or remote micro grid computing sensor and actuator system apparatus, in accordance with embodiments of the present invention.

FIG. 15 is a sequence diagram 4500 showing four stages of assembly of a fixed, mobile or remote micro grid computing sensor and actuator system apparatus, in accordance with embodiments of the present invention. The fixed, mobile or remote micro grid computing sensor and actuator system apparatus being assembled is a tier comprising a vertical arrangement of tiers that includes tier zero, tier one, and tier two. The four stages are stage one, stage two, stage three, and stage four during which tier zero, tier one, tier two, and the solar power skin 3905 of FIGS. 14A and 14B, respectively, are assembled with respect to forming the vertical arrangement of tiers.

During stage one, the micro grid apparatus 4125 of FIG. 12A is assembled in tier zero as described supra. As depicted in FIG. 12A and described supra, the micro grid apparatus 4125 comprises any combination of micro grid sensor structures 4150 and micro grid actuator structures 4250. The three micro grid sensor structures 4150 in FIG. 12A provide a combined sensor interface capability of six signal input channels and three timing input channels. The two micro grid actuator structures 4250 in FIG. 12A provide a combined actuator driver interface of two digital electrical signal output channels and two analogue electrical signal output channels.

During stage two, the micro grid apparatus 4130 of FIG. 12B is assembled in tier one as described supra. As depicted in FIG. 12B and described supra, the micro grid apparatus 4130 comprises micro grid processor modules 3210, wherein each micro grid processor module 3210 includes nine processors in one embodiment. The five grid processor modules 3210 in FIG. 12B provide a combined total of fifty micro grid processors (i.e., forty-five processors in tier one, and five embedded within micro grid sensor structures 4150 and micro grid actuator structures 4250 in FIG. 12A). In one embodiment, the micro grid apparatus 4130 of FIG. 12B is assembled in stage two after the micro grid apparatus 4125 of FIG. 12A is assembled in stage one.

During stage three, the micro grid apparatus 4135 of FIG. 12C is assembled in tier two as described supra. As depicted in FIG. 12C and described supra, the micro grid apparatus 4135 comprises irregular shaped modules 200, 415, 410, 420, and 425. In one embodiment, the irregular shaped RAM module 200 comprises one terabyte of random access memory. In one embodiment, a mesh wireless (802.11s) micro grid wireless connection points module 415 may be used in conjunction with a frequency hopping communication method. In one embodiment, a standard I/O module 410 may comprise three USB2 interface ports for interfacing to standard I/O devices such as keyboards and pointing devices. In one embodiment, a GPS module 420 may be used for constant detection of the location of the micro grid apparatus. In one embodiment, a communications module 425 may be used for wireless 802.11g micro grid unique processor communication of alert scales and micro grid processor housekeeping including assignment and availability, and two optical Ethernet connection points for physical local area network (LAN) attachment and communication. In one embodiment, the micro grid apparatus 4135 of FIG. 12C is assembled in stage three after the micro grid apparatus 4130 of FIG. 12B is assembled in stage two.

In stage four after completion of stage three, the solar power skin 3905 of FIGS. 14A and 14B is attached to and covers the micro grid apparatus 4135 of FIG. 12C in tier two as described supra. The solar power skin 3905 utilizes solar energy for battery charging and providing voltage integrity for the micro grid apparatus of the present invention.

In one embodiment, the power hub 3000 comprises fifteen docking bays, each docking bay having a composite micro grid bus connection point, embodied in a 12 volt, 5 amp hour battery complex shaped structure.

Figure 16:
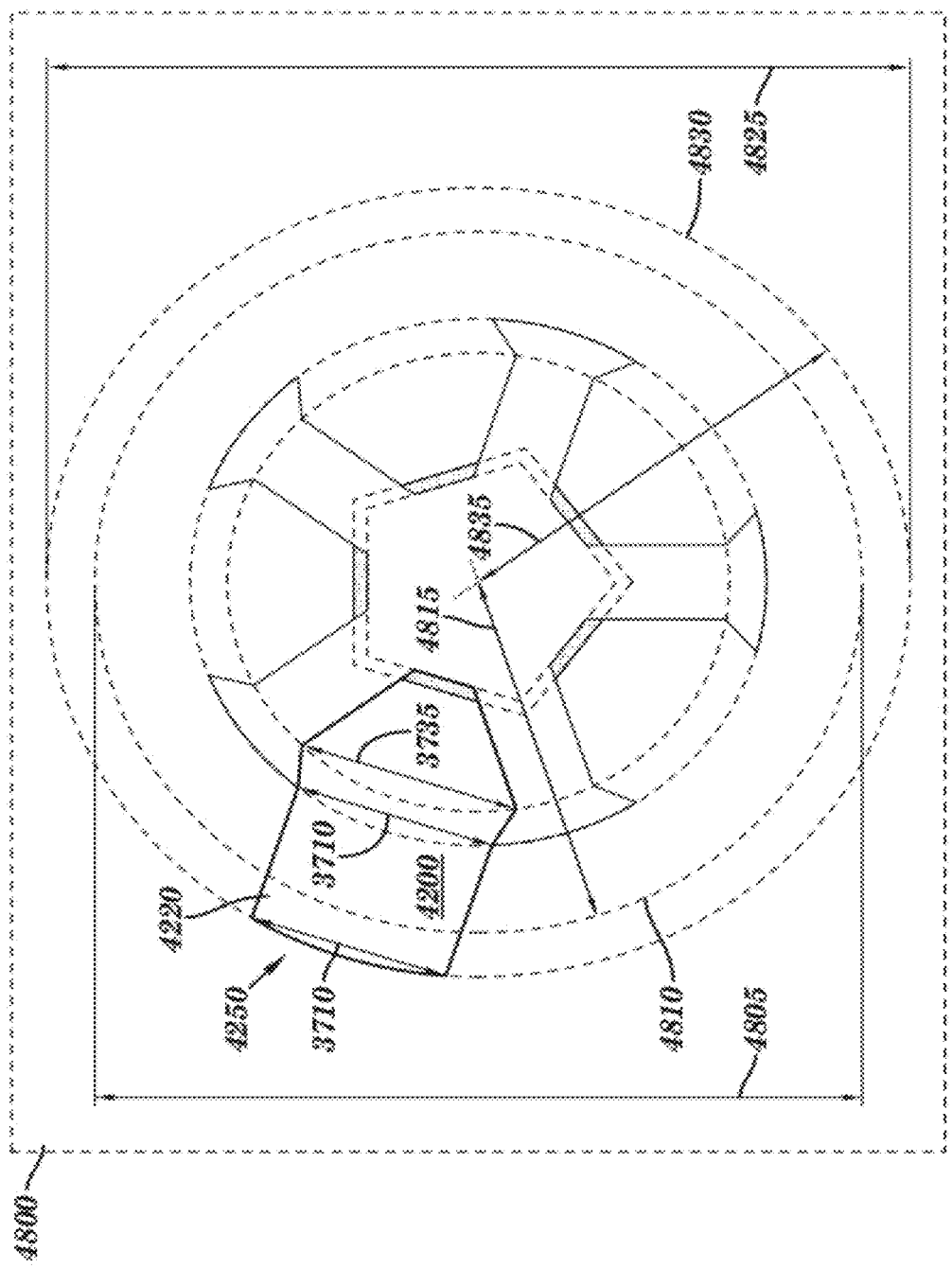
FIG. 16 is a diagram showing geometric dimensions of a micro grid actuator structure or a micro grid sensor structure, in accordance with embodiments of the present invention.

FIG. 16 is a diagram 4800 showing geometric dimensions of a micro grid actuator structure 4250 or a micro grid sensor structure 4150, in accordance with embodiments of the present invention. The micro grid actuator structure 4250 comprises a micro grid actuator module 4200 and output sockets 4220. Exemplary values for the geometric dimensions of the micro grid actuator structure 4250 in FIG. 16, which are also applicable to a micro grid sensor structure 4150 of the present invention, are as follows.

The dimensions of the outer physical circle (4830) are: diameter (4825)=15 cm and radius (4835)=7.5 cm.

The dimensions of the adjacent inner physical circle (4810) are: diameter (4805)=13.4 cm and radius (4815)=6.7 cm.

The cord (3710) of the outer circle (4830) and second inner circle=3.5 cm.

The cord (3735) of the first inner circle=4.0 cm.

Figure 17A:
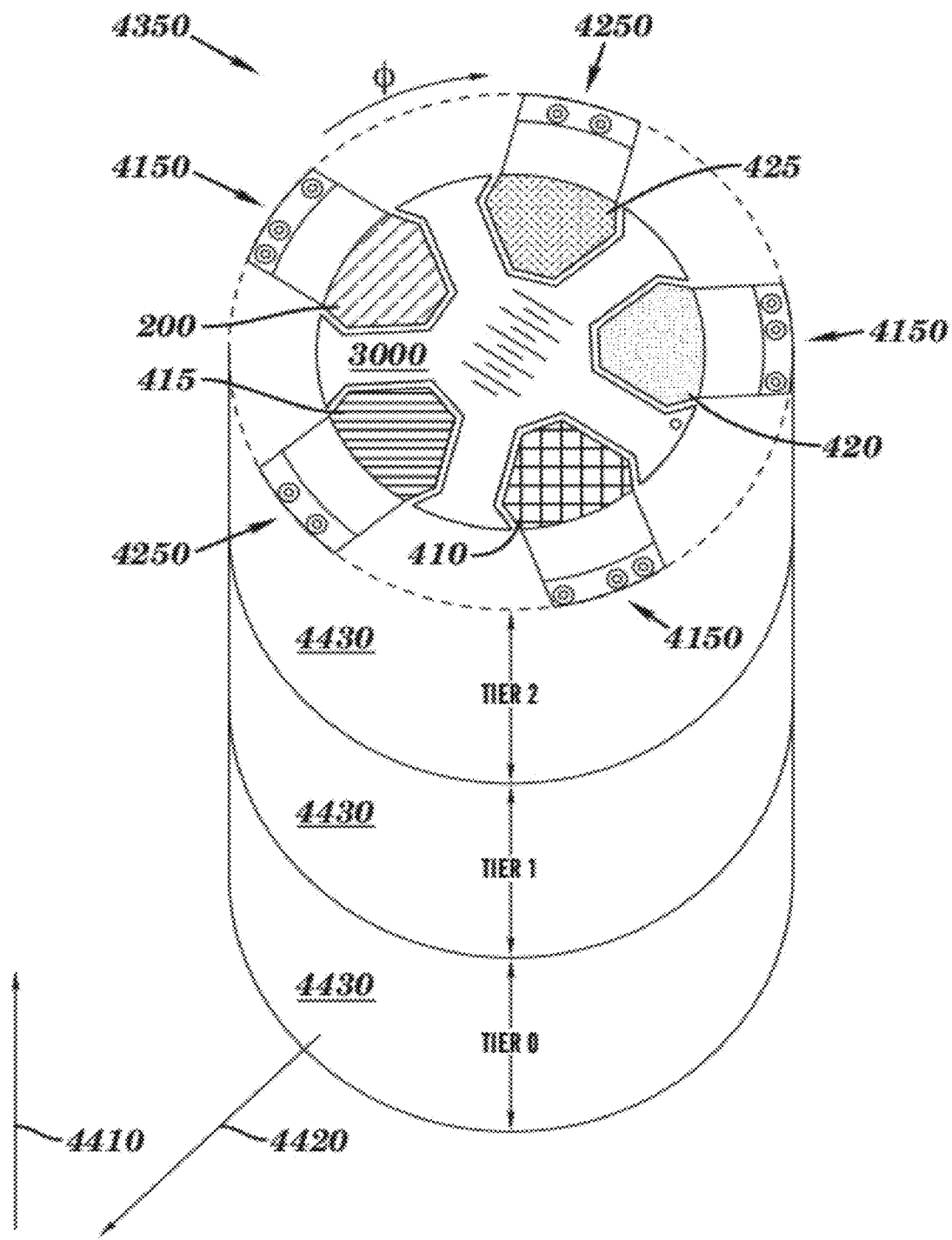
FIG. 17A depicts a complex power hub apparatus, in accordance with embodiments of the present invention.

FIG. 17A depicts a complex power hub apparatus 4350, in accordance with embodiments of the present invention. The complex power hub apparatus 4350 in FIG. 17A represents the result of assembly of the micro grid apparatus 4135 after completion of stage 3 in the sequence diagram 4500 of FIG. 15.

The central power hub 3000 generally encompasses M+1 tiers denoted as tier 0, tier 1, . . . , tier M distributed and sequenced in a vertical direction 4410 such that each tier is at a different vertical level in the vertical direction 4410, wherein M is at least 1. The central power hub 3000 generally comprises a central area and N radial arms connected to the central area, wherein N is at least 3. The central power hub 3000 is analogous to the micro grid apparatus 100 of FIG. 2A with respect to the central area 115 and radial arms 110 in FIG. 2A. The vertical direction 4410 is perpendicular to the central area. In FIG. 17A, M=2, N=5, and the tiers consist of tier 0, tier, 1 and tier 2 as shown.

Each radial arm extends radially outward from the central area in a radial direction that is perpendicular to the vertical direction 4410. Each pair of adjacent radial arms defines a docking bay in each tier such than N docking bays are defined in each tier. Each docking bay in tier m is vertically aligned directly above a corresponding docking bay in tier m−1 for m=1, 2, . . . , M to define N vertical tier structures in the central power hub 3000. Thus, each vertical tier structure comprises M+1 docking bays consisting of one docking bay in each tier of the M+1 tiers. The irregular shaped modules consist of an irregular shaped module latched in each docking bay in each tier such that M+1 modules are latched in M+1 corresponding docking bays of each vertical tier structure of the N vertical tier structures. Each irregular shaped module provides a functionality for responding to an alert pertaining to an event. The central area in the central power hub 3000 comprises a plurality of rechargeable batteries that provide electrical power for the irregular shaped modules latched in the docking bays. In one embodiment, the N vertical tier structures are uniformly distributed in azimuthal angle $\phi$ on a circle whose center is a radial center of the central area of the central power hub 3000.

FIG. 17A, M=2, N=5, and the tiers consist of tier 0, tier 1 and tier 2 comprise lateral surfaces 4430 with 5 irregular shape modules in each tier as described supra in conjunction with FIG. 15. Directions 4420 are normal to the surfaces 4430 and perpendicular to the vertical direction 4410.

In one embodiment, the N irregular shaped modules in tier 0 consist of at least one micro grid sensor structure 4150 and at least one micro grid actuator structure 4250. FIG. 17A depicts three grid sensor structure 4150 and two micro grid actuator structures 4250. Each micro grid sensor structure 4150 comprises a micro grid sensor module to which input plugs are physically and electrically connected. Each micro grid actuator structure 4250 comprises a micro grid actuator module to which output sockets are physically and electrically connected. Thus in one embodiment, the N irregular shaped modules in tier 0 consist of at least one micro grid sensor module and at least one micro grid actuator module.

In one embodiment, the at least one micro grid sensor module is configured to receive and process electrical sample signals of sampled data from at least one sampling device that has detected the electrical sample signals. In one embodiment, the sampled data pertains to the event. In one embodiment, each input plug comprises three input pin connections consisting of two independent electrical signal receiver pin connection for receiving electrical signals and one electrical trigger pin connection for triggering receiving electrical signals. In one embodiment, each input plug further comprises a structural lip for securing the micro grid sensor module to a structural bulkhead.

In one embodiment, the at least one micro grid actuator module is configured to transmit electrical driver signals to at least one functional device to actuate functional operation of the at least one functional device. In one embodiment, a first actuator module of the at least one micro grid actuator module is configured to actuate function generating circuitry to generate output signals in response to a change in an alert value associated with the event. In one embodiment, each output socket comprises two output sockets connections functioning as independent electrical function-generator output points to enable transmission of digital and analogue electrical signal output from the actuator module to at least one functional device.

In one embodiment, the N irregular shaped modules in tier 1 consist of micro grid processor modules, which are in tier 1 in the complex power hub apparatus 4350 of FIG. 17A.

Although hidden from view in the complex power hub apparatus 4350 of FIG. 17A, the micro grid processor modules 3210 in tier 1 are depicted explicitly in FIG. 12B. Each micro grid processor module comprises a plurality of processors that includes a unique processor having a unique operating system differing from an operating system in each other processor of the plurality of processors.

In one embodiment, the N irregular shaped modules in tier 2 are selected from the group consisting of a Random Access Memory (RAM) module (200), a communications module (415), a Global Positioning System (GPS) module 420), an input and output (I/O) module (410), and a micro grid wireless module (415) embodying micro grid wireless connection points, as illustrated in FIG. 17A. In one embodiment, each module of the N modules in tier 2 is a different type of module.

Figure 17B:
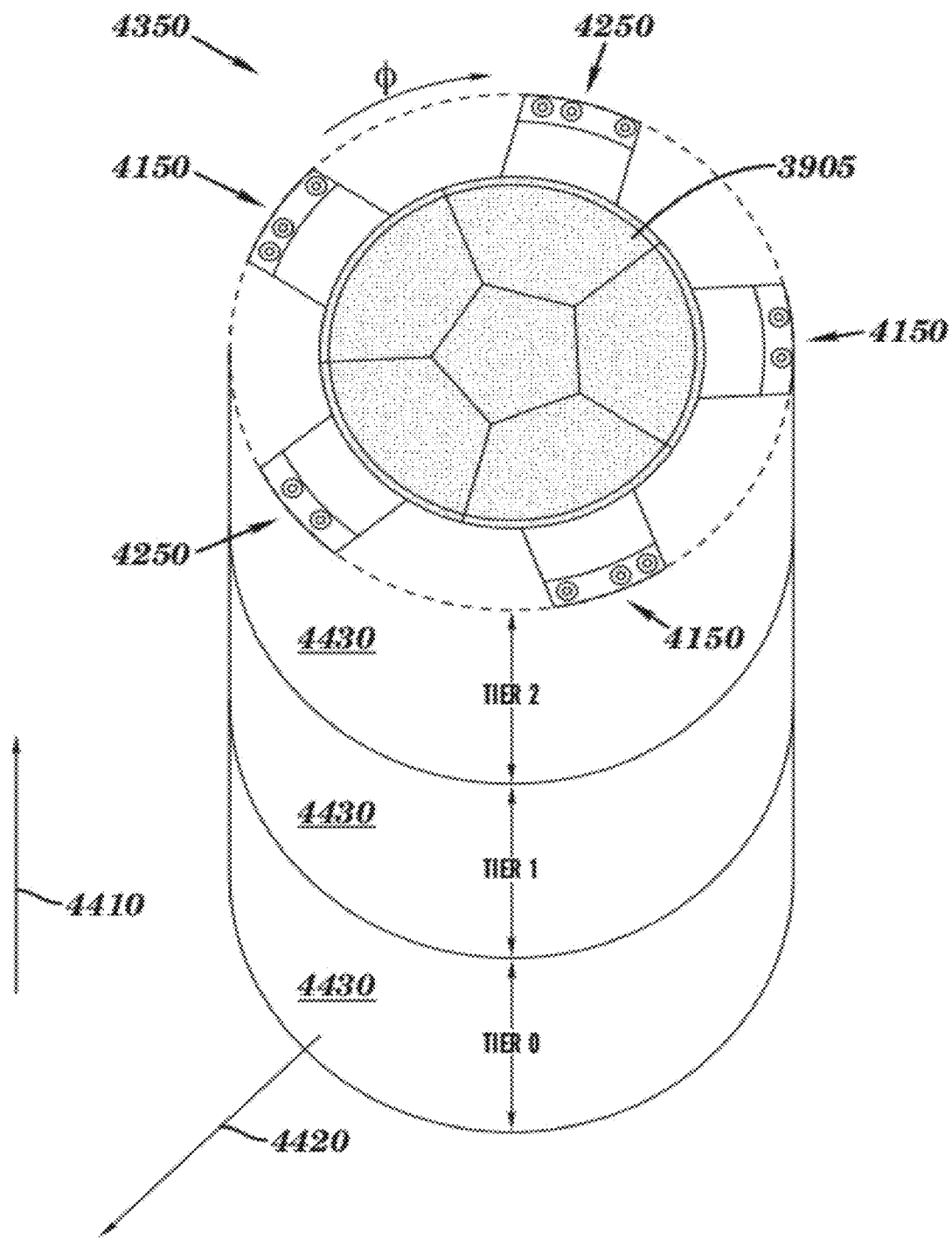
FIG. 17B depicts the complex power hub apparatus of FIG. 17A after being covered with a solar power skin, in accordance with embodiments of the present invention.

FIG. 17B depicts the complex power hub apparatus 4350 of FIG. 17A after being covered with a solar power skin 3905, in accordance with embodiments of the present invention. The complex power hub apparatus 4350 in FIG. 17A represents the result of assembly of the micro grid apparatus 4600 after completion of stage 4 in the sequence diagram 4500 of FIG. 15.

The solar power skin 3905 covers the central power hub 3000, the N radial arms, and the N modules in tier 2 such that the solar power skin 3905 is latched down over at least a portion of the lateral surfaces 4430 of the power hub apparatus 4350. The solar power skin 3905 extracts available solar energy from the sun's electromagnetic radiation field and is electrically connected to the rechargeable batteries for recharging and/or powering the rechargeable batteries in the central power hub 3000.

In one embodiment, the solar power skin 3905 is arranged as a molded composite of one central region and N surrounding polygonal shapes, with a connection cable 3910 and power plug 3915 for attachment to a power socket 3610 (see FIGS. 14A and 14B) on a radial arm of the N radial arms to transmit power from the solar power skin 3905 to the rechargeable batteries in the central power hub 3000. In one embodiment, the one central region of the solar power skin 3905 is in direct vertical alignment over the central area of the central power hub 3000. In one embodiment, each polygonal shape of the solar power skin 3905 is in direct vertical alignment over a corresponding docking bay in tier 2.

Although FIGS. 17A and 17B depict an embodiment in which the at least one micro grid sensor structure and at least one micro grid actuator structure are in tier 0, the micro grid processor modules are in tier 1, and the irregular shaped modules (200, 425, 420, 410, 415) are in tier 2, the scope of the present invention permits any types of irregular shaped modules to be in any tiers of the M tiers. Thus, the complex power hub apparatus 4350 of FIGS. 17A and 17B is only one example of how different types of irregular shaped modules are latched in docking bays of different tiers. For example, the complex power hub apparatus could be configured such that the at least one micro grid sensor structure and at least one micro grid actuator structure are in tier 1, the micro grid processor modules are in tier 2, and the irregular shaped modules (200, 425, 420, 410, 415) are in tier 0.

Figure 18:
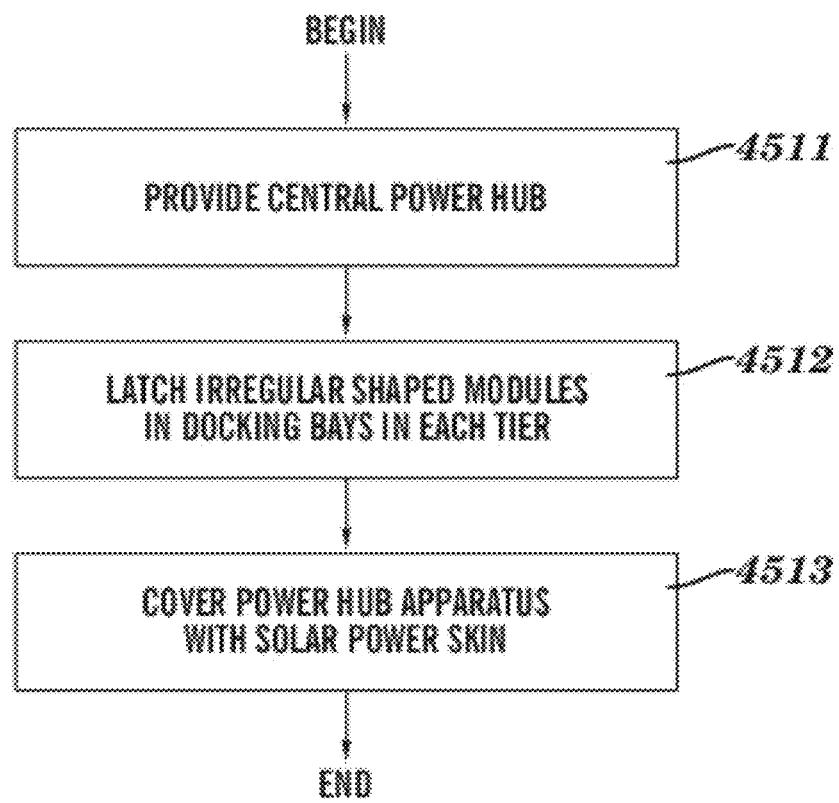
FIG. 18 is a flow chart describing a method for forming a complex power hub apparatus, in accordance with embodiments of the present invention.

FIG. 18 is a flow chart describing a method for forming a complex power hub apparatus, in accordance with embodiments of the present invention. The flow chart in FIG. 18 comprises steps 4511-4513.

Step 4511 provides a central power hub such as, inter alia, the central power hub 3000 of FIGS. 8B, 12A, 12B, 12C, 13A, 13B, 15, 17A, and/or 17B.

Step 4512 latches an irregular shaped module in each docking bay in each tier of the power hub as described supra in conjunction with FIG. 12A, 12B, 12C, 13A, 13B, 15, or 17A, which results in M+1 modules being latched in M+1 corresponding docking bays of each vertical tier structure.

Step 4513 covers the central power hub 3000, the N radial arms, and the N modules in tier N with a solar power skin such that the solar power skin is latched down over at least a portion of lateral surfaces of the complex power hub apparatus as described supra in conjunction with FIG. 17B.

E. Bridge Structures

As described supra, FIG. 8A is a block diagram depicting a connectivity structure 9100 with a bridge module 2010 physically connecting a micro grid structure 1320 to a power hub 3000, in accordance with embodiments of the present invention. The bridge module 2010 comprises bridge units 2011 and 2012 connected together by a bridge hinge 2035. The bridge hinge 2035 provides the bridge module 2010 with sufficient physical flexibility to enable the bridge units 2011 and 2012 to dock and be ensconced into respective docking bays of the micro grid structure 1320 and the power hub 3000. Generally, the micro grid apparatus 1320 and the power hub 3000 are embodiments of a first micro grid system and a second micro grid system, respectively. The micro grid structure 1320 accommodates, via connection interface 55, the irregular shaped modules 420 (GPS), 200 (RAM), 410 (I/O), 415 (wireless connection), and the bridge unit 2011 of the bridge module 2010.

The power hub 3000 comprises a plurality of rechargeable batteries and accommodates, via connection interface 55, the irregular shaped modules 3100 (failsafe battery), 425 (communications), 3210 (micro grid processors that include a unique processor (Council) 60), 3220 (micro grid processors that include a unique processor (Council) 60), and the bridge unit 2012 of the bridge module 2010. The plurality of rechargeable batteries in the power hub 3000 provides electrical power for the micro grid processors in the irregular shaped modules (e.g., modules 3210 and 3220). The failsafe battery in the module 3100 provides back up power for the rechargeable batteries in the power hub 3000 (if the rechargeable batteries should become discharged or otherwise fail) or additional power to supplement the power provided by the rechargeable batteries in the power hub 3000. Failsafe battery modules may be connected in any plurality via connection interfaces (55), across all complex micro grid structures and apparatuses, including micro grid power hubs and micro grid power towers, where a plurality of connection interfaces (55) are presented.

The connectivity structure 9100 is more specifically a bridge structure. A bridge structure comprises a plurality of micro grid systems linked together by one or more bridge modules. Each bridge module of a bridge structure physically links together two micro grid systems of the plurality of micro grid systems. Each of micro grid system of the plurality of systems comprises at least one micro grid apparatus having a plurality of processors 65 that includes a unique processor 60. Thus, a bridge structure comprises a plurality of unique processors 60 disposed within the plurality of micro grid systems which are coupled together by the bridge module(s) in the bridge structure.

Figure 19A:
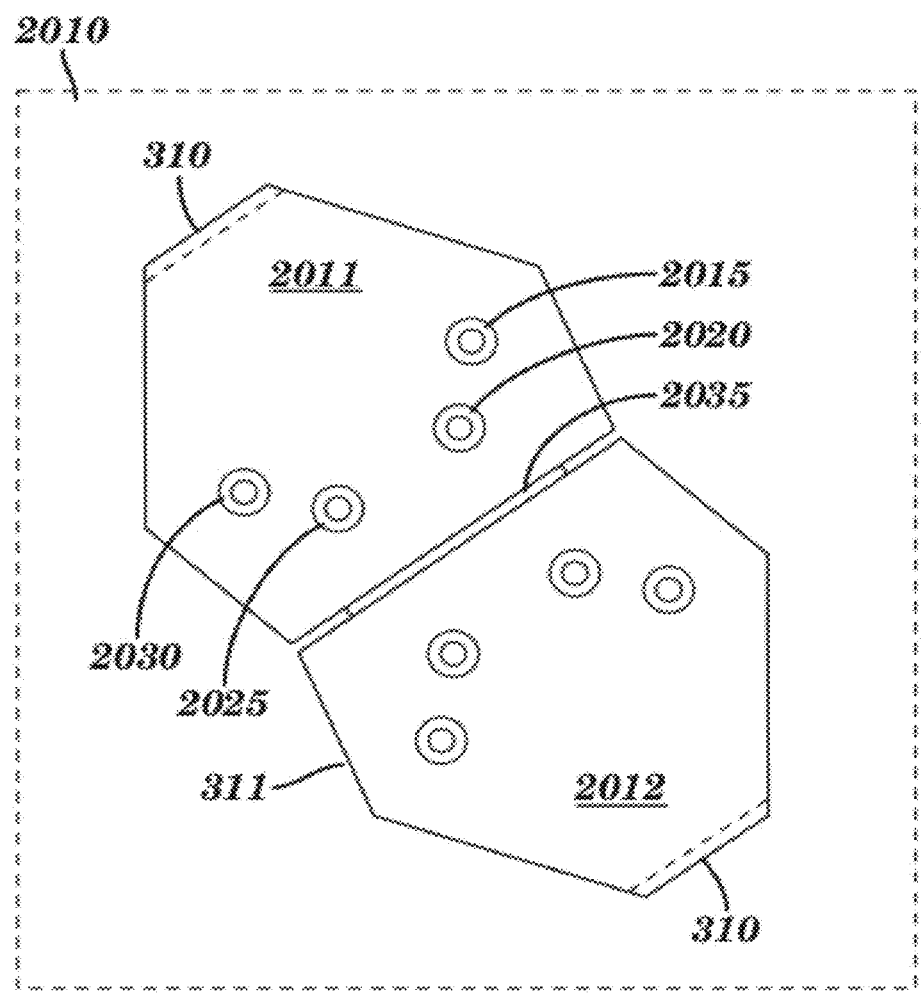
FIG. 19A is a diagram showing the bridge module of FIG. 8A, in accordance with embodiments of the present invention.

FIG. 19A is a diagram showing the bridge module 2010 of FIG. 8A, in accordance with embodiments of the present invention. The bridge module 2010 has a bi-polygonal shape and comprises a central hinged connection joint (2035) and eight light emitting diodes (LED's) (two sets of 2015, 2020, 2025, 2030). The bi-polygonal shaped bridge module 2010 may be manufactured to fit perfectly within the docking bays.

In one embodiment, there is less than 1 mm of gap tolerance around the non contact edges of two complex shapes, with a radius of 5 cm, physically adjacent to each other and separated by 1.5 cm, and with the bridge module 6.5 cm in length and 3 cm wide at the hinged connection joint 2035. The bridge module 2010 physically and electrically connects at the 'V' shaped connection interface 55 (see FIG. 8A) along the edge of the docking bay 450 (see FIG. 2A) of each of the adjacent complex structures coupled to each other by the bridge module 2010, by pushing down on the bridge module 2010 and latching the bridge module 2010 into place along the edge of the docking bay 450 of the complex shape's radial arm 110 (see FIG. 2A).

The latching mechanism is provided as a raised and rounded protrusion (e.g., of ~1.5 mm height×~3.5 mm length) along the latching edge 311 of bridge units 2011 and 2012. This protrusion fits a receptacle with the same characteristics to receive the shape on all the radial arm edges of the complex shapes. The connection edge 310 is the edge location of the 'V' shaped connection interface 55 (see FIG. 8A).

The central hinged joint 2035 provides the bridge with the physical flexibility required for the bridge module 2010 to dock and latch down into respective docking bays of two adjacent complex shapes.

Figure 19B:
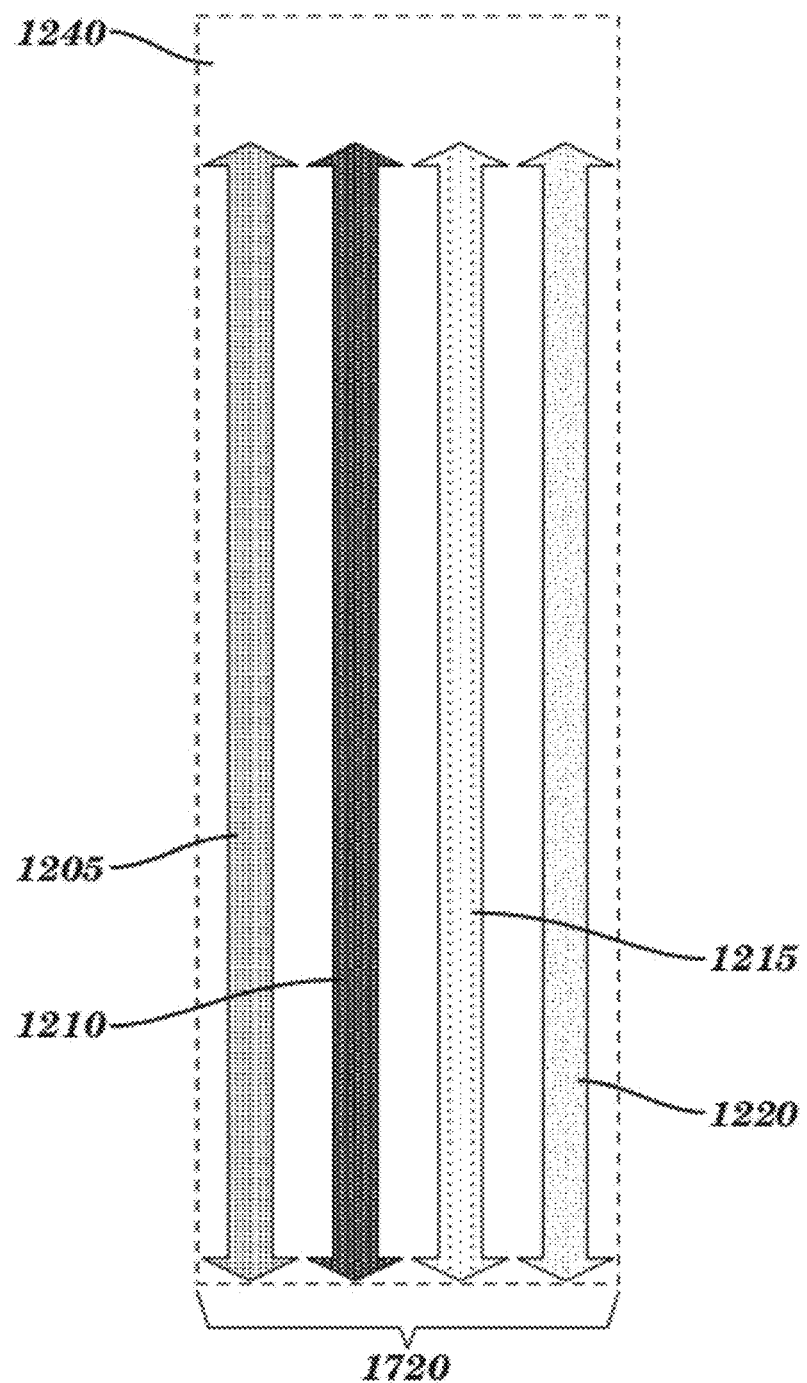
FIG. 19B is a diagram showing an internal structure of a bridge within the bridge module of FIGS. 8A and 19A, in accordance with embodiments of the present invention.

Eight optical LED's (two sets of 2015, 2020, 2025, 2030) within the bridge module 2010 provide visual activity monitoring, and infra red (IR) sensing and data transfer, of buses 1205, 1210, 1215, 1220, respectively (see FIG. 19B). In particular, the LEDs 2030 are connected to the micro grid system bus 1205, the LEDs (2025, 2020) are connected to the standard system bus (1210, 1215), and the LEDs 2015 are connected to the macro grid system bus 1220. The LED's (2030, 2025, 2020, 2015) provide functional use of data transfer and attachment for data bus monitoring devices, visual inspection for micro grid and/or macro grid system integrity, system maintenance, fault determination, of the buses (1205, 1210, 1215, 1220), by engineers and robots.

FIG. 19B is a diagram showing an internal structure of a bridge 2040 within the bridge module 2010 of FIGS. 8A and 19A, in accordance with embodiments of the present invention. The bridge 2040 comprises a composite bus 1720 which includes the micro grid system bus 1205, the standard system bus (1210, 1215), and the macro grid system bus 1220. The composite bus 1720 electrically connects along the edge of the docking bay of the two adjacent micro grid apparatuses at their 'V' point 305 (see FIG. 21B). The internal structure of the bridge 2040 embodies electronics and serial data buffers suitable for optical and infra red transfer of data to observers, and data monitoring equipment, for purposes of maintenance and repair.

Figure 20A:
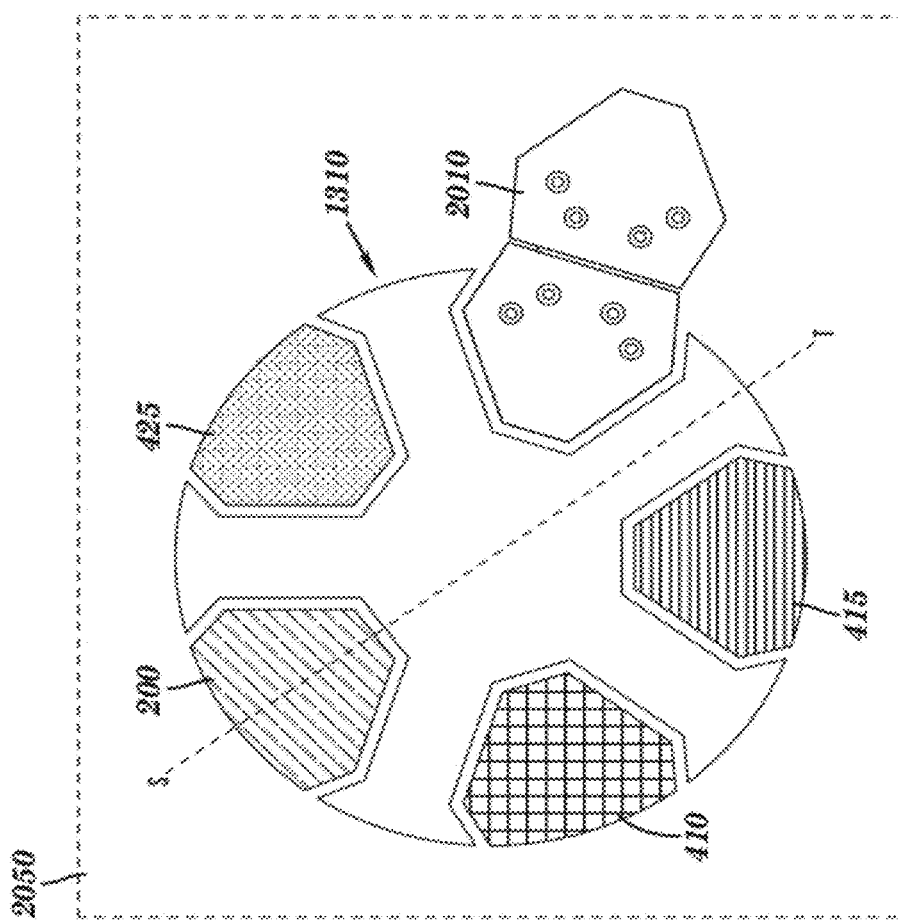
FIG. 20A is a diagram of an assembled micro grid apparatus, in accordance with an embodiments of the present invention.

FIG. 20A is a diagram of an assembled structure 2050, in accordance with an embodiments of the present invention. The assembled structure 2050 depicts a micro grid apparatus 1310 comprising the four irregular shaped modules 415, 410, 200, 425, and the bridge module 2010 that contains the eight LED's (two sets of 2030, 2025, 2020, 2015—see FIG. 19A). The micro grid apparatus 1310 is representative of the micro grid apparatus 1300 of FIG. 3A subject to the bridge module 2010 being specific to FIG. 20A. The assembled structure 2050 is an example of a basic mobile micro grid apparatus, and a laptop micro grid system apparatus, (i.e., without a bridge module, the assembled structure 2050 is a 'single' micro grid apparatus; with a bridge module and connected to another complex shape, the assembled structure 2050 forms a 'dual' micro grid apparatus). With inclusion of the bridge module 2010, the assembled structure 2050 assembles with other complex shapes to form more complex micro grid and macro grid apparatuses. In FIG. 20A, the irregular shaped modules 415, 410, 200, 425, and the bridge module 2010 are each inserted into an available docking bay of the complex shape of the micro grid apparatus 1310.

Figure 20B:
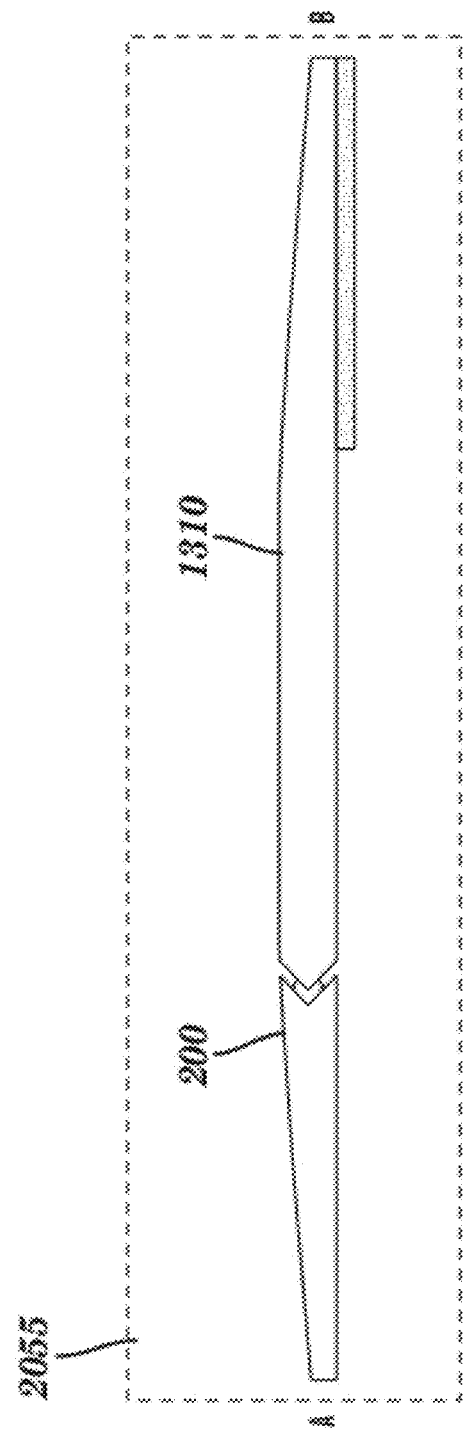
FIG. 20B depicts a vertical structure of a cross sectional view along a line S-T in FIG. 20A, in accordance with an embodiments of the present invention.

FIG. 20B depicts a vertical structure 2055 of a cross-sectional view along a line S-T depicted in FIG. 20A, in accordance with an embodiments of the present invention. The vertical structure 2055 is between points S and T. The vertical structure 2055 depicts the conjunction of the irregular shaped module 200 with the micro grid apparatus 1310 at a 'V' shaped connection point 305 and connection edge 310 at bridge module 2014 (see FIG. 21B) which is the location on the micro grid apparatus 1310 used by the bridge module 2014 to attach and link two complex micro grid processor modules together, as described infra in conjunction with FIG. 21B.

Figure 21A:
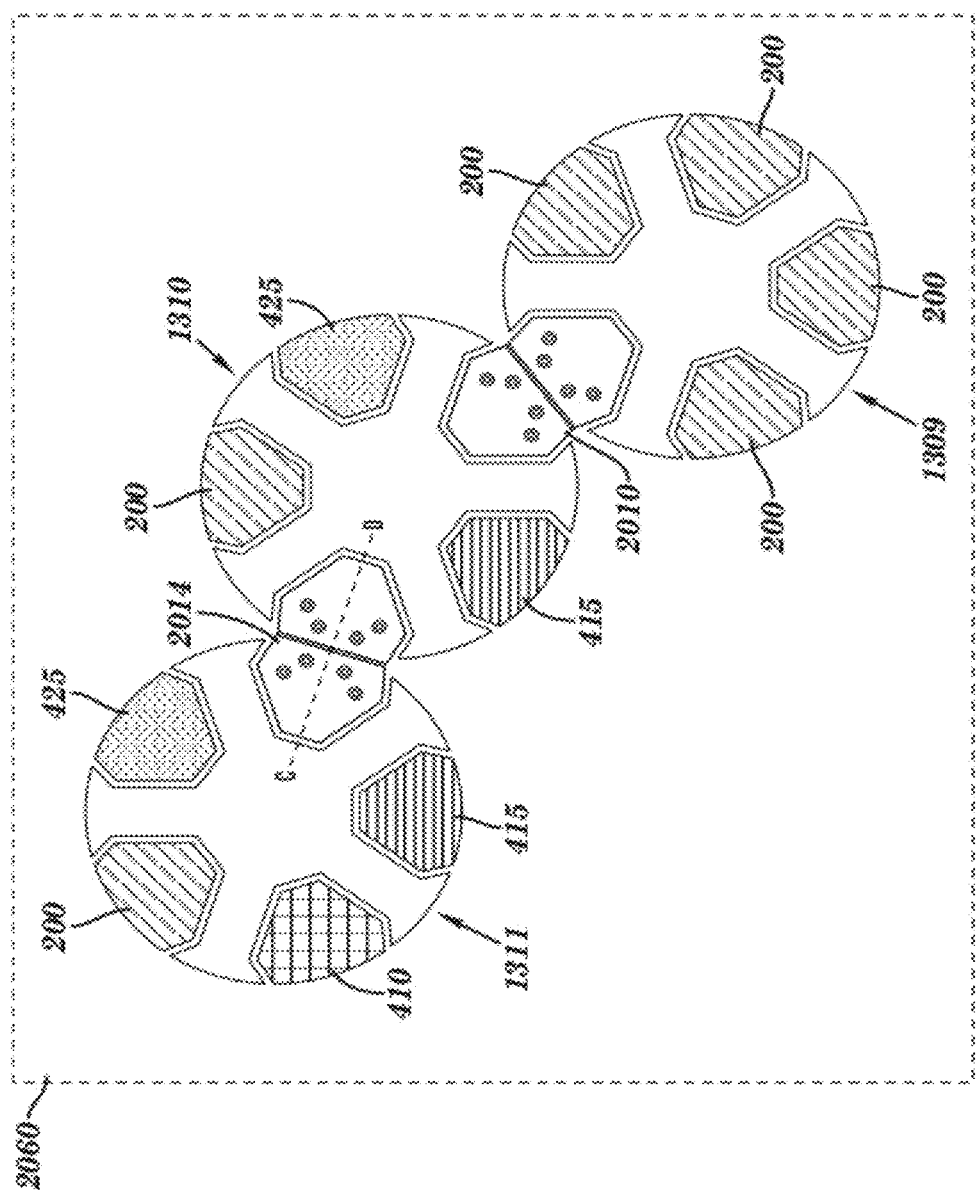
FIG. 21A depicts a micro grid bridge structure, in accordance with embodiments of the present invention.

FIG. 21A depicts a micro grid bridge structure 2060, in accordance with embodiments of the present invention. The micro grid bridge structure 2060 is a bridge structure that comprises three micro grid apparatuses (1309, 1310, 1311) connected by two bridge modules (2014, 2010) containing eleven irregular shaped modules, including: six RAM modules (200), two 802.11s Mesh Wireless modules (415), two 802.11g Communications modules (425), and one I/O module (410). The bridge modules 2010 and 2014 link the micro grid apparatus 1310 to the micro grid apparatus 1309 and 1311, respectively. In one embodiment, the micro grid bridge structure 2060 is an example of a desk-top micro grid twin bridge apparatus.

While FIG. 21A depicts the micro grid bridge structure 2060 as comprising three micro grid processor apparatuses, the micro grid bridge structure 2060 generally comprises three micro grid apparatuses (1311, 1310, 1309), wherein each such micro grid apparatus may be either a micro grid processor apparatus or a micro grid power hub apparatus. For example, FIG. 29B (discussed infra) depicts a similar micro grid bridge structure 3400 comprising three micro grid apparatuses, with one micro grid processor apparatus (1310) disposed between two micro grid power hub apparatuses (3000A, 3000B).

Figure 29A:
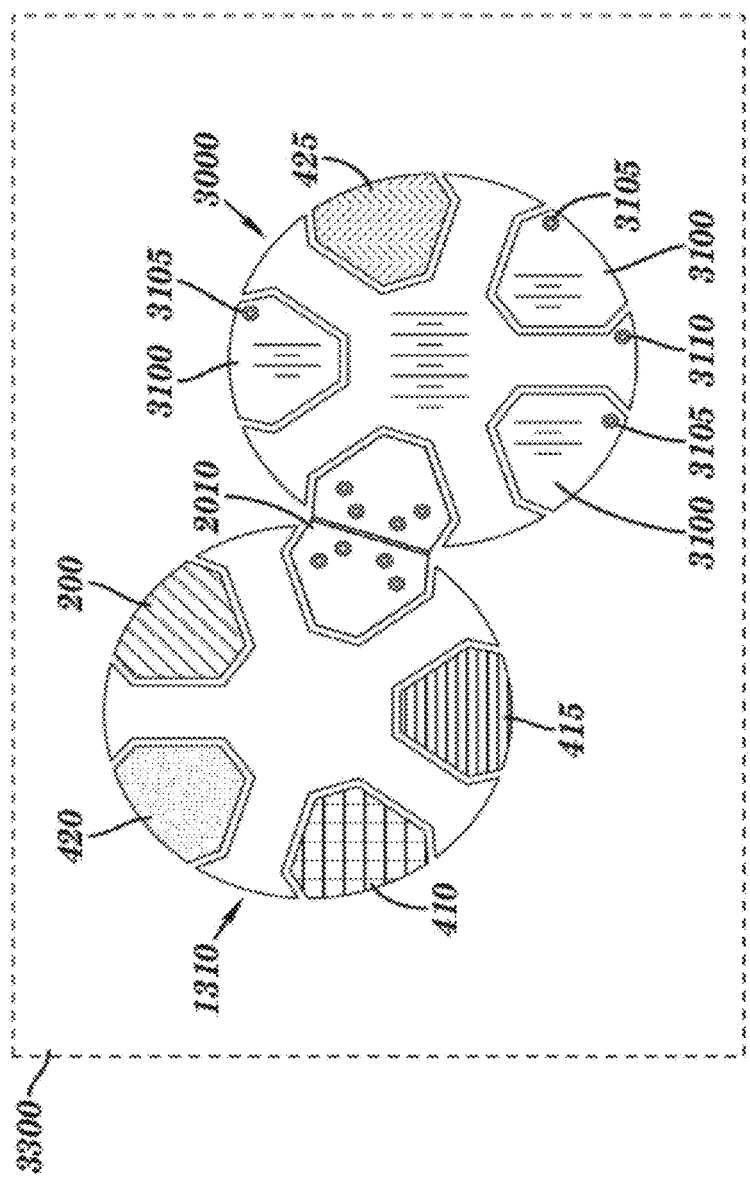
FIG. 29A is a diagram of a micro grid bridge structure, which is a bridge structure connecting a micro grid processor apparatus to a micro grid power hub by a micro grid bridge module, in accordance with embodiments of the present invention
Figure 29B:
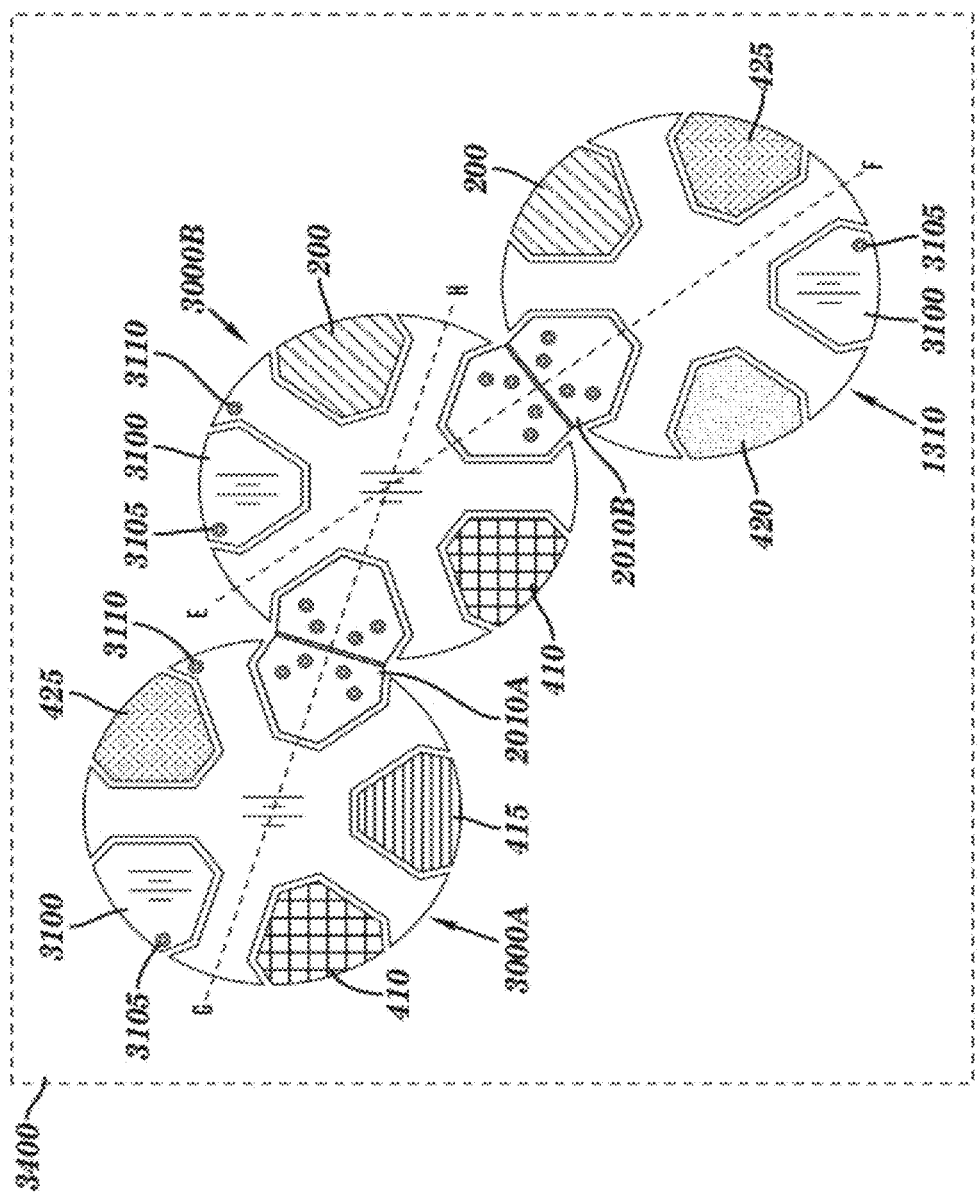
FIG. 29B is a diagram of a micro grid bridge structure, which is a bridge structure showing a second micro grid power hub connected by a first micro grid bridge module to a first micro grid power hub and by a second micro grid bridge module to a micro grid processor apparatus, in accordance with an embodiments of the present invention.

Generally, the micro bridge structure of FIG. 21A or of FIG. 29B comprises a first micro grid apparatus (1311), a second micro grid apparatus (1310), and a third micro grid apparatus (1309), a first bridge module (2014), and a second bridge module (2010). A first bridge unit and a second bridge unit of the first bridge module (2014) is respectively latched into a first docking bay of the second micro grid apparatus (1310) and a docking bay of the first micro grid apparatus (1311). A first bridge unit and a second bridge unit of the second bridge module (2010) is respectively latched into a second docking bay of the second micro grid apparatus (1310) and a docking bay of the third micro grid apparatus (1309). In FIG. 21A, the first micro grid apparatus is a processor apparatus (1311), the second micro grid apparatus is a processor apparatus (1310), and the third micro grid apparatus is a processor apparatus (1309). In FIG. 29B, the first micro grid apparatus is a power hub apparatus (3000A), the second micro grid apparatus is a processor apparatus (1310), and the third micro grid apparatus is a processor apparatus (3000B).

Figure 21B:
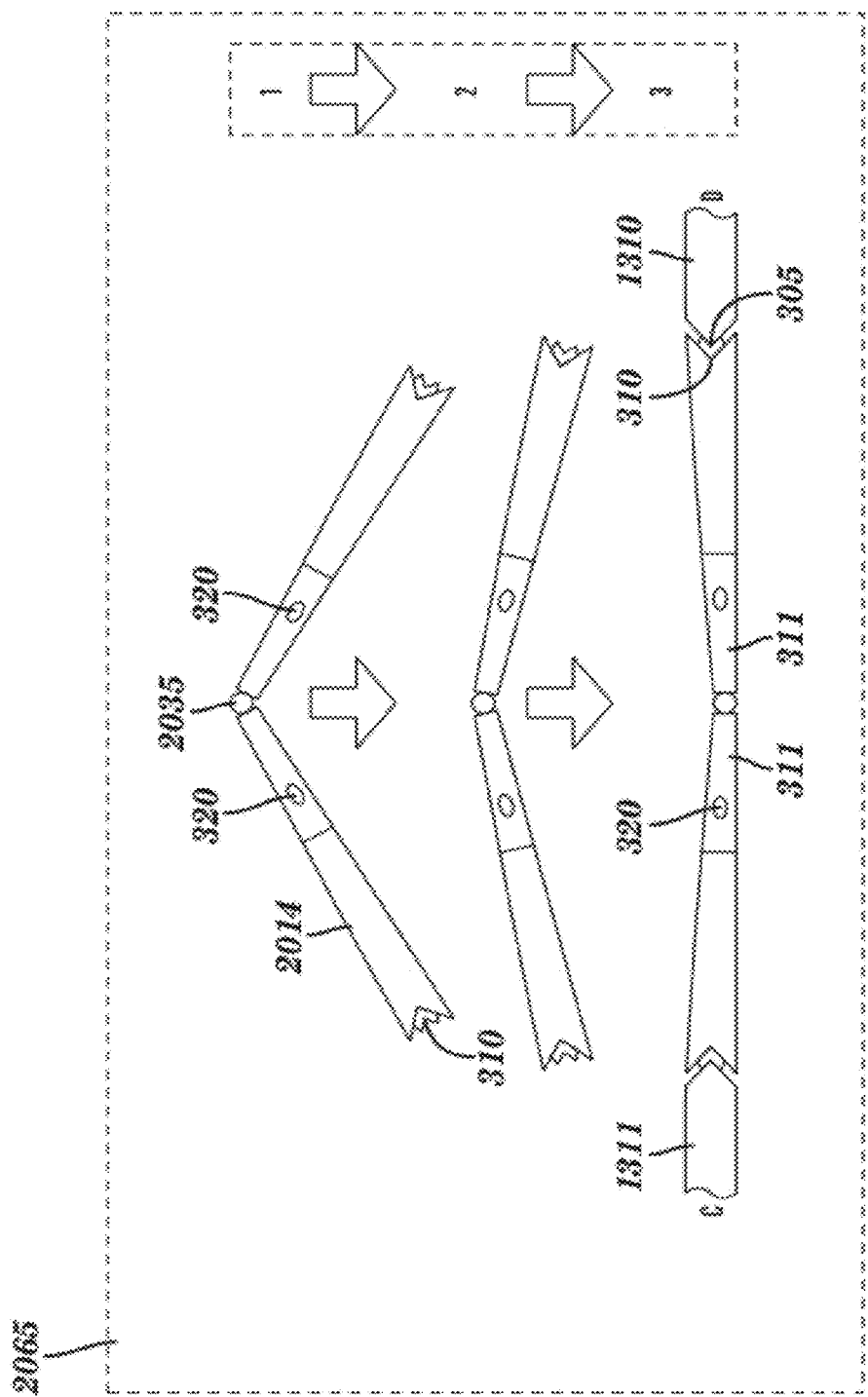
FIG. 21B depicts a cross-sectional view along a line C-D in FIG. 21A, in accordance with an embodiments of the present invention.

FIG. 21B depicts a cross-sectional view 2065 along a line C-D depicted in FIG. 21A, in accordance with an embodiments of the present invention. The cross-sectional view 2065 shows three stages of assembly (1, 2, 3) of the bridge module 2014, into the docking bays of two physically adjacent (and multi-layered printed circuit board mounted) micro grid apparatuses 1311 and 1310.

In its unmounted and non-connected state, the bridge hinge 2035 rests at an angle of about 120 degrees, by light spring (not shown) tension. In one embodiment, the bridge hinge 2035 is ~0.4 cm in height at the centre hinge and 1 cm in height at the 'V' shaped connection points, at both of its ends, and a latching mechanism is provided as a raised and rounded protrusion (320) of ~1.5 mm height×~3.5 mm length along the edge of both of its sides (311), and both halves of the bridge.

The bridge module 2014 is positioned, and lowered in the center (against light spring tension), into alignment with two single circuit board mounted micro grid apparatuses 1311 and 1310, with adjacent docking bays available to receive the bridge module 2014. The bridge module 2014 is latched into place (against light spring tension) when the 'V' shaped connection edge 310 on the bridge module 2014 is in conjunction with the 'V' shaped connection point 305 on the micro grid apparatus 1310. The latching mechanism, a protrusion 320 on the bridge module 2014, fits a receptacle (i.e., insertion point) with the same characteristics to receive the shape, on all the radial arm edges of the micro grid apparatus 1310.

Figure 21C:
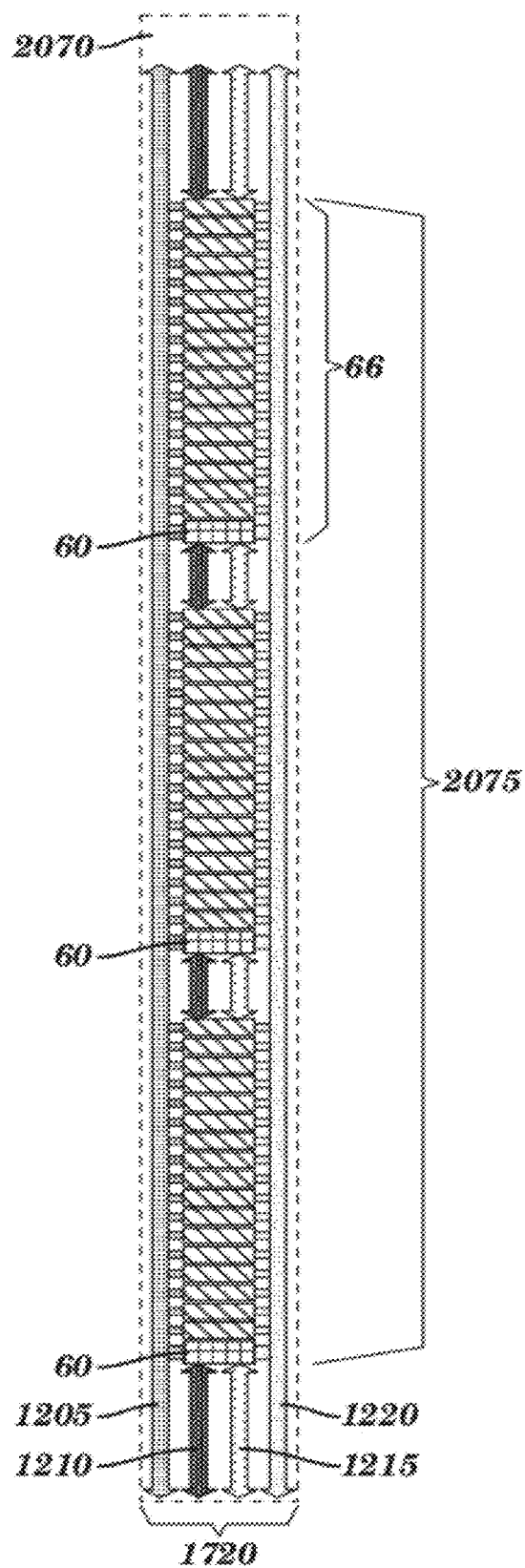
FIG. 21C is a diagram of a micro grid apparatus, in accordance with an embodiments of the present invention.

FIG. 21C is a diagram of a micro grid bridge structure 2070, in accordance with an embodiments of the present invention. The micro grid bridge structure 2070 is a bridge structure comprising a stack set 2075 of a micro grid complex shape (e.g., the complex micro grid structure 2060 in FIG. 21A). The stack set 2075 is a set of three micro grid system stacks 66. Each micro grid system stack 66 in the stack 2075 comprises 18 processors, wherein the 18 processors of each stack 66 include the unique processor 60. The three stacks 66 are bridged to form a contiguous micro grid system of fifty four processors along an extended composite bus 1720 which includes the micro grid system bus 1205, the standard system bus (1210, 1215), and the macro grid system bus 1220.

The assembled micro grid bridge structure 2070 includes a specialized grid of the three unique processors 60. This specialized grid of three unique processors 60 is structured so that each unique processor 60 is positioned by software determination to be in a load balanced position in the complex micro grid apparatus 2070 to best serve and apportion the alerts and macro grid processor assignment requirements demanded by the artificial intelligence(s) operating in their macro grids.

The complex micro grid structure 2070 is a fifty four micro grid processor system (suitable in size for a 'next generation' desktop cloud computing device) and is further scalable, to assemble into a basic cloud computing server of a micro grid bridge structure 2080 (see FIG. 22A) containing 108 processors, embodying a stack set of six micro grid system stacks 66.

Figure 22A:
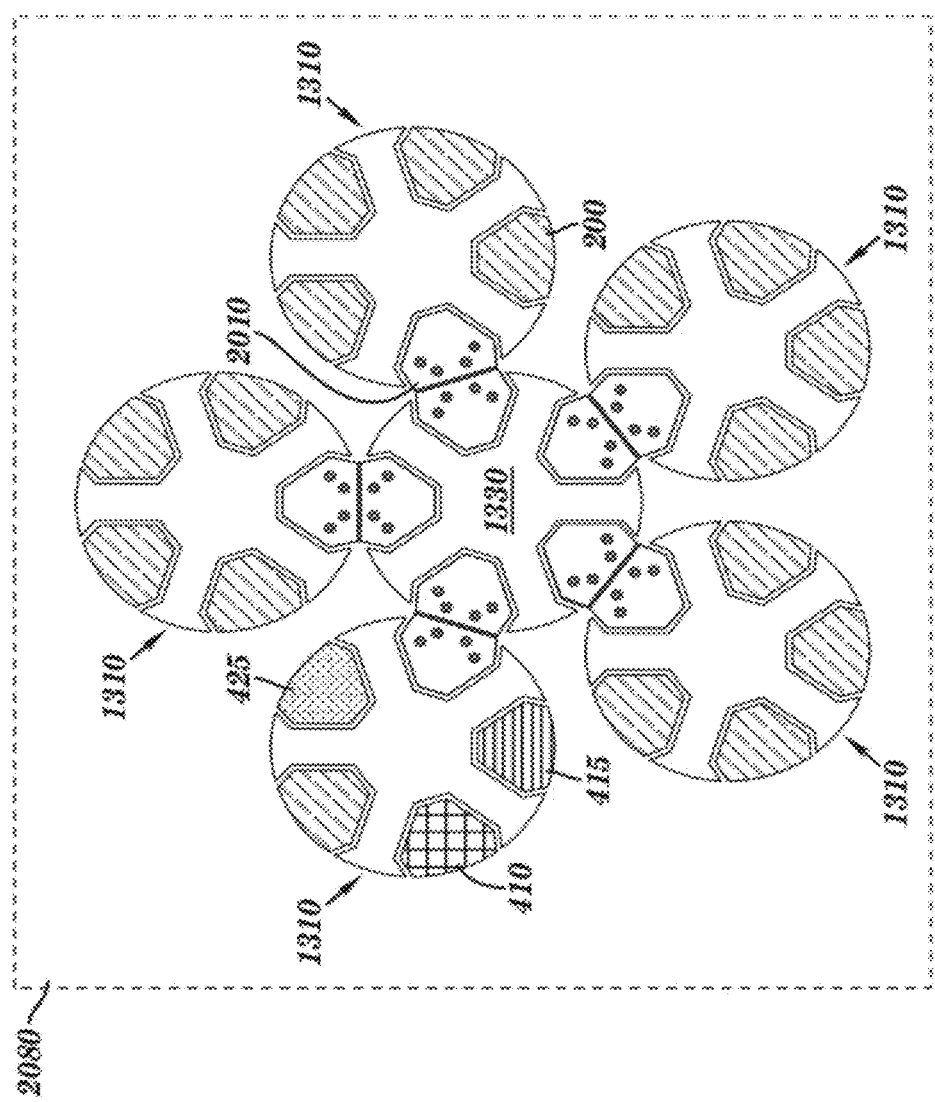
FIG. 22A is a diagram of a micro grid bridge structure, in accordance with an embodiments of the present invention.

FIG. 22A is a diagram of a micro grid bridge structure 2080, in accordance with an embodiments of the present invention. The micro grid bridge structure 2080 is a bridge structure that comprises a central micro grid apparatus 1330 whose docking bays contain only bridge units of five corresponding bridge modules 2010, and that further comprises five micro grid apparatuses 1310 each connected to the central micro grid apparatus 1330 by the five corresponding bridge modules 2010. The five micro grid apparatuses 1310 collectively comprise twenty irregular shaped modules.

The micro grid bridge structure 2080 is suitable as a cloud computing server, containing 108 processors, assembled as a complex composite grid array of six micro grid apparatuses, each having a complex shape.

The micro grid bridge structure 2080 embodies, by selective design, seventeen RAM modules (200) (e.g., seventeen terabytes of random access memory), one 802.11s Mesh Wireless module (415), one 802.11g Communications module (425), and one I/O module (410).

The micro grid bridge structure 2080 includes a specialized grid of the six unique processors 60. The unique processors 60 are not shown in FIG. 22A. A representative unique processor 60 is depicted in FIG. 8A for the micro grid apparatus 1320 which is analogous to the micro grid apparatus 1310 in FIG. 22A. The micro grid bridge structure 2080 is structured so that each of the six unique processors 60 are positioned by software determination, to be in a load balanced position in the complex micro grid to best serve and apportion the alerts and macro grid processor assignment requirements demanded by the artificial intelligence(s) operating in their macro grids.

The micro grid bridge structure 2080 is an example of a server micro grid five bridge apparatus. In one embodiment, the micro grid bridge structure 2080 (e.g., a cloud computing server with 108 processors) has an overall physical diameter of 30 cm. and a profile height less than 1.5 cm.

While FIG. 22A depicts the micro grid bridge structure 2080 as comprising six micro grid processor apparatuses (i.e., five processor apparatuses 1310 and one central processor apparatus 1330), the micro grid bridge structure 2080 generally comprises six micro grid apparatuses, wherein each such micro grid apparatus may be either a micro grid processor apparatus or a micro grid power hub apparatus.

The micro grid bridge structure 2080 is a "centric bridge structure". A centric bridge structure comprises a central micro grid apparatus (1330), N outer micro grid apparatuses (1310; N=5) such that N is at least 2, and N bridge modules (2010), wherein each bridge module of the N bridge modules comprises a first bridge unit latched to a docking bay of the central micro grid apparatus (1330) and a second bridge unit latched to a docking bay of a corresponding micro grid apparatus (1310) of the N outer micro grid apparatuses.

Figure 22B:
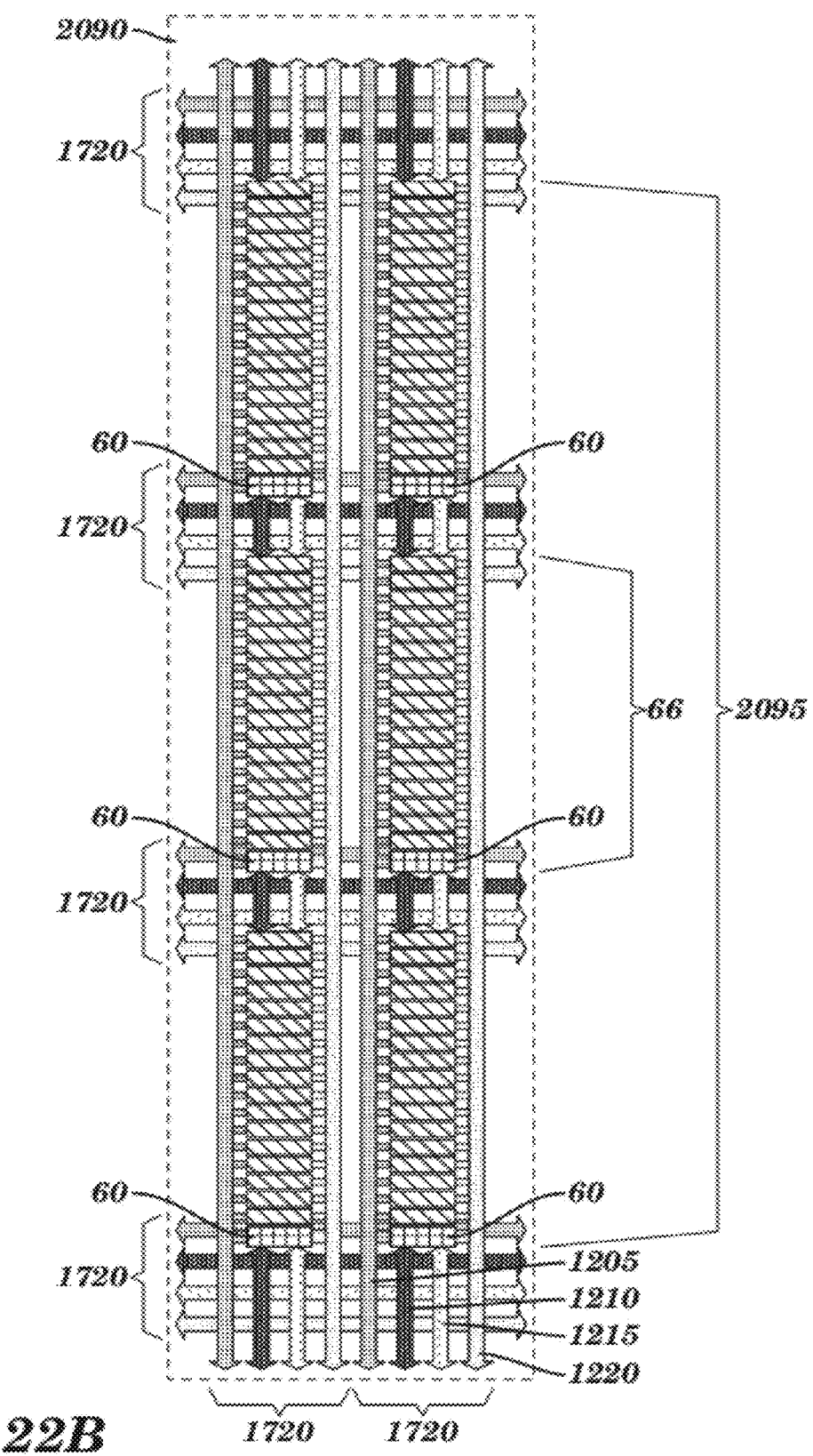
FIG. 22B is a diagram of a micro grid bridge structure, in accordance with an embodiments of the present invention.

FIG. 22B is a diagram of a micro grid bridge structure 2090, in accordance with an embodiments of the present invention. The micro grid bridge structure 2090 is a bridge structure that comprises a set 2095 of micro grid system stacks 66 (more specifically, a set of six micro grid system stacks 66). Each micro grid system stack 66 comprises 18 processors, wherein the 18 processors of each stack 66 include the unique processor 60. The six stacks 66 are bridged so as shown to form a micro grid system of 6×18 (i.e., 108) processors along extended composite buses 1720 which includes the micro grid system bus 1205, the standard system bus (1210, 1215), and the macro grid system bus 1220.

The micro grid bridge structure 2090 is a one hundred and eight micro grid processor system (i.e., suitable in size for a 'next generation' cloud computing server device) and is further scalable, to assemble into a complex micro grid mosaic apparatus 2300 (see FIG. 24A) containing six hundred and forty eight processors.

Figure 23A:
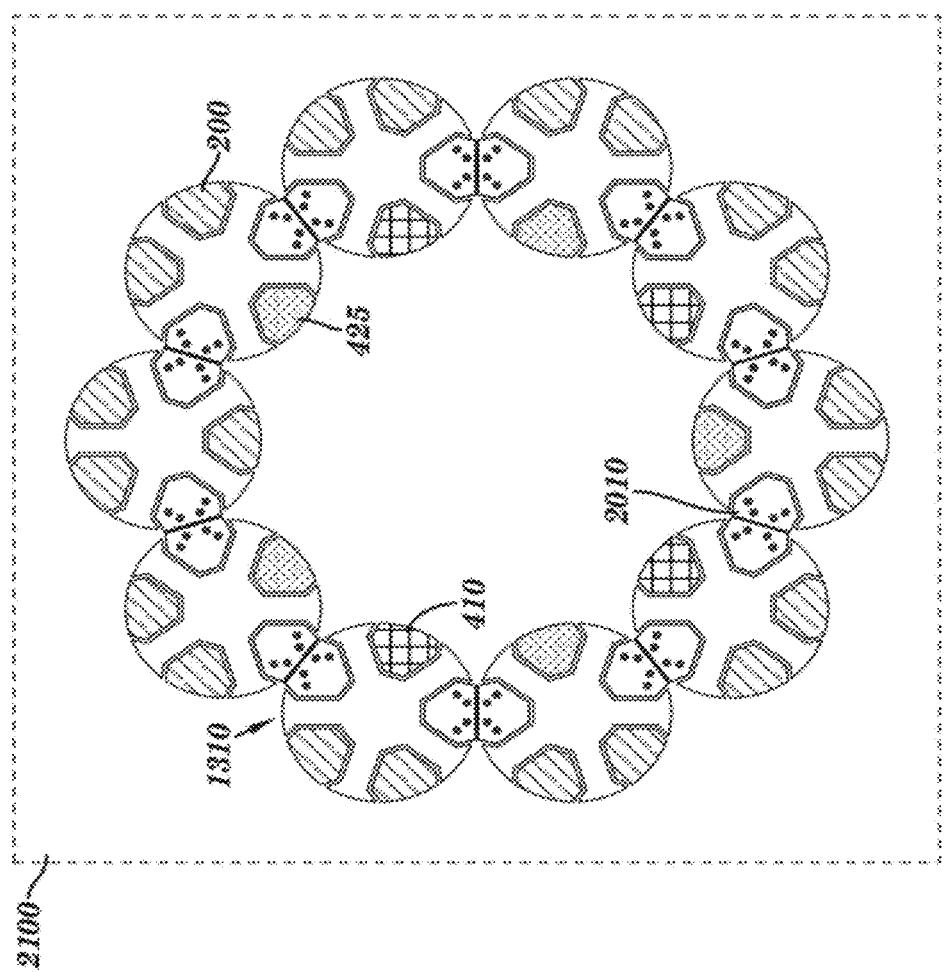
FIG. 23A is a diagram of a micro grid bridge structure having a complex micro grid ring structure, in accordance with an embodiments of the present invention.

FIG. 23A is a diagram of a micro grid bridge structure 2100 having a complex micro grid ring structure, in accordance with an embodiments of the present invention. The complex micro grid ring structure 2100 is a bridge structure that comprises ten micro grid apparatuses 1310 connected by ten bridge modules 2010 in a closed ring formation. The ten bridge modules 2010 collectively comprise thirty irregular shaped modules. The complex micro grid ring structure 2100, which is also suitable for military, research and scientific applications, includes one hundred and eighty processors, assembled as a complex composite grid ring structure of ten micro grid apparatuses.

Generally, the complex micro grid ring structure of the present invention comprises or consists of N micro grid apparatuses in a closed ring formation such that N is at least 3. Representing the N micro grid apparatuses as $A_1, A_2, \ldots, A_N$, the closed ring formation is characterized by the N micro grid apparatuses being bridged together in the sequence of: $A_1, A_2, \ldots A_N, A_1$.

While FIG. 23A depicts the micro grid bridge structure 2100 as comprising ten micro grid processor apparatuses, the micro grid bridge structure 2100 generally comprises ten micro grid apparatuses (or N micro grid apparatuses generally), wherein each such micro grid apparatus may be either a micro grid processor apparatus or a micro grid power hub apparatus.

The complex micro grid ring structure 2100 embodies, by selective design, twenty RAM modules (200) (e.g., twenty terabytes of random access memory), five 802.11g Communications modules (425), and five I/O modules (410). Each micro grid apparatuses 1310 comprises two RAM modules 200, one 802.11g Communications module 425, or I/O module 410, and one bridge module 2010 to connect to the next adjacent micro grid ring apparatuses 1310.

Figure 23B:
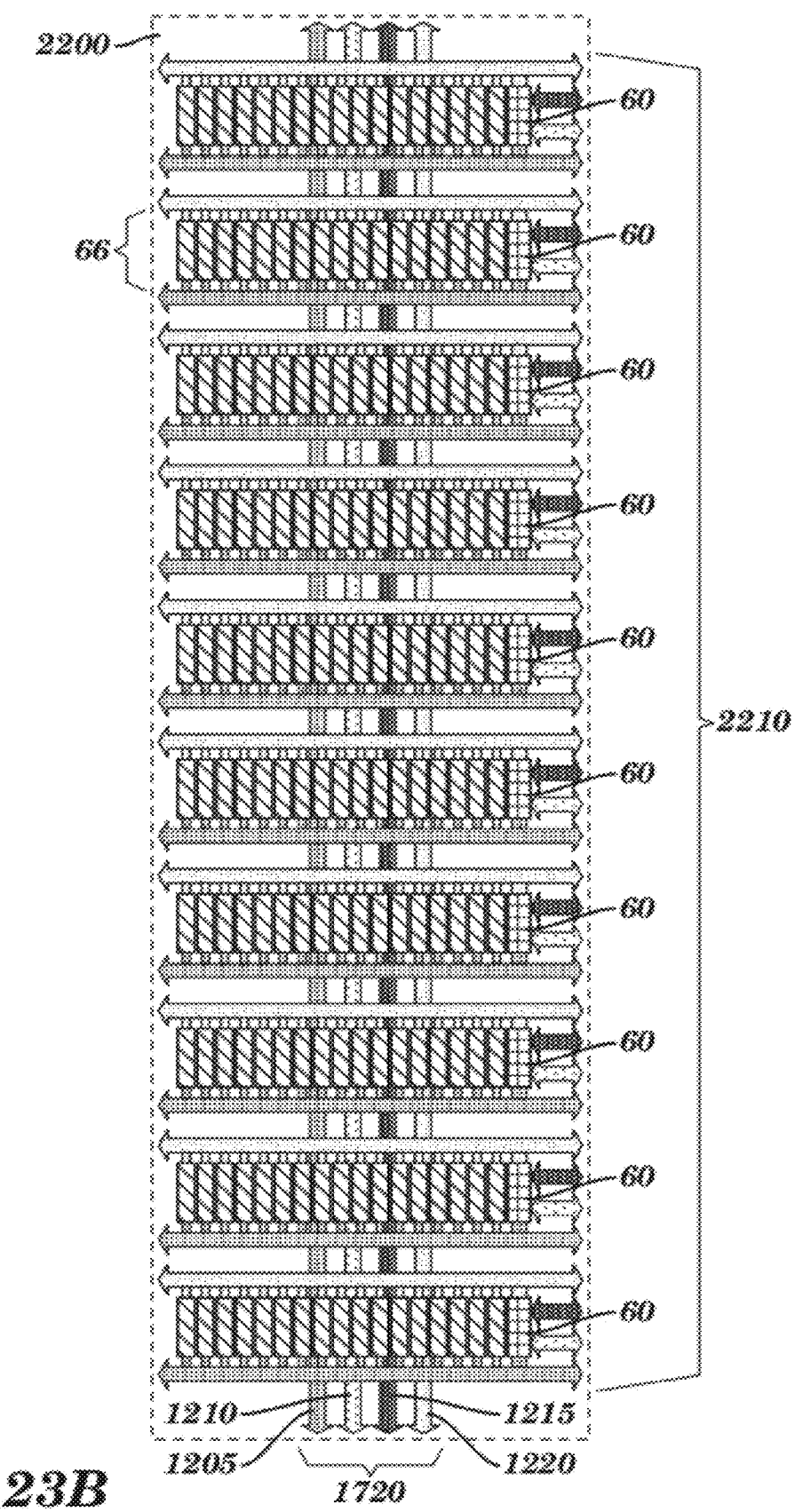
FIG. 23B is a diagram of a complex micro grid ring structure, in accordance with an embodiments of the present invention.

The complex micro grid ring structure 2100 allows for an alternative experimental very high speed mono-directional token ring and similar bus architectures, for testing and improving the micro grid standard system bus (1210, 1215) use and data interchange design; the micro grid system bus (1205) use and governance design; and the macro grid system bus (1220) use and artificial intelligence design, for the enablement of future superior micro grid and macro grid design and performance efficiencies (see FIG. 23B, discussed infra, for a depiction of the buses 1205, 1210, 1215, 1220).

The complex micro grid ring structure 2100 comprises five I/O modules (410) which provide for access to and from large volume disk drive storage arrays.

In one embodiment, the complex micro grid ring structure 2100 (e.g., an experimental research computing micro grid ring) has an overall physical diameter of 40 cm. and a profile height less than 1.5 cm, and is an example of a complex ring micro grid apparatus. The 20 cm diameter space in the physical centre of the structure (2100) (and its mountable printed circuit board) provides, for a relatively large volume of air flow to move through the apparatus, for purposes of cooling.

Multiple stacking of micro grid ring structures (2100) provides for new mainframe cylindrical structural designs.

FIG. 23B is a diagram of a complex micro grid ring structure 2200, in accordance with an embodiments of the present invention. The complex micro grid apparatus 2200 represents the complex micro grid ring structure 2100 of FIG. 23A and is a bridge structure that comprises a set 2210 of ten micro grid system stacks 66. Each micro grid system stack 66 comprises 18 processors, wherein the 18 processors of each stack 66 include the unique processor 60. The ten stacks 66 are bridged as shown to form a continuous micro grid ring system of 180 processors attached to a composite micro grid bus (1720) ring. Each micro grid bus 1720 includes the micro grid system bus 1205, the standard system bus (1210, 1215), and the macro grid system bus 1220. The complex micro grid apparatus 2200 includes a specialized grid of ten unique processors 60.

Figure 24A:
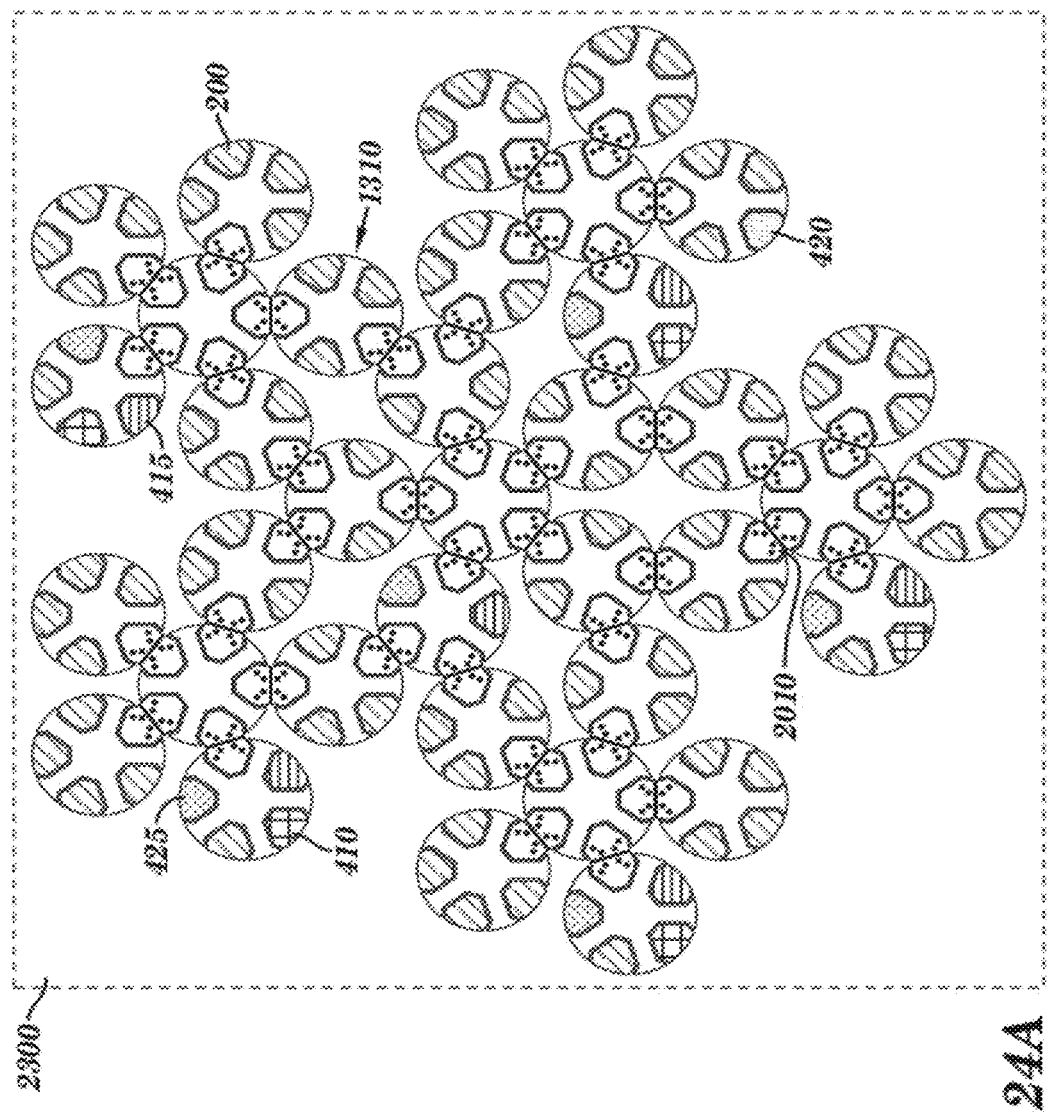
FIG. 24A is a diagram of a micro grid bridge structure having a complex micro grid mosaic structure, in accordance with an embodiments of the present invention.

FIG. 24A is a diagram of a micro grid bridge structure having a complex micro grid mosaic apparatus 2300, in accordance with an embodiments of the present invention. The complex micro grid mosaic apparatus 2300 is a bridge structure that comprises thirty six micro grid apparatuses 1310 connected by forty bridge modules 2010, containing one hundred selected irregular shaped modules (200, 415, 425, 410, 420).

The complex micro grid mosaic apparatus 2300 is suitable as a large cloud computing polygonal mosaic micro grid system and embodies micro grids, macro grids, and unique processor grids within a single apparatus.

The complex micro grid mosaic apparatus 2300 embodies six hundred and forty eight processors, assembled as a very complex composite micro grid array from thirty six micro grid apparatuses 1310.

The complex micro grid mosaic apparatus 2300 embodies, by selective design, eighty-two RAM modules (200) (e.g., eighty-two terabytes of random access memory), six 802.11s mesh wireless modules (415), six 802.11g communications modules (425), five I/O modules (410), and one GPS module (420).

The complex micro grid mosaic apparatus 2300 includes a specialized grid of the thirty-six unique processors (60), and is structured so that each of the thirty-six unique processors 60 is positioned by software determination to be in a load balanced position in the complex micro grid mosaic to best serve and apportion the alerts and macro grid processor assignment requirements demanded by the artificial intelligence(s) operating in their macro grids.

In one embodiment, the complex micro grid mosaic apparatus 2300 (e.g., a large cloud computing polygonal mosaic micro grid system.) has an overall physical diameter of ~80 cm. and a profile height less than 1.5 cm, and is an example of a large complex mosaic micro grid apparatus.

Multiple stacking of these micro grid mosaic apparatuses (2300) provides for new large mainframe design architectures, containing a plurality of micro grid processors.

The complex micro grid mosaic apparatus 2300 comprises M centric bridge structures such that M>1. See FIG. 22A and the discussion thereof which illustrates and describes a centric bridge structure.

In a generalized micro grid bridge structure whose scope includes the micro grid bridge structure of both FIGS. 22A and 24A, the generalized micro grid bridge structure comprises M centric bridge structures such that M is at least 1. Each centric bridge structure comprises a central micro grid apparatus, N outer micro grid apparatuses such that N is at least 2, and N bridge modules. Each bridge module of the N bridge modules comprises a first bridge unit latched to a docking bay of the central micro grid apparatus and a second bridge unit latched to a docking bay of a corresponding micro grid apparatus of the N outer micro grid apparatuses. The generalized micro grid bridge structure comprises a plurality of micro grid apparatuses that includes the central micro grid apparatus and the N outer micro grid apparatuses of the M centric bridge structures. The generalized micro grid bridge structure also comprises a plurality of bridge module that includes the N bridge modules of the M centric bridge structures. In FIG. 22A, M=1. In FIG. 24A, M>1 and each centric bridge structure of the M centric bridge structures is bridged by at least one other bridge module of the plurality of bridge modules to a corresponding at least one other centric bridge structure of the M centric bridge structures.

While FIG. 24A depicts the micro grid bridge structure 2300 as comprising N*M micro grid processor apparatuses, the micro grid bridge structure 2300 generally comprises N*M micro grid apparatuses, wherein each such micro grid apparatus may be either a micro grid processor apparatus or a micro grid power hub apparatus.

Figure 24B:
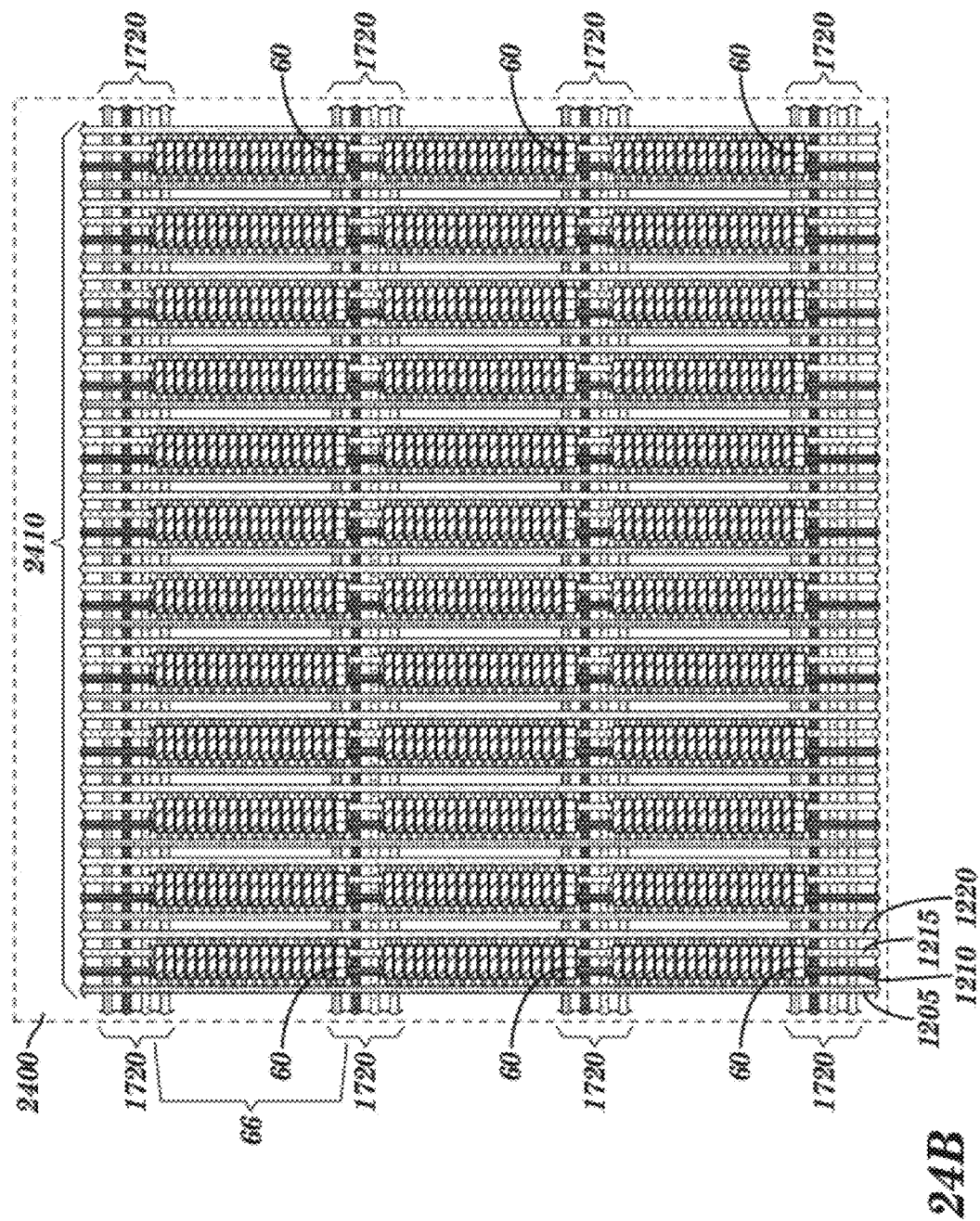
FIG. 24B is a diagram of a complex micro grid mosaic structure, in accordance with an embodiments of the present invention.

FIG. 24B is a diagram of a complex micro grid mosaic apparatus 2400, in accordance with an embodiments of the present invention. The complex micro grid apparatus 2400 is a representation of the complex micro grid mosaic apparatus 2300 of FIG. 24A and is a bridge structure that comprises a set 2410 of thirty six micro grid system stacks 66. Each micro grid system stack 66 comprises 18 processors, wherein the 18 processors of each stack include the unique processor 60. The thirty six stacks 66 are bridged as shown to form a complex micro grid mosaic array of 648 processors, including a specialized grid array of thirty six unique processors (60), and interconnected and extendable composite buses (1720). Each micro grid bus 1720 includes the micro grid system bus 1205, the standard system bus (1210, 1215), and the macro grid system bus 1220 (see FIG. 5C). The complex micro grid mosaic apparatus 2400 includes a specialized grid of thirty six unique processors 60.

In one embodiment, the complex micro grid mosaic apparatus 2400 is a 648 micro grid processor system (i.e., suitable in size for a large cloud computing polygonal mosaic micro grid system) and is further scalable, to assemble into new large mainframe polyhedral structural designs, containing a plurality of micro grid processors.

Figure 25:
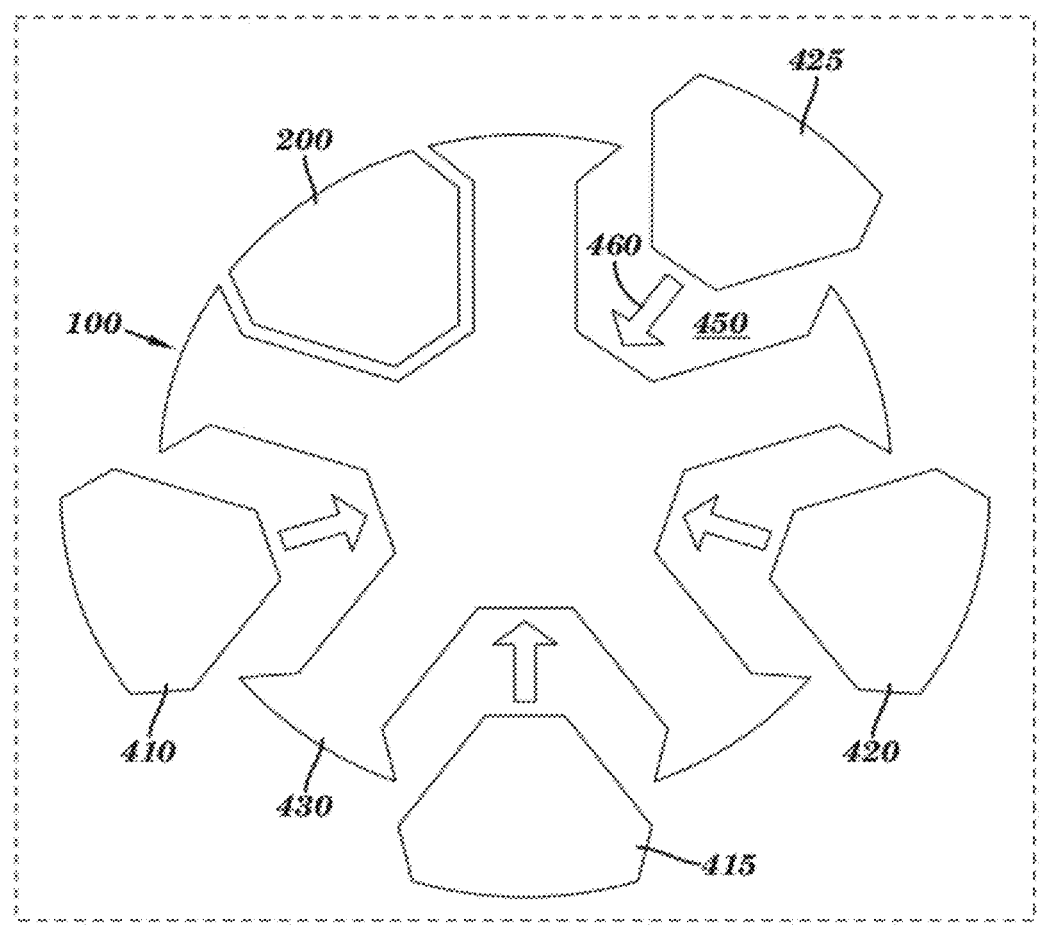
FIG. 25 is a diagram of a micro grid apparatus in which irregular shaped modules are fitted into all available docking bays, in accordance with embodiments of the present invention.

FIG. 25 is a diagram of a micro grid apparatus 100 in which irregular shaped modules 200, 410, 415, 420, and 425, which may contain chip structures, are fitted into all available docking bays, in accordance with embodiments of the present invention. Diagrammatic arrows 460 illustrate where the irregular shaped modules fit to complete the fully assembled micro grid apparatus 100. A flowchart describing the assembly of the micro grid apparatus is provided in FIG. 26, described infra. A manufactured mark 430 on the top surface of the appropriate radial arm indicates the position of connection pin 1 for ease of manufacturing and device replacement. FIG. 4B depicts the completed assembly of the micro grid apparatus of FIG. 25.

Figure 26:
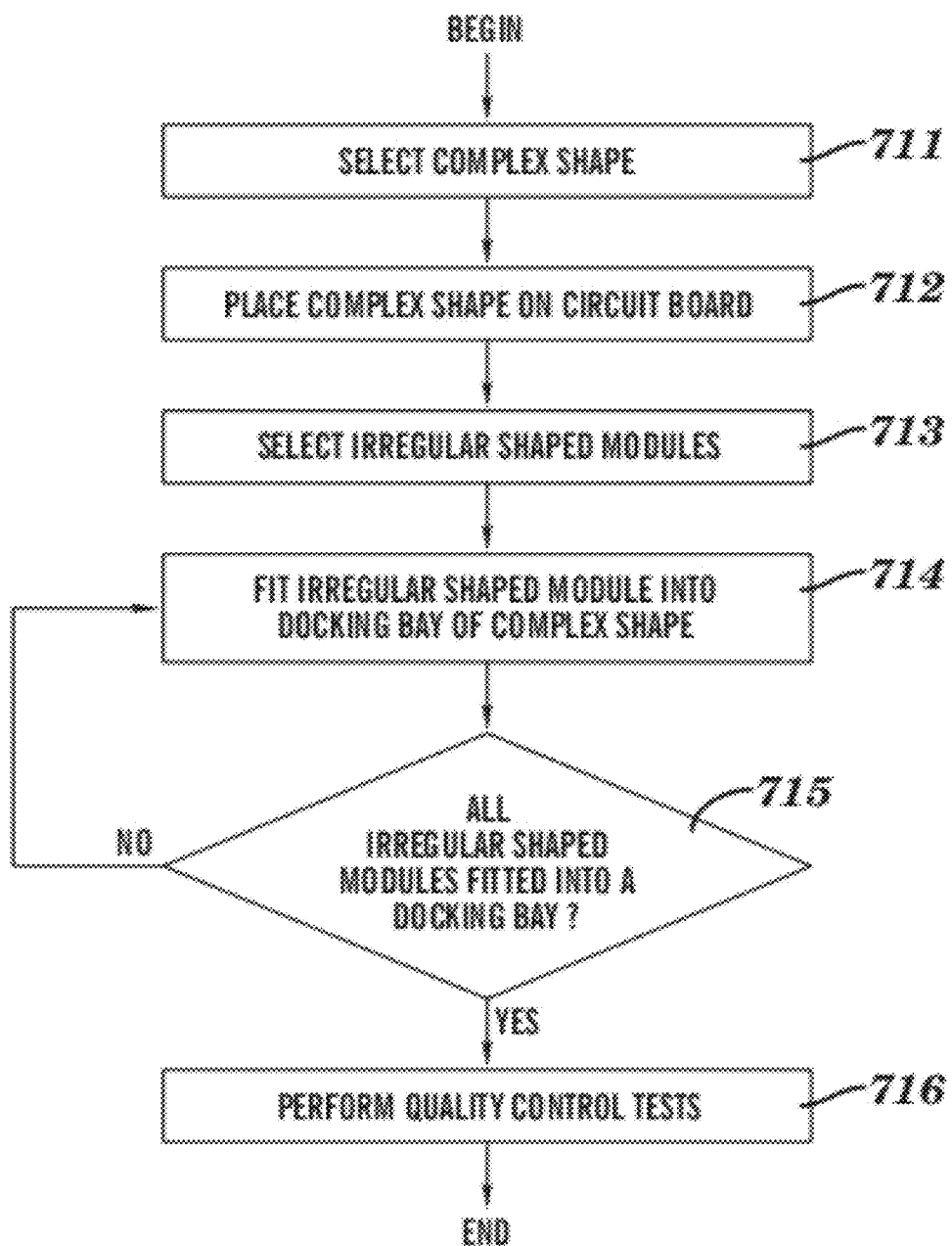
FIG. 26 is a flow chart describing a process for assembling a micro grid apparatus, in accordance with embodiments of the present invention.

FIG. 26 is a flow chart describing a process for assembling a micro grid apparatus (e.g., the micro grid apparatus 500 in FIG. 4B), in accordance with embodiments of the present invention. The flowchart of FIG. 26 comprises steps 711-716.

Step 711 selects a micro grid apparatus 100 (see FIG. 25) having a complex shape. In one embodiment, the micro grid apparatus represents a central processing unit. The manufactured mark 430 (see FIG. 25) on a radial arm of the micro grid apparatus 100 may be used to locate pin one.

Step 712 places the micro grid apparatus 100 with its complex shape on the circuit board, using multi-pin containment connection carriages soldered in place, said manufactured mark 430 ensuring that pin one is in the correct position. The multi-pin containment connection carriages are designed with a release mechanism to enable the removal of the complex shape, if necessary, from its physical connection to the mountable multi-layered printed circuit board.

Step 713 selects irregular shaped modules to be fitted into respective docking bays of the micro grid apparatus 100. In one embodiment, the total number of irregular shaped modules to be fitted into respective docking bays of the micro grid apparatus 100 is equal to the total number of empty docking bays of the micro grid apparatus 100. In one embodiment, the total number of irregular shaped modules to be fitted into respective docking bays of the micro grid apparatus 100 is less than the total number of empty docking bays of the micro grid apparatus 100. In one embodiment, the respective docking bays are randomly selected for being fitted into by the selected irregular shaped modules. In one embodiment, docking bays specific to each selected irregular shaped module are selected for being fitted into by the selected irregular shaped modules.

Step 714 fits an irregular shaped module into a docking bay of the micro grid apparatus 100 (i.e., the complex shape). The multiple serial bus configured edge of the irregular shaped module is fitted into one of the five electrical connection points on the complex structure's wedge shaped 'V' edge, by pressing down on the outer curved edge of the irregular shaped module until the device edge(s) latch into place in the docking bay.

Step 715 determines whether all irregular shaped modules have been fitted into the docking bay. If Step 715 determines that all irregular shaped modules have not been fitted into the docking bay then the process loops back to step 714 to fit the next irregular shaped module into the docking bay; otherwise all docking bays of the complex shape are occupied with irregular shaped modules to form the assembled micro grid apparatus 100 (which has the appearance of, for example, the micro grid apparatus 500 of FIG. 4B with the fitted irregular shaped modules), and step 716 is next performed.

Step 716 performs mechanical assembly quality control tests before quality assurance approval of the assembled apparatus occurs. Then the mechanical assembly process of FIG. 7 is complete and ends.

Figure 27:
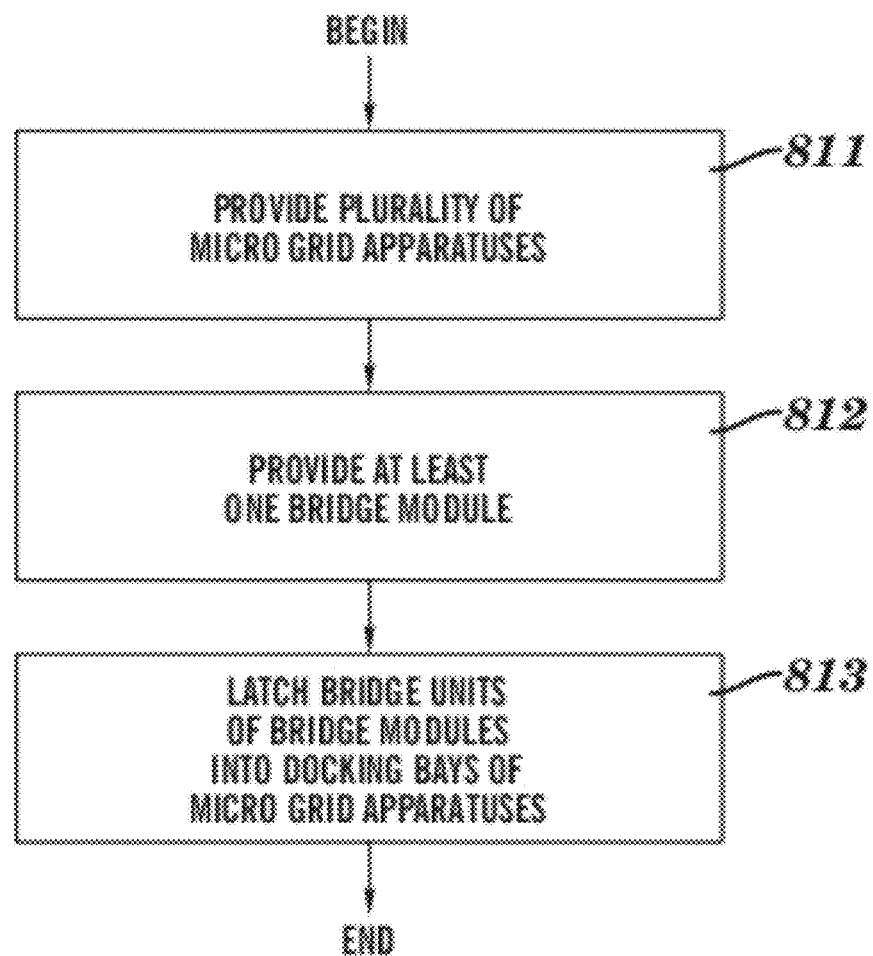
FIG. 27 is a flow describing a process for assembling a micro grid bridge structure, in accordance with embodiments of the present invention.

FIG. 27 is a flow describing a process for assembling a micro grid bridge structure, in accordance with embodiments of the present invention. The flowchart of FIG. 27 comprises steps 811-813

Step 811 provides a plurality of micro grid apparatuses. Each micro grid apparatus comprising a central area and radial arms integrally connected to and extending radially outward from the central area such that each pair of adjacent radial arms defines a docking bay into which an irregular shaped module may be latched. Each micro grid apparatus is either a power hub apparatus whose central area comprises a plurality of rechargeable batteries (as discussed infra) or a processor apparatus whose central area comprises a plurality of processors that includes a unique processor having a unique operating system differing from an operating system in each other processor of the plurality of processors.

Step 812 provides at least one bridge module comprising two bridge units connected by a bridge hinge.

Step 813 latches each bridge unit in each bridge module of the at least one bridge module into a docking bay of a respective micro grid apparatus of two grid micro apparatuses of the plurality of micro grid apparatuses to bridge the two grid apparatuses together, which results in each micro grid apparatus being bridged to at least one other micro grid apparatus of the plurality of micro grid apparatuses. A micro grid bridge structure results from performance of the process described in the flow chart of FIG. 27. The micro grid bridge structure comprises a plurality of micro grid apparatuses and at least one bridge module. Each bridge module comprises two bridge units connected by a bridge hinge. Each micro grid apparatus comprises a central area and radial arms integrally connected to and extending radially outward from the central area such that each pair of adjacent radial arms defines a docking bay into which an irregular shaped module may be latched. Each bridge unit in each bridge module of the at least one bridge module is attached into a docking bay of a respective micro grid apparatus of two micro grid apparatuses of the plurality of micro grid apparatuses to bridge the two grid apparatuses together, wherein each micro grid apparatus is bridged to at least one other micro grid apparatus of the plurality of micro grid apparatuses. Each micro grid apparatus is either a power hub apparatus whose central area comprises a plurality of rechargeable batteries or a processor apparatus whose central area comprises a plurality of processors that includes a unique processor having a unique operating system differing from an operating system in each other processor of the plurality of processors.

Thus, a "cloud" of the present invention is any complex apparatus (i.e., any complex micro grid apparatus or associated set of micro grid system stacks or a cloud computing polygonal mosaic, such as any of the micro grid bridge structures 2060, 2070, 2080, 2090, 2100, 2200, 2300, 2400), characterized by a plurality of micro grid apparatus such that the micro grid apparatus are interconnected by at least one bridge module.

In order to completely facilitate cloud computing, the present invention provides an entirely new computational micro grid technology to lift the computing industry to the next platform, embracing structures of the past but also facilitating new structures for the future.

The new fundamental computing elements of the present invention are scalable from the very tiny to the very large, so that software systems can traverse the entire hardware product range.

Cloud computing according to the present invention is available and sustainable not only in fixed locations, but also in mobile and remote locations, and is able to be serviced by engineers and robots and/or plugged into power grids.

The present invention provides for the diversity of functional use that cloud computing utilizes, for computational involvement of the very small to the very large, for the connection to everything, everywhere, all the time, for 'On Demand' requests for information, for reaction to alerts and pro-active resolve by artificial intelligence, for artefact and archive storage, all intertwined with the growing computational needs of humanity.

The following example illustrates the use of cloud computing according to the present invention. This example comprises wireless connectivity of twelve micro grid apparatuses embedded in vehicles on a freeway, adjacent to each other, and moving at fifty miles per hour. Each individual micro grid apparatus has a unique processor 60 that is constantly monitoring for alerts and task requests, from sensors attached to the vehicles, and keyboard requests from individuals within the vehicles.

A macro grid containing an artificial intelligence is generated between the apparatus's when alerts and requests are received. Alerts and requests can be anything from smoke detector alerts on or within the vehicles, to stock exchange data requests by the passengers. There may be a plurality of alert and request types.

The artificial intelligence (macro grid) expands itself by conscripting other wirelessly adjacent micro grid processors to assist with computing the alert or request. Escalation is the result of an increased change in alert scale. This cloud computing process is constantly occurring and evolving. One macro grid containing an artificial intelligence is connected to the Internet for stock exchange information transfer, while another macro grid has generated amongst the four adjacent leading vehicles in the group of twelve, reacting to three additional smoke alerts to the one smoke alert the another macro grid has itself detected. The another macro grid needs to determine whether each alert is unique or is a larger issue as the vehicles pass by a fire along side the freeway. Each artificial intelligence determines what to do about their request or alert.

The artificial intelligence seeking the stock exchange data, determines that another passenger in another one of the twelve vehicles has just coincidentally requested the same information, and copies and transfers the fresh data to satisfy the request without requiring access to the host server containing the stock exchange information. The artificial intelligence decides to maintain itself and its access to the Internet should further World Wide Web requests occur within the adjacent vehicles in the next 3 minutes.

The artificial intelligence reacting to the smoke alert has determined that it is both a passenger who is smoking in the vehicle and a scrub fire outside the vehicle. This artificial intelligence illuminates a visual cigarette smoke warning message to the passengers on the dashboard display console and the display panels in the rear of the front passengers head rests within the vehicle that originated the local alert. Health advertising messages (from advertising agencies on the web) are also displayed on the liquid crystal display panels by the artificial intelligence.

The artificial intelligence also conscripts additional micro grid processors from one of the other four vehicles that raised a higher alert value of the scrub fire and migrates the majority of its computational power to that vehicle. It determines that three other lead vehicles have now also detected the scrub fire smoke, and synchronizes a gradual speed change and increased vehicle distance gap between all twelve vehicles, using micro grid controlled actuators on the vehicles. Visual messages are also displayed on the driver's dashboard consoles. Fire prevention advertising messages (from advertising agencies on the web) are also displayed on the liquid crystal display panels by the artificial intelligence.

Two of the leading vehicles reduce their alert value for external smoke detection and one declares a value of zero. The artificial intelligence recognizes the changing pattern of the alert value and shifts its processing power (the heavier concentration of its conscripted micro grid processors) further back amongst the following vehicles.

Eventually all micro grid alert values are zero and the artificial intelligence decays leaving twelve vehicles travelling on the freeway with larger vehicle gaps between them and moving at 45 miles per hour. The drivers all gradually increase their speed again to fifty miles per hour. Cloud computing has been efficient and the micro grids were effective.

F. Power

Figure 28:
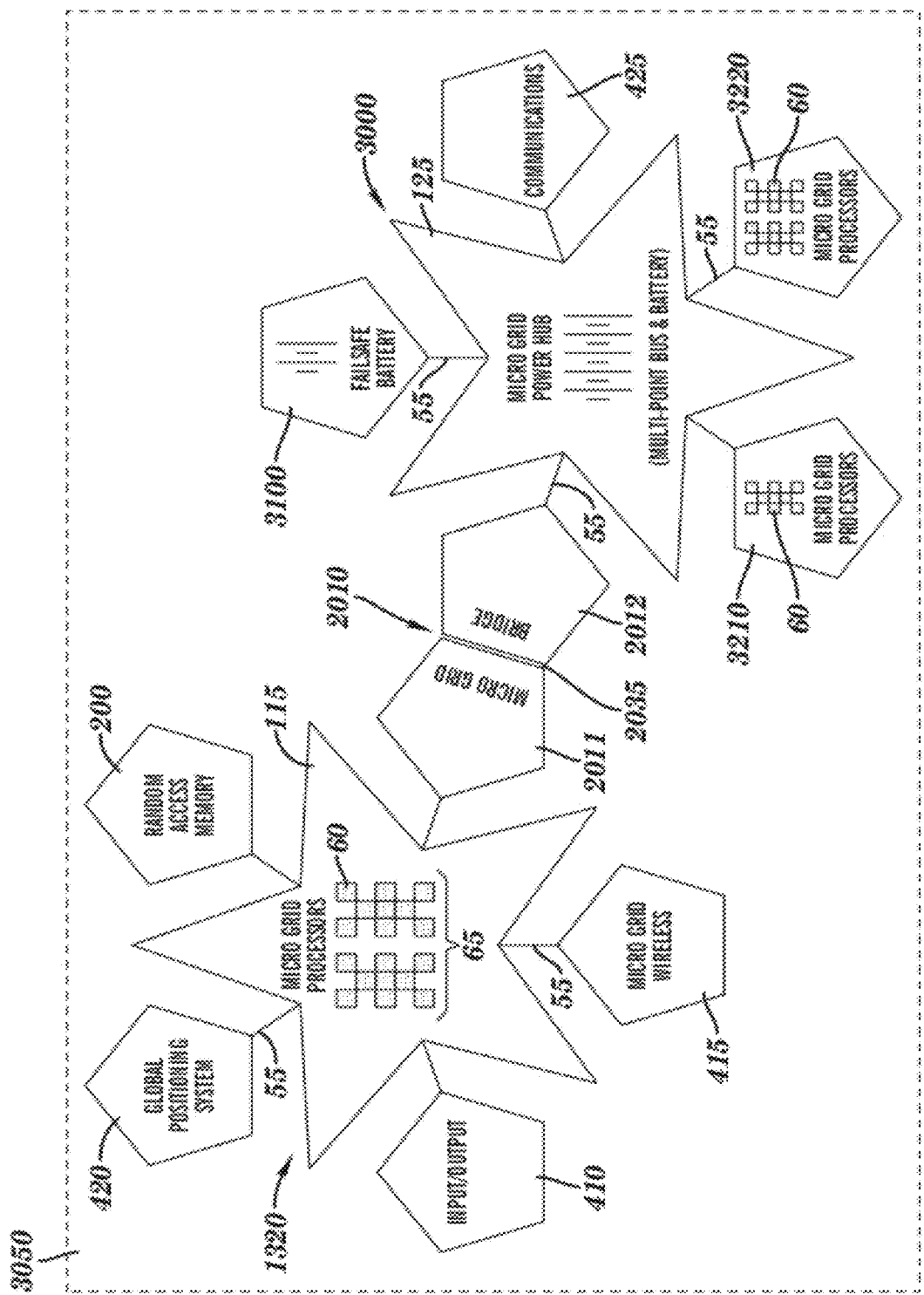
FIG. 28 is a block diagram depicting a micro grid computing system with a bridge module physically connecting a micro grid apparatus to a power hub, in accordance with embodiments of the present invention.

FIG. 28 is a block diagram depicting a micro grid computing system 3050 with a bridge module 2010 physically connecting a micro grid processor apparatus 1320 to a power hub apparatus 3000, in accordance with embodiments of the present invention. The bridge module 2010 comprises bridge units 2011 and 2012 connected together by a bridge hinge 2035. The bridge hinge 2035 provides the bridge module 2010 with sufficient physical flexibility to enable the bridge units 2011 and 2012 to dock and be ensconced into respective docking bays of the micro grid processor apparatus 1320 and the power hub apparatus 3000. Generally, the micro grid processor apparatus 1320 and the power hub apparatus 3000 are embodiments of a first micro grid system and a second micro grid system, respectively.

The micro grid processor apparatus 1320 comprises two sets of nine processors (cell processors) (65), attached to four types of add-on irregular shaped modular system devices (200, 420, 410, 415), and connection to the bridge module 2010, linking the micro grid processor apparatus 1320 to a micro grid battery pack or power hub apparatus 3000 containing an assembly of rechargeable batteries (not shown) and five docking bays each capable of accommodating a stack of three irregular modular system devices, each with a bus connection 55. Attached to the micro grid power hub apparatus 3000 are a failsafe battery (3100), communications module (425), micro grid processor module (3220), and micro grid processor module (3210). A failsafe battery is defined as a battery that has a probability of failure below a specified threshold probability by including features in the battery that automatically counteract anticipated sources of failure of the battery (e.g., via continuous monitoring of battery voltage and/or charge).

Thus, a micro grid apparatus in a bridge structure may be a micro grid processor apparatus ("processor apparatus" for short) or a micro grid power hub apparatus ("power hub apparatus" or "power hub" for short). A processor apparatus (e.g., processor apparatus 1320) is defined as a micro grid apparatus whose central area 115 comprises a plurality of micro grid processors 65 that includes a unique processor 60. A power hub apparatus (e.g., power hub apparatus 3000) is defined as a micro grid apparatus whose central area 125 comprises a plurality of rechargeable batteries.

The micro grid power hub apparatus 3000 has docking bay accommodation for fifteen add-on irregular modular system devices in one embodiment of the present invention.

A functional purpose of the features for the fixed, mobile, or remote micro grid computing system (3050) is to provide:
1. a battery power device (power hub apparatus 3000) for a fixed, mobile or remote micro grid system embodied in a single complex apparatus;
2. a hub of docking bays for attaching a plurality of irregular shaped modules to a fixed, mobile or remote micro grid system embodied in a single complex apparatus;
3. a failsafe battery contained within an irregular shaped module (3100) for maintaining localized data vitality of random access memory and processor cache memory in the event of a main supply power failure to small fixed micro grid systems, and other micro grid systems that do not have access to, wherein the failsafe battery irregular shaped module structure 3100 is able to connect to any available docking bay on either a complex shaped micro grid apparatus (1310) or another micro grid power hub apparatus (3000);
4. an add-on micro grid of nine cell processors contained within an irregular shaped module (3210) for increasing the number of processors in a micro grid within the embodiment of a single apparatus;
5. an add-on micro grid of eighteen cell processors contained within an irregular shaped module (3220) for increasing the number of processors in a micro grid within the embodiment of a single apparatus;
6. a complex shaped structure for the containment of a primary 12 Volt (5 Amp Hour) battery for a constant source of supply of micro grid voltage and power (power hub apparatus 3000).

FIG. 29A is a diagram of a micro grid bridge structure 3300, which is a bridge structure connecting a micro grid processor apparatus 1310 to a micro grid power hub apparatus 3000 by a micro grid bridge module 2010, in accordance with embodiments of the present invention. The micro grid processor apparatus 1310 comprises four irregular shaped modules (200, 420, 410, 415). The power hub apparatus 3000 comprises three failsafe battery modules 3100, one irregular shaped module (425), and ten available docking bays.

A functional purpose of the physical micro grid structure 3300 for a fixed, mobile or remote micro grid computing system is to provide a micro grid system with:
1. one terabyte of memory (200) in one embodiment;
2. Global Positioning data (420) in one embodiment;
3. Input and Output for mouse, keyboard, pointing devices and digital monitor (410) in one embodiment;
4. mesh wireless for cloud computing micro grid communication (415), (i.e., macro grid artificial intelligence communication) in one embodiment;
5. additional micro grid module access by a bridge module (2010), containing micro grid system buses, power and maintenance serviceability in one embodiment;
6. Ethernet fibre optic and 802.11g Wireless (Transmission Control Protocol/Internet Protocol) Communications (425) for the unique processor alert detection, alert scale communication and adjacent apparatus micro grid processor availability recognition;
7. a primary battery power supply or power hub apparatus (3000), attached to the filtered mains power supply (or a solar panel in some mobile and remote locations), with a voltage light emitting diode indicator (3110) to indicate charge condition;
8. failsafe battery (3100) for short term memory vitality, with a voltage light emitting diode indicator (3105) to indicate charge condition;
9. ten additional docking bays, for additional micro grid modules and failsafe battery recharging, are available on the upper two layers of the power hub apparatus (3000).

FIG. 29B is a diagram of a micro grid bridge structure (3400), which is a bridge structure showing a second micro grid power hub (3000B) connected by a first micro grid bridge module (2010A) to a first micro grid power hub apparatus (3000A) and by a second micro grid bridge module (2010B) to a micro grid processor apparatus (1310), in accordance with an embodiments of the present invention. The micro grid bridge structure (3400) includes eleven irregular shaped modules, namely two irregular shaped modules 200, two irregular shaped modules 425, two irregular shaped modules 410, one irregular shaped module 415, one irregular shaped module 420, and three failsafe battery modules 3100. FIG. 29B shows two dotted lines, one from point E to point F, and one from point G to point H that are described infra in conjunction with FIG. 29D and FIG. 29F, respectively.

The micro grid bridge structure (3400) may be used for bus expansion, micro grid scalability, increased battery power, and additional docking bays for a fixed, mobile or remote micro grid computing system. Additional features to the micro grid bridge structure (3400) include: micro grid expandability, scalability and battery power doubling, by use of two bridged complex shaped power hubs, and additional unfilled docking bays available for additional micro grid irregular shaped modules to be added.

The failsafe battery's voltage light emitting diode indicator (3105), and the power hub apparatus's voltage light emitting diode indicator (3110), indicate the voltage charge status of the failsafe battery and the power hub apparatus, respectively, by a green, yellow or red (tri-state light emitting diode) condition.

In one embodiment, the light emitting diode indicator (3105) in the failsafe battery irregular shaped module (3100) includes a tri-state light emitting diode Power status indicator.

In one embodiment, the light emitting diode indicator (3110) in the power hub apparatus (3000) includes a tri-state light emitting diode Power status indicator.

The failsafe battery irregular shaped module and the power hub apparatus may each include its own unique screen printed marking for uniquely identifying the failsafe battery and the power hub, and may each be indicative of the manufacturing source, and other descriptive information such as date of manufacture, revision level of the internal electronic content, etc. A unique bold identification icon may be embossed into the body (e.g., plastic or ceramic body) at the time the failsafe battery and power hub is formed during manufacture.

The light emitting diodes (visual and infra red) on the two micro grid bridge structures (2010) are available for visually observing the vitality and data activity on the connected busses, and infra red monitoring of the data buses by maintenance tools and in some mobile and remote locations, by robots.

Figure 29C:
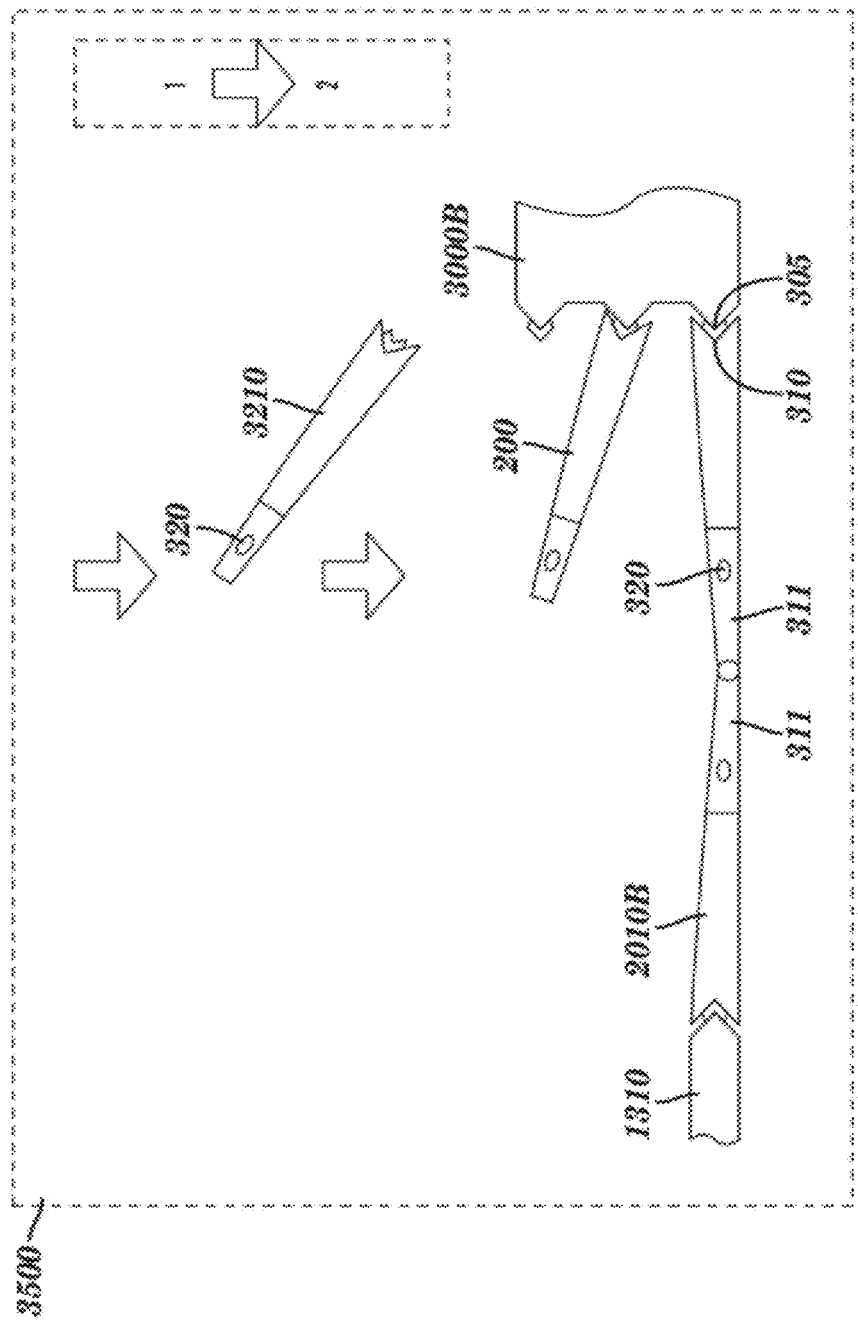
FIG. 29C is a vertical section diagram showing part of one micro grid processor apparatus connected by a micro grid bridge module to the bottom docking bay of part of a micro grid power hub, and two steps of assembling irregular shaped modules into the remaining docking bay connection points of a micro grid power hub structure, in accordance with an embodiments of the present invention.

FIG. 29C is a vertical section diagram (3500) showing part of one micro grid processor apparatus (1310) connected by a micro grid bridge module (2010) to the bottom docking bay of part of a micro grid power hub apparatus (3000), and two steps of assembling irregular shaped modules (3210) and (200) into the remaining docking bay connection points (305) of a micro grid power hub apparatus (3000) structure, in accordance with an embodiments of the present invention.

The assembling of irregular shaped modules (3210) and (200) into the remaining docking bay connection points (305) is shown in FIG. 29C for a fixed, mobile or remote micro grid computing system in two steps (1 and 2). Initially, the micro grid bridge structure (2010) is latched into position by the protrusion (320), on both sides and both halves of the bridge, fitting into receptors of the same size located on the inside radial arms of the micro grid power hub apparatus (3000) and micro grid processor complex shape (1310). Power and bus connection is made at the 'V' shaped edge between the connection point of the bridge (310) and the micro grid power hub's connection point (305).

Similarly, the Random Access Memory irregular shaped module (200) is inserted and latches down in tier one of the micro grid power hub's docking bay.

A nine processor micro grid irregular shaped module (3210) latches down in tier two of the micro grid power hub's docking bay, with its protrusion (320) along latching edge 311 fitting into the two receptors of the same size located on tier two of the inside radial arms of the micro grid power hub apparatus.

Figure 29D:
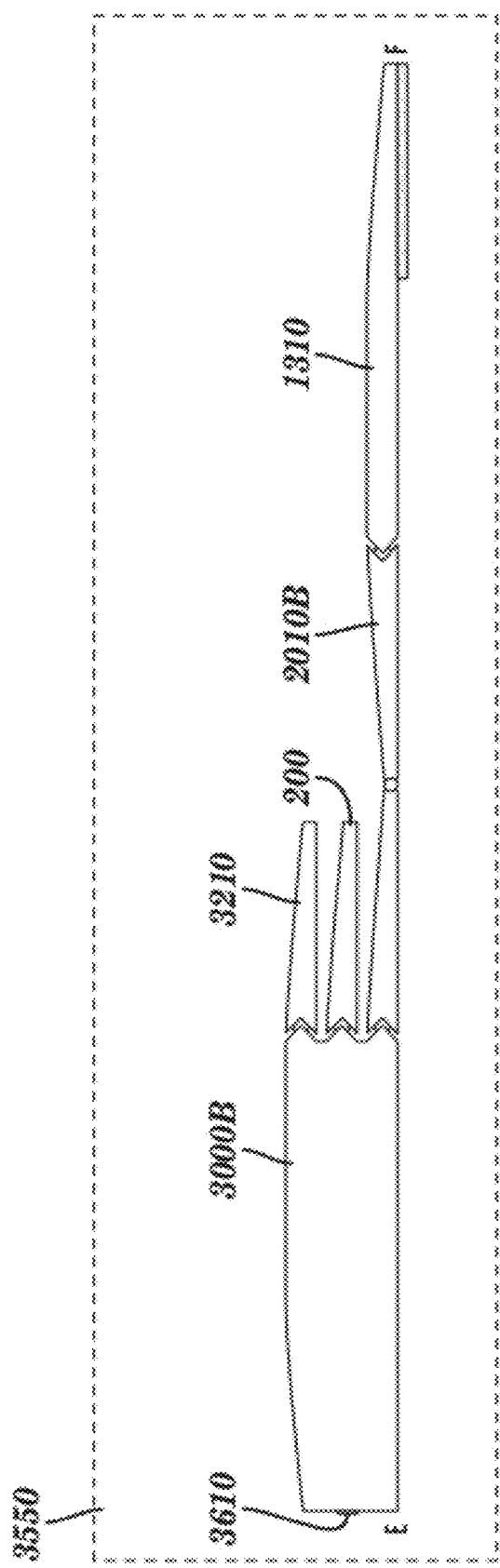
FIG. 29D is a vertical cross-sectional view along a line E-F depicted in FIG. 29B, showing the completed assembly process of this part of the micro grid apparatus, in accordance with embodiments of the present invention.

FIG. 29D is a vertical cross-sectional view (3550) along a line E-F depicted in FIG. 29B, showing the completed assembly process of this part of the micro grid bridge structure (3400), in accordance with an embodiments of the present invention. According to the assembly steps taken in the vertical section diagram in FIG. 29C, the result is a micro grid processor apparatus (1310) connected by a micro grid bridge module (2010B) to the bottom docking bay (tier zero) of a micro grid power hub apparatus (3000B), and two irregular shaped modules (3210), and (200), latched into the remaining vertical tier docking bay connection points of a micro grid power hub apparatus (3000B).

A power socket (3610) is provided on the center of one of the radial arms of the micro grid power hub apparatus (3000B) for battery charging and filtered mains power supply connection, including electrical connection to a solar panel charging 'skin' (3905) as described supra in conjunction with FIGS. 14A and 14B.

Figure 29E:
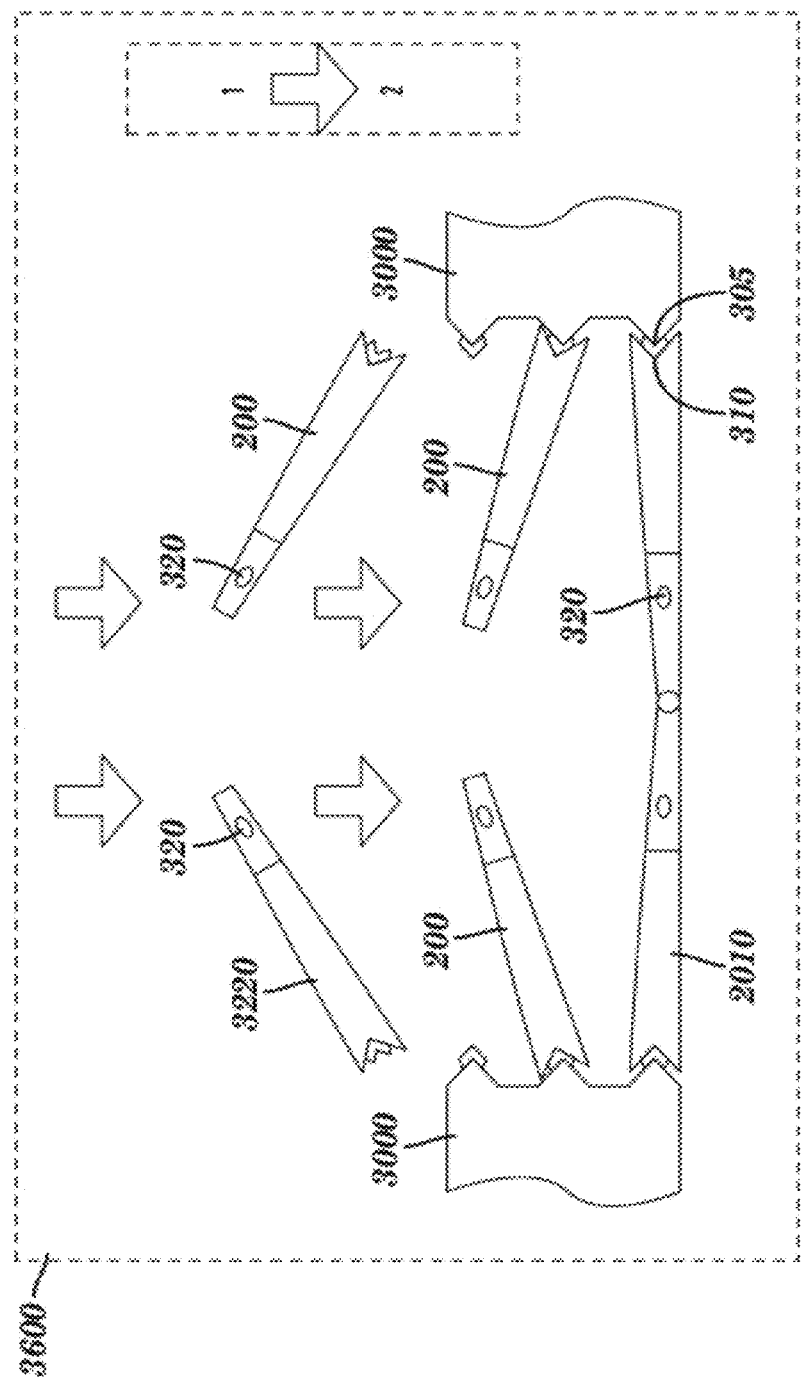
FIG. 29E is a vertical section diagram showing part of one micro grid power hub connected by a micro grid bridge module to the bottom docking bay of part of another micro grid power hub, and two stages of assembling irregular shaped modules, into the remaining docking bay connection points of both micro grid power hubs, in accordance with embodiments of the present invention.

FIG. 29E is a vertical section diagram (3600) showing part of one micro grid power hub apparatus (3000) connected by a micro grid bridge module (2010) to the bottom docking bay (tier zero) of part of another micro grid power hub apparatus (3000), and two stages of assembling irregular shaped modules (3220, 200, 200, 200), into the remaining docking bay connection points (305) of both micro grid power hub apparatuses (3000), in accordance with embodiments of the present invention.

The assembling of irregular shaped modules (3220, 200, 200, 200) into the remaining docking bay connection points (305) is shown in FIG. 29E for a fixed, mobile or remote micro grid computing system in two steps (1 and 2). Initially the micro grid bridge structure (2010) is latched into position by the protrusion (320), on both sides and both halves of the bridge, fitting into receptors of the same size located on the inside radial arms of the micro grid power hubs (3000, 3000). Power and bus connection is made at the 'V' shaped edge between the connection point of the bridge (310) and the micro grid power hub's connection point (305).

Similarly, the three Random Access Memory irregular shaped modules (200, 200, 200), shown, are inserted and latched down in the available vertical tiers of the docking bay of the micro grid power hubs.

An eighteen processor micro grid irregular shaped module (3220) latches down in the tier two of the micro grid power hub's docking bay, with its protrusion (320) fitting into the two receptors of the same size located on tier two of the inside radial arms of the micro grid power hub.

Figure 29F:
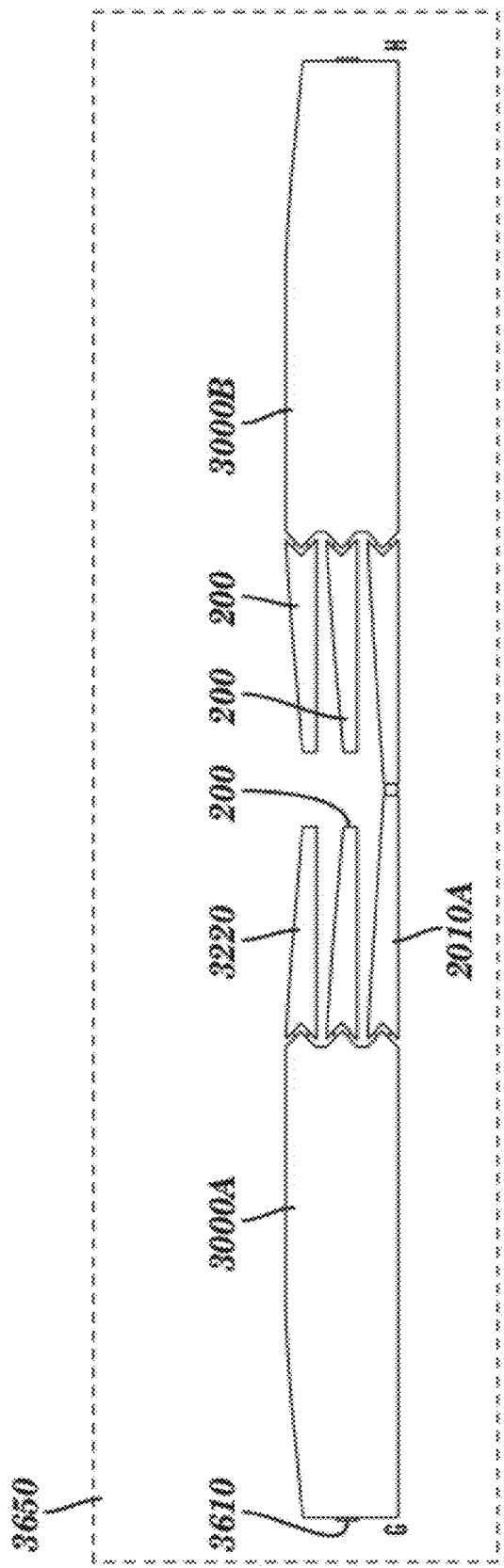
FIG. 29F is a vertical cross-sectional view along a line G-H depicted in FIG. 29B, showing the completed assembly process of this part of the micro grid apparatus, in accordance with an embodiments of the present invention.

FIG. 29F is a vertical cross-sectional view (3650) along a line G-H depicted in FIG. 29B, showing the completed assembly process of this part of the micro grid bridge structure (3400), in accordance with an embodiments of the present invention. According to the assembly steps taken in the vertical section diagram in FIG. 29E, the result is micro grid power hub apparatus (3000A), connected by a micro grid bridge module (2010A) to the bottom docking bay (tier zero) of micro grid processor apparatus (1310), and four irregular shaped modules (3220, 200, 200, 200) are latched into the remaining vertical tier docking bay connection points of micro grid power hub apparatus (3000A) and micro grid power hub apparatus (3000B).

A power socket (3610) is provided on the center of one of the radial arms of micro grid power hub apparatus (3000A) for battery charging and filtered mains power supply connection, including electrical connection to a solar panel charging 'skin' (3905) as described supra in conjunction with FIGS. 14A and 14B.

G. Mainframe/Server Apparatus

A micro grid apparatus of the present invention is either a mainframe apparatus configured to be used in a mainframe system or a server apparatus configured to be used in a server system.

A mainframe apparatus comprises a multi-tier micro grid structure which includes a plurality of sequentially stacked tiers. Each tier comprises a bridge structure. In one embodiment, the bridge structure of each tier is a complex mosaic micro grid structure. A mosaic micro grid apparatus is a bridge structure comprising a plurality of micro grid structures interconnected with one another via bridge modules. Embodiments of micro grid multi-tier topologies were described supra in conjunction with FIGS. 13A, 13B, 14B 17A.

A server apparatus of the present invention comprises a single tier micro grid server structure which comprises only one tier, namely a single tier. In one embodiment, the single tier of a server apparatus is a complex mosaic micro grid structure.

The present invention provides methods of forming a mainframe apparatus and/or a server apparatus for use in micro grid and macro grid fixed location computing, and more generally in grid computing, and holistically in cloud computing.

Figure 30:
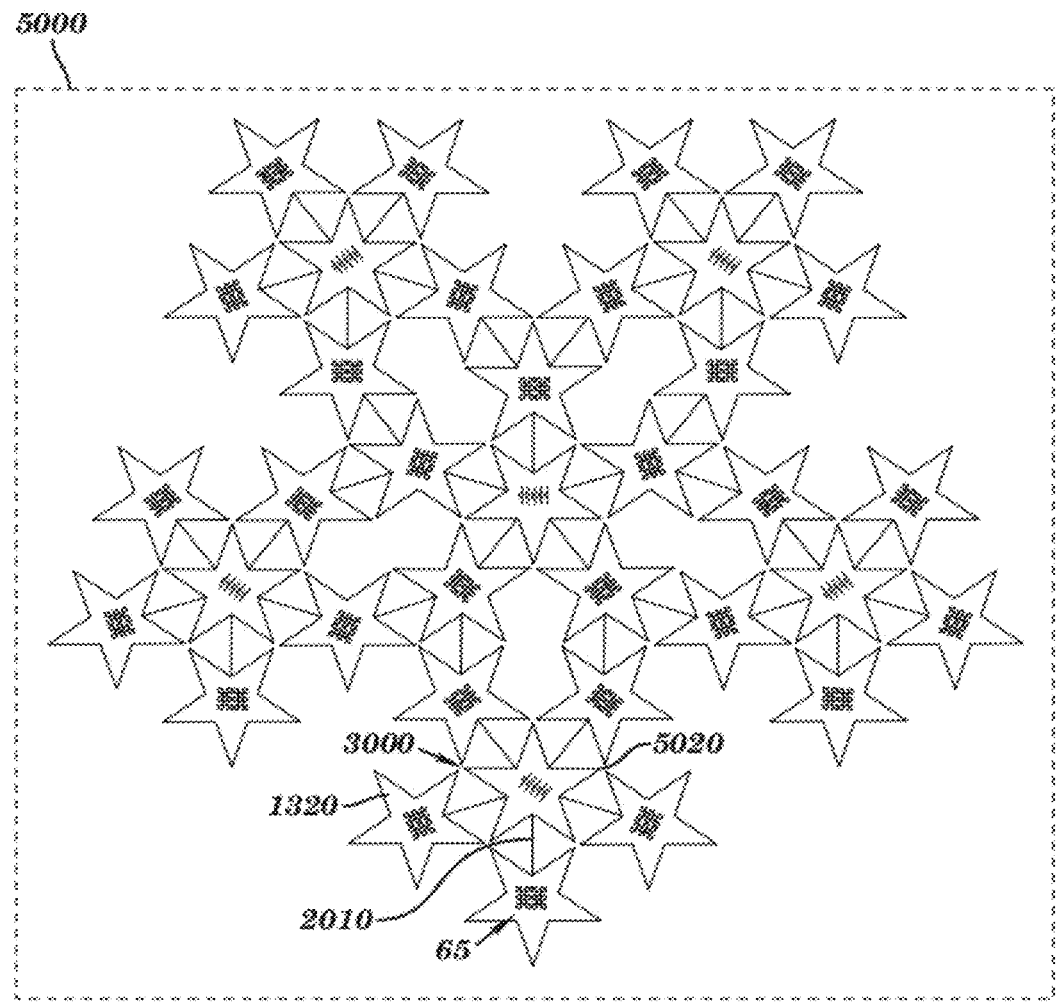
FIG. 30 depicts a complex mosaic micro grid structure on a tier of a mainframe apparatus or on the single tier of a server apparatus, in accordance with embodiments of the present invention.

FIG. 30 depicts a complex mosaic micro grid structure 5000 on a tier of a mainframe apparatus or on the single tier of a server apparatus, in accordance with embodiments of the present invention.

The complex mosaic micro grid apparatus 5000 comprises a plurality of power hubs 3000 and a plurality of micro grid structures 1320. Each power hub 3000 is directly connected to at least two micro grid structures 1320 via bridge modules 2010. Each power hub 3000 is connected to at least one other power hub 3000 via at least one micro grid structure 1320 disposed between each power hub 3000 and each at least one other power hub 3000.

Each micro grid structure 1320 is a "processor hub" that comprises a plurality of processors 65 which includes a unique processor 60 as described supra. Each micro grid structure 1320 (or micro grid structure 1310 described supra and infra) or power hub 3000 is a complex shape that comprises a central area and radial arms external to and integral with the central area. Each radial arm extends radially outward from the central area and each pair of adjacent radial arms defines a docking bay. The docking bays are for accommodating modules to be inserted in the docking bays as described supra.

Specifically, FIG. 30 depicts thirty complex micro grid structures 1320 on a mosaic tier. Each micro grid structure 1320 is physically bridged via bridge module 2010, and interconnected and linked to six direct-current micro grid 'power tower' complex shapes 5020 (see FIG. 31A).

A functional purpose of the mosaic micro grid apparatus 5000 is to provide modularity for construction of either a single tier server apparatus or a multi-tier mainframe apparatus, which is a key feature for micro grid hardware design, diversity, and functionality. In one embodiment, each micro grid structure 1320 has eighteen micro grid processors 65 and a micro grid software assigned unique processor 60.

The micro grid apparatus 5000 is structured as a complex mosaic and is assembled on a pentagonal multi-layered printed circuit board 5340 (see FIG. 33A), with a base to apex length 5310 (see FIG. 33A) of 90 cm (i.e. ~3 feet) in one embodiment.

The micro grid 'power tower' complex shape (5020) in a fixed location micro grid server and micro grid mainframe computing system (5000) is provided, in one embodiment, in two hundred vertical tiers, and provides one thousand micro grid irregular shaped module (and bridge) docking bays. In one embodiment, each tier is ~11 mm in height. Thus, a 'power tower' encompasses corresponding power hubs in all tiers of a mainframe apparatus such that the corresponding power hubs in successive tiers are aligned directly above or directly below each other and are integral with each other. The 'power towers' physically connect together the tiers of the mainframe apparatus.

In one embodiment, the tiers provide a 2.2 meter high physical structure for assisting with the structural strength and physical integrity of the mainframe apparatus.

In one embodiment, direct-current voltage distribution to the one thousand 'V' shaped micro grid irregular shaped module docking bays, from 12V (320 amp hour) batteries, are embodied in the micro grid 'power tower' complex shape (5020) structure, acting as: a final power filter for the primary switched-mode power supply; and an un-interruptible power supply embodied within the mainframe apparatus. For example, each micro grid 'power tower' 5020 comprises a plurality of rechargeable batteries 5025 (see FIG. 35A).

In one embodiment, system bus distribution is provided to the one thousand 'V' shaped micro grid irregular shaped module docking bays.

Thus, the complex mosaic micro grid structure 5000, as well as any other complex mosaic micro grid structure or simple mosaic micro grid structure described herein, comprises a multiplicity of complex shapes, where each complex shape of the multiplicity of complex shapes is either a 'power hub' whose central area comprises a plurality of rechargeable batteries or a 'processor hub' whose central area comprises plurality of processors. A multiplicity of complex shapes is defined herein to consist of two or more complex shapes.

Figure 31A:
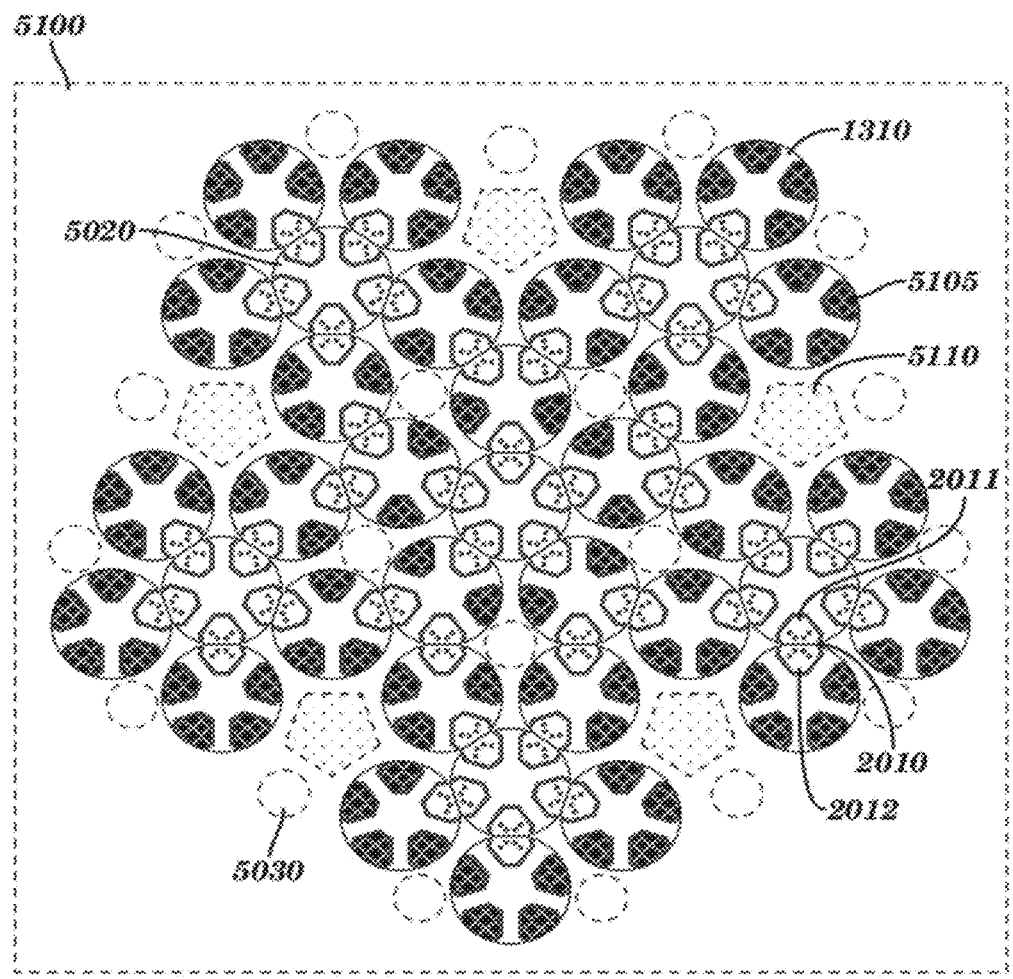
FIGS. 31A, 31B, 31C, 32A, and 32B each depict a complex mosaic micro grid structure on a single tier of a server apparatus or on a tier of a mainframe apparatus, in accordance with embodiments of the present invention.

FIG. 31A depicts a complex mosaic micro grid structure 5100 on a single tier of a server apparatus or on a tier of a mainframe apparatus, in accordance with embodiments of the present invention. The complex mosaic micro grid structure 5100 comprises thirty micro grid structures 1310 and one hundred micro grid nine-processor irregular shaped modules (5105). Each micro grid structure 1310 is a "processor hub", namely a complex shape as described supra and comprises a plurality of processors 60 (e.g., eighteen processors) which may include a unique processor 65. In one embodiment the complex mosaic micro grid structure 5100 comprises one thousand four hundred and forty processors.

Each micro grid structure 1310 is physically bridged to one of six direct-current micro grid 'power tower' complex shapes (5020) via bridge module 2010 in a fixed micro grid computing system. The 'power tower' complex shapes 5020 is characterized by each docking bay of the 'power tower' complex shapes 5020 comprising a bridge unit (2011 or 2012) of a bridge module 2010.

Twenty circular holes (5030) provide locations for cooling pipes containing pumped liquid nitrogen. Each cooling pipe passes through all tiers of the mainframe apparatus that comprises the complex mosaic micro grid structure 5100.

Five pentagonal locations (5110) are illustrated where 'pin and socket' connection blocks are placed for vertical stacking of multiple mosaic tiers. Each stack of 'pin and socket' connection blocks at locations 5110 form vertically continuous, and segmented, multi-data bus, power and signal 'backplanes', for micro grid computing apparatuses assembled without micro grid 'power tower' structures 5020 in one embodiment.

Figure 31B:
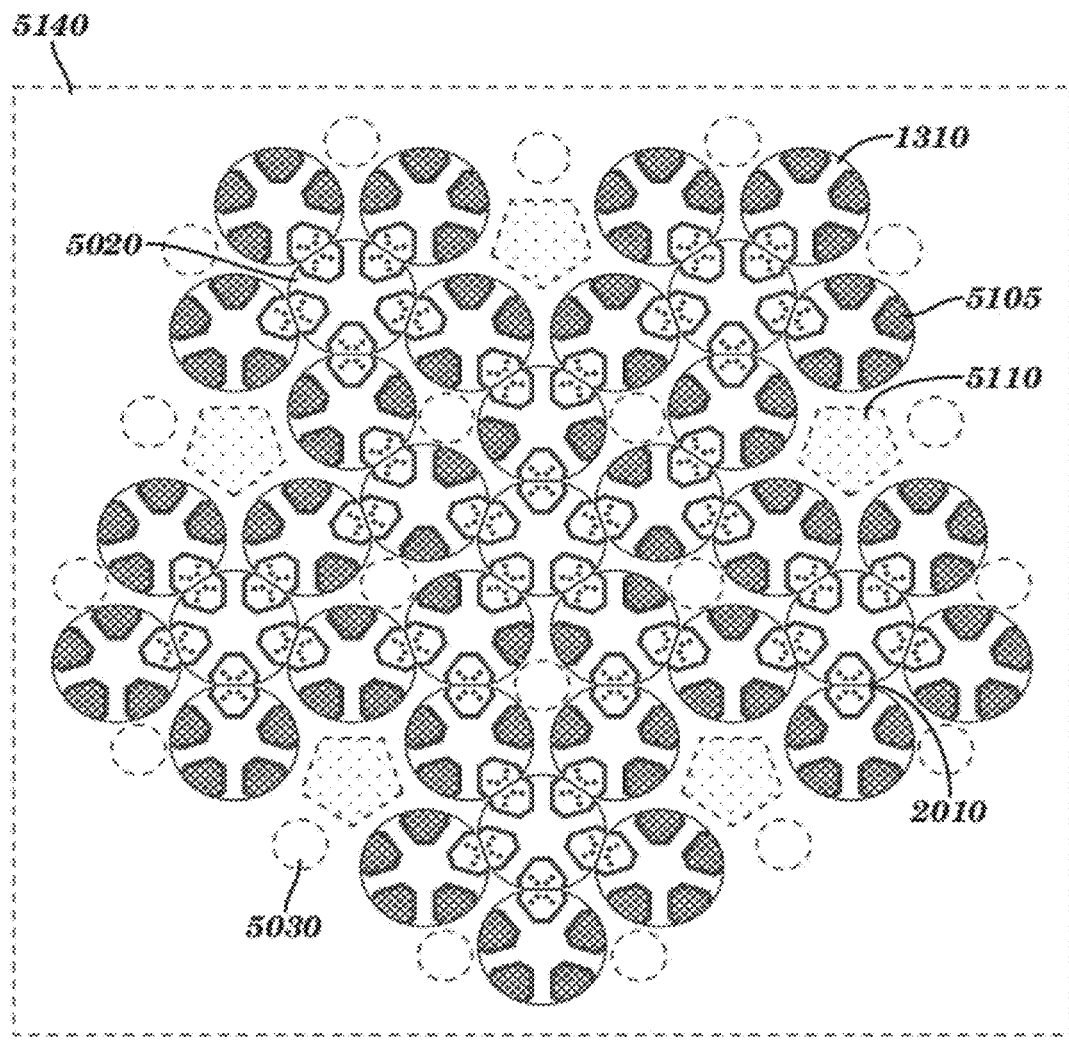

FIG. 31B depicts a complex mosaic micro grid structure 5140 on a single tier of a server apparatus or on a tier of a mainframe apparatus, in accordance with embodiments of the present invention. The complex mosaic micro grid structure 5140 comprises thirty micro grid structures 1310 and one hundred micro grid nine-processor irregular shaped modules (5105). In one embodiment each micro grid structure 1310 is a 'processor hub' comprising eighteen processors.

The complex mosaic micro grid structure 5140 comprises two thousand three hundred and forty processors.

Each micro grid structure 1310 is physically bridged to one of six direct-current micro grid 'power tower' complex shapes (5020) via bridge module 2010 in a fixed micro grid computing system.

Twenty circular holes (5030) provide locations for cooling pipes containing pumped liquid nitrogen. Each cooling pipe passes through all tiers of the mainframe apparatus that comprises the complex mosaic micro grid structure 5140.

Five pentagonal locations (5110) are illustrated where 'pin and socket' connection blocks are placed for vertical stacking of multiple mosaic tiers. Each stack of 'pin and socket' connection blocks at locations 5110 form vertically continuous, and segmented, multi-data bus, power and signal 'backplanes', for micro grid computing apparatuses assembled without micro grid 'power tower' structures 5020 in one embodiment.

Figure 31C:
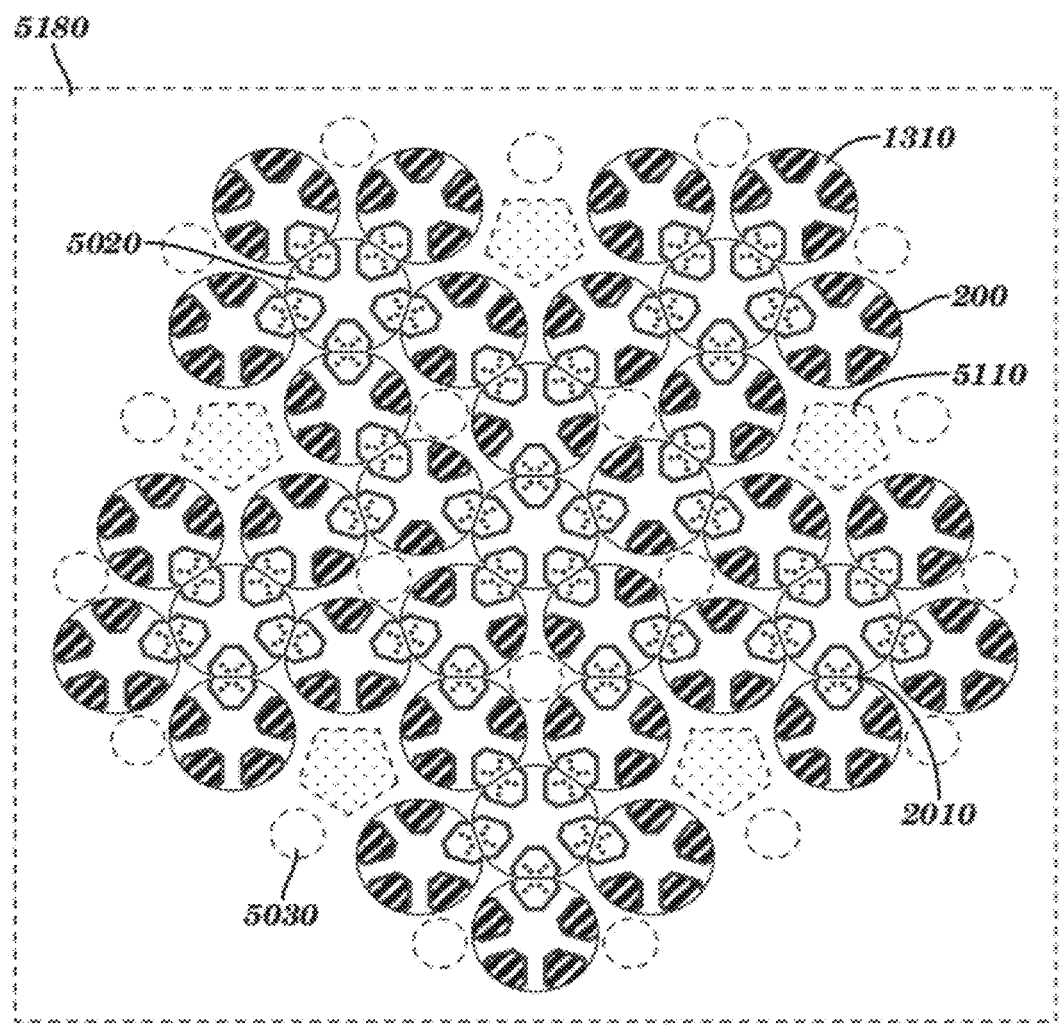

FIG. 31C depicts a complex mosaic micro grid structure 5180 on a single tier of a server apparatus or on a tier of a mainframe apparatus, in accordance with embodiments of the present invention. The complex mosaic micro grid structure 5180 comprises thirty micro grid structures 1310 and one hundred micro grid random access memory irregular shaped modules (200). In one embodiment each micro grid Random Access Memory irregular shaped module 200 contains one terabyte of memory.

The complex mosaic micro grid structure 5180 comprises five hundred and forty processors.

The complex mosaic micro grid structure 5180 comprises one hundred terabytes of random access memory.

Each micro grid structure 1310 is physically bridged to one of six direct-current micro grid 'power tower' complex shapes (5020) via bridge module 2010 in a fixed micro grid computing system.

Twenty circular holes (5030) provide locations for cooling pipes containing pumped liquid nitrogen. Each cooling pipe passes through all tiers of the mainframe apparatus that comprises the complex mosaic micro grid structure 5180.

Five pentagonal locations (5110) are illustrated where 'pin and socket' connection blocks are placed for vertical stacking of multiple mosaic tiers. Each stack of 'pin and socket' connection blocks at locations 5110 form vertically continuous, and segmented, multi-data bus, power and signal 'backplanes', for micro grid computing apparatuses assembled without micro grid 'power tower' structures 5020 in one embodiment.

Figure 32A:
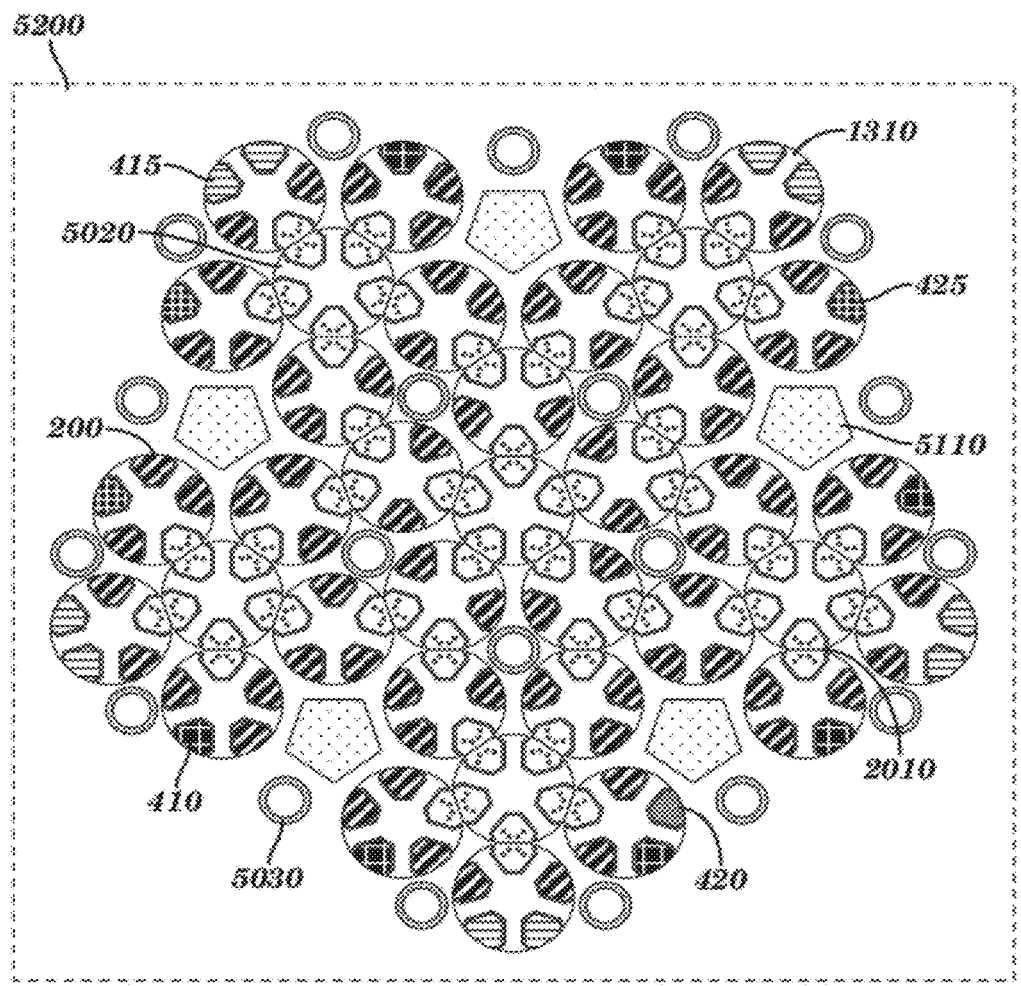

FIG. 32A depicts a complex mosaic micro grid structure 5200 on a single tier of a server apparatus or on a tier of a mainframe apparatus, in accordance with embodiments of the present invention. In one embodiment the complex mosaic micro grid structure 5200 comprises thirty micro grid structures 1310 and seventy nine micro grid random access memory irregular shaped modules (200), ten micro grid 802.11s Mesh Wireless irregular shaped modules (415), six micro grid Input/Output irregular shaped modules (410), four micro grid Communication irregular shaped modules (425), and one micro grid Global Positioning System irregular shaped module (420).

The complex mosaic micro grid structure 5200 comprises five hundred and forty processors, seventy-nine terabytes of random access memory with a plurality of Mesh Wireless, Input/Output, Communication and Global Positioning System functionality.

Each micro grid structure 1310 is physically bridged to one of six direct-current micro grid 'power tower' complex shapes (5020) via bridge module 2010 in a fixed micro grid computing system.

Twenty circular holes (5030) provide locations for cooling pipes containing pumped liquid nitrogen. Each cooling pipe passes through all tiers of the mainframe apparatus that comprises the complex mosaic micro grid structure 5200.

Five pentagonal locations (5110) are illustrated where 'pin and socket' connection blocks are placed for vertical stacking of multiple mosaic tiers. Each stack of 'pin and socket' connection blocks at locations 5110 form vertically continuous, and segmented, multi-data bus, power and signal 'backplanes', for micro grid computing apparatuses assembled without micro grid 'power tower' structures 5020 in one embodiment.

Modularity for construction of a complex mosaic micro grid structure on a tier is a key feature for micro grid hardware design, diversity, and functionality.

Micro Grid Mesh Wireless (802.11s) modules (415) and micro grid Communication modules (425), embodied in the apparatus, provide the macro grid and micro grid communication functionality of the present invention, which eliminates a large proportion of traditional mainframe and server data cabling requirements.

Figure 32B:
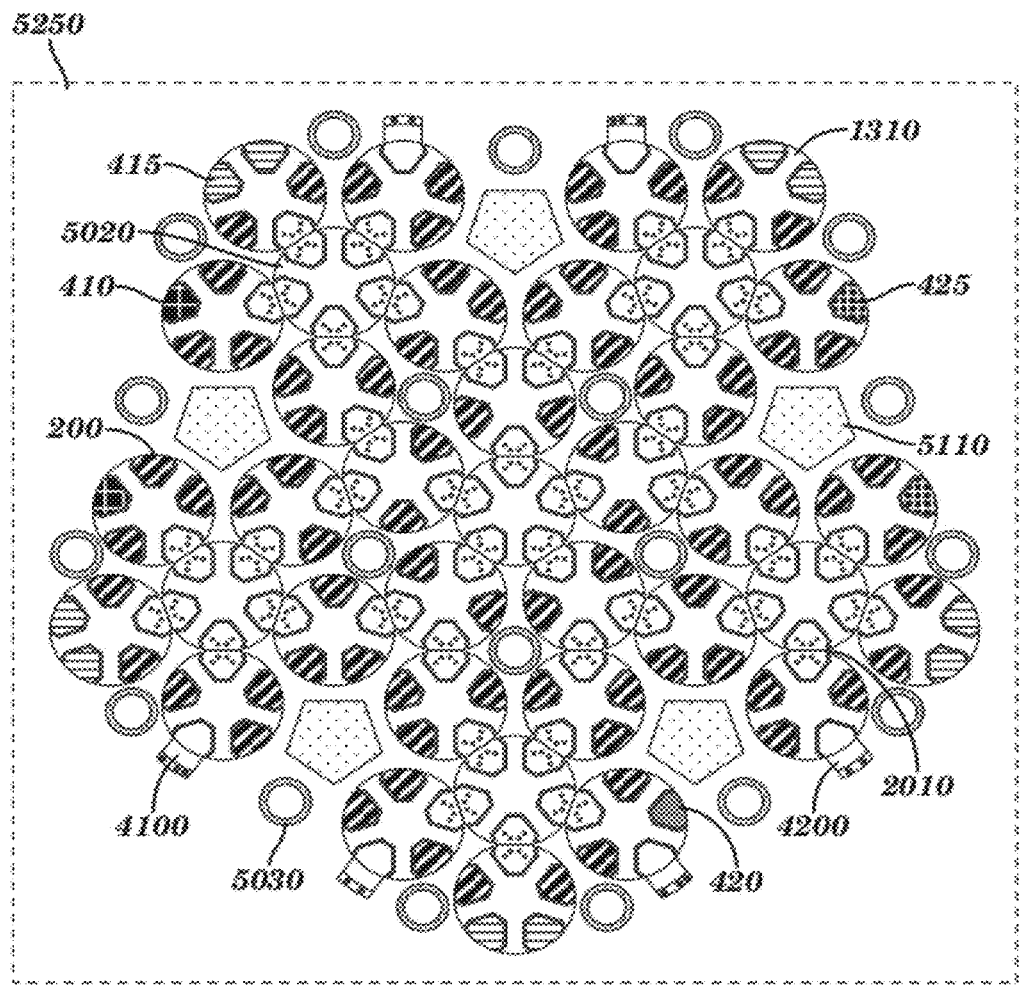

FIG. 32B depicts a complex mosaic micro grid structure 5250 on a single tier of a server apparatus or on a tier of a mainframe apparatus, in accordance with embodiments of the present invention. In one embodiment the complex mosaic micro grid structure 5250 comprises thirty micro grid structures 1310 and seventy nine micro grid random access memory irregular shaped modules (200), ten micro grid 802.11s Mesh Wireless irregular shaped modules (415), two micro grid Input/Output irregular shaped modules (410), two micro grid Communication irregular shaped modules (425), one micro grid Global Positioning System irregular shaped module (420), three micro grid complex ceramic actuator driver modules (4200) and three micro grid instrument sensor modules (4100).

The complex mosaic micro grid structure 5250 comprises five hundred and forty processors, seventy nine terabytes of random access memory with a plurality of Mesh Wireless, Input/Output, Communication, a Global Positioning System, and Actuator and Sensor functionality.

Each micro grid structure 1310 is physically bridged to one of six direct-current micro grid 'power tower' complex shapes (5020) via bridge module 2010 in a fixed micro grid computing system.

Twenty circular holes (5030) provide locations for cooling pipes containing pumped liquid nitrogen. Each cooling pipe passes through all tiers of the mainframe apparatus that comprises the complex mosaic micro grid structure 5250.

Five pentagonal locations (5110) are illustrated where 'pin and socket' connection blocks are placed for vertical stacking of multiple mosaic tiers. Each stack of 'pin and socket' connection blocks at locations 5110 form vertically continuous, and segmented, multi-data bus, power and signal 'backplanes', for micro grid computing apparatuses assembled without micro grid 'power tower' structures 5020 in one embodiment The complex mosaic micro grid structure 5250 comprises three micro grid complex ceramic actuator driver modules (4200) and three micro grid instrument sensor modules (4100), making the complex mosaic micro grid structure 5250 suitable for a tier zero position in the process of stacking complex mosaic structures to form a micro grid mainframe apparatus.

Figure 33A:
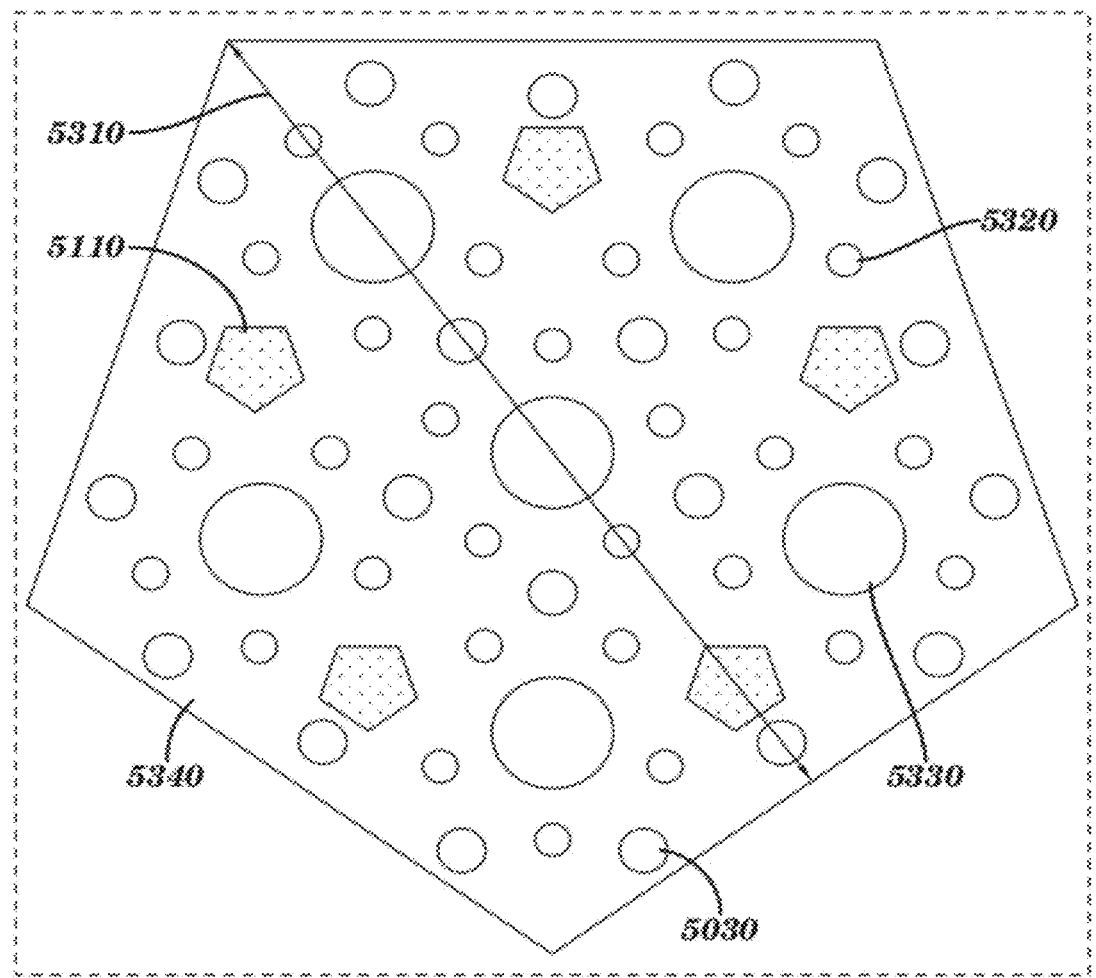
FIG. 33A depicts a pentagonal shaped multi-layered printed circuit board, in accordance with embodiments of the present invention.

Modularity for construction of complex mosaic micro grid structures is a key feature for micro grid mainframe hardware design, diversity, and functionality FIG. 33A depicts a pentagonal shaped multi-layered printed circuit board (5340), in accordance with embodiments of the present invention. The printed circuit board 5340 comprises a tier of a mainframe apparatus. The printed circuit board 5340 comprises five pentagonal 'pin and socket' connection block locations (5110) and a plurality of various sized holes that extend through the tiers of the mainframe apparatus.

The printed circuit board 5340 provides structural support for the assembly of a complex mosaic micro grid structure.

Inter-connection 'pin and socket' blocks (5110) are for vertical stacking of multiple mosaic tiers, forming vertically continuous, and segmented, multi-data bus, power and signal 'backplanes', for micro grid computing apparatuses that are assembled without micro grid 'power tower' structures.

Six holes (5330) in the multi-layered printed circuit board (5340) accommodate micro grid 'power tower' structures (5020), for the assembly of several variations of a 2.2 meter high micro grid mainframe apparatus in one embodiment.

Twenty circular holes (5030) provide locations for cooling pipes containing pumped liquid nitrogen. Each cooling pipe passes through all tiers of the mainframe apparatus that comprises the printed circuit board 5340.

Thirty holes (5320) in the multi-layered printed circuit board (5340) accommodate micro grid heat sinks on the upper and lower surfaces of a micro grid structure 1310 (see, e.g., FIGS. 31A-31C, 32A-32B). When the vertical stacking of multiple mosaic tiers occurs, the heat sinks and micro grid structure 1310 are 'sandwiched' together with a non-silicone heat transfer compound, creating thirty two-meter high vertical heat dissipation tower in one embodiment, within several variations of stacked tiers of a mainframe apparatus.

In one embodiment, the suitably sized multi-layered printed circuit board (5340) with a base to apex length (5310) of 90 cm (i.e. ~3 feet) provides sufficient 'real estate' to accommodate a plurality of different micro grid server and micro grid mainframe mosaic modular designs.

Figure 33B:
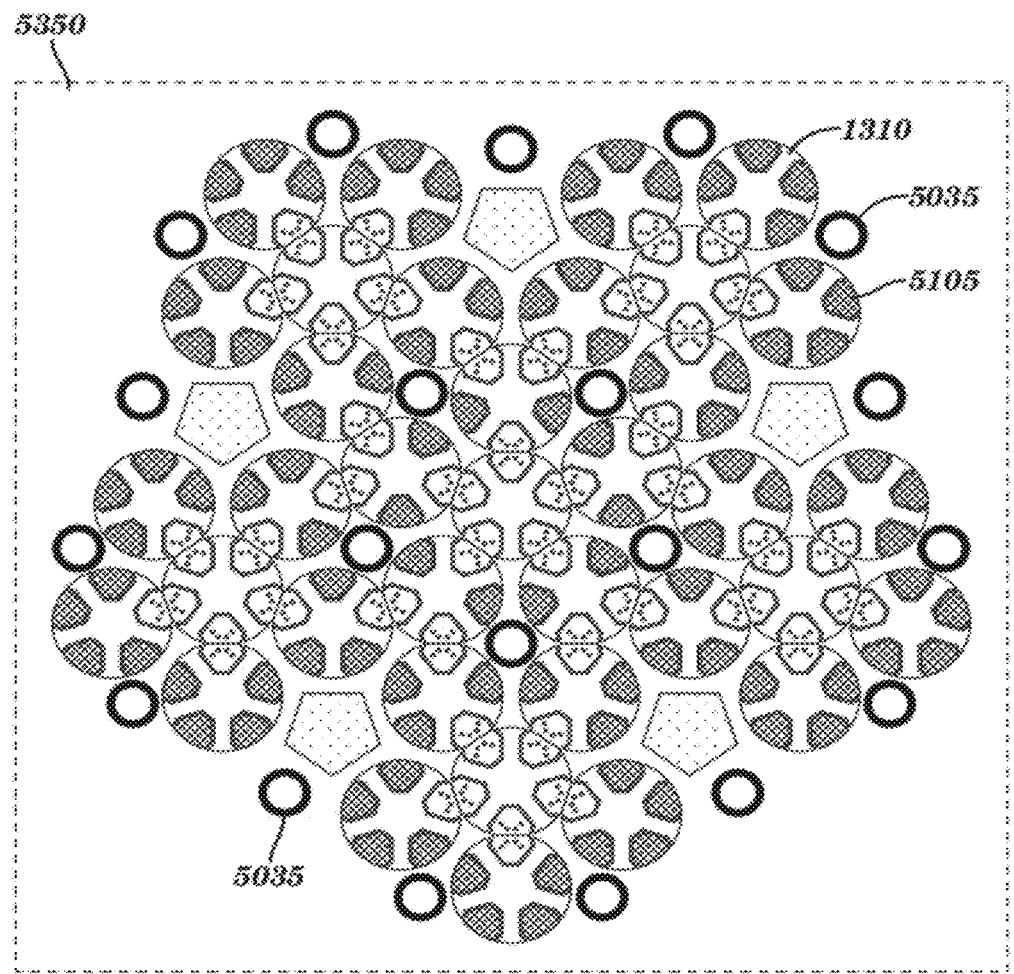
FIG. 33B is a diagram of a piping structure of a tier of a complex mosaic micro grid structure, in accordance with embodiments of the present invention.

FIG. 33B is a diagram of a piping structure (5350) of a tier of a complex mosaic micro grid structure, in accordance with embodiments of the present invention.

In one embodiment the piping structure 5350 comprises thirty micro grid structures 1310 and one hundred irregular shaped modules 5105. Each micro grid structure 1310 comprises eighteen processors.

Twenty circular pipes (5035) containing liquid nitrogen under pressure, and penetrate the stacked mosaic layers of complex micro grid server and micro grid mainframe apparatuses. Each circular pipes 5035 fits within a corresponding hole 5030 (see FIG. 33A).

Figure 33C:
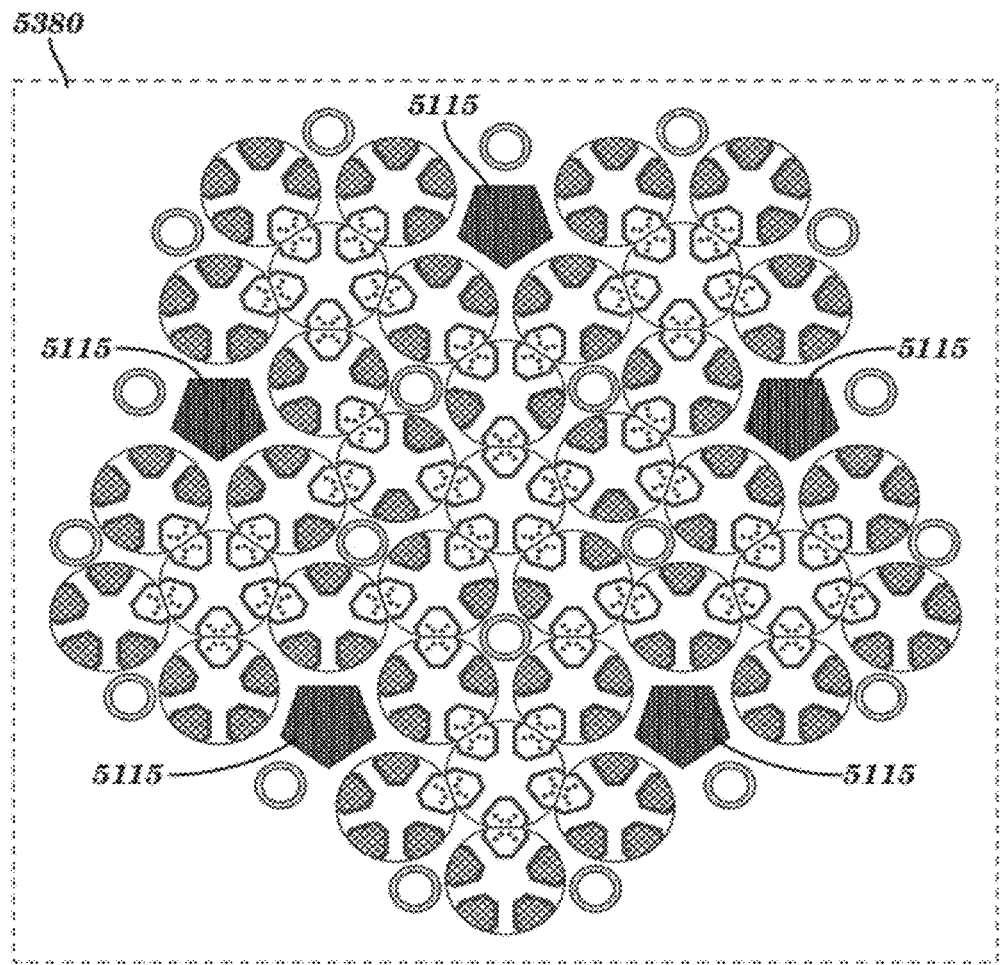
FIG. 33C is a diagram of a structure showing five 'pin and socket' pentagonal block structures, in accordance with embodiments of the present invention.

FIG. 33C is a diagram of a structure (5380) showing five 'pin and socket' pentagonal block structures (5115), in accordance with embodiments of the present invention. In one embodiment each block structures 5115 comprises a vertical stack of connection blocks for vertical stacking of mosaic tiers to form five vertically segmented multi-data bus, power and signal 'backplanes', for micro grid computing apparatuses assembled without micro grid 'power tower' structures (5020). Each block structures 5115 fits within a corresponding location 5110 (see FIG. 33A) for including the 'pin and socket' connection blocks.

The structure 5380 comprises thirty micro grid structures 1310 and one hundred irregular shaped modules 5105. Each micro grid structure 1310 comprises eighteen processors.

Figure 34A:
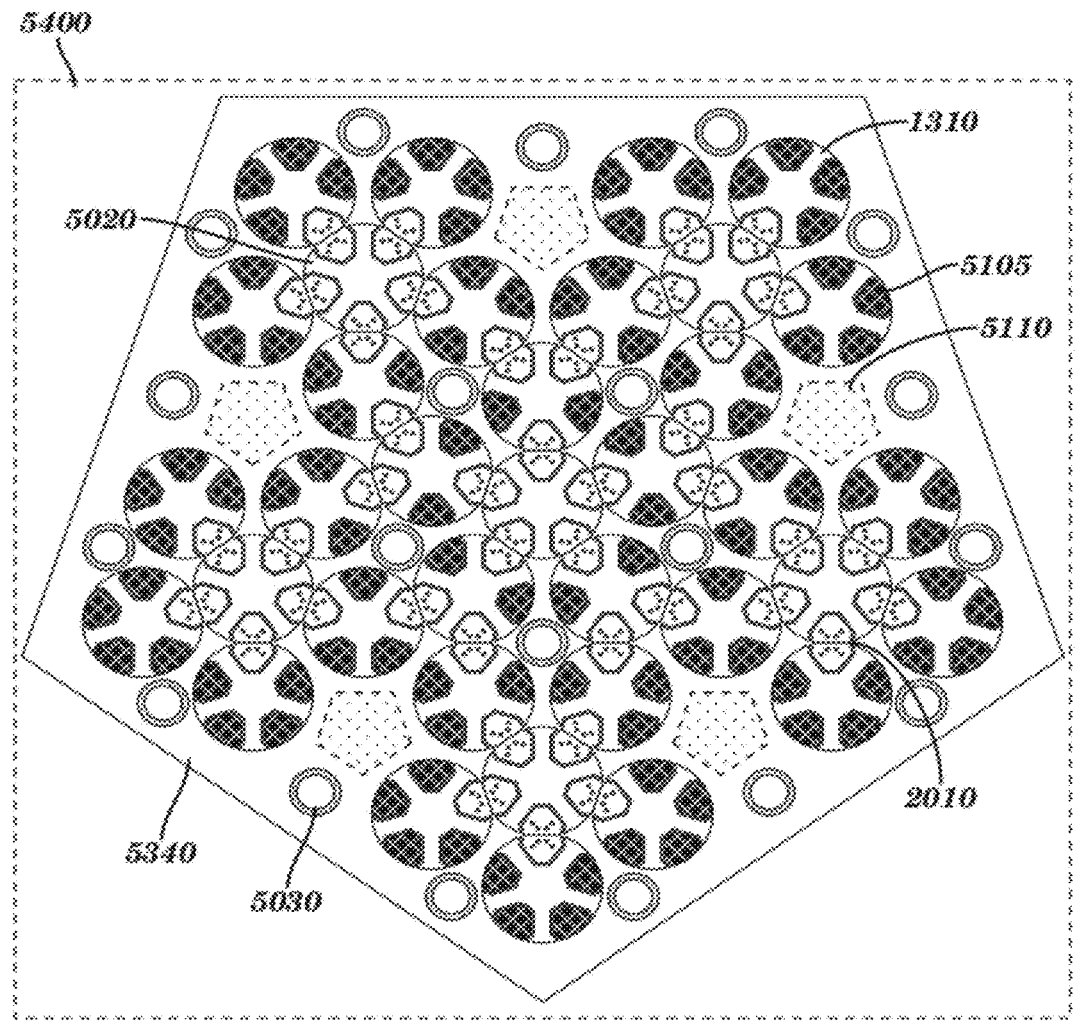
FIG. 34A depicts a tier of a complex mosaic micro grid structure on a pentagonal multi-layered printed circuit board, in accordance with embodiments of the present invention.

FIG. 34A depicts a tier of a complex mosaic micro grid structure 5400 on a pentagonal multi-layered printed circuit board 5340, in accordance with embodiments of the present invention. A mainframe apparatus comprises the printed circuit board 5340 and its tier. In one embodiment the complex mosaic micro grid structure 5400 comprises thirty micro grid structures 1310 and one hundred irregular shaped modules 5105. Each micro grid structures 1310 comprises nine processors. The complex mosaic micro grid structure 5400 comprises one thousand four hundred and forty processors.

Each micro grid structure 1310 is physically bridged to one of six direct-current micro grid 'power tower' complex shapes (5020) via bridge module 2010. Each 'power tower' complex shape 5020 is positioned to penetrate through one of the six large holes 5330 (see FIG. 33A) in the structure in a fixed micro grid computing system.

Twenty circular holes (5030) provide locations for cooling pipes containing pumped liquid nitrogen. Each cooling pipe passes through all tiers of the mainframe apparatus that comprises the complex mosaic micro grid structure 5400.

Five pentagonal locations (5110) are illustrated where 'pin and socket' connection blocks are placed for vertical stacking of multiple mosaic tiers. Each stack of 'pin and socket' connection blocks at locations 5110 form vertically continuous, and segmented, multi-data bus, power and signal 'backplanes', for micro grid computing apparatuses assembled without micro grid 'power tower' structures 5020 in one embodiment.

Figure 34B:
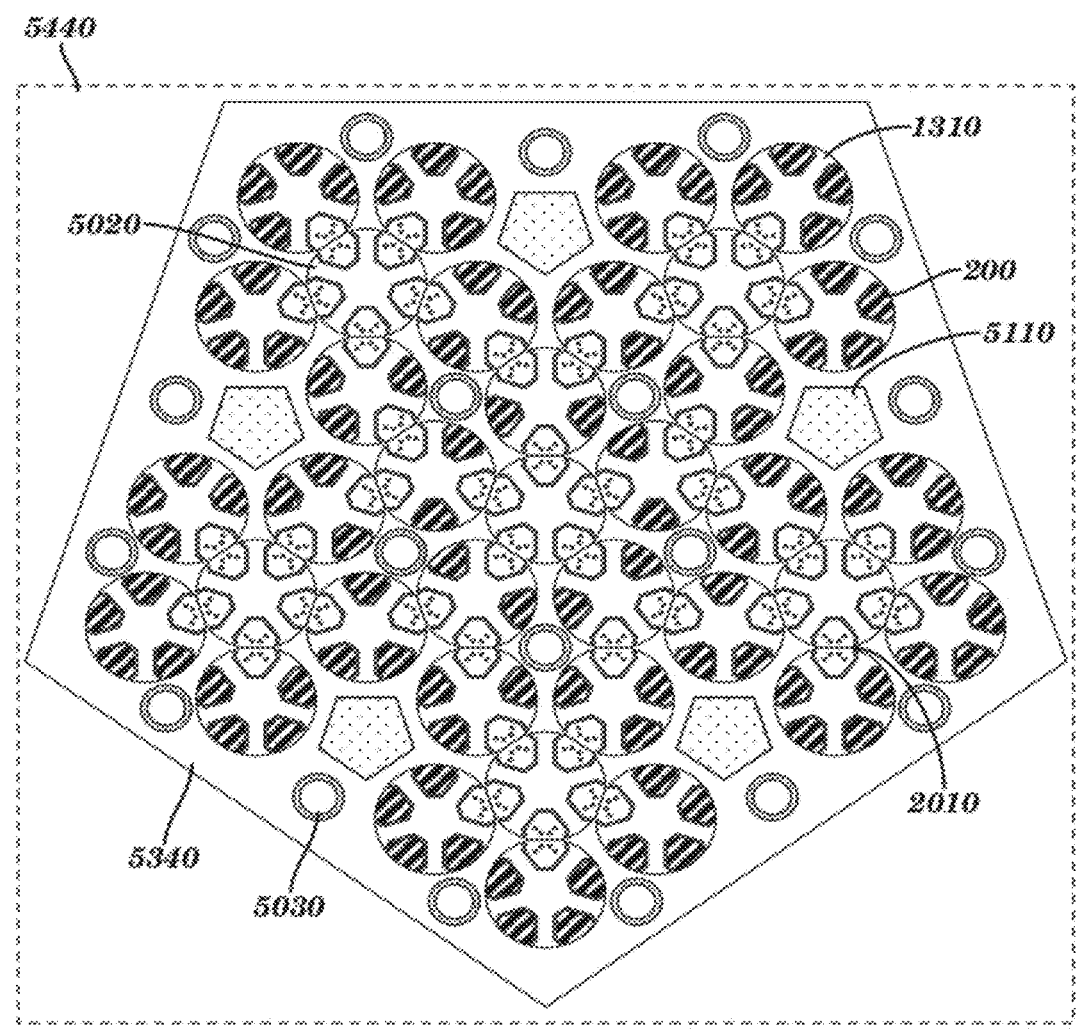
FIG. 34B depicts a complex mosaic micro grid structure on pentagonal multi-layered printed circuit board of a tier, in accordance with embodiments of the present invention.

FIG. 34B depicts a complex mosaic micro grid structure 5440 on pentagonal multi-layered printed circuit board 5340 of a tier, in accordance with embodiments of the present invention. A mainframe apparatus comprises the printed circuit board 5340 and its tier. In one embodiment the complex mosaic micro grid structure 5440 comprises thirty micro grid structures 1310 and one hundred micro grid random access memory irregular shaped modules 200. Each micro grid structures 1310 comprises eighteen processors. The complex mosaic micro grid structure 5440 comprises five hundred and forty processors and one hundred terabytes of random access memory.

Each micro grid structure 1310 is physically bridged to one of six direct-current micro grid 'power tower' complex shapes (5020) via bridge module 2010. Each 'power tower' complex shapes 5020 is positioned to penetrate through one of the six large holes 5330 (see FIG. 33A) in the structure in a fixed micro grid computing system Twenty circular holes (5030) provide locations for cooling pipes containing pumped liquid nitrogen. Each cooling pipe passes through all tiers of the mainframe apparatus that comprises the complex mosaic micro grid structure 5440.

Five pentagonal locations (5110) are illustrated where 'pin and socket' connection blocks are placed for vertical stacking of multiple mosaic tiers. Each stack of 'pin and socket' connection blocks at locations 5110 form vertically continuous, and segmented, multi-data bus, power and signal 'backplanes', for micro grid computing apparatuses assembled without micro grid 'power tower' structures 5020 in one embodiment.

Figure 34C:
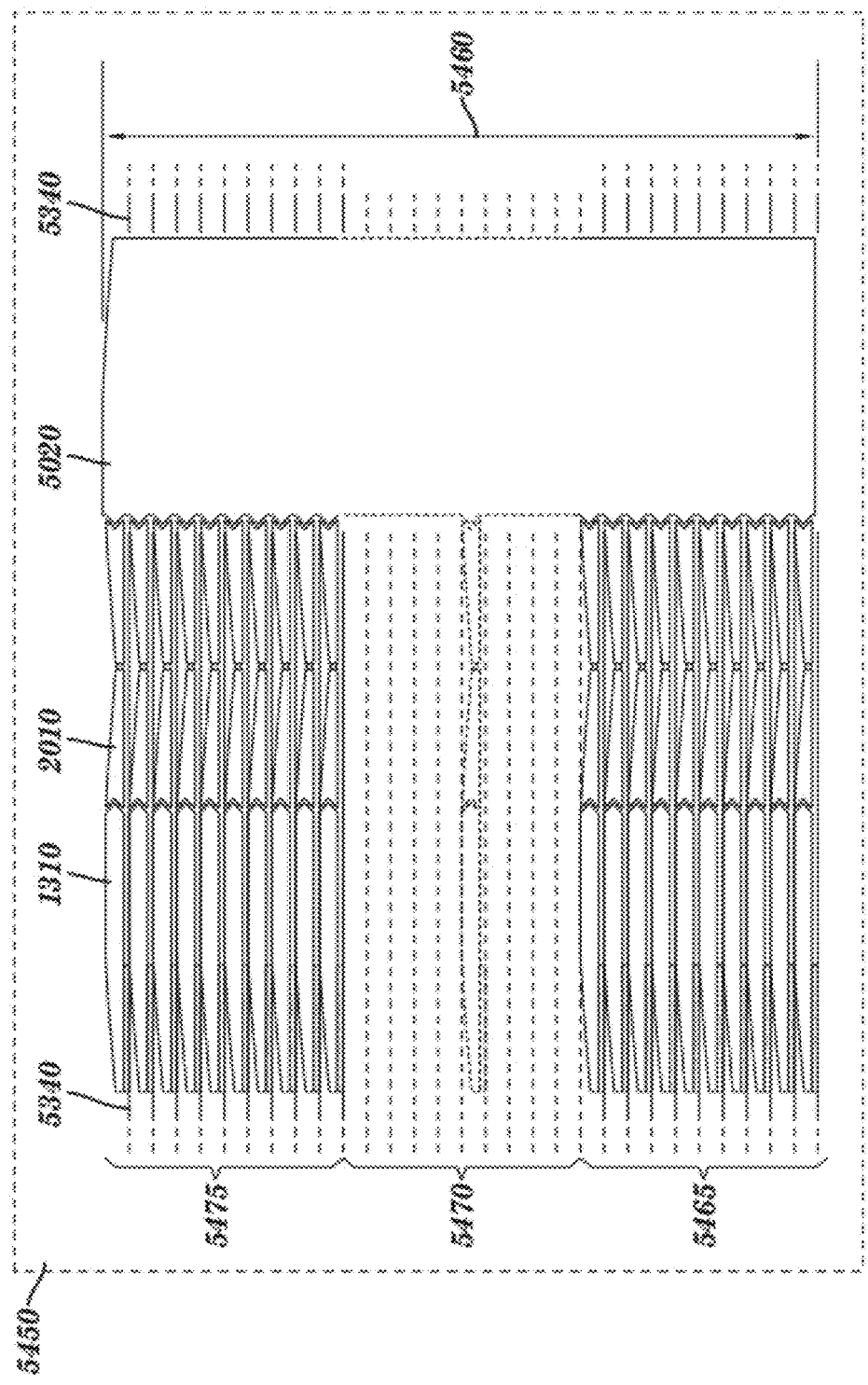
FIG. 34C is a vertical section diagram showing an assembled complex shaped micro grid 'power tower' structure, multi-bridged via a bridge module to a vertical stack of two hundred micro grid structures, in accordance with embodiments of the present invention.

FIG. 34C is a vertical section diagram (5450) showing an assembled complex shaped micro grid 'power tower' structure (5020), multi-bridged via bridge module 2010 to a vertical stack of two hundred micro grid structures 1310, in accordance with embodiments of the present invention. Each micro grid structure 1310 is mounted on a multi-layered printed circuit board (5340) and is connected to an individual tier of the 'power tower' structure 5020 of a mainframe apparatus. Each micro grid structure 1310 comprises eighteen processors.

The 'power tower' 5020 encompasses corresponding 'power hubs' 3000 in all tiers of a mainframe apparatus such that the corresponding 'power hubs' in successive tiers are aligned directly above or directly below each other and are integral with each other. The 'power tower' 5020 in FIG. 34C is depicted as continuous and integral. The 'power tower' 5020 in FIG. 34C, together with any other 'power towers' that exist in the mainframe apparatus, physically connects together the tiers of the mainframe apparatus.

In one embodiment, two hundred tier positions are available, vertically, on the 2.2 meter high 'power tower' structure 5020.

Tier zero through seven (5465) of the mainframe apparatus, and tier one hundred and ninety-two through tier one hundred and ninety-nine (5475) of the mainframe apparatus, are shown in FIG. 34C.

Tier eight through one hundred and ninety-one (5470) of the mainframe apparatus are shown in FIG. 34C as dotted lines.

In one embodiment, the structural height (5460) of the micro grid 'power tower' structure 5020 is 2.2 meters (~86.5 inches).

Figure 34D:
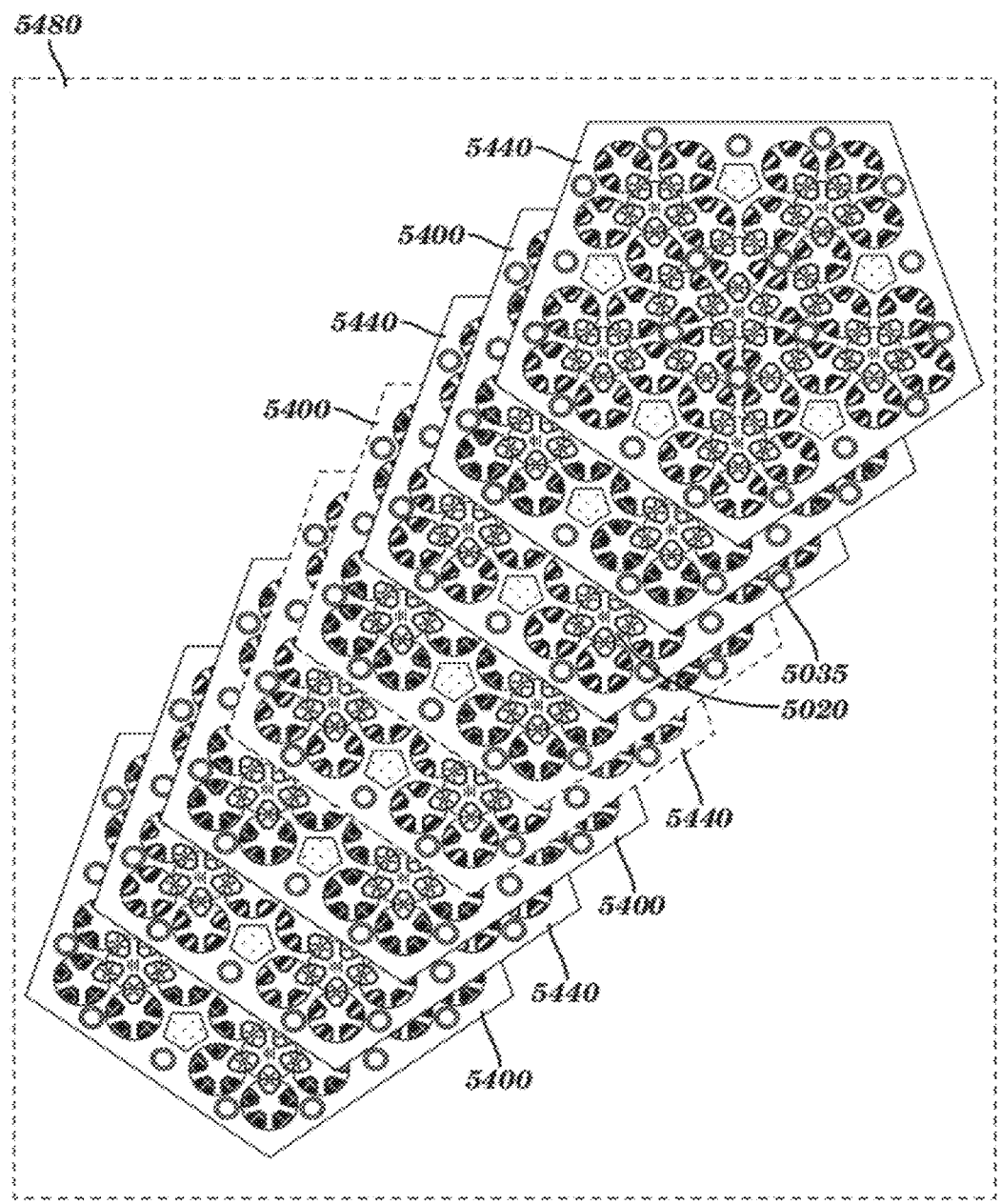
FIG. 34D is an exploded view of an assembly of stacked tiers of printed circuit boards interleaved with stacked printed circuit boards, in accordance with embodiments of the present invention.

FIG. 34D is an exploded view of an assembly (5480) of stacked tiers of printed circuit boards 5400 (see FIG. 34A) interleaved with stacked printed circuit boards 5440 (see FIG. 34B), in accordance with embodiments of the present invention. The printed circuit boards 5400 each comprise a complex mosaic micro grid structure that includes irregular shaped modules. The printed circuit boards 5440 each comprise a complex mosaic micro grid structure that includes random access memory irregular shaped modules.

The mainframe apparatus that comprises the printed circuit boards 5400 and the printed circuit boards 5440 includes, in one embodiment, one hundred and ninety-eight thousand processors and ten petabytes (1 petabyte=1000 terabytes) of random access memory.

In one embodiment, six micro grid 'power tower' structures (5020) and twenty circular cooling pipes (5035) penetrate the structure of the printed circuit boards 5400 and the printed circuit boards 5440.

Micro Grid Mesh Wireless (802.11s) modules (415) and micro grid Communication modules (425), embodied in the complex mosaic micro grid structures for the printed circuit boards 5400 and the printed circuit boards 5440, provide macro grid and micro grid communication functionality, which eliminates a large proportion of traditional mainframe and server data cabling requirements.

In one embodiment, the structural height of the assembly (5480) is 2.2 meters (~86.5 inches).

Two of the printed circuit boards in the assembly 5480 are shown with dotted lines around their edges, representing one hundred and ninety four interleaved printed circuit boards in the mid-section of the assembly 5480.

In one embodiment of the stacked assembly (5480), the irregular shaped modules on all tiers may be 'fail-safe' batteries, thus forming an intelligent 'power house' structure of DC power for use as a Cloud Computing node's power provisioning system.

In one embodiment of the stacked assembly (5480), the irregular shaped modules on all tiers may be one terabyte random access memory modules, thus forming an 'On Demand' battery supported, data repository of 20 petabytes for Cloud Computing temporary data storage and memory array systems.

In one embodiment of the stacked assembly (5480), the irregular shaped modules on all tiers may be wireless and/or communication modules, thus forming a battery supported large centralized wireless and/or communications node for Cloud Computing.

In one embodiment of the stacked assembly (5480), the irregular shaped modules on all tiers may be Input/Output modules, thus forming a battery supported large data multiplexor for high volume data traffic routing (e.g., 'super highway' data switching and routing).

Figure 35A:
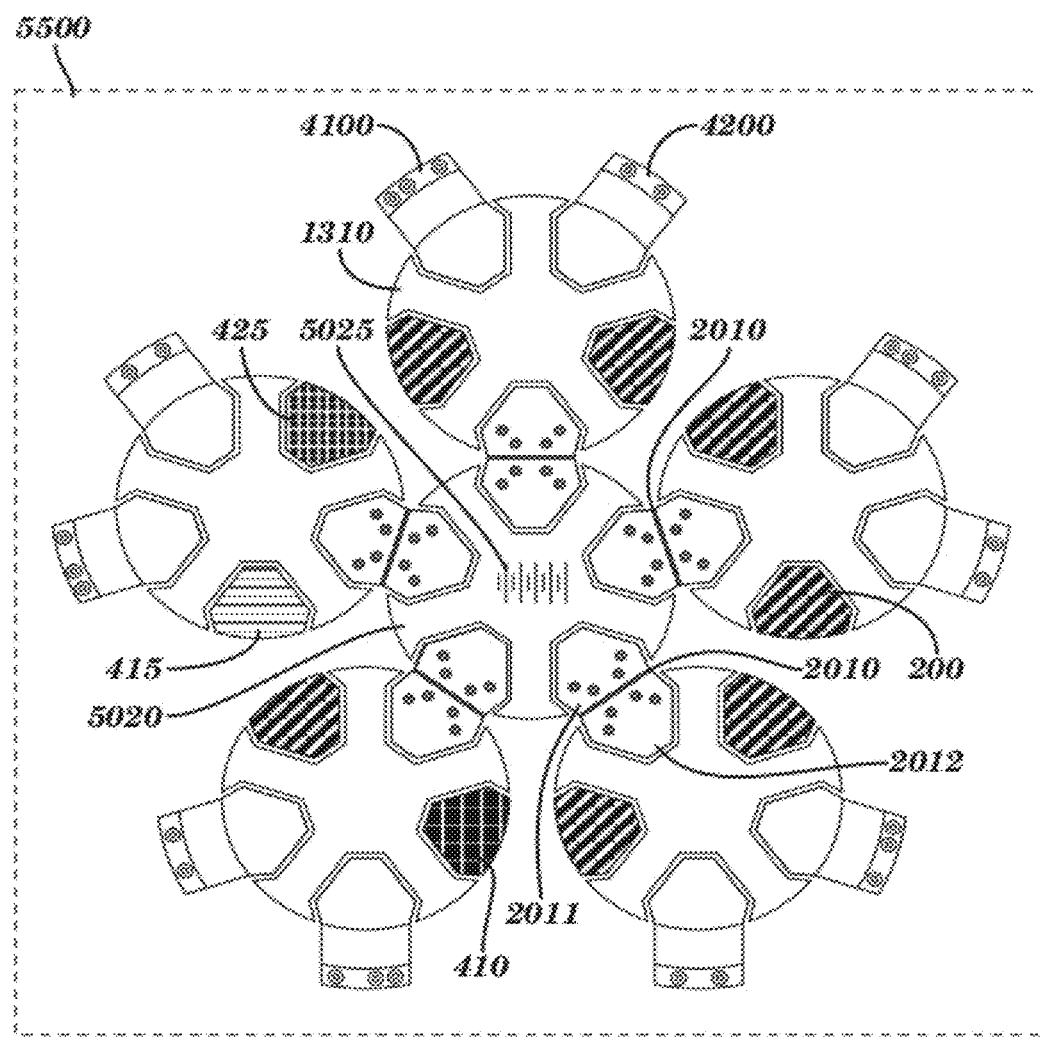
FIG. 35A depicts a simple mosaic micro grid structure, in accordance with embodiments of the present invention.

FIG. 35A depicts a simple mosaic micro grid structure (5500), in accordance with embodiments of the present invention. In one embodiment the simple mosaic micro grid structure 5500 may exist at tier zero and comprises five complex micro grid eighteen-processor shapes (1310), collectively including seven micro grid random access memory irregular shaped modules (200), one micro grid 802.11s Mesh Wireless irregular shaped module (415), one micro grid Input/Output irregular shaped module (410), one micro grid Communication irregular shaped module (425), five micro grid complex ceramic actuator driver modules (4200) and five micro grid instrument sensor modules (4100).

Each micro grid structure 1310 is physically bridged to a direct-current micro grid 'power tower' complex shapes (5020) via bridge module 2010 in a fixed micro grid computing system. Each docking bay of the 'power tower' complex shapes (5020) comprises a bridge unit (2011 or 2012) of a bridge module 2010.

Thus, the simple mosaic micro grid structure 5500 comprises a single 'power tower' whose 'power hub' at each tier is bridged by a bridge module 2010 in each docking bay to a corresponding 'processor hub' that is not bridged to any other complex shape.

Figure 35B:
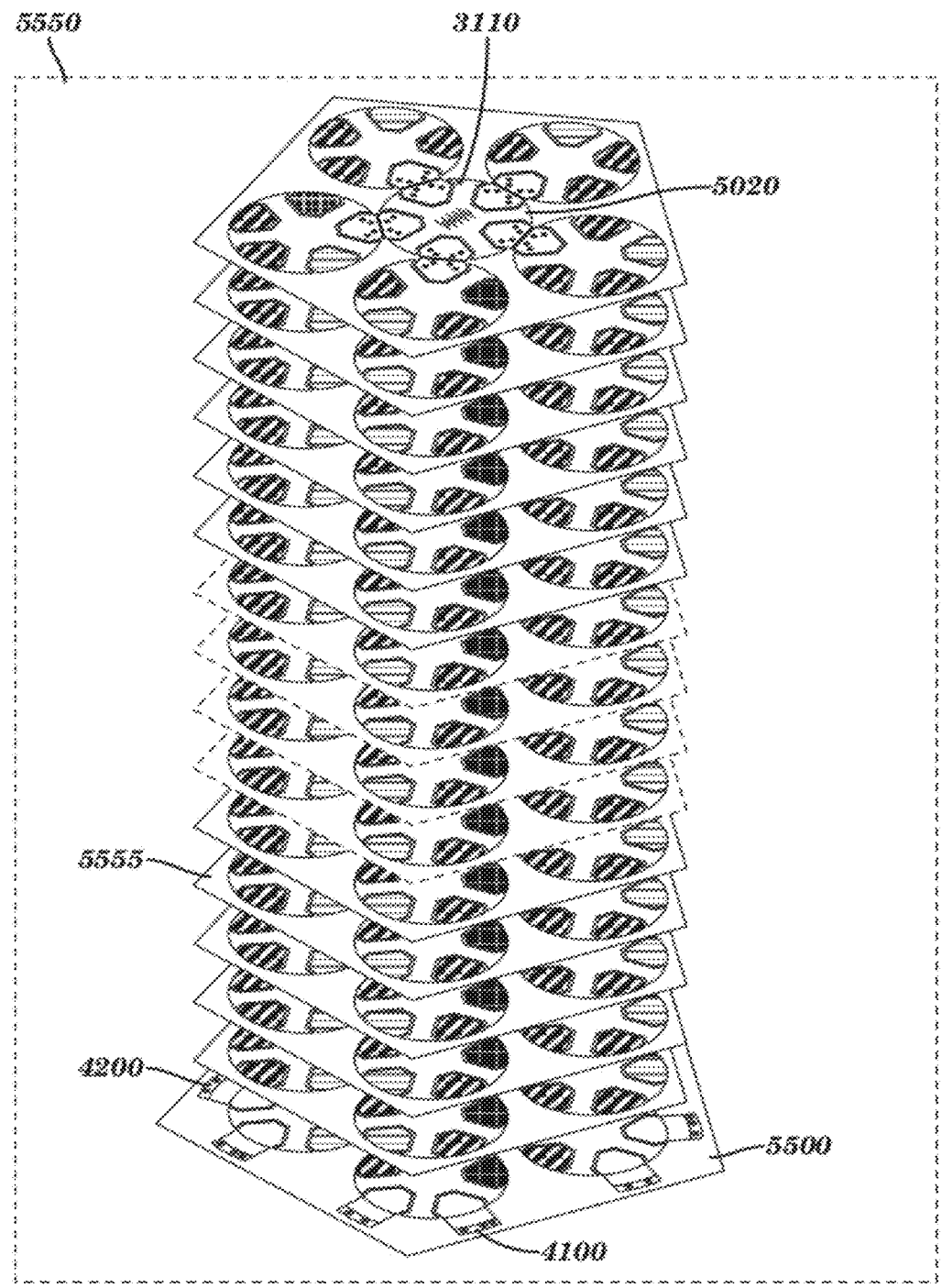
FIG. 35B is an exploded view of a stacked assembly of tiers of simple micro grid mosaic structures in a mainframe apparatus, in accordance with embodiments of the present invention.

FIG. 35B is an exploded view of a stacked assembly (5550) of tiers of simple micro grid mosaic structures in a mainframe apparatus, in accordance with embodiments of the present invention. The stacked assembly 5550 comprises a simple micro grid mosaic structure 5500 at tier zero (see FIG. 35A) and a plurality of simple micro grid mosaic structures 5555 at tier one, tier two, etc. Each simple micro grid mosaic structures 5555 is the simple micro grid mosaic structure 5500 of FIG. 35A with the driver modules (4200) and sensor modules (4100) removed, and replaced by other micro grid irregular shaped modules in accordance with the embodiments of the present invention.

The stacked assembly 5550 is an embodiment of a single micro grid 'power tower' (5020) as it's central core, and instrument sensor modules (4100) and actuator driver modules (4200) in tier zero. The 'power tower' (5020) includes a voltage light emitting diode indicator (3110).

The mainframe apparatus embodies a micro grid of eighteen thousand processors, and one thousand four hundred terabytes (1.4 petabytes) of random access memory.

Micro Grid Mesh Wireless (802.11s) modules (415) and micro grid Communication modules (425), embodied in the stacked assembly 5555, provide macro grid and micro grid communication functionality, which eliminate a large proportion of traditional mainframe and server data cabling requirements.

In one embodiment, the structural height of the stacked assembly 5550 is 2.2 meters (~86.5 inches).

Four of the simple micro grid mosaic structures 5555 are shown with dotted lines around their edges, representing one hundred and eighty-eight simple micro grid mosaic structures in the mid-section of the assembled micro grid mainframe apparatus.

Thus, the stacked assembly 5550 comprises a single power tower whose power hub at each tier is bridged by a bridge module 2010 in each docking bay to a corresponding processor hub that is not bridged to any other complex shape.

In one embodiment of the stacked assembly (5550), the irregular shaped modules on all tiers may be 'fail-safe' batteries, thus forming an intelligent 'power column' structure of DC power for use as a Cloud Computing node's power provisioning system.

In one embodiment of the stacked assembly (5550), five 'power towers' are each individually bridged to the central 'power tower', and the irregular shaped modules on all tiers may be 'fail-safe' batteries, thus forming an intelligent 'power cluster' structure of DC power for use as a Cloud Computing node's power provisioning system.

In one embodiment of the stacked assembly (5550), the irregular shaped modules on all tiers may be one terabyte random access memory modules, thus forming an 'On Demand' battery supported, data repository of 4 petabytes for Cloud Computing temporary data storage and memory array systems.

In one embodiment of the stacked assembly (5550), the irregular shaped modules on all tiers may be wireless and/or communication modules, thus forming a battery supported centralized wireless and/or communications node for Cloud Computing.

In one embodiment of the stacked assembly (5550), the irregular shaped modules on all tiers may be Input/Output modules, thus forming a battery supported data multiplexor for high volume data traffic routing (e.g., 'super highway' data switching and routing).

Figure 36A:
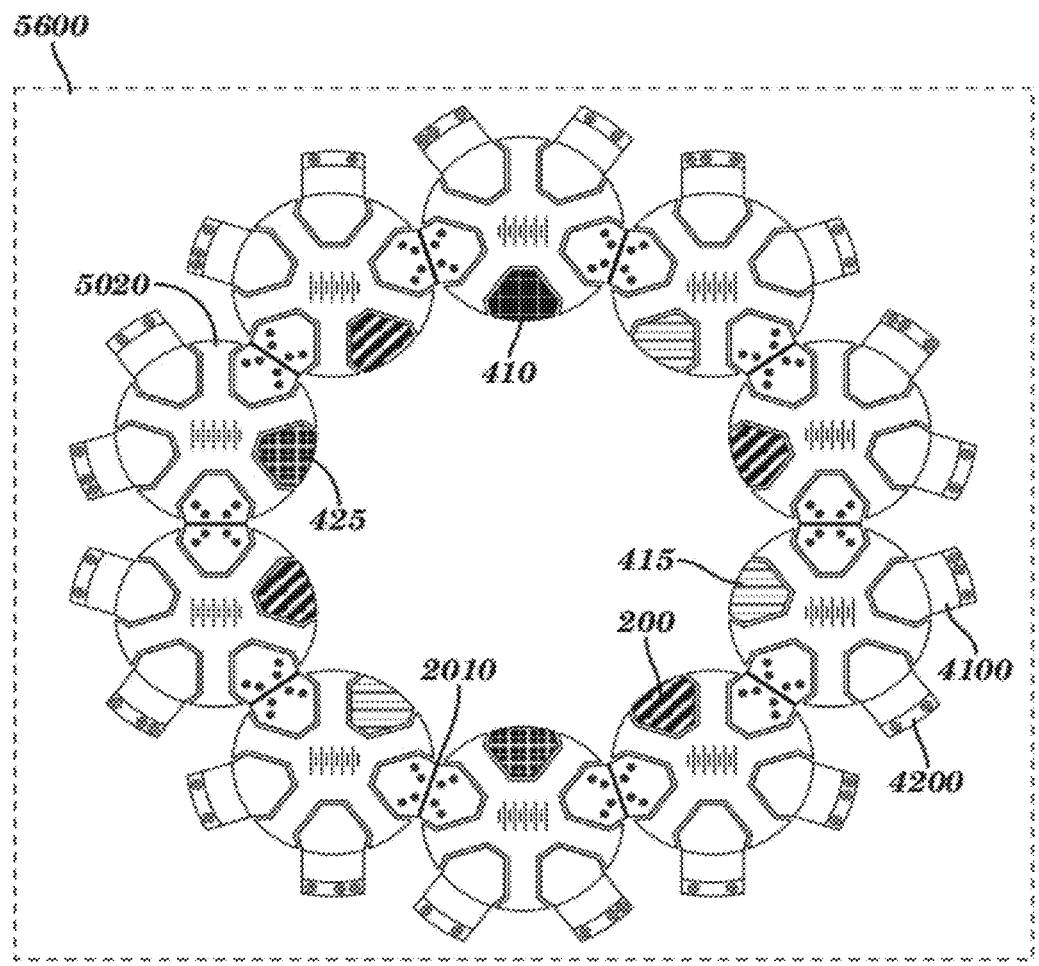
FIG. 36A depicts a ring mosaic at tier zero of a mainframe apparatus, in accordance with embodiments of the present invention.

FIG. 36A depicts a ring mosaic 5600 at tier zero of a mainframe apparatus, in accordance with embodiments of the present invention. A ring mosaic is a complex micro grid mosaic structure comprising a plurality of micro grid structures sequentially interconnected via bridge modules to form a closed ring. In general, a ring mosaic in a single tier of a server apparatus or in each tier of a mainframe apparatus consists of at least three complex shapes (e.g., processor hubs and/or power hubs) sequentially interconnected by bridge modules to form a closed ring.

In one embodiment the ring mosaic 5600 comprises ten micro grid 'power tower' complex shapes (5020) bridged together via bridge modules 2010 to form a cylindrical ring (2.2 meter high in one embodiment), and four micro grid random access memory irregular shaped modules (200), three micro grid 802.11s Mesh Wireless irregular shaped modules (415), one micro grid Input/Output irregular shaped module (410), two micro grid Communication irregular shaped modules (425), ten micro grid complex ceramic actuator driver modules (4200) and ten micro grid instrument sensor modules (4100), in a fixed micro grid computing system.

In one embodiment, the structural width of the ring mosaic is 47 cm (~18.5 inches).

Figure 36B:
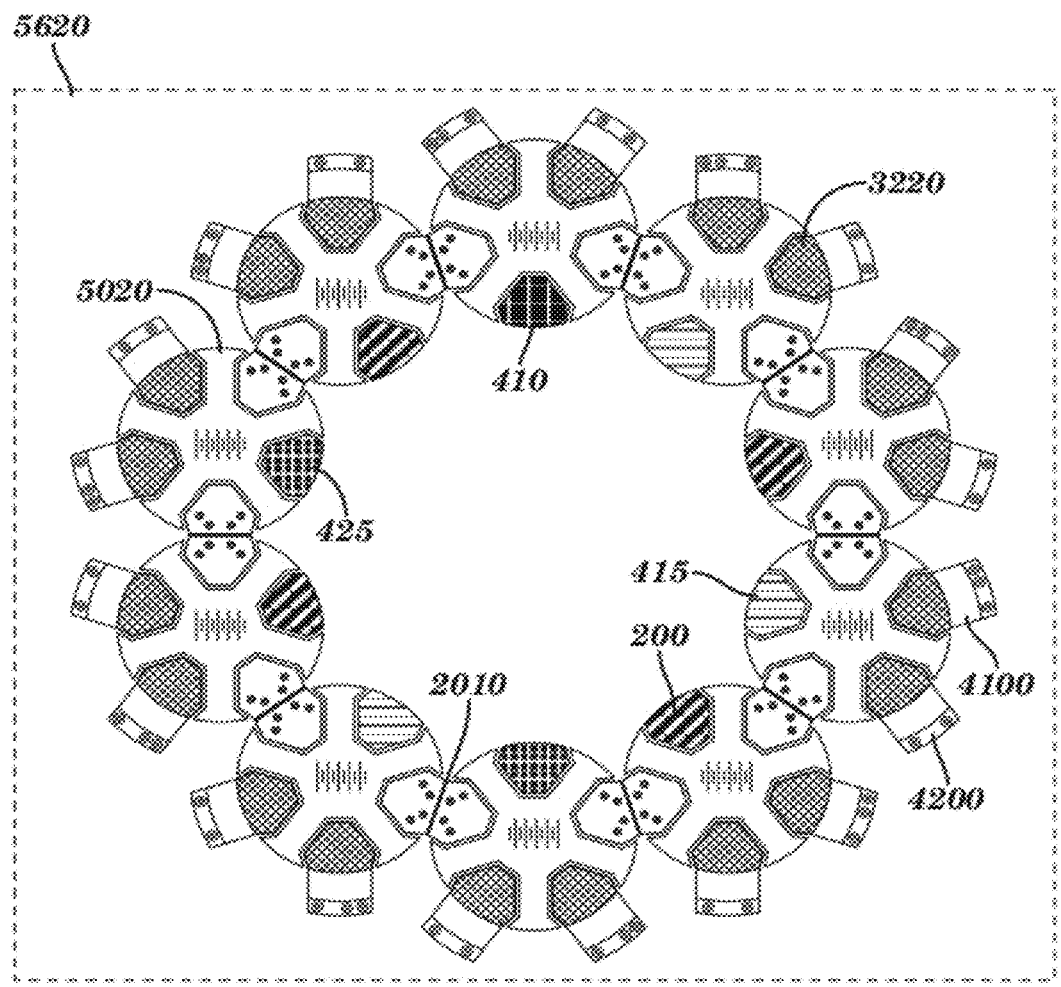
FIG. 36B depicts a ring mosaic at tier one of a mainframe apparatus overlayed with the ring mosaic at tier zero of FIG. 36A, in accordance with embodiments of the present invention.

FIG. 36B depicts a ring mosaic 5620 at tier one of a mainframe apparatus overlayed with the ring mosaic 5600 at tier zero of FIG. 36A, in accordance with embodiments of the present invention. The ring mosaic 5620 comprises ten micro grid 'power tower' complex bridged shapes (5020), and the tier one additions of four more micro grid random access memory irregular shaped modules (200), three more micro grid 802.11s Mesh Wireless irregular shaped modules (415), one more micro grid Input/Output irregular shaped module (410), two more micro grid Communication irregular shaped modules (425), and twenty complex micro grid eighteen-processor modules (3220), in a fixed micro grid computing system.

Ten micro grid complex ceramic actuator driver modules (4200) and ten micro grid instrument sensor modules (4100) are shown protruding from under the tier one ring, since the actuator driver modules (4200) and the sensor modules (4100) are part of the ring mosaic 5600 at tier zero.

Figure 36C:
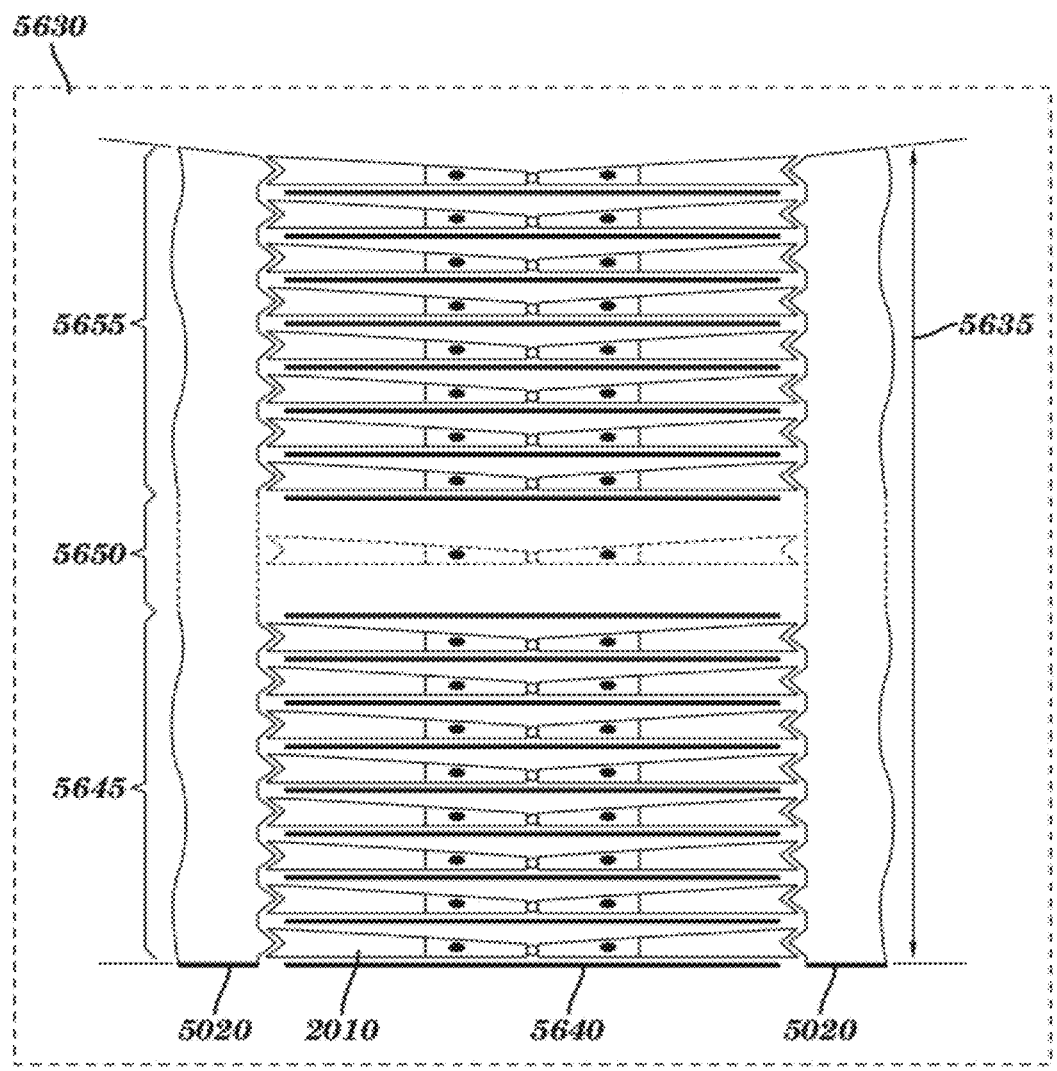
FIG. 36C is a vertical section diagram showing an assembly of two adjacent complex shaped micro grid 'power tower' structures, multi-bridged via a bridge module to a vertical stack of tier positions, in accordance with embodiments of the present invention.

FIG. 36C is a vertical section diagram showing an assembly (5630) of two adjacent complex shaped micro grid 'power tower' structures (5020), multi-bridged via bridge module 2010 to a vertical stack of tier positions, in accordance with embodiments of the present invention. The bridge module 2010 functions as a connecting bridge module that directly bridges the two 'power towers' 5020 to each other as shown.

The 'power towers' 5020 each encompass corresponding 'power hubs' 3000 in all tiers of a mainframe apparatus such that the corresponding 'power hubs' in successive tiers are aligned directly above or directly below each other and are integral with each other. The 'power towers' 5020 in FIG. 36C are each depicted as continuous and integral. The 'power towers' 5020 in FIG. 36C, together with any other 'power towers' that exist in the mainframe apparatus, physically connects together the tiers of the mainframe apparatus.

In one embodiment, two hundred tier positions are available, vertically, on the 2.2 meter high assembly 5630.

Tier zero through seven (5645) of the mainframe apparatus, and tier one hundred and ninety-two through tier one hundred and ninety-nine (5655) of the mainframe apparatus, are shown in FIG. 36C.

Tier eight through tier one hundred and ninety-one (5650) of the mainframe apparatus are shown in FIG. 36C as dotted lines.

In one embodiment, the structural height (5635) of the assembly (5630) is 2.2 meters (~86.5 inches).

Circular multi-layered circuit boards (5640) containing the assembled micro grid structures of each tier are shown.

Figure 36D:
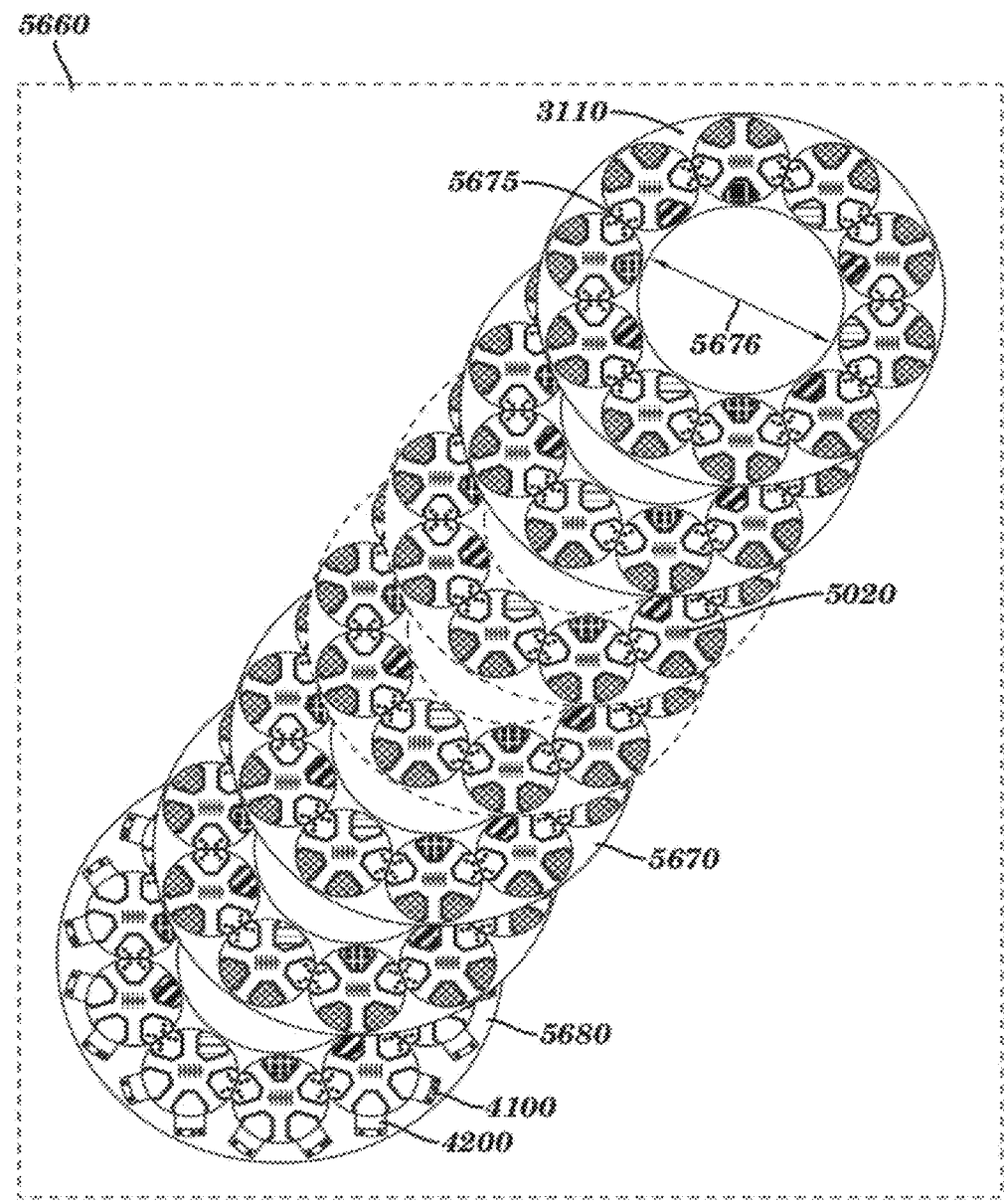
FIG. 36D is an exploded view of a stacked assembly of complex micro grid ring mosaics, in accordance with embodiments of the present invention.

FIG. 36D is an exploded view of a stacked assembly (5660) of complex micro grid ring mosaics (5670), in accordance with embodiments of the present invention. The stacked assembly 5660 comprises a cylindrical structure of ten micro grid 'power towers' (5020), with instrument sensor modules (4100) and actuator driver modules (4200) in tier zero in the complex micro grid ring mosaic 5680. A large heat exhaust plenum (5675) provides for heat exhaust from within the stacked assembly 5660. A voltage light emitting diode indicator (3110) is on the top complex micro grid ring mosaic of the stacked assembly (5660).

The stacked assembly 5660 comprises a micro grid of seventy-one thousand six hundred and forty processors, and eight hundred terabytes of random access memory.

Micro Grid Mesh Wireless (802.11s) modules (415) and micro grid Communication modules (425), embodied in the stacked assembly 5660, provide macro grid and micro grid communication functionality, which eliminates a large proportion of traditional mainframe and server data cabling requirements.

In one embodiment, two hundred tier positions are available, vertically on the 2.2 meter high stacked assembly 5660.

In one embodiment, the structural width (5676) of the heat exhaust plenum 5675 is 22 cm (~8.5 inches).

Two of the complex micro grid ring mosaics (5670) are shown with dotted lines around their edges, representing one hundred and ninety-five complex micro grid ring mosaics in the mid-section of the assembled micro grid mainframe (or micro grid server stack) apparatus.

In one embodiment of the stacked assembly (5660), the irregular shaped modules on all tiers may be 'fail-safe' batteries, thus forming an intelligent 'power tube' structure of DC power for use as a Cloud Computing node's power provisioning system.

In one embodiment of the stacked assembly (5660), the irregular shaped modules on all tiers may be one terabyte random access memory modules, thus forming an 'On Demand' battery supported, data repository of 6 petabytes for Cloud Computing temporary data storage and memory array systems.

In one embodiment of the stacked assembly (5660), the irregular shaped modules on all tiers may be wireless and/or communication modules, thus forming a battery supported centralised wireless and/or communications node for Cloud Computing.

In one embodiment of the stacked assembly (5660), the irregular shaped modules on all tiers may be Input/Output modules, thus forming a battery supported data multiplexor for high volume data traffic routing (eg. 'super highway' data switching and routing).

Figure 36E:
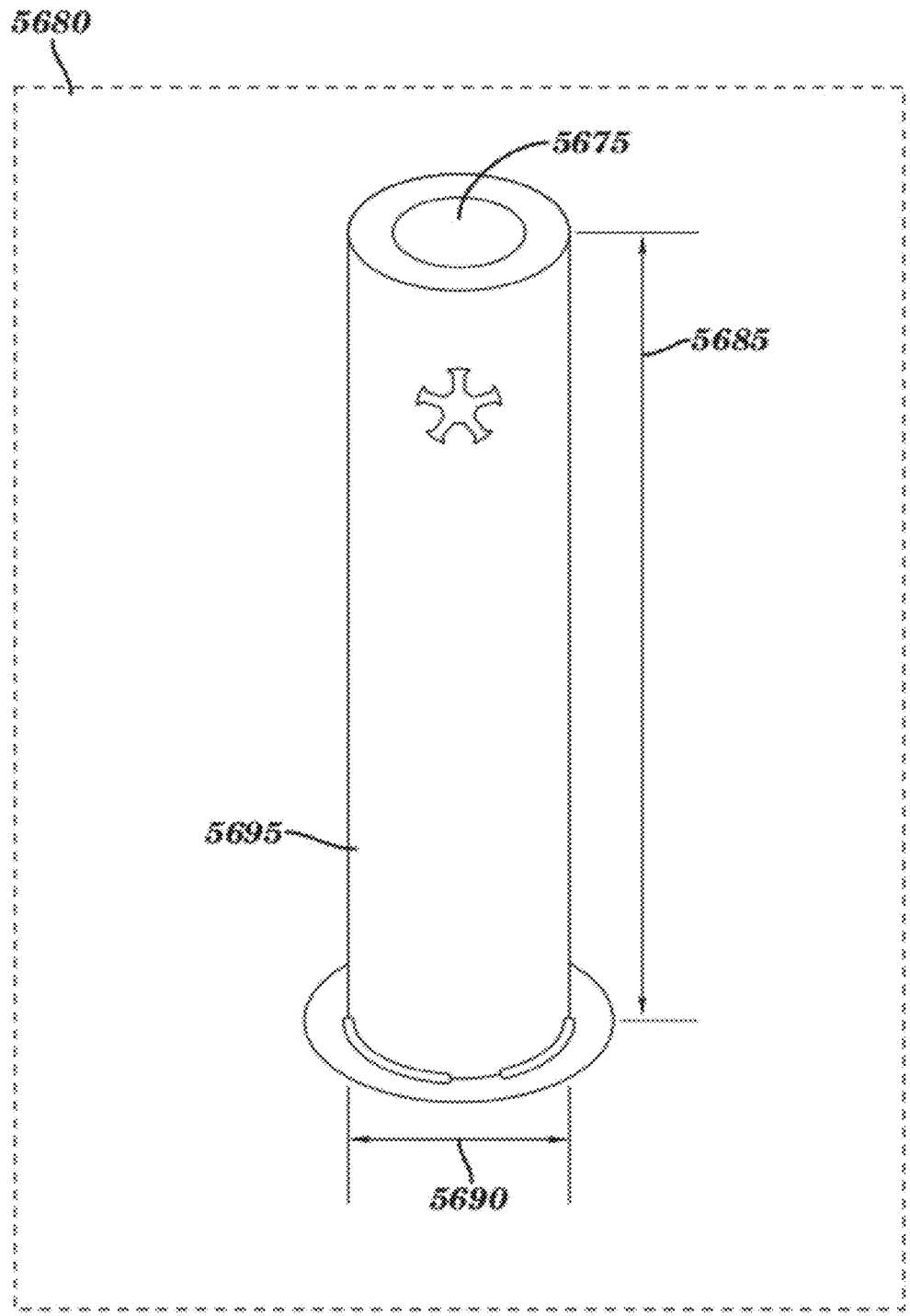
FIG. 36E is an illustration showing the structural sizes of the outer skin for containment of the heat exhaust plenum of the stacked assembly of complex micro grid ring mosaics of FIG. 36D, in accordance with embodiments of the present invention.

FIG. 36E is an illustration (5680) showing the structural sizes of the outer skin (5695) for containment of the heat exhaust plenum (5675) of the stacked assembly (5660) of complex micro grid ring mosaics of FIG. 36D, in accordance with embodiments of the present invention.

In one embodiment, the diameter (5690) of the external skin 5695 is 50 cm (~19.7 inches).

In one embodiment, the height (5685) of the external skin 5695 is 2.26 meters (~7 foot 5 inches).

In one embodiment, ducted and filtered fan forced cool air, from beneath raised flooring of the data centre supporting the mainframe apparatus, is exhausted from the heat exhaust plenum 5675 as a chimney, out of the top of the stacked assembly 5660.

Figure 37A:
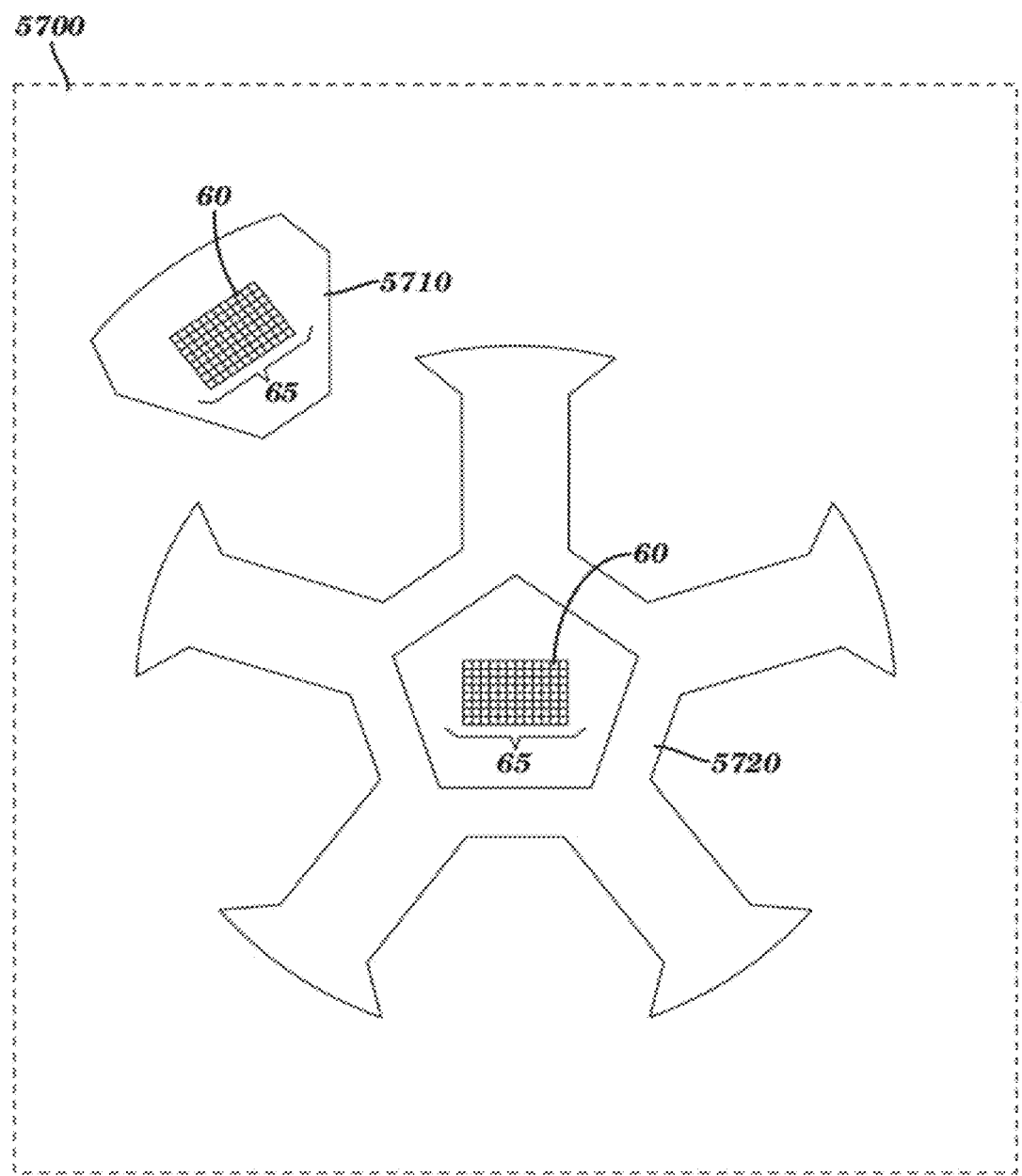
FIG. 37A depicts an eighty-core processor wafer, arranged in functionality as a group of micro grid processors with a single assigned unique processor, capable of generating artificial intelligence and participating in a plurality of virtual macro grids, in both a micro grid irregular shaped ceramic module and a micro grid processor ceramic complex shape, in accordance with embodiments of the present invention.

FIG. 37A depicts an eighty-core processor wafer (5700), arranged in functionality as a group of micro grid processors (65) with a single assigned unique processor (60), capable of generating artificial intelligence and participating in a plurality of virtual macro grids, in both a micro grid irregular shaped ceramic module (5710) and a micro grid processor ceramic complex shape (5720), in accordance with embodiments of the present invention.

Figure 37B:
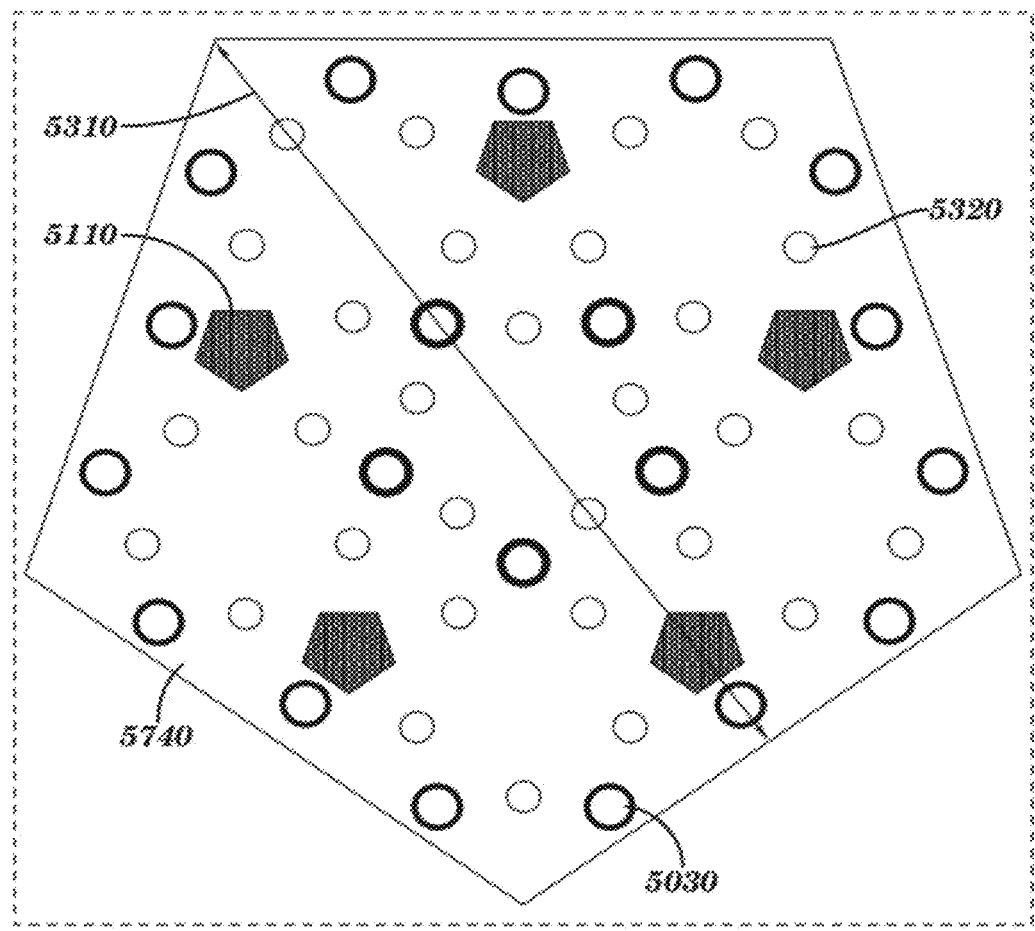
FIG. 37B depicts a pentagonal shaped multi-layered printed circuit board, in accordance with embodiments of the present invention.

FIG. 37B depicts a pentagonal shaped multi-layered printed circuit board (5740), in accordance with embodiments of the present invention. The printed circuit board 5740 includes a tier of a mainframe apparatus. The printed circuit board 5740 comprises five pentagonal 'pin and socket' connection block locations (5110) and a plurality of various sized holes that extend through the tiers of a mainframe apparatus.

The printed circuit board 5740 provides structural support for the assembly of complex mosaic micro grid structure.

Inter-connection 'pin and socket' blocks (5110) are for vertical stacking of multiple mosaic tiers, forming vertically continuous, and segmented, multi-data bus, power and signal 'backplanes', for micro grid computing apparatuses that are assembled without micro grid 'power tower' structures.

Twenty circular holes (5030) provide locations for cooling pipes containing pumped liquid nitrogen. Each cooling pipe passes through all tiers of the mainframe apparatus that comprises the printed circuit board 5740.

Thirty holes (5320) in the multi-layered printed circuit board (5740) accommodate micro grid heat sinks on the upper and lower surfaces of a micro grid structure 1310 (see, e.g., FIGS. 31A-31C, 32A-32B). When the vertical stacking of multiple mosaic tiers occurs, the heat sinks and micro grid structure 1310 are 'sandwiched' together with a non-silicone heat transfer compound, creating thirty two-meter high vertical heat dissipation tower in one embodiment, within several variations of stacked tiers of a mainframe apparatus.

In one embodiment, the suitably sized multi-layered printed circuit board (5740) with a base to apex length (5310) of 90 cm (i.e. ~3 feet) provides sufficient 'real estate' to accommodate a plurality of different micro grid server and micro grid mainframe mosaic modular designs.

Figure 37C:
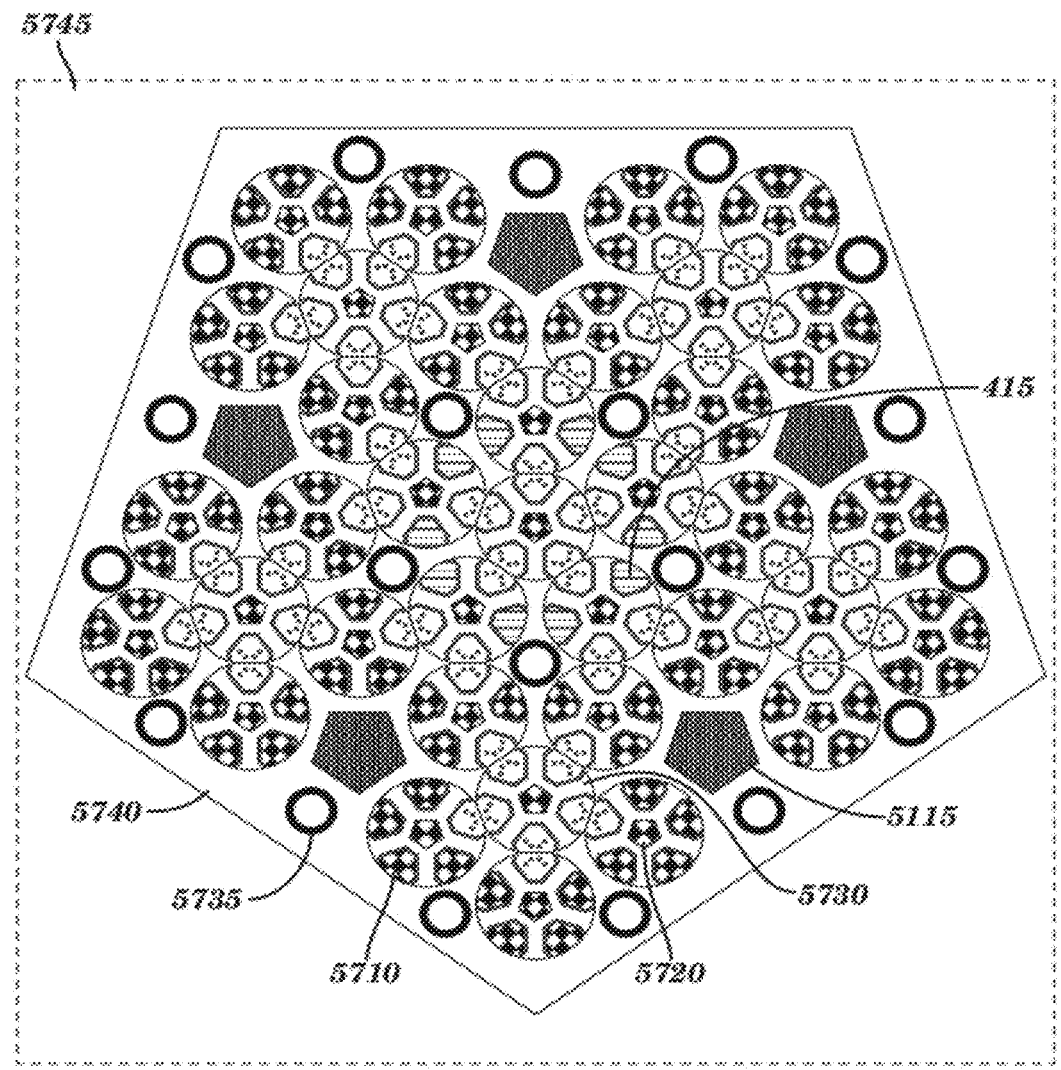
FIG. 37C depicts a complex mosaic micro grid structure on pentagonal multi-layered printed circuit board of a tier, in accordance with embodiments of the present invention.

FIG. 37C depicts a complex mosaic micro grid structure 5745 on pentagonal multi-layered printed circuit board 5740 of a tier, in accordance with embodiments of the present invention. A mainframe apparatus comprises the printed circuit board 5740 and its tier. The complex mosaic micro grid structure 5745 comprises thirty-six processor shapes (5720), ninety micro grid eighty-processor irregular shaped modules (5710) and ten micro grid 802.11s Mesh Wireless irregular shaped modules (415). Each processor shape 5720 comprises eighty processors. The complex mosaic micro grid structure 5745 comprises ten thousand and eighty processors.

For heat dissipation and cooling, liquid nitrogen is pumped through twenty pipes (5735) penetrating the complex mosaic micro grid structure 5745.

Each processor shape 5720 is physically connected via it's radial arm pins, attached to the printed circuit board 5340 and to the five pentagonal 'pin and socket' connection blocks (5115) forming segmented vertical 'backplanes' between the tiers of the complex mosaic micro grid structure 5745 in a fixed micro grid computing system.

The mosaic micro grid structure 5745 does not use micro grid 'power tower' structures (5020) for multi-layered assembly into a micro grid mainframe apparatus. Instead, each complex shape 5730, which does not comprise batteries (i.e., rechargeable batteries) and instead comprises a plurality of processors 65 having a unique processor 60, has docking bays each of which comprise a bridge unit 2011/2012 of a bridge module 2010 so that no docking bay comprises an irregular module.

Figure 37D:
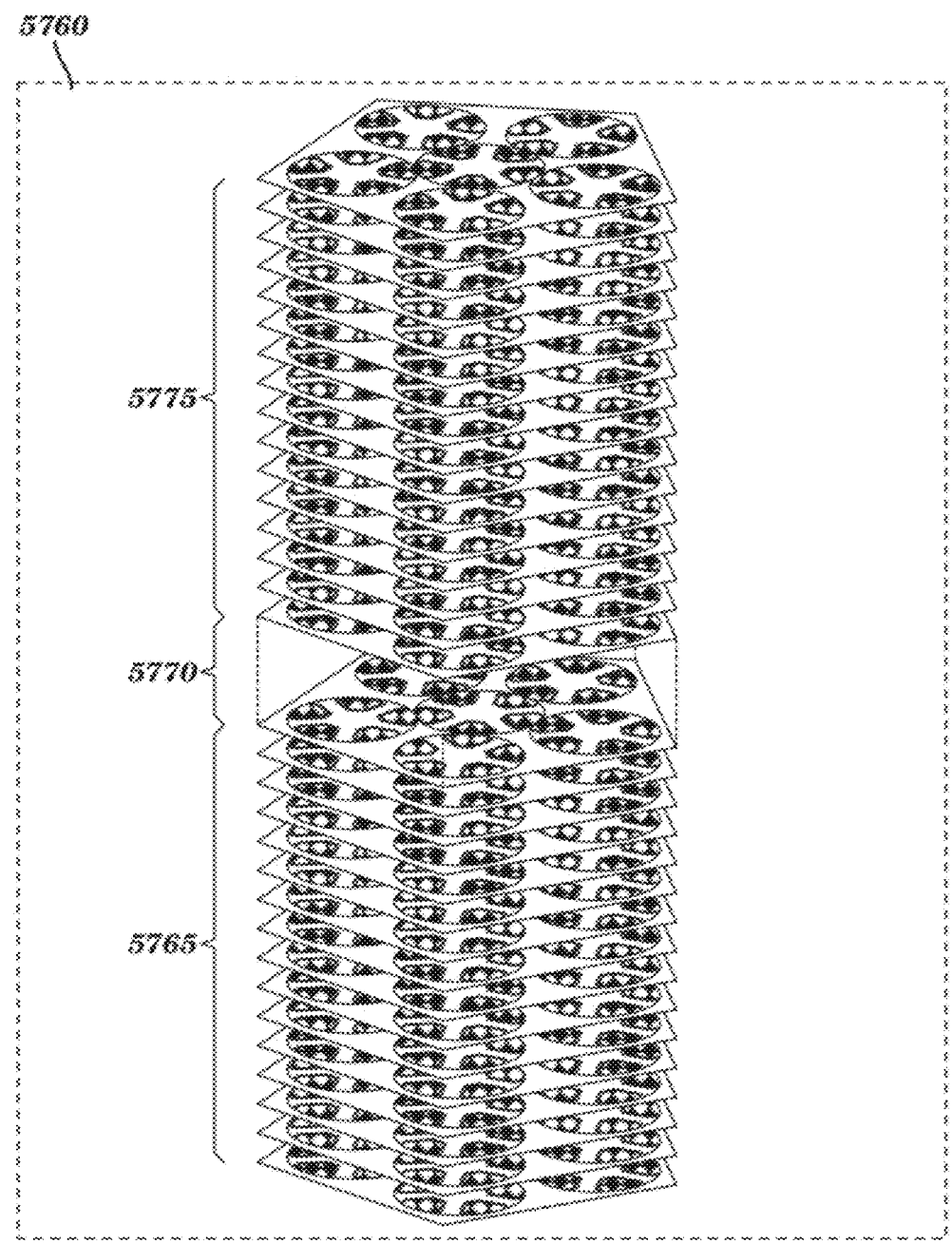
FIG. 37D is an exploded view of a stacked assembly of tiers of complex micro grid mosaic structures in a mainframe apparatus, in accordance with embodiments of the present invention.

FIG. 37D is an exploded view of a stacked assembly (5760) of tiers of complex micro grid mosaic structures in a mainframe apparatus, in accordance with embodiments of the present invention. The stacked assembly 5760 comprises tiers zero to one hundred and ninety-nine. In FIG. 37D, tiers zero to fifteen (5765) and tiers one hundred and eighty-four to one hundred and ninety-nine (5775) are shown. The dotted lines denote tiers sixteen to one hundred and eighty-three (5770).

In one embodiment, the structural height of the stacked assembly 5760 is 2.2 meters (~86.5 inches).

The stacked assembly 5760 embodies an extremely powerful complex micro grid of two million and sixteen thousand processors (2,016,000). Additionally, two hundred micro grid irregular shaped module docking bays are available, for a combination of 802.11s Mesh Wireless, Communications, Input and Output, Cache Memory, Global Positioning System, Instrument Sensors, and Actuator Drivers.

Micro Grid Mesh Wireless (802.11s) modules (415) and micro grid Communication modules (425), embodied in the stacked assembly 5760, provide macro grid and micro grid communication functionality, which eliminates a large proportion of traditional mainframe and server data cabling requirements.

The stacked assembly 5760 may perform as a multi-petaflop machine, as performance of the Intel eighty-core processor wafer is assessed at 1.8 teraflops with a clock speed of 5.6 GHz. One petaflop equals one thousand trillion (one quadrillion) floating point operations per second.

A hypothetical assembled mainframe micro grid apparatus constructed with one thousand Intel eighty-core processor wafers (eighty thousand micro grid processors) will theoretically produce a single machine capable of 1.8 petaflops (i.e. 1000×1.8 teraflops).

The assembled micro grid mainframe apparatus (5760) with 2,016,000 micro grid processors (the equivalent of 25,200 Intel eighty-core processor wafers), will provide a computing machine capable of 45.36 petaflops (i.e. 25,200× 1.8 teraflops), or 0.4536 exaflops. Five micro grid mainframe apparatus's (5760) wirelessly interconnected with common composite data and signal buses can be constructed as a single machine with ten million and eighty thousand micro grid processors (see FIG. 37F) to perform as a 2.268 exaflop machine (i.e. 5×0.4536 exaflops). One exaflop equals a million trillion (one thousand quadrillion) floating point operations per second.

Thus, the complex mosaic micro grid structure 5745 in FIG. 37C comprises five pin and socket towers (generally, at least one pin and socket tower). Each pin and socket tower is depicted in FIG. 37D as comprising corresponding pin and socket connection blocks 5115 (see FIG. 37C) in all tiers such that the corresponding pin and socket connection blocks 5115 in successive tiers are aligned directly above or directly below each other and physically connected to each other (see FIG. 37D). The pin and socket towers physically connect together the tiers of the stacked assembly 5760. The stacked assembly 5760 does not comprise a power tower, wherein a power tower encompasses corresponding power hubs in all tiers such that the corresponding power hubs in successive tiers are aligned directly above or directly below each other and are integral with each other.

Figure 37E:
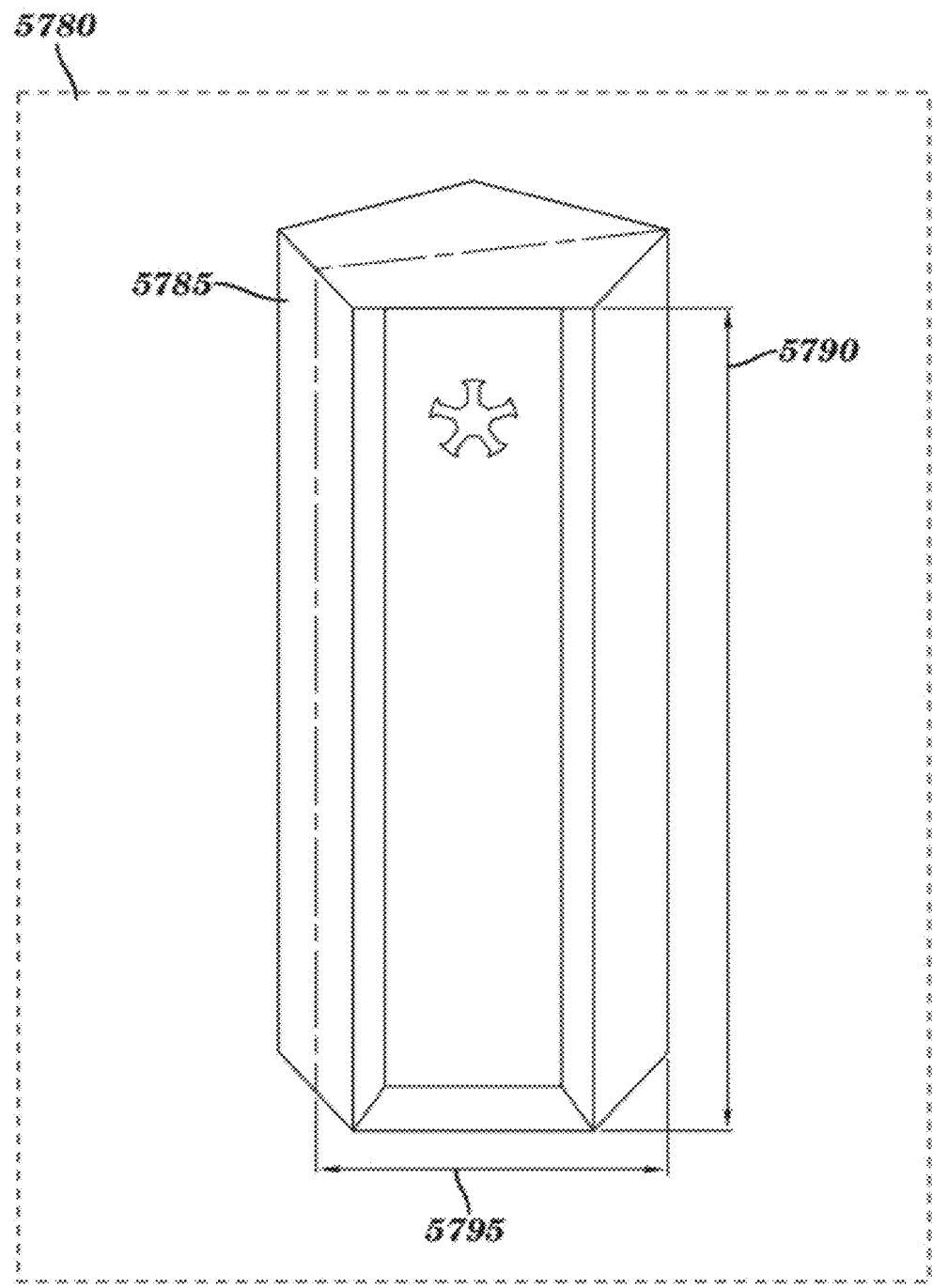
FIG. 37E depicts the structural sizes of the outer skin for containment of a unique and complex micro grid apparatus, in accordance with embodiments of the present invention.

FIG. 37E depicts the structural sizes of the outer skin (5785) for containment of a unique and complex micro grid apparatus (5780), in accordance with embodiments of the present invention.

In one embodiment, the complex micro grid apparatus 5780 comprises two million and sixteen thousand processors.

In one embodiment, the complex micro grid apparatus composite moulded skin 5785 is fabricated as a light, structurally solid, wirelessly transparent, thermally resistive, hi-tech Papier-Mâché from recycled non-contaminated waste, such as paper and cardboard packaging in accordance with world-best environmental, research and manufacturing practices.

The complex micro grid apparatus composite moulded skin 5785 is arranged and fastened as flat interlocking panel shapes (see FIG. 37E) without the need for a mechanical frame.

The complex micro grid apparatus composite moulded skin 5695 is arranged as a tubular cylinder (see FIG. 36E) being lowered over the apparatus as a cylinder, and fastened to a base plate without the requirement of a structural frame.

The complex micro grid apparatus composite moulded skin (5785) may comprise any material known in the art as being non-conductive, structurally vital and light, wirelessly transparent, thermally resistive, non-toxic, environmentally safe, bio-degradable, non-absorptive, and fire resistant. In one embodiment, the complex micro grid apparatus composite moulded skins (5785, 5695) may be comprised of a hi-tech Papier-Mâché material.

In one embodiment, the complex micro grid apparatus skin 5785 is manufactured by high pressure and temperature moulding.

In one embodiment, the base to apex length (5795) of the external skin 5785 is one meter (~39 inches).

In one embodiment, the height (5790) of the external skin 5785 is 2.26 meters (~7 foot 5 inches).

Figure 37F:
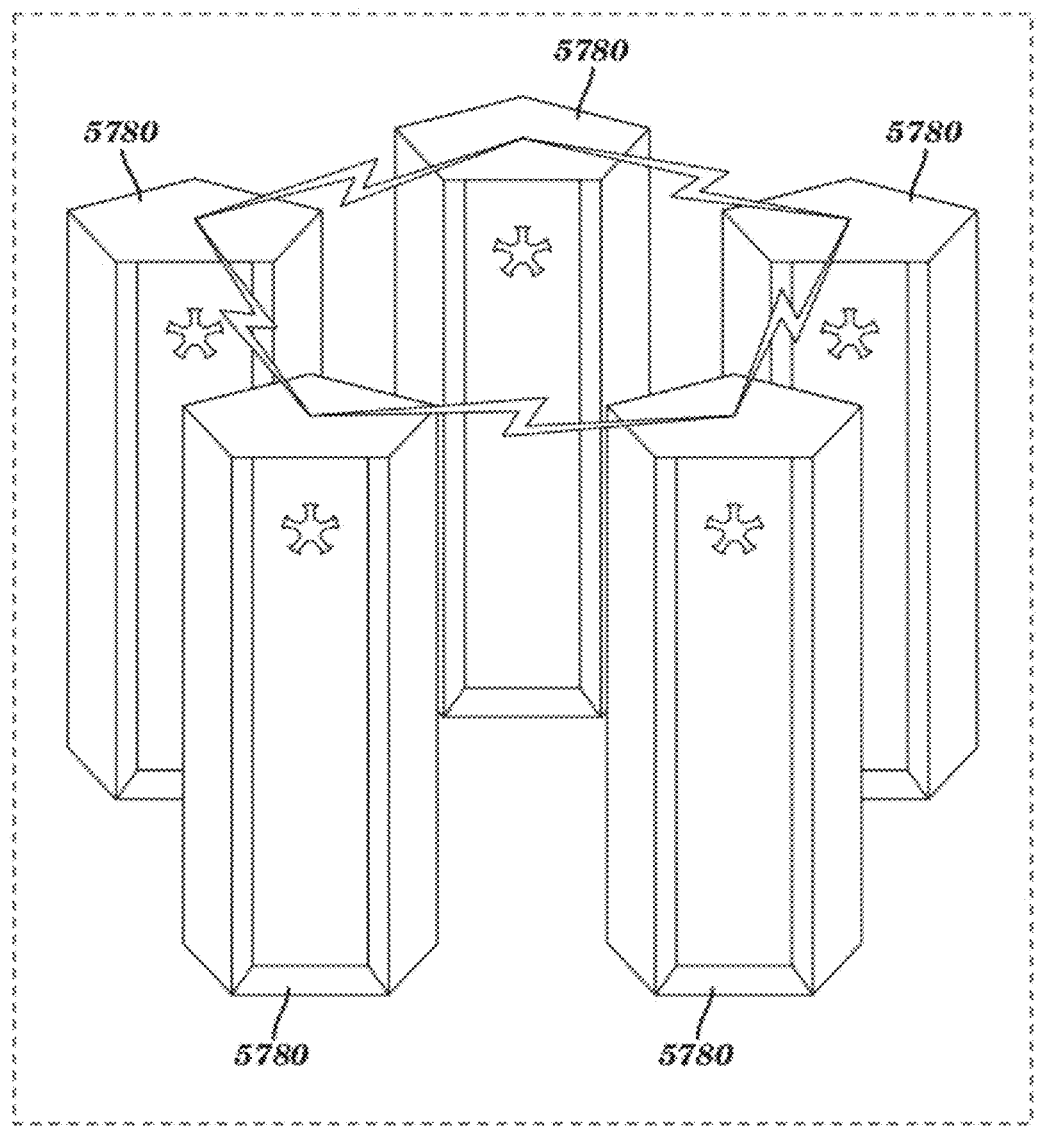
FIG. 37F depicts five micro grid mainframe apparatus's wirelessly interconnected with common composite data and signal buses forming a 'Hypercomputer', in accordance with embodiments of the present invention.

FIG. 37F depicts five micro grid mainframe apparatus's (5760) wirelessly interconnected with common composite data and signal buses forming a 'Hypercomputer' (a single computing machine capable of sustaining more than one exaflop).

In one embodiment a 'Hypercomputer' can be constructed as a single apparatus with ten million and eighty thousand micro grid processors (see FIG. 37F) to perform as a single 2.268 exaflop computational machine. The 'Hypercomputer' is formed by data bus interconnection; power systems commonality; Government, Parliament, Executive and Council Governance; Artificial Intelligence functionality; and micro grid wireless interconnect; within the embodiment of five complex micro grid mosaic mainframe structures.

In one embodiment a localized Government may be bound within an Intranet. A plurality of artificial intelligences may generate as a result of responding to a plurality of alerts within an Intranet. In one embodiment, an artificial intelligence may determine availability of Internet actuator resources (i.e., outside the Intranet) to remedy Intranet alerts and alarms. The Artificial Intelligence layer of the extended 7 layer data communications model for micro grids, functions with superiority over the Governance layer.

In summary, the present invention provides a micro grid apparatus for use in a mainframe system or server system and a method of forming the micro grid apparatus. At least one tier in a printed circuit board is formed. The tiers of a mainframe apparatus are distributed and sequenced in a vertical direction such that each tier is at a different vertical level in the vertical direction. Each tier comprises a multiplicity of complex shapes interconnected by a plurality of bridge modules (2010). Each complex shape of the multiplicity of complex shapes comprises a central area and at least three radial arms connected to the central area. The radial arms are external to and integral with the central area. Each radial arm extends radially outward from the central area, wherein each pair of adjacent radial arms defines a docking bay.

Each complex shape of the multiplicity of complex shapes is either a power hub (3000) whose central area comprises a plurality of rechargeable batteries or a processor hub (1310) whose central area comprises plurality of processors.

At least one docking bay of each complex shape of the multiplicity of complex shapes has a bridge unit (2011/2012) of a bridge module (2010) of the plurality of bridge modules latched therein such that another remaining bridge unit of said bridge module is latched into a docking bay of another complex shape of the multiplicity of complex shapes. Thus, any of the bridge modules 2010 in the Figures described supra in this section has its bridge units 2011 and 2012 latched into respective docket bays of two complex shapes to bridge the two complex shapes together.

Each docking bay of each complex shape of the multiplicity of complex shapes that does not have a bridge unit of any bridge module of the plurality of bridge modules latched therein has an irregular shaped module of a plurality of irregular shaped modules latched therein, wherein each irregular shaped module provides a functionality for responding to an alert pertaining to an event. Thus, either an irregular shaped module or a bridge unit of a bridge module is latched to each docket bay of each complex shape of a mainframe apparatus or a server apparatus.

The multiplicity of complex shapes comprises a plurality of complex shapes such that at least one docking bay of each complex shape of the plurality of complex shapes has one irregular shaped module of the plurality of irregular shaped modules latched therein. Thus, each complex shape a plurality of complex shapes in each tier (which does not necessarily include all complex shapes in each tier) has an irregular shaped module latched in at least one of its docking bays.

In one embodiment, the at least one tier is a plurality of tiers, wherein a sensor module is latched in each sensor docking bay of at least one sensor docking bay and an actuator module is latched in each actuator docking bay of at least one actuator docking bay of each complex shape of one or more complex shapes of the multiplicity of complex shapes in one or more tiers of the plurality of tiers. Thus, a mainframe apparatus, which comprises a plurality of tiers, comprises at least one tier having complex shapes that include at least one sensor module and at least one actuator module (e.g., see FIGS. 32B, 35A, 35B, 36A, 36B).

In one embodiment, the multiplicity of complex shapes in each tier comprises at least one complex shape such that each docking bay of each complex shape of the at least one complex shape has a bridge unit of a connective bridge module of the plurality of bridge modules latched therein, said connective bridge module comprising a remaining bridge unit latched into a docking bay of some other complex shape of the multiplicity of complex shapes. Thus the docking bays of some complex shapes comprise only bridge units of bridge modules (e.g., 'power hubs' 3000 in 'power tower' 5020, complex shapes 5730 in FIG. 37C).

In one embodiment, the micro grid apparatus comprises at least one 'power tower', each 'power tower' encompassing corresponding 'power hubs' in all tiers such that the corresponding 'power hubs' in successive tiers are aligned directly above or directly below each other and are integral with each other, said at least one 'power tower' physically connecting together the tiers of the plurality of tiers.

In one embodiment, the at least one 'power tower' consists of a first 'power tower' whose 'power hub' at each tier is bridged by a bridge module of the plurality of bridge modules in each docking bay to a corresponding 'processor hub' that is not bridged to any other complex shape of the multiplicity of complex shapes (e.g., see FIG. 35A).

In one embodiment, the at least one 'power tower' comprises a plurality of 'power towers', wherein the multiplicity of complex shapes comprises a plurality of simple mosaics, wherein each simple mosaic comprises a corresponding 'power tower' of the plurality of 'power towers', wherein for each simple mosaic the docking bays of each corresponding 'power tower' are each bridged to a satellite 'processor hub' of the multiplicity of complex shapes, and wherein a satellite 'processor hub' of each simple mosaic is directly bridged to a satellite 'processor hub' of another simple mosaic of the plurality of simple mosaics by a connecting bridge module of the plurality of bridge modules. Thus, a complex mosaic may be a coupled collection of simple mosaics.

In one embodiment, the at least one 'power tower' comprises a plurality of 'power towers', wherein a first 'power tower' and a second 'power tower' are directly bridged to each other by a connecting bridge module of the plurality of bridge modules (e.g., see FIG. 36C).

In one embodiment, the at least one 'power tower' comprises a plurality of 'power towers', wherein a first 'power tower' and a second 'power tower' are indirectly connected to each other by either:
- a single 'processor hub', wherein the first 'power tower' is directly bridged to the single 'processor hub' at a first docking bay of the single 'processor hub', and wherein the second 'power tower' is directly bridged to the single 'processor hub' at a second docking bay of the single 'processor hub'; or
- a plurality of 'processor hubs' interconnected with each other by at least one interconnecting bridge module of the plurality of bridge modules, wherein the plurality of 'processor hubs' comprises a first 'processor hub' and a second 'processor hub', wherein the first 'power tower' is directly bridged to the first 'processor hub' at a docking bay of the first 'processor hub', and wherein the second 'power tower' is directly bridged to the second 'processor hub' at a docking bay of the second 'processor hub'.

Thus, 'power towers' may be indirectly connected to each other by one or more 'processor hubs'.

In one embodiment, the micro grid apparatus comprises at least one pin and socket tower, each pin and socket tower encompassing corresponding pin and socket connection blocks in all tiers such that the corresponding pin and socket connection blocks in successive tiers are aligned directly above or directly below each other and physically connected to each other. In this embodiment, the micro grid apparatus does not comprise a power tower that encompasses corresponding 'power hubs' in all tiers such that the corresponding 'power hubs' in successive tiers are aligned directly above or directly below each other and are integral with each other.

In one embodiment, the multiplicity of complex shapes in each tier consists of at least three complex shapes sequentially interconnected by bridge modules of the plurality of bridge modules to form a closed ring (e.g., see FIGS. 36A and 36B).

H. Cloud Computing

The present invention provides for cloud computing and virtualization where artificial intelligences conscript available processors to a macro grid from micro grid resources. It is possible (with sufficient micro grid computing machines deployed) that a single generated artificial intelligence could govern a single virtual Mesh Wireless connected macro grid of a billion micro grid processors or more, which illustrates the power of cloud computing.

A "cloud" of the present invention is any complex apparatus (i.e., any complex micro grid apparatus, or associated set of micro grid system stacks, or a cloud computing polygonal mosaic such micro grid bridge structures, or a complex power hub apparatus), characterized by a plurality of interconnected micro grid apparatuses.

In order to completely facilitate cloud computing, the present invention provides an entirely new computational micro grid technology to lift the computing industry to the next platform, embracing structures of the past but also facilitating new structures for the future.

The new fundamental computing elements of the present invention are scalable from the very tiny to the very large, so that software systems can traverse the entire hardware product range.

Cloud computing according to the present invention is available and sustainable not only in fixed locations, but also in mobile and remote locations, and is able to be serviced by engineers and robots and/or plugged into power grids.

The present invention provides for the diversity of functional use that cloud computing utilizes, for computational involvement of the very small to the very large, for the connection to everything, everywhere, all the time, for 'On Demand' requests for information, for reaction to alerts and pro-active resolve by artificial intelligence, for artefact and archive storage, all intertwined with the growing computational needs of humanity.

The following examples illustrate the use of cloud computing by the present invention.

G.1 First Cloud Computing Example

Figure 38:
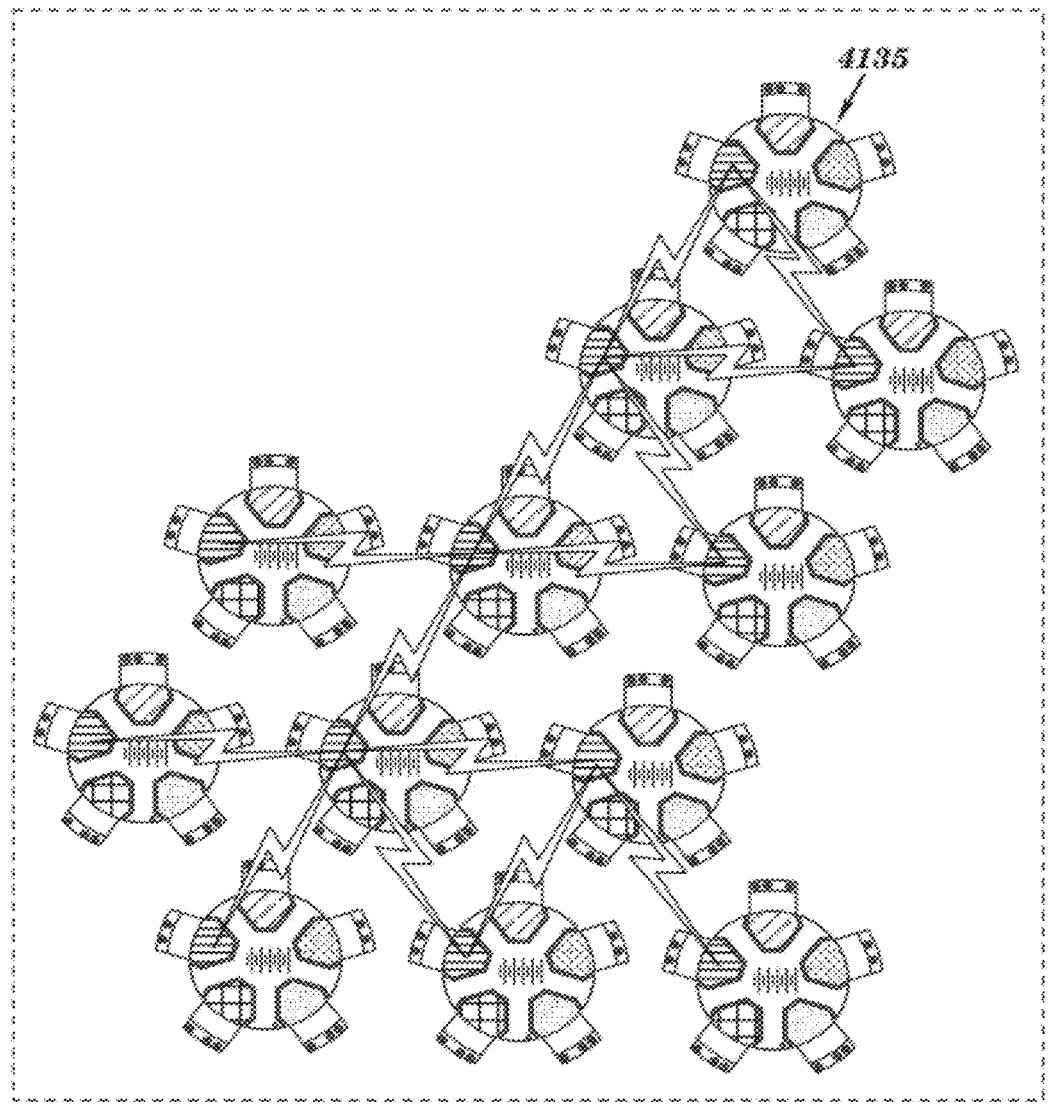
FIG. 38 illustrates wireless connectivity of a composite apparatus comprising twelve power hub apparatuses that includes micro grid instrument sensor and actuator driver apparatuses in a medical ward within a wing of a large metropolitan hospital, in accordance with embodiments of the present invention.

In a first cloud computing example involving hospital intelligence, FIG. 38 illustrates wireless connectivity of a composite apparatus comprising twelve power hub apparatuses 4135 that includes micro grid instrument sensor and actuator driver apparatuses in a medical ward within a wing of a large metropolitan hospital, in accordance with embodiments of the present invention.

Some of the apparatuses are embedded in specialized electronic medical machines. Some are attached to hospital mobile equipment trolleys and patient beds, while others are discretely positioned in fixed locations within the medical ward, connected to the in-house emergency power systems.

Specialized hospital equipment associated with all the patients in the hospital ward (e.g., electro-cardiograph pacemakers and heart monitors; blood dialysis machines; glucose monitors; blood pressure monitors; intravenous drip machines; body thermometers; encephalogram devices; x-ray scanners; blood test devices; CAT scanners; including medical personnel pagers and patient bed-side alarm buttons; etc.) are physically connected to the installed instrument sensor and activator driver modules of the present invention.

Each individual micro grid instrument sensor and actuator driver apparatus has ten unique processors (i.e., one unique micro grid assigned processor in each of the five micro grid processor modules, and a dedicated micro grid processor in each of the instrument sensor modules and actuator driver modules) that are constantly monitoring for alerts and task requests by direct physical and electrical attachment to the patient's life-support machines, including alarm buzzer requests from patients within the hospital ward.

A macro grid containing an artificial intelligence is generated between the apparatuses when alerts and requests are received. Alerts and requests can be anything from an unusual event occurring on a patient connected encephalogram device to an alarm buzzer request from a patient's bedside assistance request button. There is a plurality of alert and request types. The artificial intelligence (macro grid) expands itself by conscripting other wirelessly adjacent micro grid processors to assist with computing the alert or request. Escalation is the result of an increased change in alert scale. This cloud computing process is constantly occurring and evolving.

One macro grid containing an artificial intelligence is connected to the Internet for digital TV channels and web-site information transfer to all the patients bedside display and access systems for their entertainment and enjoyment, while another macro grid has generated amongst the four adjacent apparatuses closest to the emergency theatre, reacting to oxygen (O2) low signals from the line of O2 gas bottles lined up along the theatre's outside wall.

Failure of an O2 gas bottle connection hose to the emergency theatre's primary O2 gas supply line has occurred.

The artificial intelligence instructs the micro grid apparatus that is physically and electrically connected to the O2 gas bottle valves to close the appropriate valves between the emergency theatre O2 supply line and the rapidly depleting gas bottle by use of its actuator driver, and open, purge and test (by use of an instrument sensor) the integrity of a fresh O2 gas bottle, and then include this source of O2 into the hospital emergency theatre's primary supply, without delay.

Hospital personnel is advised of the O2 depletion event and of the pro-active remedy taken by the artificial intelligence.

A requisition is made by the artificial intelligence for hospital maintenance and repair assistance, and for more O2 to be supplied to this ward in this wing of the hospital.

The micro grid alert value returns to zero, the artificial intelligence responding to the O2 shortage event decays, leaving a single artificial intelligence busy with the digital TV and Internet web-site provisioning to the patients and nurses, across all the twelve micro grid instrument sensor and actuator driver apparatuses in the hospital ward.

The doctors in the emergency theatre were not interrupted by the oxygen depletion event during the three hour surgery they were undertaking.

G.2 Second Cloud Computing Example

Figure 39:
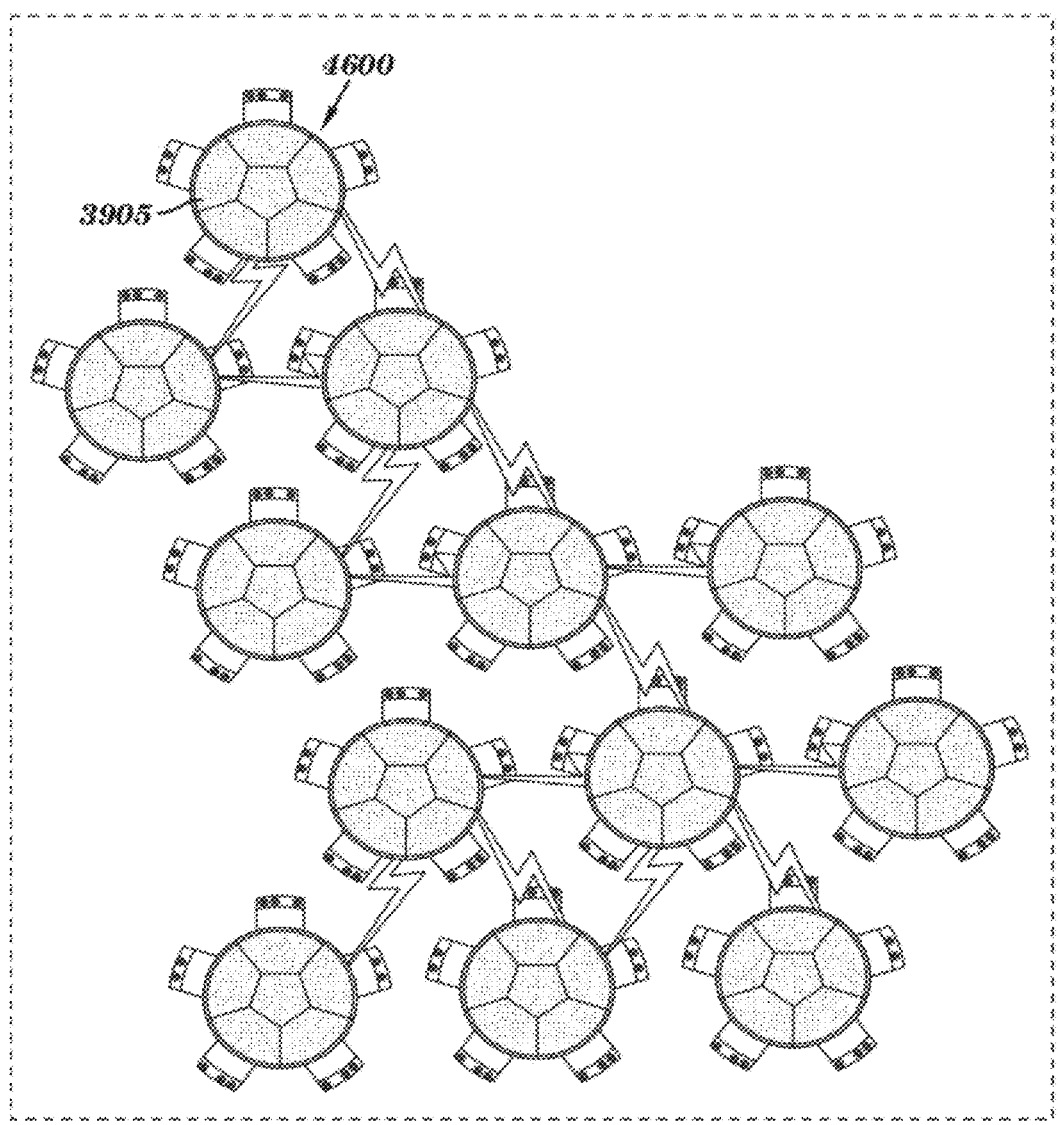
FIG. 39 illustrates wireless connectivity of a composite apparatus comprising twelve power hub apparatuses that include remote micro grid instrument sensor and actuator driver apparatuses in a small river basin, in accordance with embodiments of the present invention.

In a second cloud computing example involving water management, FIG. 39 illustrates wireless connectivity of a composite apparatus comprising twelve power hub apparatuses 4600 that include remote micro grid instrument sensor and actuator driver apparatuses in a small river basin, in accordance with embodiments of the present invention. Each apparatus is covered by a micro grid solar power skin to assist in charging its embodied micro grid system battery.

Micro grid instrument sensor and actuator driver connections are permanently established by attachment to thousands of water sensing devices and flow control valves and gates, throughout the complex river basin.

An artificial intelligence governs the entire vitality and health of the water in the river system.

Information of increased evaporation in the ponds of the lower reaches of the river alert the artificial intelligence to release stored water 1500 kilometers away in a controlled and cascading way, of just the right quantities to slowly rebuild and enhance the fragile ecosystems without flooding and scouring damage.

A rapid loss of several hundred thousand mega-liters of water is detected in a city. A local artificial intelligence is generated across five of the micro grid apparatuses reacting to an alert value of 8, sensed from a series of flotation devices in one of the remote river lakes. The artificial intelligence closes the flood and flow control gates of the lake, by using its available actuator drivers on the appropriately located apparatuses. The water level of the lake continues to fall, and the alert value is raised to 9. The artificial intelligence requests (by system generated e-mail) that water authority personnel urgently attend the remote location. Global positioning coordinates are provided by the Micro Grid technology for the response team to quickly locate the problem on a map.

An old irrigation channel to a cattle property has opened up and is drawing water away from the lake.

Sand bags are dropped by helicopter to stem the water outflow.

The micro grid alert value starts to drop and the artificial intelligence responding to the water loss event re-opens the water control gates. As the alert value reaches zero, the artificial intelligence decays, leaving a single artificial intelligence busy with the entire vitality and health of the water in the river system.

H. Data Processing Apparatus

Figure 40:
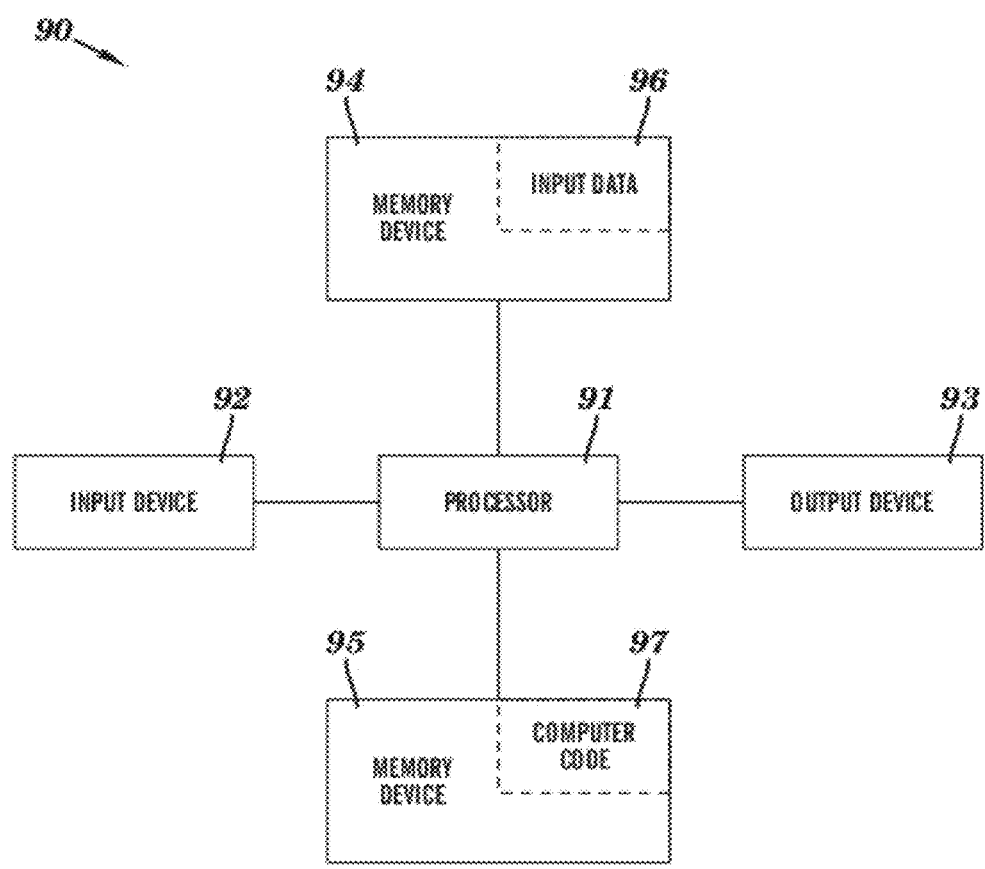
FIG. 40 illustrates an exemplary data processing apparatus used for implementing any process or functionality of any processor, apparatus, or structure used in accordance with embodiments of the present invention.

FIG. 40 illustrates an exemplary data processing apparatus 90 used for implementing any process or functionality of any processor, apparatus, or structure used in accordance with embodiments of the present invention. The data processing apparatus 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 is program code that includes an algorithm for implementing any process or functionality of any processor, apparatus, or structure used in accordance with embodiments of the present invention. The processor 91 implements (i.e., performs) the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 40) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer readable storage medium (or said program storage device).

Any of the components of the present invention could be created, integrated, hosted, maintained, deployed, managed, serviced, supported, etc. by a service provider who offers to facilitate implementation of any process or functionality of any processor, apparatus, or structure used in accordance with embodiments of the present invention. Thus the present invention discloses a process for deploying or integrating computing infrastructure, comprising integrating computer-readable code into the data processing apparatus 90. Therefore, the code in combination with the data processing apparatus 90 is capable of performing any process or functionality of any processor, apparatus, or structure used in accordance with embodiments of the present invention.

In another embodiment, the invention provides a method that performs the process steps of the invention on a subscription, advertising, and/or fee basis. That is, a service provider, such as a Solution Integrator, could offer to facilitate implementation of any process or functionality of any processor used in accordance with embodiments of the present invention. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 40 shows only one processor 91, the processor 91 may represent an array of processors such as the plurality of processors 65 coupled to the input device 92, the output device 93, and the memory devices 94 and 95.

While FIG. 40 shows the data processing apparatus 90 as a particular configuration of hardware and software, any configuration of hardware and software, as would be known to a person of ordinary skill in the art, may be utilized for the purposes stated supra in conjunction with the particular data processing apparatus 90 of FIG. 40. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A micro grid apparatus for use in a mainframe system or server system, comprising:

at least one tier, each tier comprised by an associated printed circuit board, wherein if said at least one tier consists of a plurality of tiers then the tiers are distributed and sequenced in a vertical direction such that each tier is at a different vertical level in the vertical direction, wherein each tier comprises a multiplicity of complex shapes interconnected by a plurality of bridge modules, wherein each complex shape of the multiplicity of complex shapes is a physical structure having an exterior boundary, wherein each complex shape of the multiplicity of complex shapes comprises a central area and at least three radial arms connected to the central area, wherein the radial arms are external to and integral with the central area, wherein each radial arm extends radially outward from the central area, wherein each pair of adjacent radial arms together with a portion of an exterior boundary of the central area defines a docking bay consisting of a region whose geometric shape enables a module to be latched therein, wherein each complex shape of the multiplicity of complex shapes is either a power hub whose central area comprises a plurality of rechargeable batteries or a processor hub whose central area comprises plurality of processors, wherein at least one docking bay of each complex shape of the multiplicity of complex shapes has a bridge unit of a bridge module of the plurality of bridge modules latched therein such that another remaining bridge unit of said bridge module is latched into a docking bay of another complex shape of the multiplicity of complex shapes, wherein each docking bay of each complex shape of the multiplicity of complex shapes that does not have a bridge unit of any bridge module of the plurality of bridge modules latched therein has an irregular shaped module of a plurality of irregular shaped modules latched therein, each irregular shaped module providing a functionality for responding to an alert pertaining to an event, and wherein the multiplicity of complex shapes comprises a plurality of complex shapes such that at least one docking bay of each complex shape of the plurality of complex shapes has one irregular shaped module of the plurality of irregular shaped modules latched therein.

2. The micro grid apparatus of claim 1, wherein the at least one tier is a plurality of tiers, and wherein a sensor module is latched in each sensor docking bay of at least one sensor docking bay and an actuator module is latched in each actuator docking bay of at least one actuator docking bay of each complex shape of one or more complex shapes of the multiplicity of complex shapes in one or more tiers of the plurality of tiers.

3. The micro grid apparatus of claim 2, wherein the multiplicity of complex shapes in each tier comprises at least one complex shape such that each docking bay of each complex shape of the at least one complex shape has a bridge unit of a connective bridge module of the plurality of bridge modules latched therein, said connective bridge module comprising a remaining bridge unit latched into a docking bay of some other complex shape of the multiplicity of complex shapes.

4. The micro grid apparatus of claim 3, wherein the micro grid apparatus comprises at least one power tower, each power tower encompassing corresponding power hubs in all tiers such that the corresponding power hubs in successive tiers are aligned directly above or directly below each other and are integral with each other, said at least one power tower physically connecting together the tiers of the plurality of tiers.

5. The micro grid apparatus of claim 4, wherein the at least one power tower consists of a first power tower whose power hub at each tier is bridged by a bridge module of the plurality of bridge modules in each docking bay to a corresponding processor hub that is not bridged to any other complex shape of the multiplicity of complex shapes.

6. The micro grid apparatus of claim 4, wherein the at least one power tower comprises a plurality of power towers, wherein the multiplicity of complex shapes comprises a plurality of simple mosaics, wherein each simple mosaic comprises a corresponding power tower of the plurality of power towers, wherein for each simple mosaic the docking bays of each corresponding power tower are each bridged to a satellite processor hub of the multiplicity of complex shapes, and wherein a satellite processor hub of each simple mosaic is directly bridged to a satellite processor hub of another simple mosaic of the plurality of simple mosaics by a connecting bridge module of the plurality of bridge modules.

7. The micro grid apparatus of claim 4, wherein the at least one power tower comprises a plurality of power towers, and wherein a first power tower and a second power tower are directly bridged to each other by a connecting bridge module of the plurality of bridge modules.

8. The micro grid apparatus of claim 4, wherein the at least one power tower comprises a plurality of power towers, and wherein a first power tower and a second power tower are indirectly connected to each other by either:
- a single processor hub, wherein the first power tower is directly bridged to the single processor hub at a first docking bay of the single processor hub, and wherein the second power tower is directly bridged to the single processor hub at a second docking bay of the single processor hub; or
- a plurality of processor hubs interconnected with each other by at least one interconnecting bridge module of the plurality of bridge modules, wherein the plurality of processor hubs comprises a first processor hub and a second processor hub, wherein the first power tower is directly bridged to the first processor hub at a docking bay of the first processor hub, and wherein the second power tower is directly bridged to the second processor hub at a docking bay of the second processor hub.

9. The micro grid apparatus of claim 3,
wherein the micro grid apparatus comprises at least one pin and socket tower, each pin and socket tower encompassing corresponding pin and socket connection blocks in all tiers such that the corresponding pin and socket connection blocks in successive tiers are aligned directly above or directly below each other and physically connected to each other, said at least one pin and socket tower physically connecting together the tiers of the plurality of tiers; and
wherein the micro grid apparatus does not comprise a power tower that encompasses corresponding power hubs in all tiers such that the corresponding power hubs in successive tiers are aligned directly above or directly below each other and are integral with each other.

10. The micro grid apparatus of claim 2, wherein the multiplicity of complex shapes in each tier consists of at least three complex shapes sequentially interconnected by bridge modules of the plurality of bridge modules to form a closed ring.

11. A method of forming a micro grid apparatus for use in a mainframe system or server system, said method comprising:
- forming at least one tier, each tier comprised by an associated printed circuit board,
- wherein if said at least one tier consists of a plurality of tiers then the tiers are distributed and sequenced in a vertical direction such that each tier is at a different vertical level in the vertical direction,
- wherein each tier comprises a multiplicity of complex shapes interconnected by a plurality of bridge modules,
- wherein each complex shape of the multiplicity of complex shapes is a physical structure having an exterior boundary,
- wherein each complex shape of the multiplicity of complex shapes comprises a central area and at least three radial arms connected to the central area,
- wherein the radial arms are external to and integral with the central area,
- wherein each radial arm extends radially outward from the central area,
- wherein each pair of adjacent radial arms together with a portion of an exterior boundary of the central area defines a docking bay consisting of a region whose geometric shape enables a module to be latched therein,
- wherein each complex shape of the multiplicity of complex shapes is either a power hub whose central area comprises a plurality of rechargeable batteries or a processor hub whose central area comprises plurality of processors,
- wherein at least one docking bay of each complex shape of the multiplicity of complex shapes has a bridge unit of a bridge module of the plurality of bridge modules latched therein such that another remaining bridge unit of said bridge module is latched into a docking bay of another complex shape of the multiplicity of complex shapes,
- wherein each docking bay of each complex shape of the multiplicity of complex shapes that does not have a bridge unit of any bridge module of the plurality of bridge modules latched therein has an irregular shaped module of a plurality of irregular shaped modules latched therein, each irregular shaped module providing a functionality for responding to an alert pertaining to an event, and
- wherein the multiplicity of complex shapes comprises a plurality of complex shapes such that at least one docking bay of each complex shape of the plurality of complex shapes has one irregular shaped module of the plurality of irregular shaped modules latched therein.

12. The method of claim 11, wherein the at least one tier is a plurality of tiers, and wherein a sensor module is latched in each sensor docking bay of at least one sensor docking bay and an actuator module is latched in each actuator docking bay of at least one actuator docking bay of each complex shape of one or more complex shapes of the multiplicity of complex shapes in one or more tiers of the plurality of tiers.

13. The method of claim 12, wherein the multiplicity of complex shapes in each tier comprises at least one complex shape such that each docking bay of each complex shape of the at least one complex shape has a bridge unit of a connective bridge module of the plurality of bridge modules latched therein, said connective bridge module comprising a remaining bridge unit latched into a docking bay of some other complex shape of the multiplicity of complex shapes.

14. The method of claim 13, wherein the micro grid apparatus comprises at least one power tower, each power tower encompassing corresponding power hubs in all tiers such that the corresponding power hubs in successive tiers are aligned directly above or directly below each other and are integral with each other, said at least one power tower physically connecting together the tiers of the plurality of tiers.

15. The method of claim 14, wherein the at least one power tower consists of a first power tower whose power hub at each tier is bridged by a bridge module of the plurality of bridge modules in each docking bay to a corresponding processor hub that is not bridged to any other complex shape of the multiplicity of complex shapes.

16. The method of claim 14, wherein the at least one power tower comprises a plurality of power towers, wherein the multiplicity of complex shapes comprises a plurality of simple mosaics, wherein each simple mosaic comprises a corresponding power tower of the plurality of power towers, wherein for each simple mosaic the docking bays of each corresponding power tower are each bridged to a satellite processor hub of the multiplicity of complex shapes, and wherein a satellite processor hub of each simple mosaic is directly bridged to a satellite processor hub of another simple mosaic of the plurality of simple mosaics by a connecting bridge module of the plurality of bridge modules.

17. The method of claim 14, wherein the at least one power tower comprises a plurality of power towers, and wherein a first power tower and a second power tower are directly bridged to each other by a connecting bridge module of the plurality of bridge modules.

18. The method of claim 14, wherein the at least one power tower comprises a plurality of power towers, and wherein a first power tower and a second power tower are indirectly connected to each other by either:
- a single processor hub, wherein the first power tower is directly bridged to the single processor hub at a first docking bay of the single processor hub, and wherein the second power tower is directly bridged to the single processor hub at a second docking bay of the single processor hub; or
- a plurality of processor hubs interconnected with each other by at least one interconnecting bridge module of the plurality of bridge modules, wherein the plurality of processor hubs comprises a first processor hub and a second processor hub, wherein the first power tower is directly bridged to the first processor hub at a docking bay of the first processor hub, and wherein the second power tower is directly bridged to the second processor hub at a docking bay of the second processor hub.

19. The method of claim 13,
wherein the micro grid apparatus comprises at least one pin and socket tower, each pin and socket tower encompassing corresponding pin and socket connection blocks in all tiers such that the corresponding pin and socket connection blocks in successive tiers are aligned directly above or directly below each other and physically connected to each other, said at least one pin and socket tower physically connecting together the tiers of the plurality of tiers; and
wherein the micro grid apparatus does not comprise a power tower that encompasses corresponding power hubs in all tiers such that the corresponding power hubs in successive tiers are aligned directly above or directly below each other and are integral with each other.

20. The method of claim 12, wherein the multiplicity of complex shapes in each tier consists of at least three complex shapes sequentially interconnected by bridge modules of the plurality of bridge modules to form a closed ring.

\* \* \* \* \*